(12) United States Patent
Sasaki et al.

(10) Patent No.: US 8,666,231 B2
(45) Date of Patent: Mar. 4, 2014

(54) RECORDING MEDIUM, REPRODUCTION DEVICE, AND INTEGRATED CIRCUIT

(75) Inventors: Taiji Sasaki, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 13/056,168

(22) PCT Filed: Dec. 2, 2009

(86) PCT No.: PCT/JP2009/006559
§ 371 (c)(1),
(2), (4) Date: Jan. 27, 2011

(87) PCT Pub. No.: WO2010/073499
PCT Pub. Date: Jul. 1, 2010

(65) Prior Publication Data
US 2011/0158604 A1 Jun. 30, 2011

(30) Foreign Application Priority Data
Dec. 26, 2008 (JP) ................................. 2008-334831

(51) Int. Cl.
*H04N 5/76* (2006.01)
*H04N 9/80* (2006.01)
*H04N 5/92* (2006.01)
*H04N 5/93* (2006.01)

(52) U.S. Cl.
USPC ............ 386/341; 386/248; 386/326; 386/353

(58) Field of Classification Search
USPC ................. 386/239–248, 326–342, 353–356
See application file for complete search history.

(56) References Cited

U.S. PATENT DOCUMENTS 5,923,869 A 7/1999 Kashiwagi et al.
6,122,436 A * 9/2000 Okada et al. .................. 386/334

(Continued)

FOREIGN PATENT DOCUMENTS

JP 11-191895 7/1999
JP 2000-270347 9/2000

(Continued)

OTHER PUBLICATIONS

International Preliminary Examination Report issued Nov. 16, 2011 in corresponding Application No. PCT/JP2009/006563.

(Continued)

*Primary Examiner* — Hung Dang
(74) *Attorney, Agent, or Firm* — Wenderoth, Lind & Ponack, L.L.P.

(57) ABSTRACT

Provided is a recording medium in which extents for a base-view and a dependent-view are arranged alternately. The lower limit of the size of the base-view extents is the larger of a first lower limit value and a second lower limit value. The lower limit of the size of the dependent-view extent is a third lower limit value. The first lower limit value is determined so that, in monoscopic video playback, buffer underflow does not occur during jump periods between base-view extents. The second lower limit value is determined so that, in stereoscopic video playback, buffer underflow does not occur during read periods from each base-view extent to a next dependent-view extent. The third lower limit value is determined so that, in stereoscopic video playback, buffer underflow does not occur during read periods from each dependent-view extent to the next base-view extent.

3 Claims, 63 Drawing Sheets

(56) References Cited

U.S. PATENT DOCUMENTS

| | | |
|---|---|---|
| 6,393,574 B1 | 5/2002 | Kashiwagi et al. |
| 6,470,460 B1 | 10/2002 | Kashiwagi et al. |
| 6,484,266 B2 | 11/2002 | Kashiwagi et al. |
| 6,502,198 B2 | 12/2002 | Kashiwagi et al. |
| 6,502,199 B2 | 12/2002 | Kashiwagi et al. |
| 6,502,200 B2 | 12/2002 | Kashiwagi et al. |
| 6,516,138 B2 | 2/2003 | Kashiwagi et al. |
| 6,516,139 B2 | 2/2003 | Kashiwagi et al. |
| 6,519,414 B2 | 2/2003 | Kashiwagi et al. |
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 7,747,145 B2 | 6/2010 | Oshima et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1* | 3/2003 | Oshima et al. .................. 386/98 |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0067873 A1 | 3/2010 | Sasaki et al. |
| 2010/0111503 A1 | 5/2010 | Oshima et al. |
| 2010/0119213 A1 | 5/2010 | Oshima et al. |
| 2012/0008914 A1 | 1/2012 | Sasaki et al. |
| 2012/0008924 A1* | 1/2012 | Sasaki et al. .................. 386/357 |

FOREIGN PATENT DOCUMENTS

| | | |
|---|---|---|
| JP | 3935507 | 3/2007 |
| WO | 2008/044191 | 4/2008 |
| WO | 2010/032404 | 3/2010 |

OTHER PUBLICATIONS

Written Opinion by Intellectual Property Office of Singapore (IPOS) issued Nov. 15, 2012 in Singapore Patent Application No. 201100580-8.

* cited by examiner

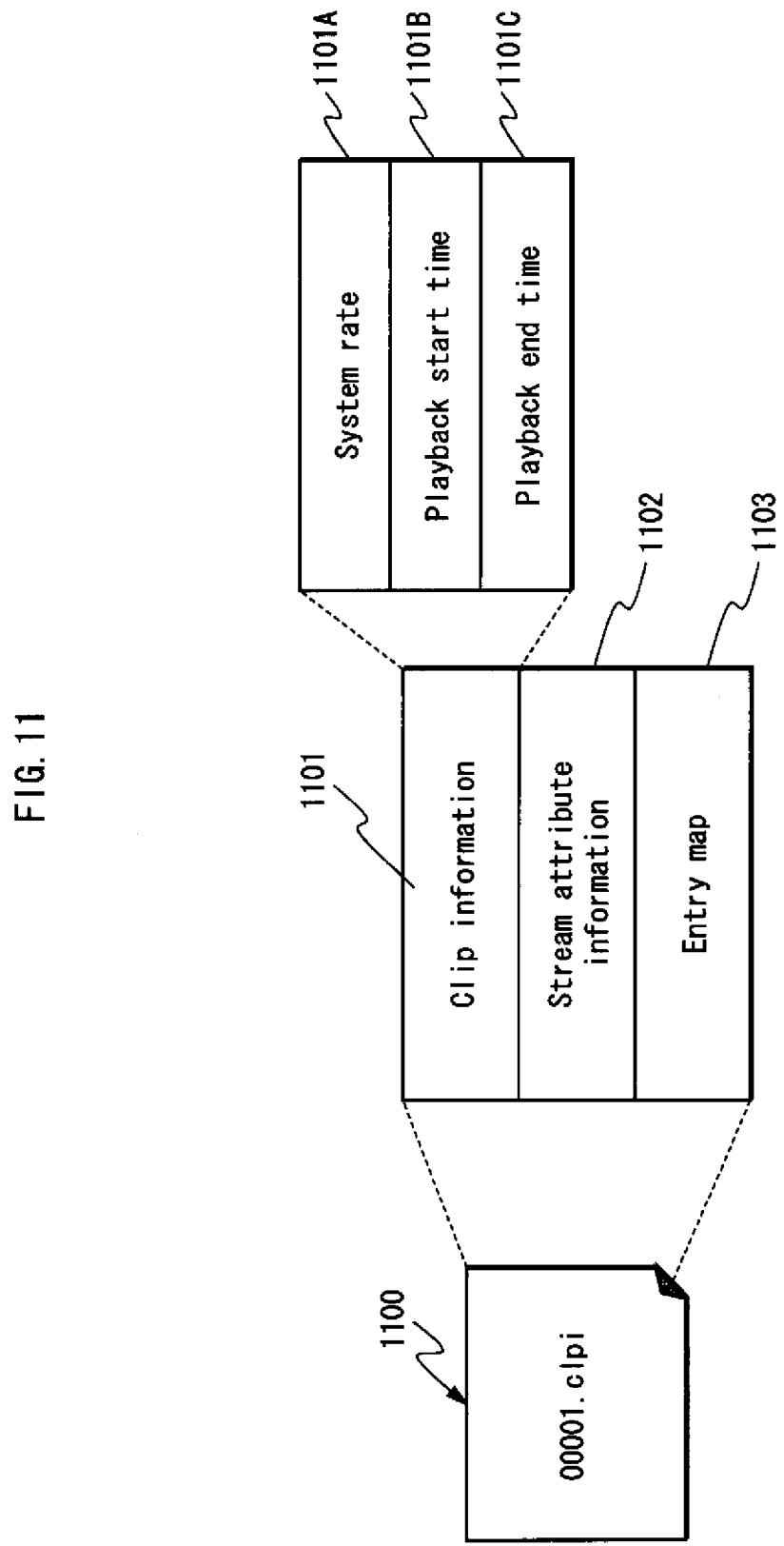

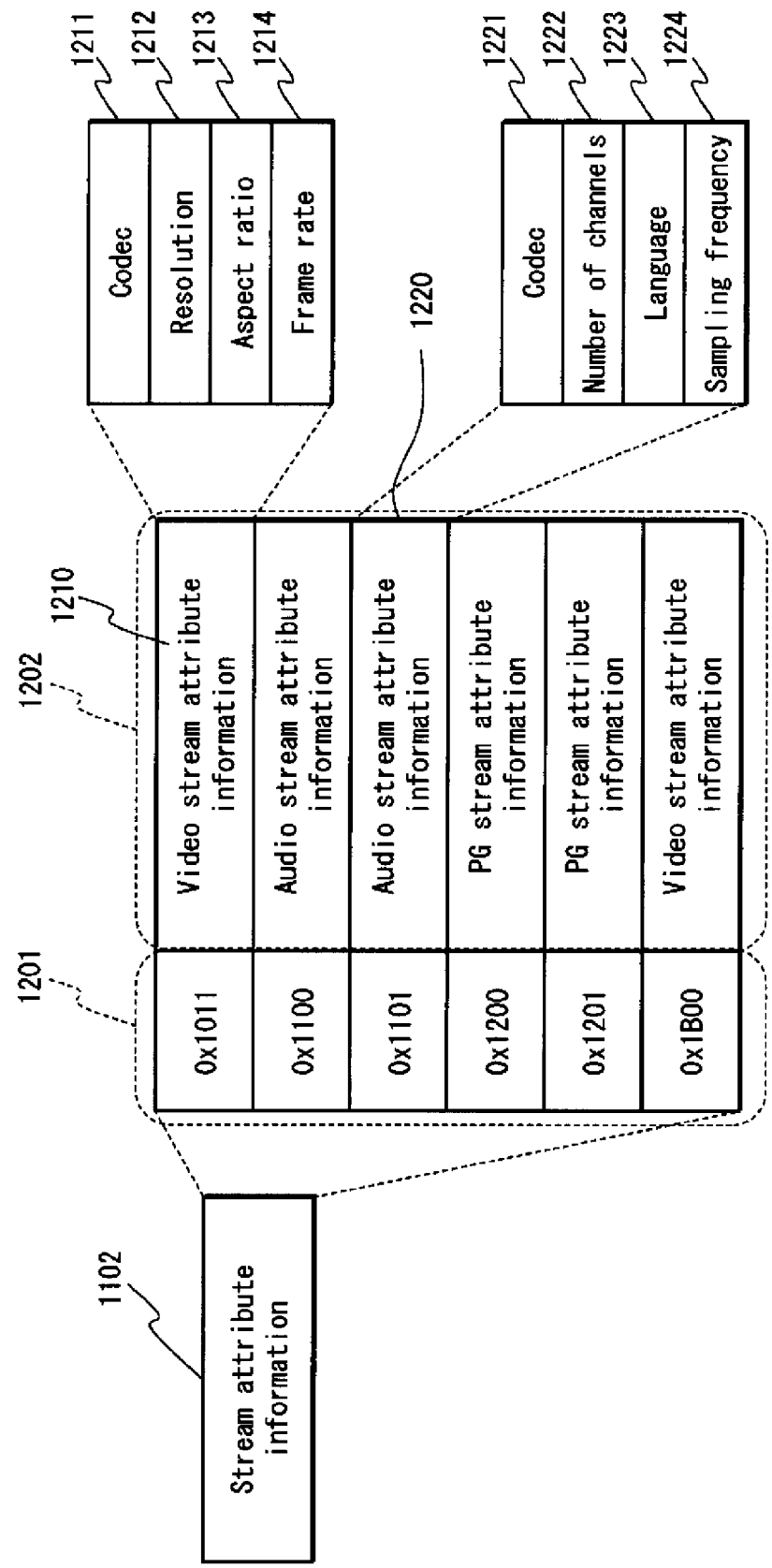

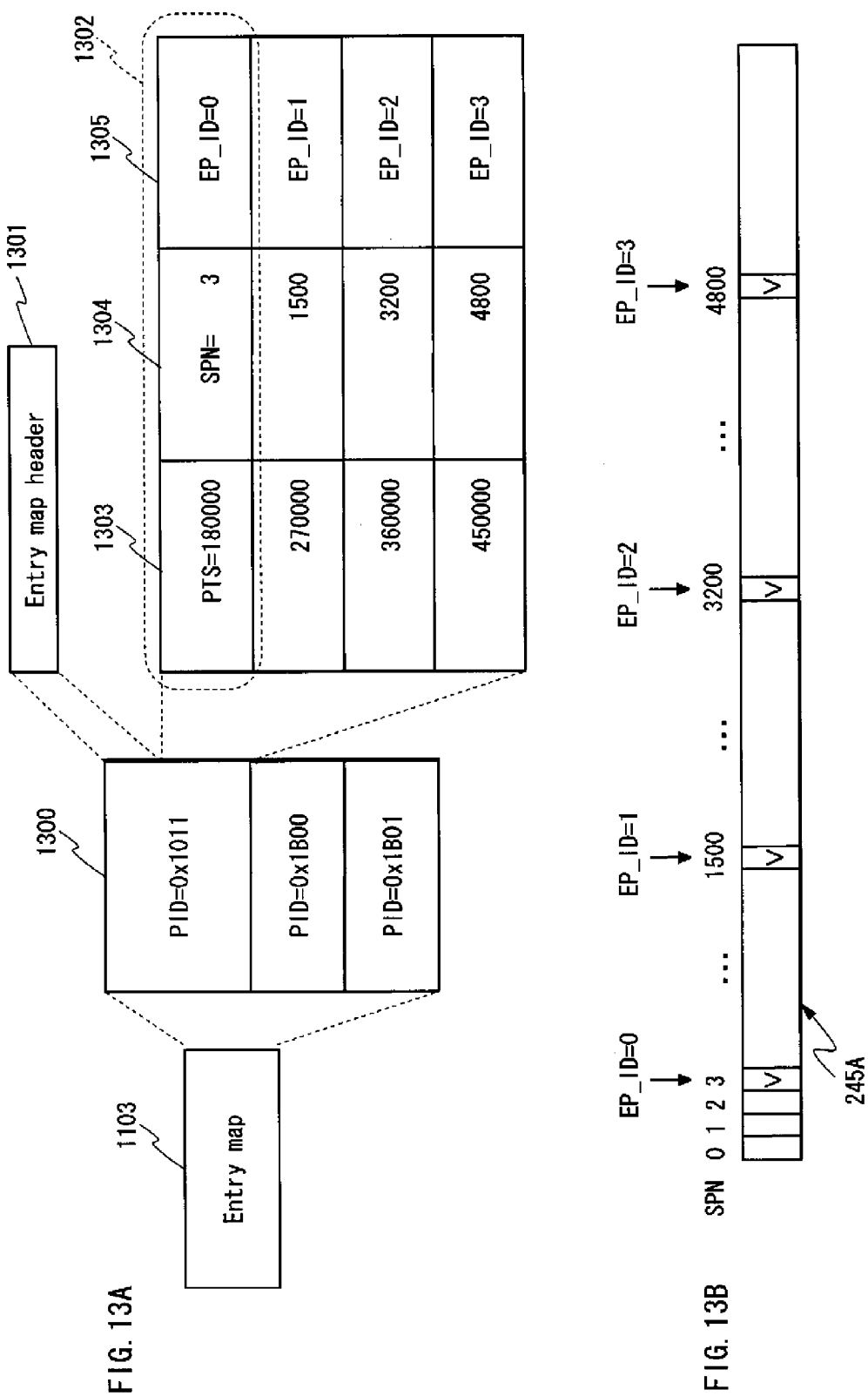

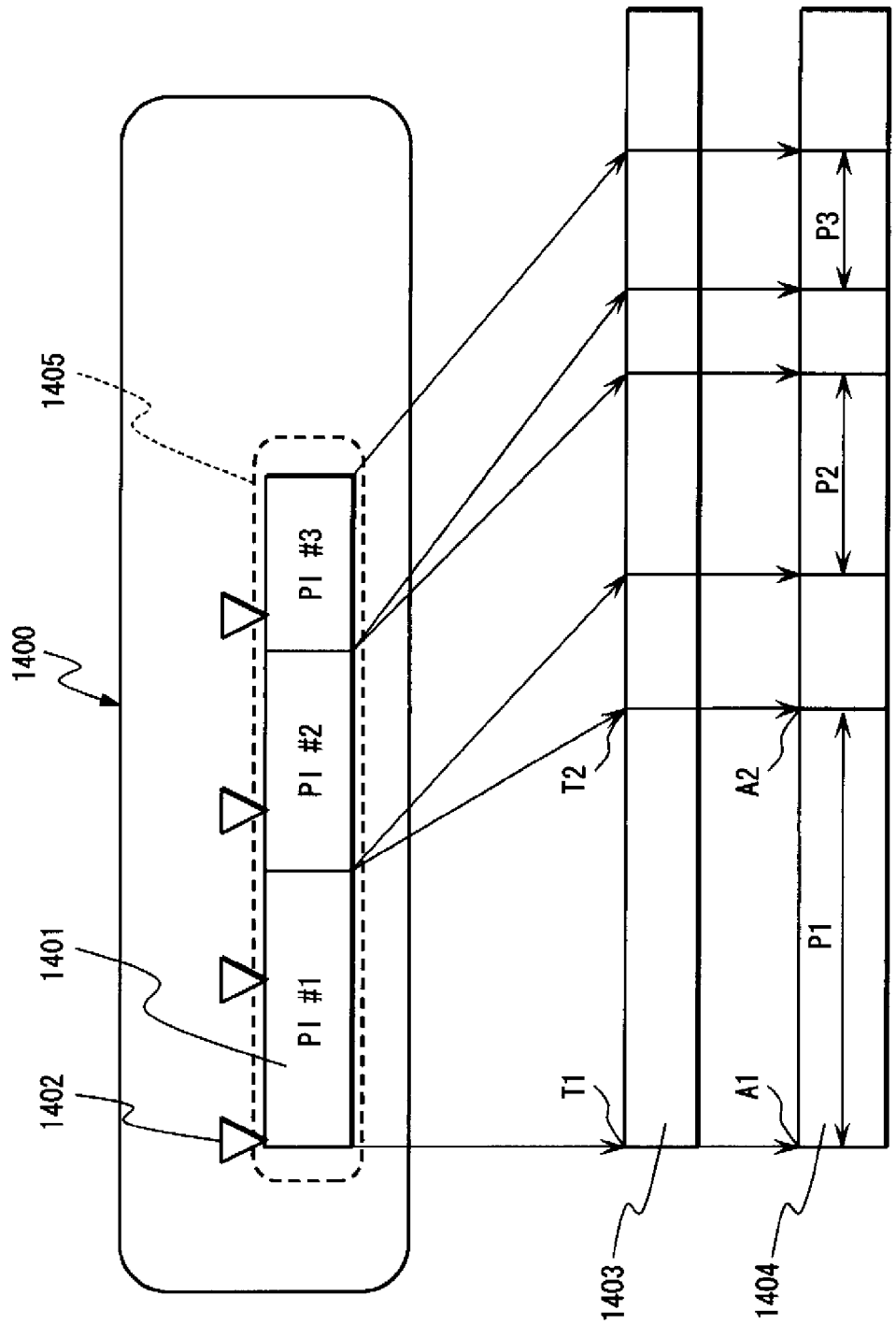

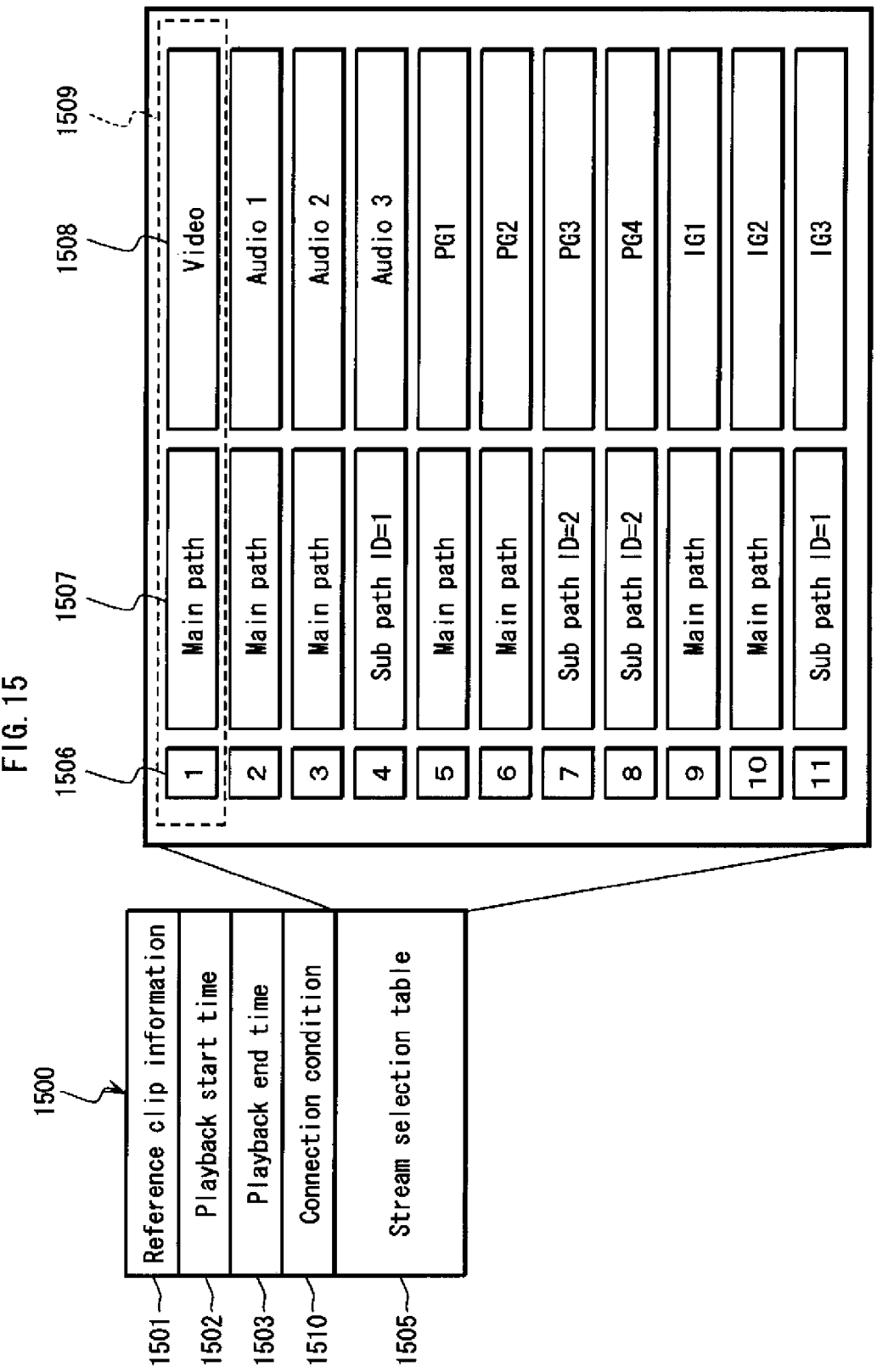

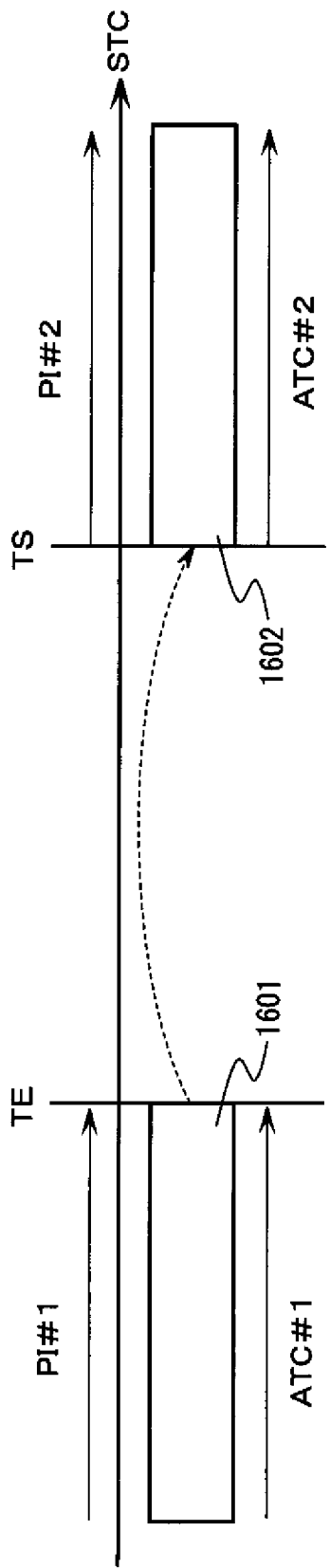
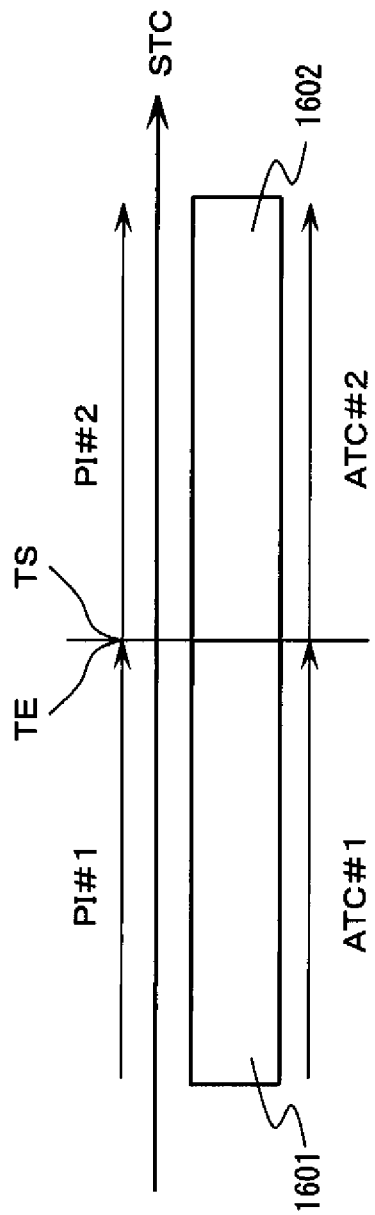
FIG. 16A
FIG. 16B

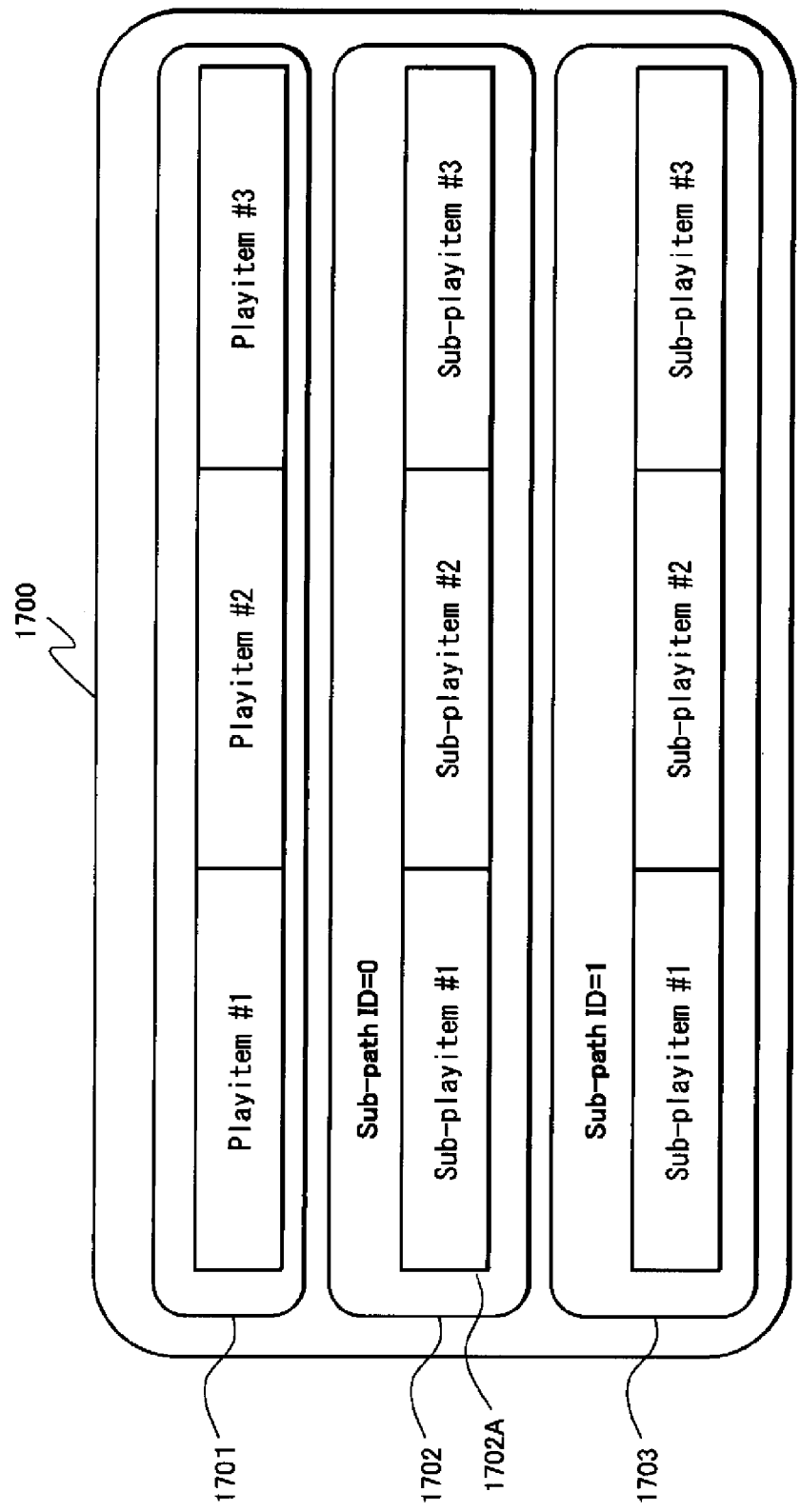

| 1901 | 1902 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 1901 | 1902 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 1901 | 1902 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| 31 | reserved |
| 32 | reserved |

FIG. 24

| S JUMP (Sectors) | 0 - 10000 | 10001 - 20000 | 20001 - 40000 | 40000 - 1/10 stroke | 1/10 stroke or greater |
|---|---|---|---|---|---|
| T JUMP (ms) | 250 | 300 | 350 | 700 | 1400 |

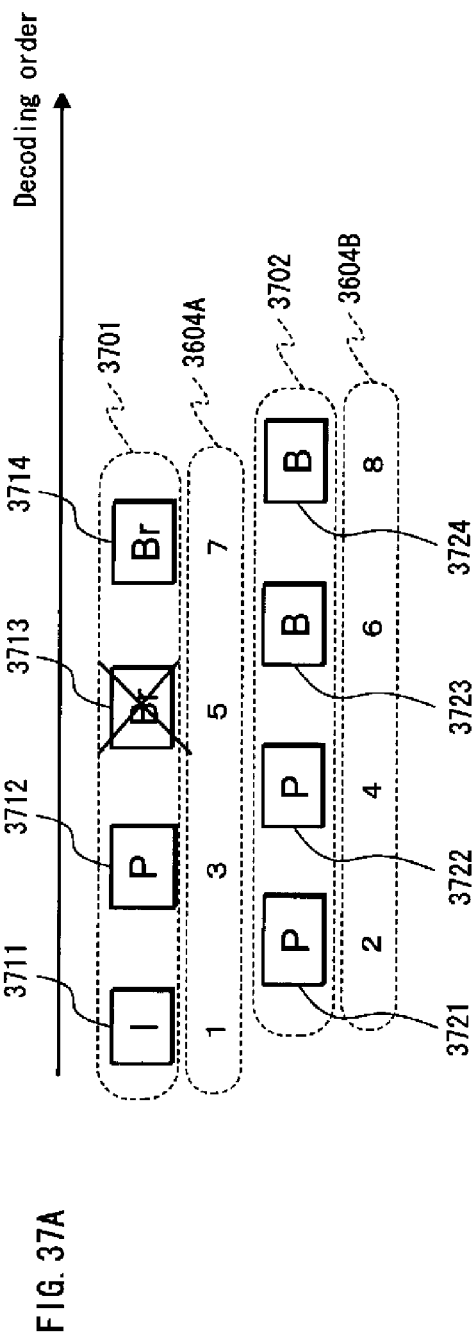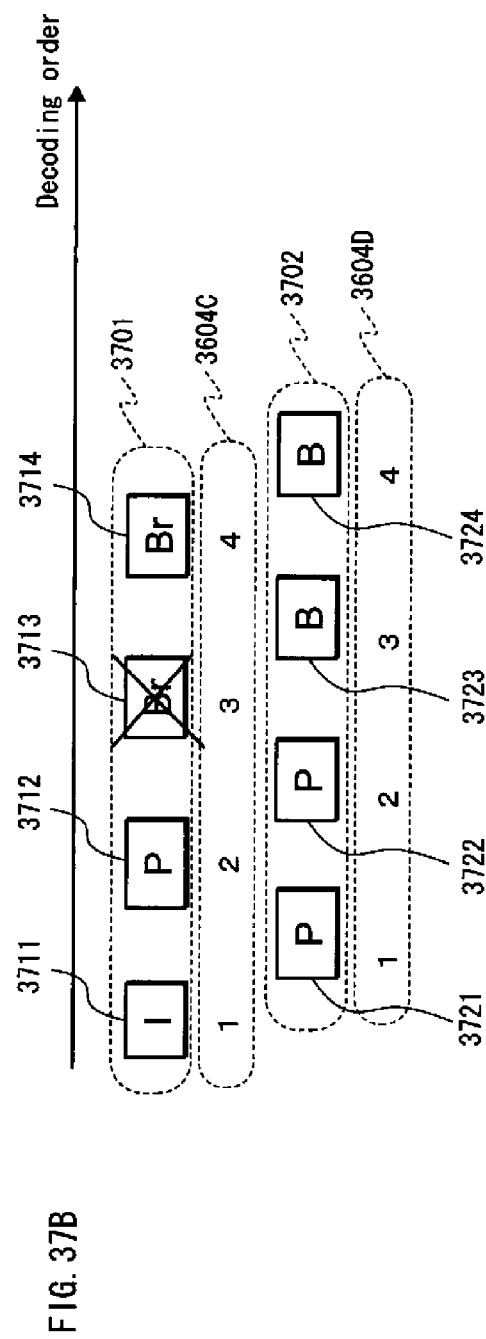
FIG. 37A
FIG. 37B

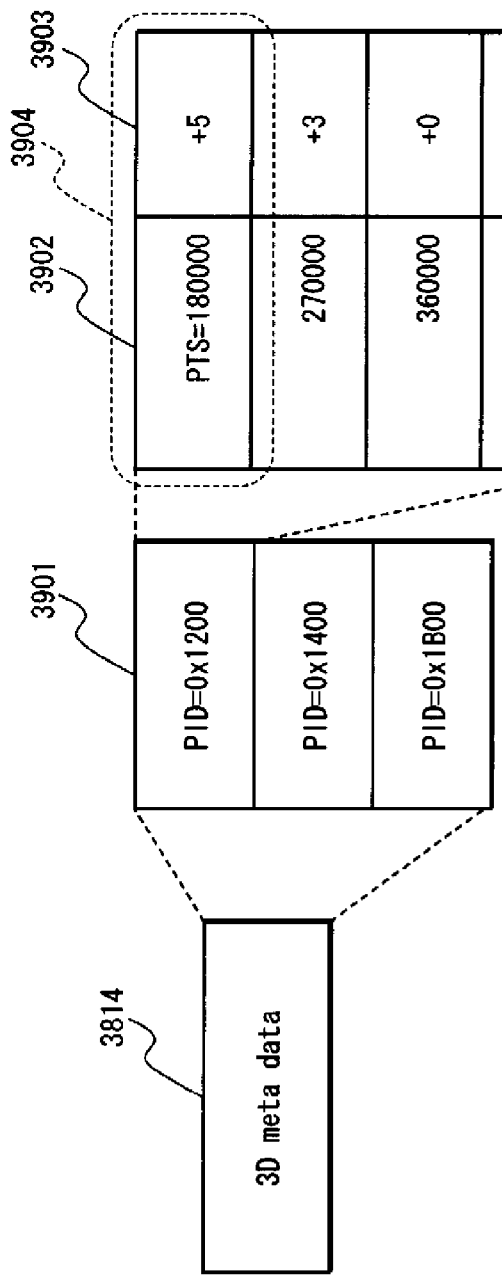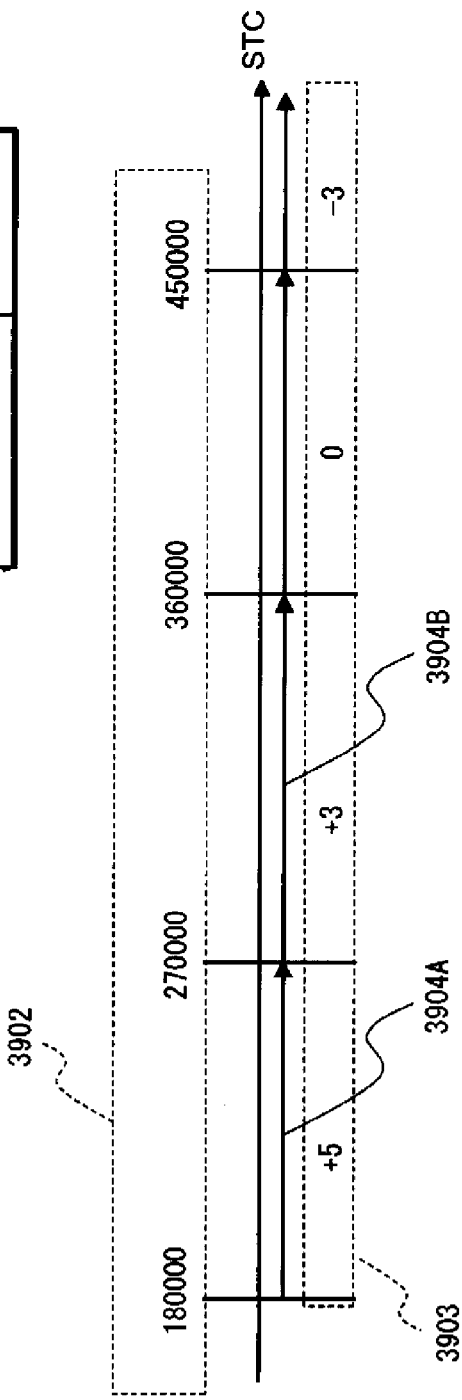
FIG. 39A
FIG. 39B

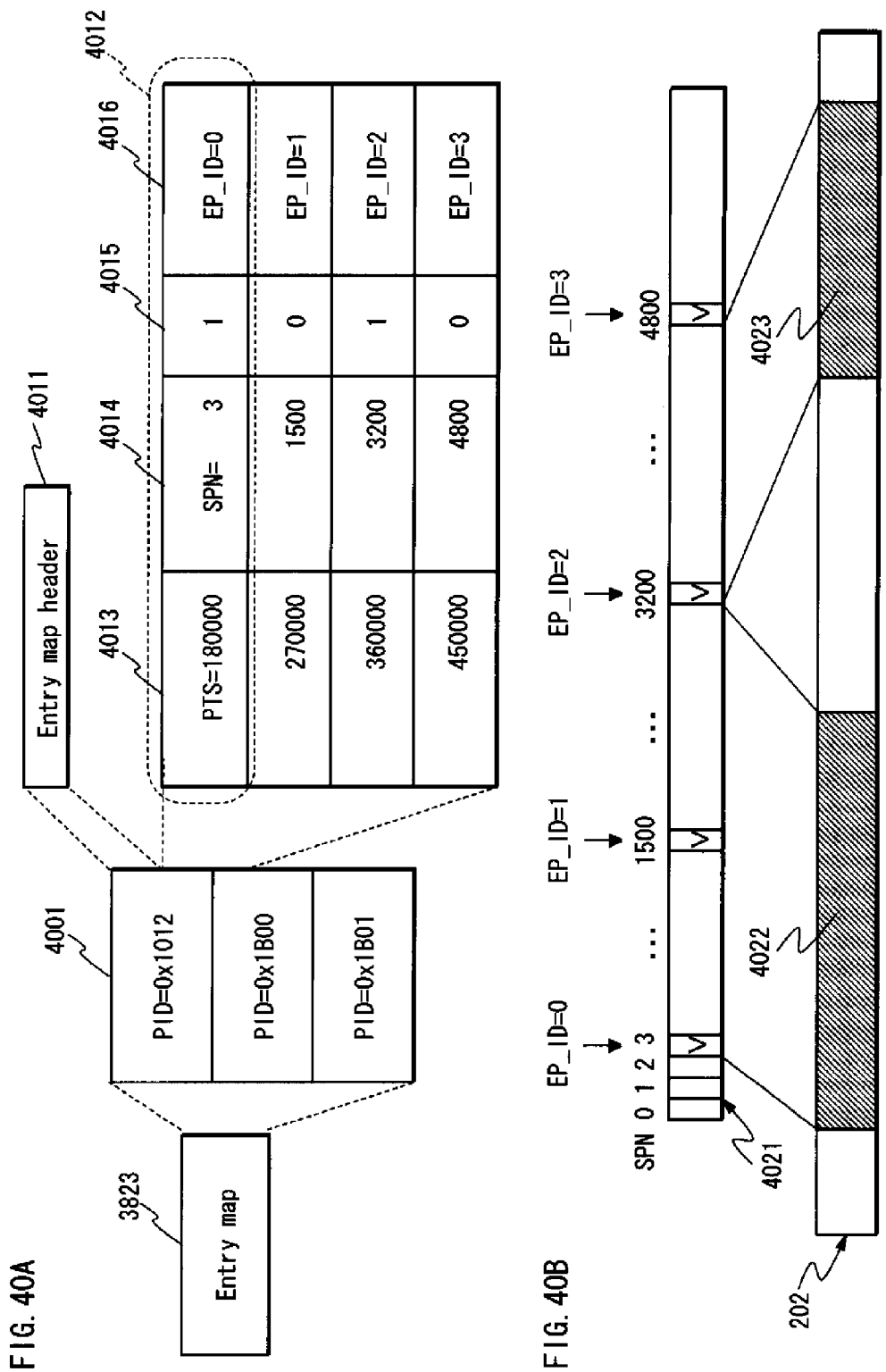

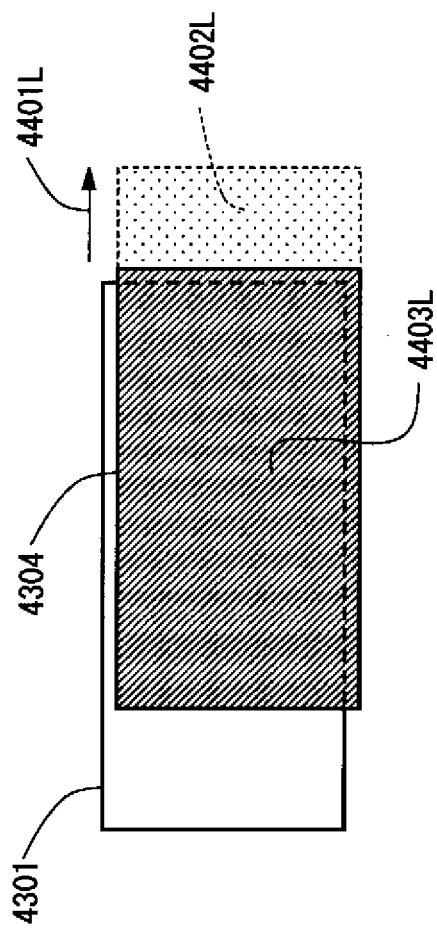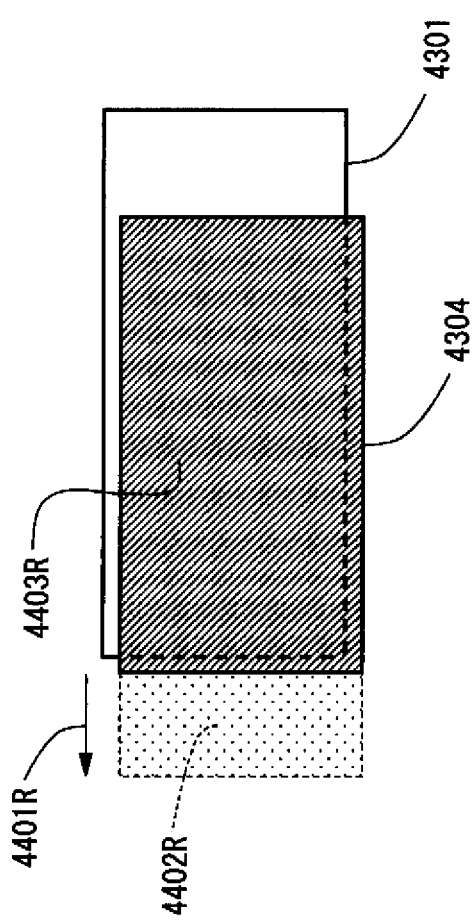
FIG. 44A
FIG. 44B

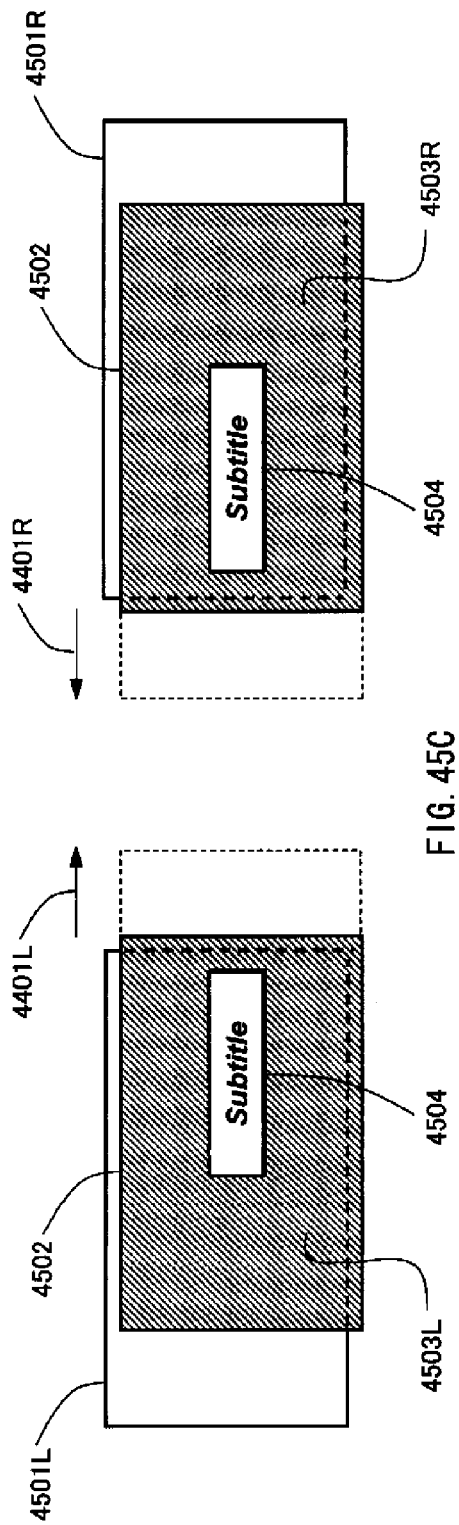
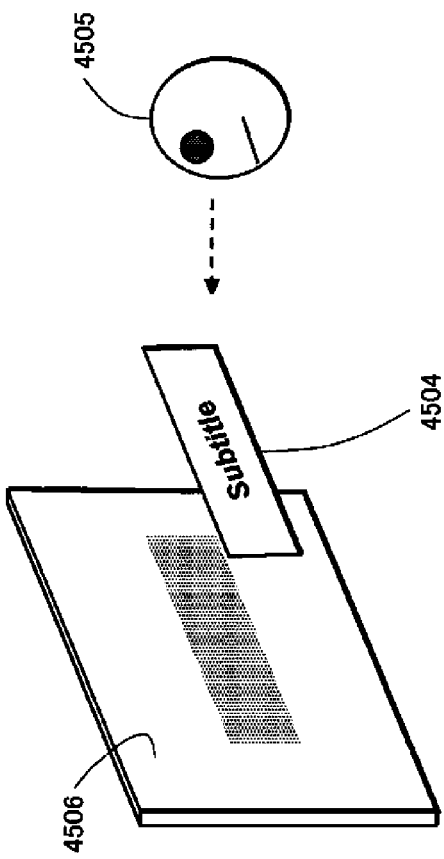
FIG. 45A
FIG. 45B
FIG. 45C

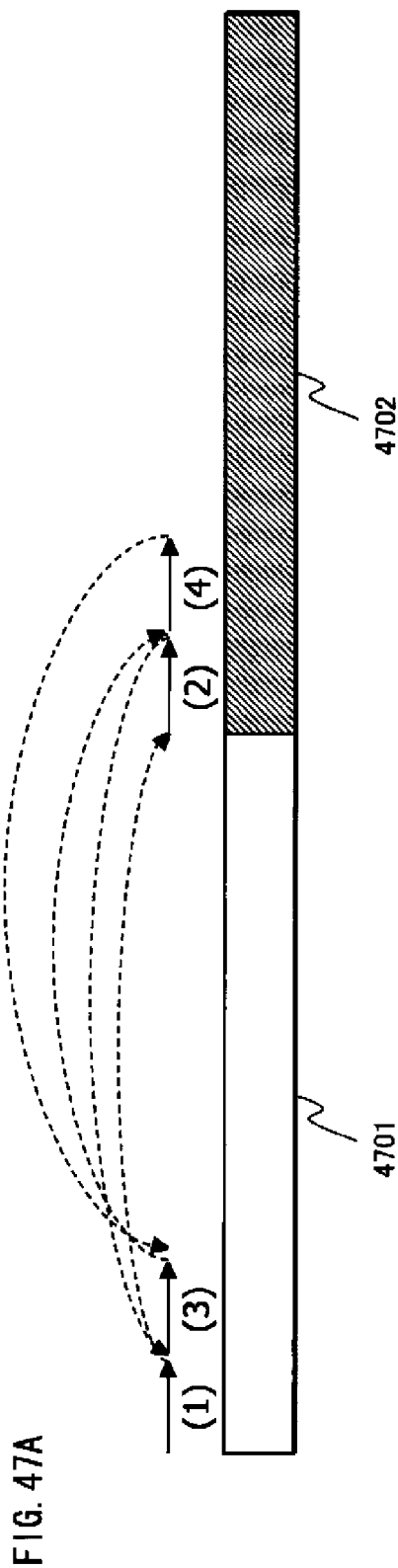
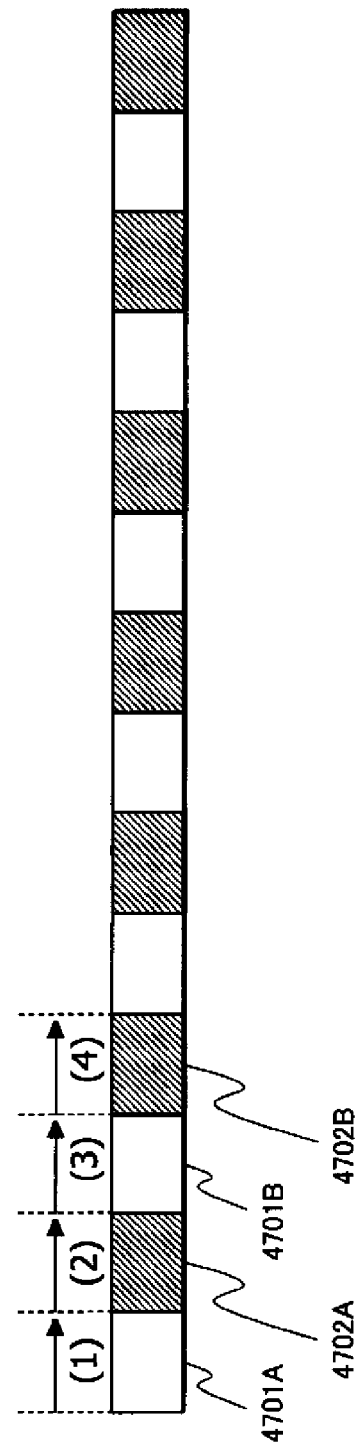
FIG. 47A
FIG. 47B

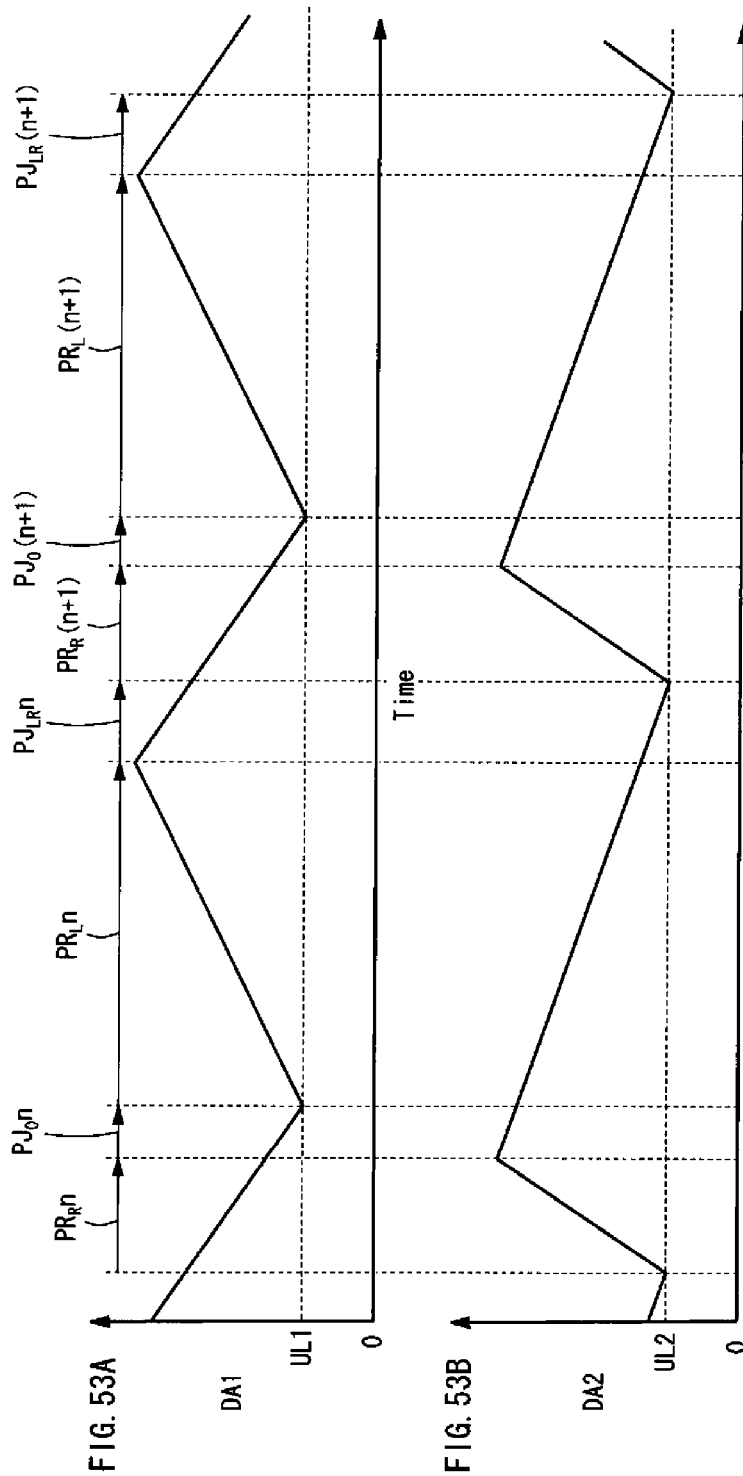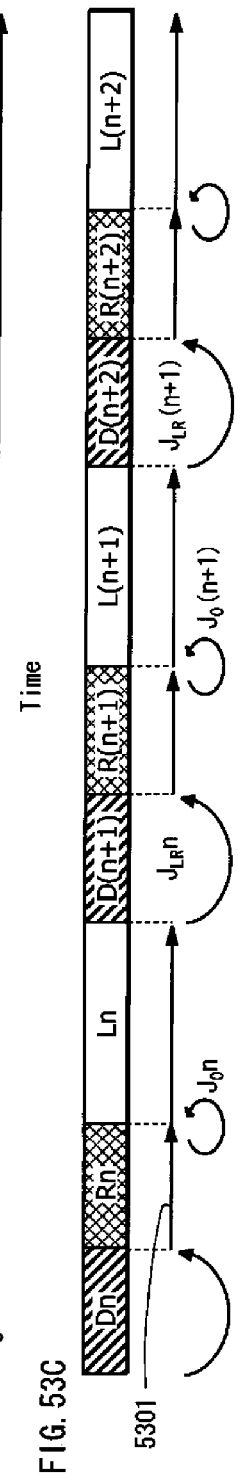
FIG. 53A
FIG. 53B
FIG. 53C

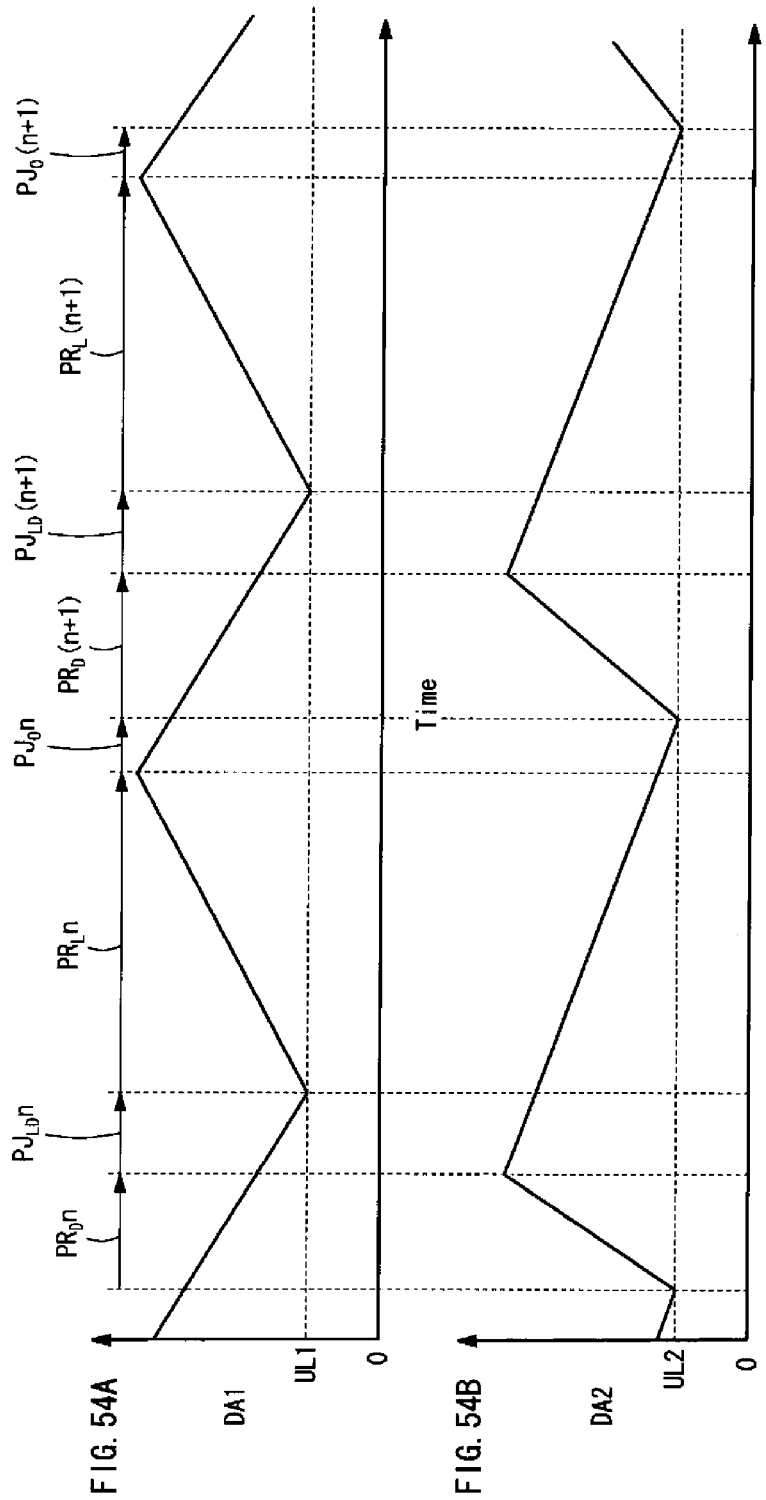

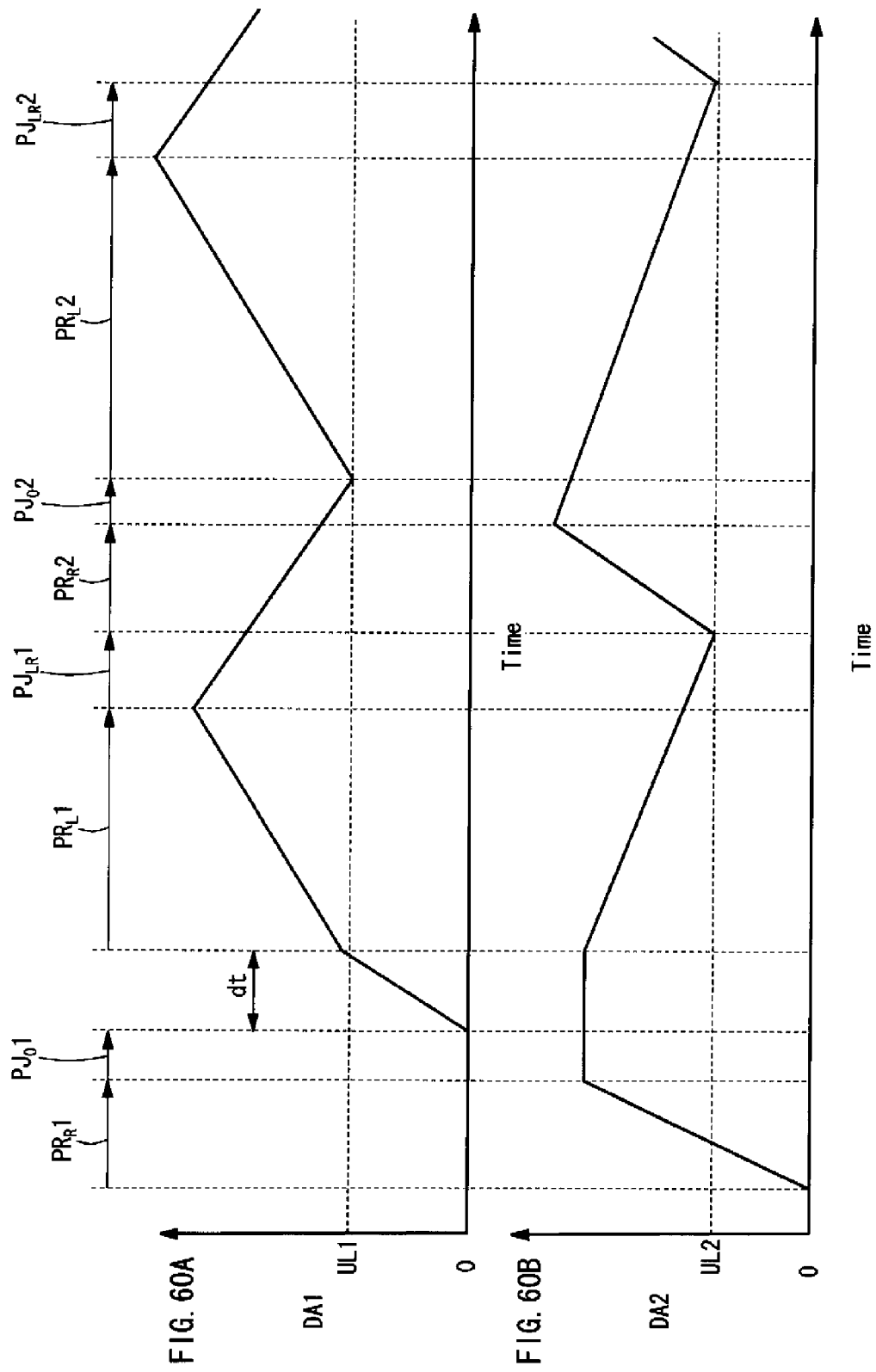

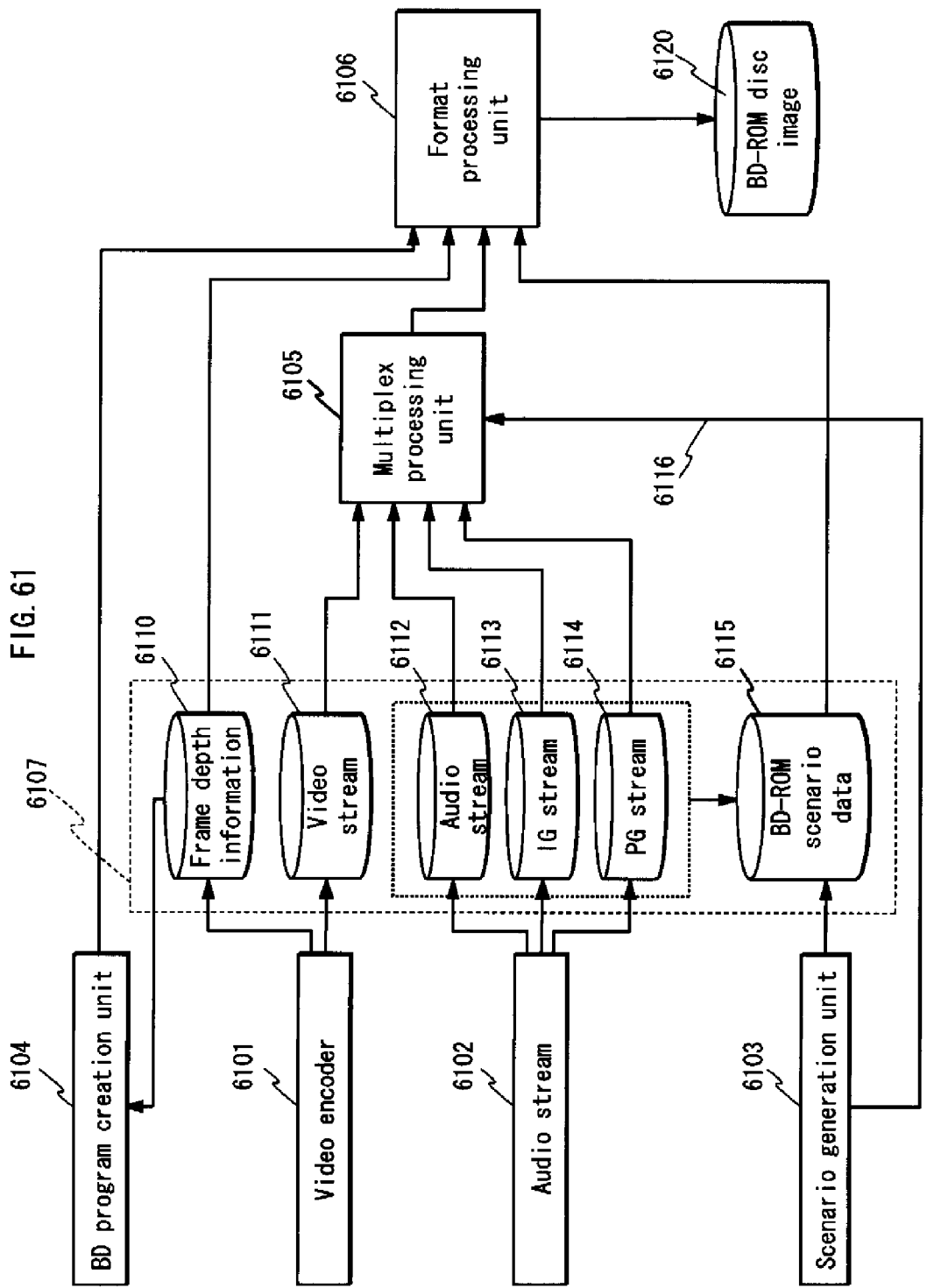

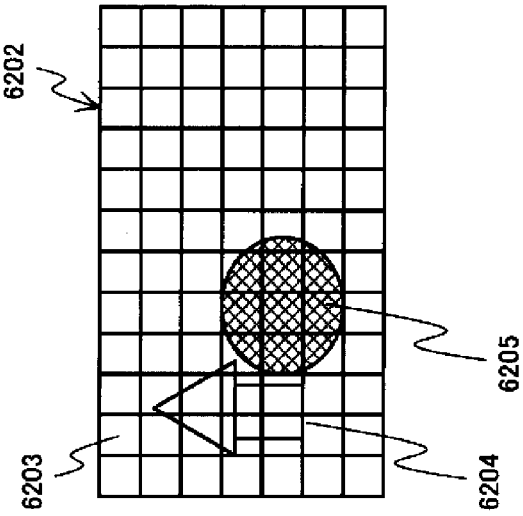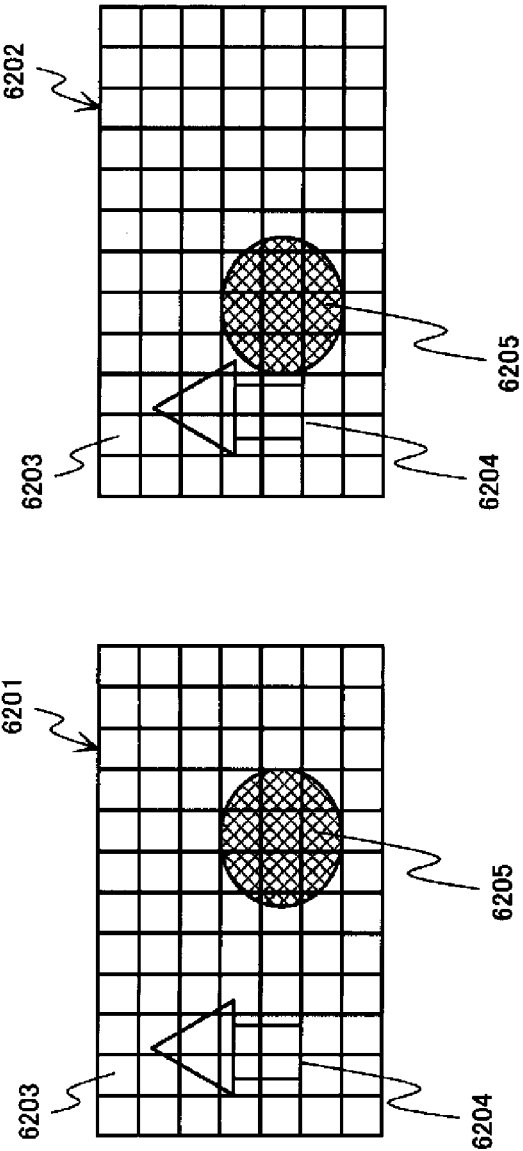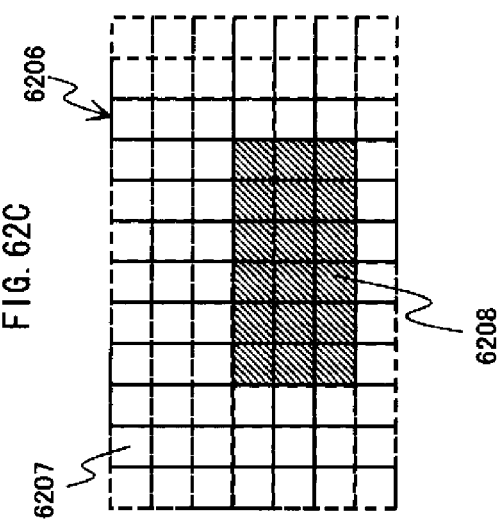

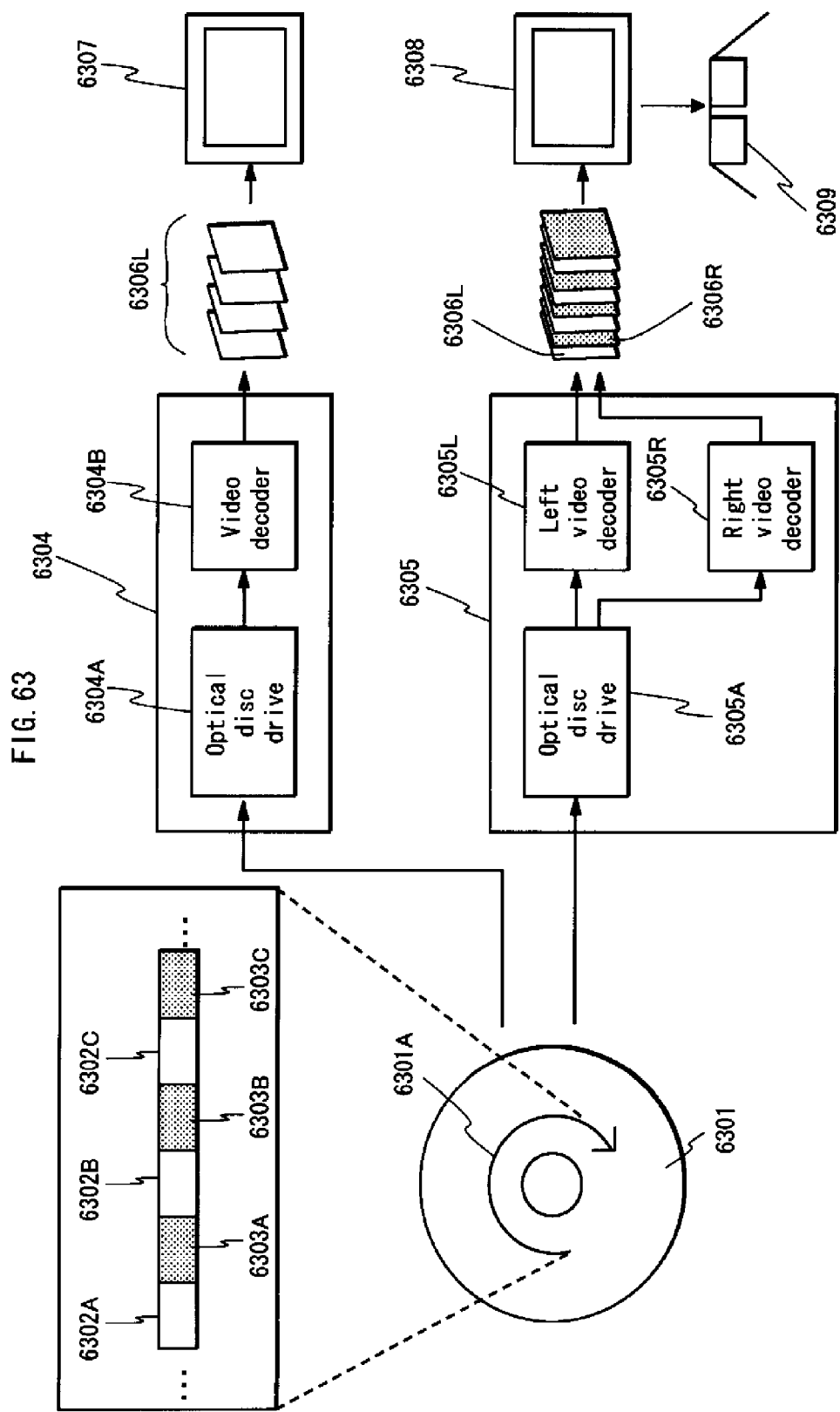

RECORDING MEDIUM, REPRODUCTION DEVICE, AND INTEGRATED CIRCUIT

TECHNICAL FIELD

The present invention relates to a technology for stereoscopic, i.e. three-dimensional (3D), video playback and especially to the allocation of a video stream on a recording medium.

BACKGROUND ART

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can playback 3D video images. Note that in general a 3D playback device can also play back 2D video images.

FIG. 63 is a schematic diagram illustrating the technology for ensuring the compatibility of an optical disc storing 3D video content with 2D playback devices (see Patent Literature 1). An optical disc 6301 stores two types of AV (Audio Visual) stream files. One of these files is a 2D/left-view stream file, and the other is a right-view stream file. The 2D/left-view stream file contains a 2D/left-view stream. A "2D/left-view stream" represents a 2D video image to be shown to the left eye of a viewer during 3D playback, i.e. a "left-view." During 2D playback, this stream constitutes the 2D video image. The right-view stream file contains a right-view stream. A "right-view stream" represents a 2D video image to be shown to the right eye of a viewer during 3D playback, i.e. a "right-view." The left and right video streams have the same frame rate but different presentation times shifted from each other by half a frame period. For example, when the frame rate of each video stream is 24 frames per second, the frames of the left-view and right-view streams are alternately displayed every $1/48$ seconds.

As shown in FIG. 63, the left-view and right-view stream files are divided into a plurality of extents 6302A-C and 6303A-C respectively on the optical disc 6301. Each extent contains at least one GOP (group of pictures) which is read together from the optical disc. Hereinafter, the extents belonging to the 2D/left-view stream file are referred to as "left-view extents," and the extents belonging to the right-view stream file are referred to as "right-view extents." The left-view extents 6302A-C and the right-view extents 6303A-C are alternately arranged on a track 6301A of the optical disc 6301. Each two adjacent extents 6302A-6303A, 6302B-6303B and 6302C-6303C have the same length of playback time. Such an arrangement of extents is referred to as an interleaved arrangement. Groups of extents recorded in an interleaved arrangement on a recording medium are used both in 3D video playback and 2D video image playback, as described below.

From among the extents recorded on the optical disc 6301, a 2D playback device 6304 causes an optical disc drive 6304A to read only the left-view extents 6302A-C sequentially from the start, skipping the reading of right-view extents 6303A-C. Furthermore, an image decoder 6304B sequentially decodes the extents read by the optical disc drive 6304A into a left-view frame 6306L. In this way, a display device 6307 only displays left-views, and viewers can watch normal 2D video images.

A 3D playback device 6305 causes a 3D optical disc drive 6305A to alternately read left-view extents and right-view extents from the optical disc 6301. Expressed as codes, the extents are read in the order 6302A, 6303A, 6302B, 6303B, 6302C, and 6303C. Furthermore, from among the read extents, those belonging to the 2D/left-view stream are supplied to a left video decoder 6305L, whereas those belonging to the right-view stream are supplied to a right-video decoder 6305R. The video decoders 6305L and 6305R alternately decode each video stream into video frames 6306L and 6306R, respectively. As a result, left-views and right-views are alternately displayed on a display device 6308. In synchronization with the switching of the views by the display device 6308, shutter glasses 6309 cause the left and right lenses to become opaque alternately. Therefore, a viewer wearing the shutter glasses 6309 sees the views displayed by the display device 6308 as 3D video images.

When 3D video content is stored on any recording medium, not only on an optical disc, the above-described interleaved arrangement of extents is used. In this way, the recording medium can be used both for playback of 2D video images and 3D video images.

CITATION LIST

Patent Literature

[PTL 1]
Japanese Patent No. 3935507

SUMMARY OF INVENTION

Technical Problem

As shown in FIG. 63, when 2D video images are played back from extent groups in an interleaved arrangement, the optical disc drive 6304A performs a "jump" at each recording area for the right extents 6303A-C. That is, the optical disc drive 6304A skips over the reading of data from these recording areas. During the jump period, since no data from the optical disc drive 6304A is provided to the buffer in the 2D playback device 6304, the amount of data stored in the buffer decreases as processing progresses in the video decoder 6304B. Therefore, in order to seamlessly playback 2D video images, the amount of data, or the size, of each of the left-view extents 6302A-C needs to be equal to or greater than the size at which buffer underfloor can be prevented during the jump period.

On the other hand, when 3D video images are played back from the same extent groups, none of the right-view extents 6303A-C can be read while one of the left-view extents 6302A-C is being read. Therefore, at this time, the amount of data for the right-view extents 6303A-C stored in the buffer in the 3D playback device 6305 decreases as processing progresses in the right video decoder 6305R. Conversely, while one of the right-view extents 6303A-C is being read, the amount of data for the left-view extents 6302A-C stored in the buffer decreases as processing progresses in the left video decoder 6305L. Therefore, in order to seamlessly play back 3D video images, the size of each of the extents 6302A-C and 6303A-C needs to be equal to or greater than the size at which data for one type of extents will not be depleted while the other type of extents is being read.

Two or more different right-view streams can be recorded for a common 2D/left-view stream on a recording medium. In this case, by combining different right-view streams with the left-view stream, a 3D playback device can, for example, play back 3D video images with different binocular disparities from the same recording medium.

A combination of a video stream that represents 2D video images and a "depth map stream" can also be stored on the recording medium. Such 2D video images represent 3D video images projected on a hypothetical 2D picture plane. The depth map stream includes a depth map for each frame in the 3D video images. A depth map represents a depth of the 3D video images at each pixel as compared to the 2D picture plane. A 3D playback device can play back 3D video images by constructing a combination of a left-view stream and a right-view stream from a combination of the video stream and the depth map stream. Here, the above-mentioned 2D/left-view stream can be used as the video stream representing the 2D video images. In this case, in addition to the 2D/left-view stream and the right-view stream, a depth map stream is recorded on the recording medium.

In the above-described ways, when in addition to a single combination of left and right video streams, another video stream is recorded on one recording medium, three or more types of extents are arranged in an interleaved manner on the recording medium. Therefore, when 3D video images are played back from such extent groups, the optical disc drive performs a jump at each recording area for the extents that are not targeted for playback, as it does during playback of 2D video images. As a result, in order to seamlessly play back 3D video images, the size of each extent needs to be equal to or greater than the size at which buffer underflow or depletion of data for one type of the extents can be avoided during each jump period.

In all of the above-mentioned cases, if the size of each extent is simply large, buffer underflow and the like can be avoided. If the extents are too large, however, it is difficult to further decrease the capacity of the buffer. This is not preferable, as it makes it difficult to further reduce the circuit size of the playback device and to further reduce manufacturing cost.

An object of the present invention is to provide a recording medium having two or more stream files recorded thereon in a more appropriate arrangement so as to allow further reduction in the buffer capacity of a playback device without causing buffer underflow to occur.

Solution to Problem

On a recording medium according to the present invention, a base-view stream file and a dependent-view stream file are recorded. The base-view stream file is used for monoscopic video playback. The dependent-view stream file is used for stereoscopic video playback in combination with the base-view stream file. The recording medium further includes a contiguous area in which a plurality of base-view extents belonging to the base-view stream file and a plurality of dependent-view extents belonging to the dependent-view stream file are arranged in an interleaved manner. A lower limit of a size of each base-view extent is a larger one of a first lower limit value and a second lower limit value. The first lower limit value is determined so that, in monoscopic video playback, buffer underflow does not occur in a playback device during a jump period from each base-view extent to a next base-view extent. The second lower limit value is determined so that, in stereoscopic video playback, buffer underflow does not occur in a playback device during a read period of a next dependent-view extent after each base-view extent. A lower limit of a size of each dependent-view extent is a third lower limit value. The third lower limit value is determined so that, in stereoscopic video playback, buffer underflow does not occur in a playback device during a read period of a next base-view extent after each dependent-view extent.

Advantageous Effects of Invention

In the above-described recording medium according to the present invention, the lower limits for the sizes of the base-view extents and the dependent-view extents are clear. As a result, it is easy to appropriately design the size of each extent so that the buffer capacity of the playback device can be further reduced without causing buffer underfloor to occur during playback from the recording medium of both monoscopic video images and stereoscopic video images.

BRIEF DESCRIPTION OF DRAWINGS

FIG. 11 is a schematic diagram showing the data structure of the part of the first clip information file shown in FIG. 2 that is used as a 2D clip information file.

FIG. 12 is a schematic diagram showing the data structure of stream attribute information shown in FIG. 11.

FIG. 13A is a schematic diagram showing the data structure of the entry map shown in FIG. 11, and FIG. 13B is a schematic diagram showing the source packets, from among the source packets included in the first AV stream file, that are associated with each EP_ID by the entry map.

FIG. 14 is a schematic diagram showing the data structure of a 2D playlist file.

FIG. 15 is a schematic diagram showing the data structure of playitem information shown in FIG. 14.

FIGS. 16A and 16B are schematic diagrams showing the relationship between playback sections specified by each piece of playitem information to be connected when the connection condition shown in FIG. 15 indicates "5" and "6," respectively.

FIG. 17 is a schematic diagram showing the data structure of a 2D playlist file when the playback path includes subpaths.

FIG. 19 is a list of system parameters stored in the player variable storage unit shown in FIG. 18.

FIG. 24 is a table showing an example of the relationship between jump distances and jump times specified for BD-ROM discs.

FIGS. 37A and 37B are schematic diagrams showing the values of decode counters allocated to each picture in the base-view stream and the dependent-view stream.

FIGS. 39A and 39B are schematic diagrams showing the data structure of the 3D meta data shown in FIG. 38A.

FIG. 40A is a schematic diagram showing the data structure of the entry map for the dependent-view clip information file shown in FIG. 38B, and FIG. 40B is a schematic diagram showing the relationship between the SPN shown by an entry point and an extent on the BD-ROM disc.

FIGS. 44A and 44B are schematic diagrams showing the cropping processing by each of the first through third cropping processing units shown in FIG. 43.

FIGS. 45A and 45B are schematic diagrams respectively showing a left-view and a right-view superimposed by cropping processes shown in FIGS. 44A and 44B, and FIG. 45C is a schematic diagram showing the resulting 3D video images that the viewer is made to perceive.

FIGS. 47A and 47B are schematic diagrams showing the arrangement on a disc of the extents belonging to a base-view stream file and a dependent-view stream file.

FIGS. 53A, 53B, and 53C are graphs showing the change of the accumulated data amount in each read buffer when the 3D playback device plays back 3D video images in L/R mode from the extent groups shown in FIG. 49.

FIGS. 54A, 54B, and 54C are graphs showing the change of the accumulated data amount in each read buffer when the 3D playback device plays back 3D video images in depth mode from the extent groups shown in FIG. 49.

FIGS. 60A and 60B are graphs showing the change of the accumulated data amount in each read buffer when a different method is used to guarantee the available buffer capacity in each read buffer.

FIG. 61 is a block diagram showing the inner structure of a recording device according to Embodiment 2 of the present invention.

FIGS. 62A, 62B, and 62C are schematic diagrams showing processes to calculate depth information from a pair of left and right pictures by the video encoder shown in FIG. 61.

FIG. 63 is a schematic diagram showing technology to ensure compatibility of an optical disc with 3D video content recorded thereon with a 2D playback device.

DESCRIPTION OF EMBODIMENTS

The following describes a recording medium and a playback device pertaining to preferred embodiments of the present invention with reference to the drawings.

Embodiment 1

Figure 1:
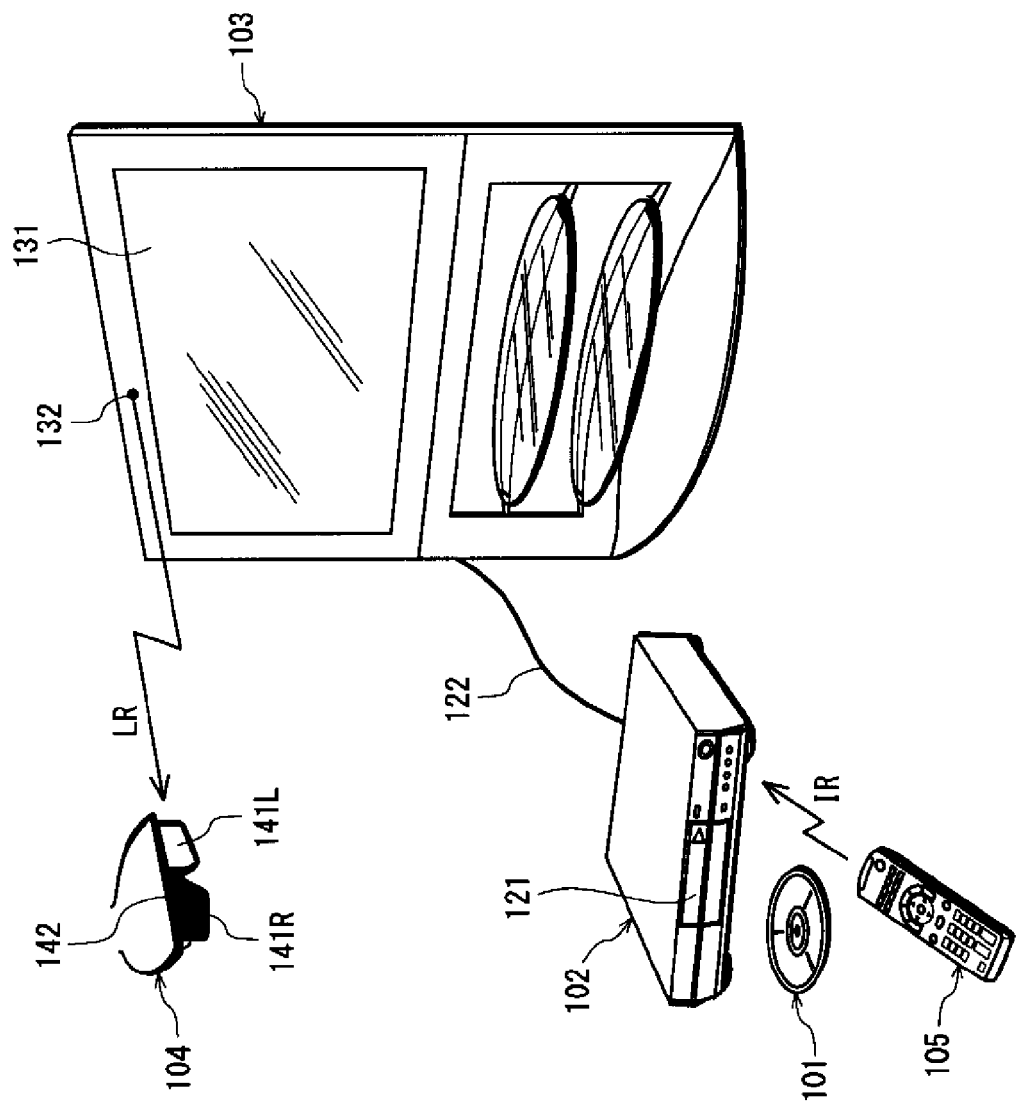
FIG. 1 is a schematic diagram showing a home theater system using a recording medium according to Embodiment 1 of the present invention.

FIG. 1 is a schematic diagram showing a home theater system using a recording medium according to Embodiment 1 of the present invention. In FIG. 1, the recording medium 101 is a read-only Blu-ray disc (BD), i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores a movie content as 3D video images. The home theater center includes a playback device 102, a display device 103, shutter glasses 104, and a remote control 105.

A BD-ROM drive 121 is mounted on the playback device 102. The BD-ROM drive 121 is an optical disc drive conforming to the BD-ROM format. The playback device 102 uses the BD-ROM drive 121 to read a movie content from the BD-ROM disc 101. The playback device 102 further decodes the movie content into video data/audio data. When the playback device 102 is a 2D playback device, or when the display device 103 only supports playback of 2D video images, then the video data only includes either a left-view or a right-view video frame. On the other hand, when the playback device 102 is a 3D playback device, and when the display device 103 supports playback of 3D video images, then the video data includes both left-view and right-view video frames.

The playback device 102 is connected to the display device 103 via an HDMI (High-Definition Multimedia Interface) cable 122. The playback device 102 converts the video data/audio data into a video signal/audio signal in the HDMI format and sends the signals to the display device 103 via the HDMI cable 122. Here, when the playback device 102 is a 2D display device, or when the display device 103 only supports playback of 2D video images, then only one of either the left-view or the right-view video frame is multiplexed in the video signal. On the other hand, when the playback device 102 is a 3D playback device, and when the display device 103 supports playback of 3D video images, then both the left-view and the right-view video frames are time-multiplexed in the video signal. Additionally, the playback device 102 exchanges CEC messages with the display device 103 via the HDMI cable 122. In this way, the playback device 102 asks the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in accordance with a video signal, and causes the speakers to produce audio in accordance with an audio signal. Here, when the playback device 102 is a 2D display device, or when the display device 103 only supports playback of 2D video images, then only one of either the left-view or the right-view is displayed on the screen 131. On the other hand, when the playback device 102 is a 3D playback device, and when the display device 103 supports playback of 3D video images, then the left-view and the right-view are displayed alternately on the screen 131.

When the display device 103 supports playback of 3D video images, a left/right signal transmitting unit 132 is further mounted on the display device 103. The display device 103 uses this unit to transmit a left/right signal LR to the shutter glasses 104 via infrared rays or by radio transmission. The left/right signal LR indicates whether the image displayed on the screen 131 at that point is a left-view or a right-view image. The display device 103 distinguishes between a left-view frame and a right-view frame using the control signal that accompanies a video signal and synchronizes the switching of the waveform for the left/right signal LR with the switching of the frame.

The shutter glasses 104 include two liquid crystal display panels 141L and 141R and a left/right signal receiving unit 142. Each of the liquid crystal display panels 141L and 141R constitute each of the left and right lens parts. The left/right signal receiving unit 142 receives a left/right signal LR, and in accordance with the waveform, sends the signal to the left and right liquid crystal display panels 141L and 141R. In accordance with the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. In this way, the two liquid crystal display panels 141L and 141R alternately let light pass through in sync with the switching of frames. As a result, when a viewer looks at the screen 131 while wearing the shutter glasses 104, the left-view is shown only to the viewer's left eye, and the right-view is shown only to the right eye. At that time, the viewer is made to perceive the difference between the images seen by each eye as the binocular parallax for a single stereoscopic image, and thus the video appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and passes a signal that specifies the button to the transmitting unit. The transmitting unit sends this signal as a signal IR via infrared rays or radio transmission to the playback device 102 or the display device 103. In this way, the user can remotely control the playback device 102 or the display device 103.

<Data Structure of the BD-ROM Disc>

Figure 2:
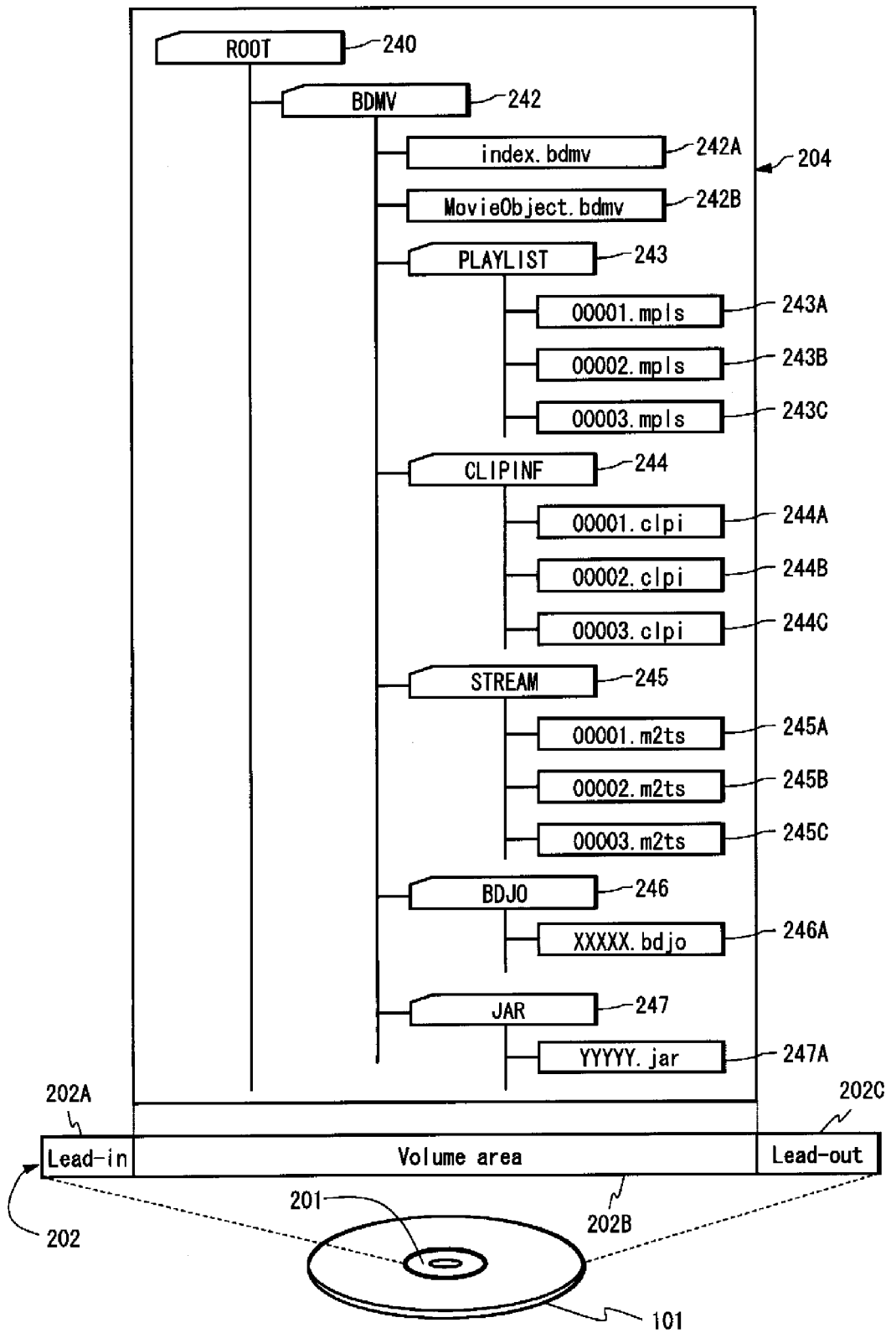
FIG. 2 is a schematic diagram showing the data structure of the BD-ROM disc shown in FIG. 1.

FIG. 2 is a schematic diagram showing the data structure of the BD-ROM disc 101. As shown in FIG. 2, a BCA (Burst Cutting Area) 201 is provided at the innermost portion of the data recording area on the BD-ROM disc 101. Only the BD-ROM drive 121 is permitted to access the BCA, and access by application programs is prohibited. In this way, the BCA 201 can be used as technology for copyright protection. In the data recording area outside of the BCA 201, tracks are formed spiraling from the inner to the outer circumference. In FIG. 2, the track 202 is virtually extended in a transverse direction. The left side of track 202 represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video, audio, etc.

The volume area 202B is divided into small areas called "sectors." Sectors are consecutively assigned numbers in order from the top of the volume area 202B. These consecutive numbers are called logical addresses (or logical block numbers). Data is read from the BD-ROM disc 101 by designating a logical address to the sector storing that data. In this way, the volume area 202B can be accessed in units of sectors. In the BD-ROM disc 101, logical addresses are furthermore substantially equivalent to physical addresses on the disc 101. That is, in an area where the logical addresses are consecutive, the physical addresses are also substantially consecutive. Accordingly, the BD-ROM drive 121 can consecutively read data pieces having consecutive logical addresses without making the optical pickup perform a seek.

<<File System of the BD-ROM Disc>>

UDF (Universal Disc Format) is used as the file system for the volume area 202B. Alternatively, the file system may be ISO9660. The data recorded on the volume area 202B is represented in a directory/file format in accordance with the file system. In other words, the data is accessible in units of directories or files.

More specifically, when a UDF is employed as the file system, the volume area 202B includes a directory area, a recording area for a file set descriptor, and a recording area for a terminating descriptor. A "directory area" is ordinarily a plurality of areas, each of which is a recording area for data constituting a single directory. The "file set descriptor" indicates a logical block number (LBN) of a sector that stores the file entry of the root directory. The "terminating descriptor" indicates the termination of the file set descriptor.

Each directory area shares a common data structure. In particular, each directory area has a file entry, a directory file, and recording areas for each subordinate file.

The "file entry" includes a descriptor tag, an ICB tag, and an allocation descriptor. The "descriptor tag" indicates that the data that includes the descriptor tag is the file entry. For example, when a descriptor tag has a value of "261," that data is a file entry. The "ICB tag" indicates attribute information of the file entry itself. The "allocation descriptor" indicates the LBN of the sector on which the directory file belonging to the same directory area is recorded.

The "directory file" includes the file identifier descriptor of a subordinate directory and the file identifier descriptor of a subordinate file. The "file identifier descriptor of a subordinate directory" is reference information used for accessing the subordinate directory located immediately below the directory recorded in the directory area. In particular, this file identifier descriptor includes identification information of the subordinate directory, the length of the directory name, a file entry address, and the actual directory name. Here, the file entry address indicates the LBN of the sector on which the file entry of the subordinate directory is recorded. The "file identifier descriptor of a subordinate file" is reference information for accessing the subordinate file located immediately below the directory recorded in the directory area. This file identifier descriptor includes identification information of the subordinate file, the length of the file name, a file entry address, and the actual file name. Here, the file entry address indicates the LBN of the file entry of the subordinate file. By tracing the file identifier descriptors of subordinate directories/files, the file entries of the subordinate directories/files can be sequentially found, starting from the file entry of the root directory.

The "subordinate file" includes the file entry and the body of the subordinate file located immediately below the directory recorded on the directory area. The "file entry" includes a descriptor tag, an ICB tag, and allocation descriptors. The "descriptor tag" indicates that the data that includes the descriptor tag is a file entry. The "ICB tag" indicates attribute information of the file entry itself. The "allocation descriptors" indicate the arrangement of the extents constituting the body of the subordinate file. Here, "extent" refers to a data sequence in which logical addresses are continuous. Each allocation descriptor is assigned to one of the extents. Therefore, when the subordinate file is divided into a plurality of extents, the file entry includes a plurality of allocation descriptors. More specifically, each allocation descriptor includes the size of an extent and an LBN. Furthermore, the two most significant bits of each allocation descriptor indicate whether an extent is actually recorded at the sector for that LBN. More specifically, when the two most significant bits indicate "0," an extent has been allocated to the sector and has been actually recorded thereat. When the two most significant bits indicate "1," an extent has been allocated to the sector but has not been yet recorded thereat. The logical addresses of the extents constituting each file can be found by referencing the allocation descriptors of the file entry of the file.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referencing the information, the location of each extent, particularly the logical address thereof, can be found.

<<Directory/File Structure on the BD-ROM Disc>>

As further shown in FIG. 2, in the directory/file structure 204 on the BD-ROM disc 101, a BD movie (BDMV) directory 242 is located immediately below a ROOT directory 241. Below the BDMV directory 242 are an index file (index.bdmv) 242A and a movie object file (MovieObject.bdmv) 242B.

The index file 242A contains information for managing as a whole the content recorded on the BD-ROM disc 101. In particular, this information includes information to make the playback device recognize the content, as well as an index table. The index table specifies the correspondence between a title constituting the content and a program to control the operation of the playback device. In particular, this program is called an "object." Object types are a movie object and a BD-J (BD Java (registered trademark)) object.

Figure 3:
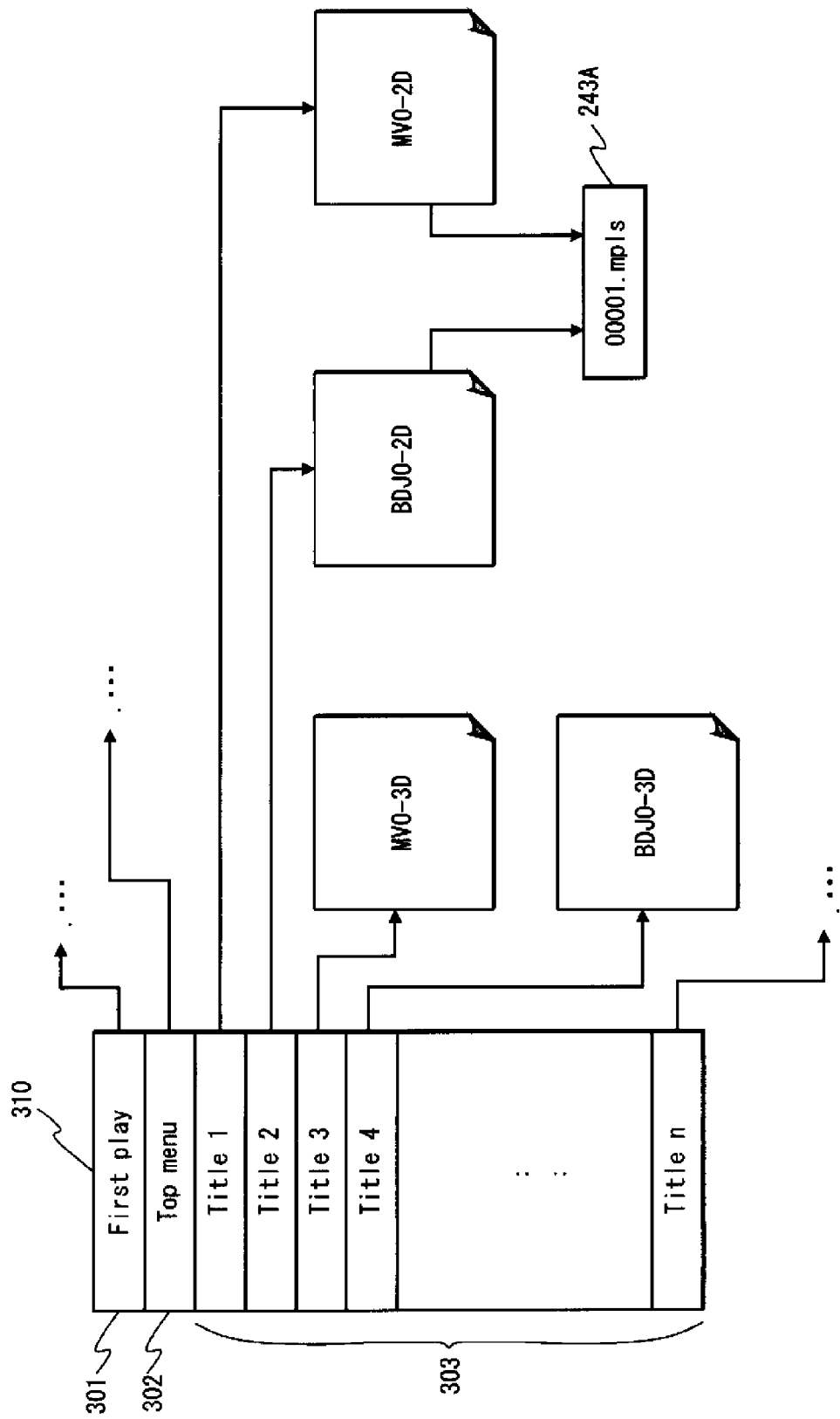
FIG. 3 is a schematic diagram showing an index table included in the index file shown in FIG. 2.

FIG. 3 is a schematic diagram showing an index table 310 in the index file 242A. The index table 310 stores items such as "first play" 301, "top menu" 302, and "title k" 303 (k=1, 2, . . . , n; an integer n is equal to or greater than one). Each item is associated with either a movie object MVO-2D, MVO-3D, etc., or with a BD-J object BDJO-2D, BDJO-3D, etc. Each time a title or a menu is called in response to a user operation or an application program, a control unit of the playback device 102 refers to a corresponding item in the index table 310, and calls an object corresponding to the item from the disc 101. The control unit then executes a variety of processes in accordance with the called object. More specifically, the "first play" 301 specifies an object to be called when the disc 101 is loaded into the BD-ROM drive 121. The "top menu" 302 specifies an object for displaying a menu on the display device 103 when a command "go back to menu" is input, for example, by user operation. In the "title k" 303, the titles that constitute the content on the disc 101 are individually allocated. For example, when a title for playback is specified by user operation, in the item "title k" in which the title is allocated, the object for playing back a video from the AV stream file corresponding to the title is specified.

The movie object file 242B generally stores a plurality of movie objects. Each movie object stores a sequence of navigation commands. A navigation command is a control command causing the playback device to execute playback processes similarly to general DVD players. Types of navigation commands are, for example, a read-out command to read out a playlist file corresponding to a title, a playback command to playback stream data from an AV stream file indicated by a playlist file, and a transition command to make a transition to another title. Navigation commands are written in an interpreted language and are deciphered by an interpreter, i.e. a job control program, included in the playback device to make the control unit execute the desired job. A navigation command is composed of an opcode and an operand. The opcode describes the operation that the playback device is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. Thus, in a manner similar to general DVD players, the playback device 102 first makes the display device 103 display a menu to allow the user to select a command. The playback device 102 then executes playback start/stop of a title, switches to another title, etc. in accordance with the selected command, thereby dynamically changing the progress of video playback.

As shown in FIG. 2, the BDMV directory 242 further contains a playlist (PLAYLIST) directory 243; a clip information (CLIPINF) directory 244; a stream (STREAM) directory 245; a BD-J object (BDJO: BD Java Object) directory 246; and a Java archive (JAR: Java Archive) directory 247.

Three types of AV stream files (00001.m2ts) 245A, (00002.m2ts) 245B, and (00003.m2ts) 245C are located in the STREAM directory 245. An "AV stream file" is the body of a video content and represents video, audio, subtitles, etc. The types of AV stream files are a 2D/AV stream file, a left-view stream file, a right-view stream file, and a depth map AV stream file. A "2D/AV stream file" refers to an AV stream file that can be used alone for playback of 2D video images. A "left-view stream file" refers to an AV stream file representing the left-view of 3D video images. A "right-view stream file" refers to an AV stream file representing the right-view of 3D video images. A left-view stream file and a right-view stream file are used as a pair to display 3D video images. A "depth map AV stream file" refers to an AV stream file representing a depth map for 3D video images. A depth map AV stream file is used in combination with a 2D/AV stream file for playback of 3D video images. In the example shown in FIG. 2, the first AV stream file (00001.m2ts) 245A is a 2D/AV stream file and is also a left-view stream file. The second AV stream file (00002.m2ts) 245B is a right-view stream file, and is used in combination with the first AV stream file 245A for playback of 3D video images. The third AV stream file (00003.m2ts) 245C is a depth map AV stream file, and is used in combination with the first AV stream file 245A for playback of 3D video images.

Three types of clip information files, (00001.clpi) 244A, (00002.clpi) 244B, and (00003.clpi) 244C are located in the CLIPINF directory 244. A "clip information file" is associated on a one-to-one basis with an AV stream file, and mainly represents the correspondence between the presentation time of the video shown by the AV stream file and the logical address in the AV stream file. The types of clip information files are a 2D clip information file, a left-view clip information file, a right-view clip information file, and a depth map clip information file, which are clip information files respectively corresponding to a 2D/AV stream file, a left-view stream file, a right-view stream file, and a depth map AV stream file. In the example shown in FIG. 2, the first clip information file (00001.clpi) 244A is a 2D clip information file and is also a left-view clip information file corresponding to the first AV stream file (00001.m2ts) 245A. The second clip information file (00002.clpi) 244B is a right-view clip information file corresponding to the second AV stream file (00002.m2ts) 245B. The third clip information file (00003.clpi) 244C is a depth map clip information file corresponding to the third AV stream file (00003.m2ts) 245C.

Three types of playlist files, (00001.mpls) 243A, (00002.mpls) 243B, and (00003.mpls) 243C are located in the PLAYLIST directory 243. A "playlist file" specifies the playback path of an AV stream file, i.e. the part of an AV stream file to decode, and the order of decoding. The types of playlist files are a 2D playlist file and a 3D playlist file. A "2D playlist file" refers to a playlist file specifying the playback path of a 2D/AV stream file. A "3D playlist file" refers to a playlist file that specifies (i) the playback path of a combination of a left-view stream file and a right-view stream file, or (ii) the playback path of a combination of a 2D/AV stream file and a depth map AV stream file. The first playlist file (00001.mpls) 243A is a 2D playlist file, and the second playlist file (00002.mpls) 243B and the third playlist file (00003.mpls) are both 3D playlist files. In particular, when 3D video images are played back from the combination of a left-view stream file and a right-view stream file, the second playlist file 243B is used. On the other hand, when 3D video images are played back from the combination of a 2D/AV stream file and a depth stream file, the third playlist file 243C is used.

A BD-J object file (XXXXX.bdjo) 246A is located in the BDJO directory 246. The BD-J object file 246A includes a single BD-J object. The BD-J object is a bytecode program to cause a Java virtual machine mounted on the playback device 102 to execute the processes of title playback and graphics rendering. The BD-J object is written in a compiler language such as Java or the like. The BD-J object includes an application management table and identification information for the playlist file to which is referred. The application management table is a list of the Java application programs to be executed by the Java virtual machine and their period of execution (lifecycle). The identification information of the playlist file to which is referred identifies a playlist file that corresponds to a title to be played back. The Java virtual machine calls a BD-J object in accordance with a user operation or an application program, and executes the Java application program according to the application management table included in the BD-J object. Consequently, the playback device 102 dynamically changes the progress of the video for each title played back, or causes the display device 103 to display graphics independently of the title video.

A JAR file (YYYYY.jar) 247A is located in the JAR directory 247. The JAR directory 247 generally includes a plurality of bodies of Java application programs to be executed in accordance with the application management table shown in the BD-J object. A Java application program is a bytecode program written in a compiler language such as Java or the like, as is the BD-J object. Types of Java application programs include programs causing the Java virtual machine to execute playback of a title process and programs causing the Java virtual machine to execute graphics rendering. The JAR file 247A is a Java archive file, and when it is read by the playback device 102, it is extracted into internal memory. In this way, a Java application program is stored in memory.

More specifically, the directory file structure 204 is implemented to have a ROOT directory area, a BDMV directory area, a PLAYLIST directory area, a CLIPINF directory area, a STREAM directory area, a BDJO directory area, and a JAR directory area in the volume area 202B of the BD-ROM disc 101. By tracing the above-mentioned file identifier descriptor, a series of file entries in each directory can be found sequentially from the ROOT directory. For example, the file entry of the ROOT directory can lead to the file entry of the BDMV directory. Furthermore, the file entry of the BDMV directory can lead to the file entry of the PLAYLIST directory. Similarly, the file entry of the BDMV directory can lead to the file entries of the CLIPINF directory, the STREAM directory, the BDJO directory, and the JAR directory areas.

<Data Structure of 2D Video Content>

The following describes the data structure of each file associated with playback of 2D video content from among the group of files in the BDMV directory 242.

<<Objects Recorded in the Index Table>>

In the example in FIG. 3, the movie object associated with the item "title 1," MVO-2D, includes a group of commands related to playback processes for 2D video images using the first playlist file 243A. When the playback device 102 refers to the item. "title 1," then in accordance with the movie object MVO-2D, the first playlist file 243A is read from the disc 101, and playback processes for 2D video images are executed in accordance with the specifications therein.

In the example in FIG. 3, the BD-J object associated with the item "title 2," BDJO-2D, includes an application management table related to playback processes for 2D video images using the first playlist file 243A. When the playback device 102 refers to the item "title 2," then in accordance with the application management table in the BD-J object BDJO-2D, a Java application program is called from the JAR file 247A and executed. In this way, the first playlist file 243A is read from the disc 101, and playback processes for 2D video images are executed in accordance with the specifications therein.

<<2D/AV Stream File>>

Figure 4:
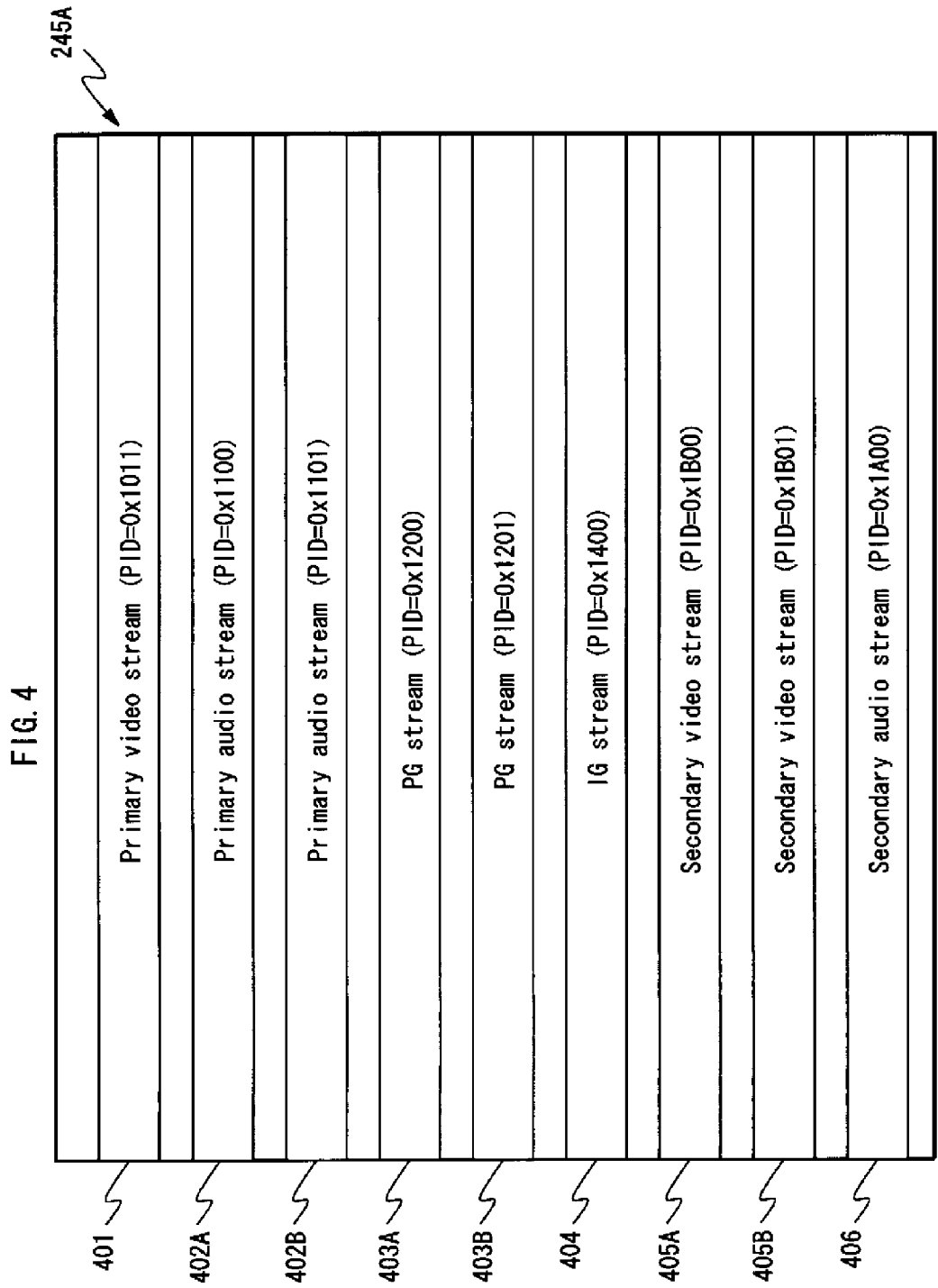
FIG. 4 is a schematic diagram showing elementary streams multiplexed in the first AV stream file shown in FIG. 2.

The first AV stream file 245A is a digital stream in MPEG-2 transport stream (TS) format. A plurality of elementary streams are multiplexed in the first AV stream file 245A. FIG. 4 is a schematic diagram showing elementary streams multiplexed in the first AV stream file 245A. The first AV stream file 245A shown in FIG. 4 includes a primary video stream 401, primary audio streams 402A and 402B, presentation graphics (PG) streams 403A and 403B, an interactive graphics (IG) stream 404, secondary video streams 405A and 405B, and a secondary audio stream 406.

The primary video stream 401 represents the primary video of a movie, and the secondary video streams 405A and 405B represent secondary video of the movie. The primary video is the major video of a content, such as the main feature of a movie, and is displayed on the entire screen, for example. On the other hand, the secondary video is displayed simultaneously with the primary video with the use, for example, of a picture-in-picture method, so that the secondary video images are displayed in a smaller window presented on the full screen displaying the primary video image. Each video stream is encoded by a video compression encoding method, such as MPEG-2, MPEG-4 AVC, or SMPTE VC-1.

The primary audio streams 402A and 402B represent the primary audio of the movie. Here, the two primary audio streams 402A and 402B are in different languages. The secondary audio stream 406 represents secondary audio to be mixed with the primary audio. Each audio stream is encoded by a method such as AC-3, Dolby Digital Plus ("Dolby Digital" is a registered trademark), MLP, DTS (Digital Theater System: registered trademark), DTS-HD, or linear PCM (Pulse Code Modulation).

The PG streams 403A and 403B represent subtitles of the movie. Here, the PG streams 403A and 403B represent subtitles in a different language. The IG stream 404 represents graphical user interface (GUI) graphics components, and the arrangement thereof, for constructing an interactive screen on the screen 131 in the display device 103.

The elementary streams 401-406 are identified by packet IDs (PIDs). For example, the primary video stream 401 is assigned a hexadecimal value of 0x1011 as a PID. The primary audio streams 402A and 402B are each assigned any value from 0x1100 to 0x111F as PIDs. The PG streams 403A and 403B are each assigned any value from 0x1200 to 0x121F as PIDs. The IG stream 404 is assigned any value from 0x1400 to 0x141F as a PID. The secondary video streams 405A and 405B are each assigned any value from 0x1B00 to 0x1B1F as PIDs. The secondary audio stream 406 is assigned any value from 0x1A00 to 0x1A1F as a PID.

Figure 5:
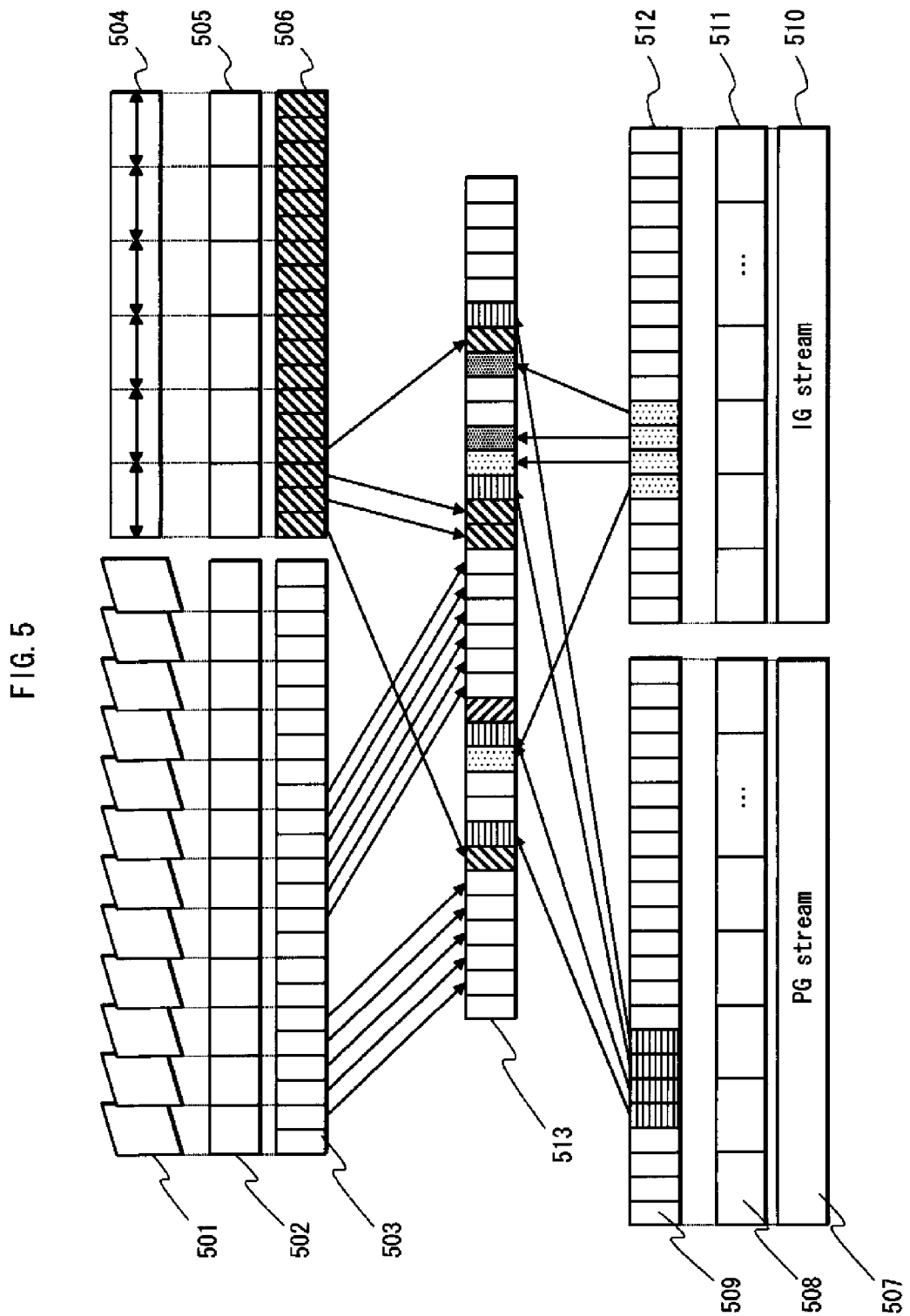
FIG. 5 is a schematic diagram showing an arrangement of packets in each elementary stream multiplexed in the AV stream file shown in FIG. 2.

FIG. 5 is a schematic diagram showing the arrangement of packets in each of the elementary streams 501, 504, 507, 510 multiplexed in the 2D/AV stream file 513. First, a video stream 501 having a plurality of video frames 501 is converted to a series of PES packets 502. Then, each PES packet 502 is converted to a TS packet 503. Similarly, an audio stream having a plurality of audio frames 504 is converted into a series of PES packets 505, after which this series is converted into a series of TS packets 506. Similarly, the PG stream 507 and the IG stream 510 are converted into series of PES packets 508 and 511 and afterwards are converted into series of TS packets 509 and 512, respectively. Lastly, these TS packets 503, 506, 509, and 512 are time-multiplexed into one stream 513. In this way, the 2D/AV AV stream file 513 is constructed.

Using a video stream as an example, details regarding packetization of the elementary streams shown in FIG. 5 are provided below.

Figure 6:
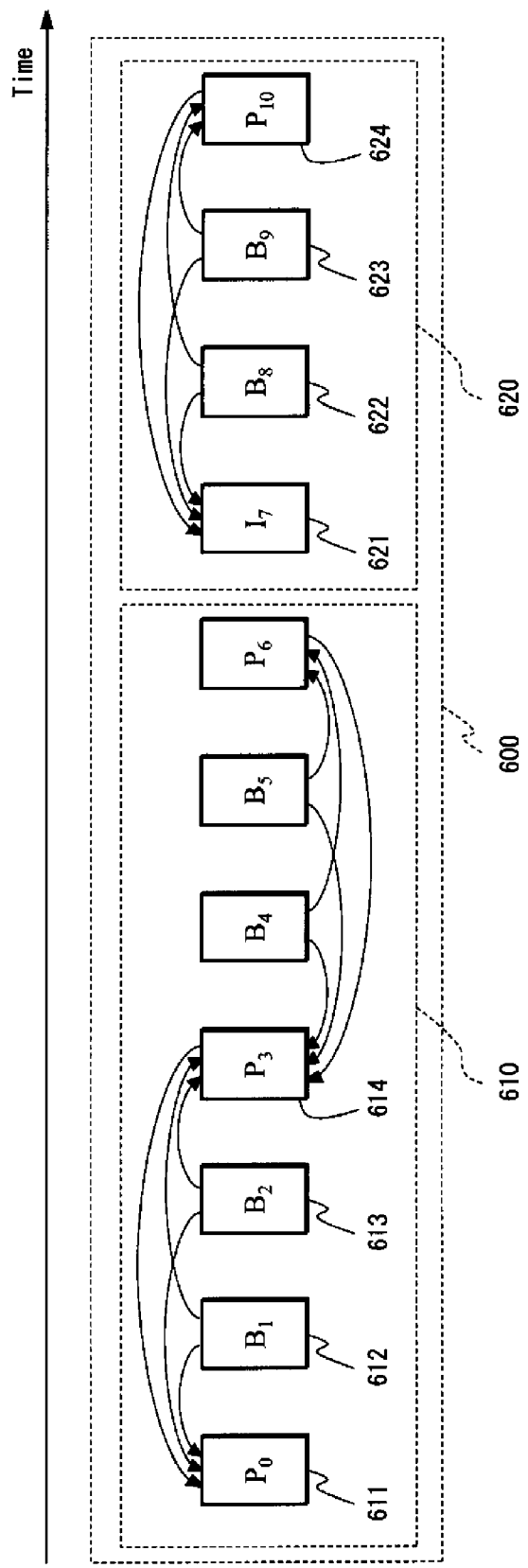
FIG. 6 is a schematic diagram showing the pictures in the video stream shown in FIG. 5 in the time order in which they are displayed.

FIG. 6 is a schematic diagram showing the pictures 611-614, . . . , 621-624 included in the video stream 600 in the time order in which they are displayed. Each picture 611-614, . . . , 621-624 represents one frame or one field of video data. In the video stream 600, each picture 611-614, . . . , 621-624 is compressed with one of the above-mentioned video compression encoding methods such as MPEG-2.

Compression of each picture by the above-mentioned encoding method uses the picture's spatial or temporal redundancy. Here, picture encoding that only uses the picture's spatial redundancy is referred to as "intra-picture encoding." On the other hand, picture encoding that uses the similarity between data for multiple pictures displayed sequentially is referred to as "inter-picture predictive encoding." In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after motion compensation and the picture to be encoded is sought, and temporal redundancy is removed using the difference value. In this way, the amount of data for each picture is compressed.

As shown in FIG. 6, the pictures included in the video stream 600 are generally divided into a plurality of GOPs 610 and 620. Here, a "GOP" refers to a sequence of pictures starting with an I picture. An "I Picture" refers to a picture compressed by intra-picture encoding. A GOP generally has a P picture and a B picture as well as an I picture. A "P picture" refers to a picture compressed by inter-picture predictive encoding, having used as a reference picture either an I picture earlier in presentation time or a different P picture. A "B picture" refers to a picture compressed by inter-picture predictive encoding, having used two reference pictures that are I or P pictures earlier or later in presentation time.

In the example in FIG. 6, the pictures in the GOPs 610 and 620 are compressed in the following order. First, the first pictures in GOP 610 and 620 are compressed as $I_0$ picture 611 and $I_7$ picture 621 respectively. Here, the subscripted number indicates the sequential number allotted to each picture in the order of presentation time. Next, the fourth pictures in GOP 610 and 620 are compressed as $P_3$ picture 614 and $P_{10}$ picture 624 respectively, using $I_0$ picture 611 and $I_7$ picture 621 in the same GOP respectively as a reference picture, as indicated by the arrows in FIG. 6. Then the second and third pictures in the first GOP 610 are compressed as $B_1$ picture 612 and $B_2$ picture 613 respectively, using the earlier $I_0$ picture 611 and the later $P_3$ picture 614 as reference pictures. Similarly, the second and third pictures in the second GOP 620 are compressed as $B_8$ picture 622 and $B_9$ picture 623 respectively, using the earlier $I_7$ picture 621 and the later $P_{10}$ picture 624 as reference pictures. When subsequent pictures after the $P_3$ picture 614 exist, as in the first GOP 610, these pictures are similarly compressed.

In this way, as each GOP always contains an I picture at the top, the pictures in each GOP can be decoded. For example, in the first GOP 610, the $I_0$ picture 611 is first decoded alone. Next, the $P_3$ picture 614 is decoded using the decoded $I_0$ picture 611. Then the $B_1$ picture 612 and $B_2$ picture 613 are decoded using the decoded $I_0$ picture 611 and $P_3$ picture 614. In this way, the video stream 600 can be randomly accessed in units of GOPs. Therefore, editing or playback of the video stream 600 can be performed in units of GOPs.

Figure 7:
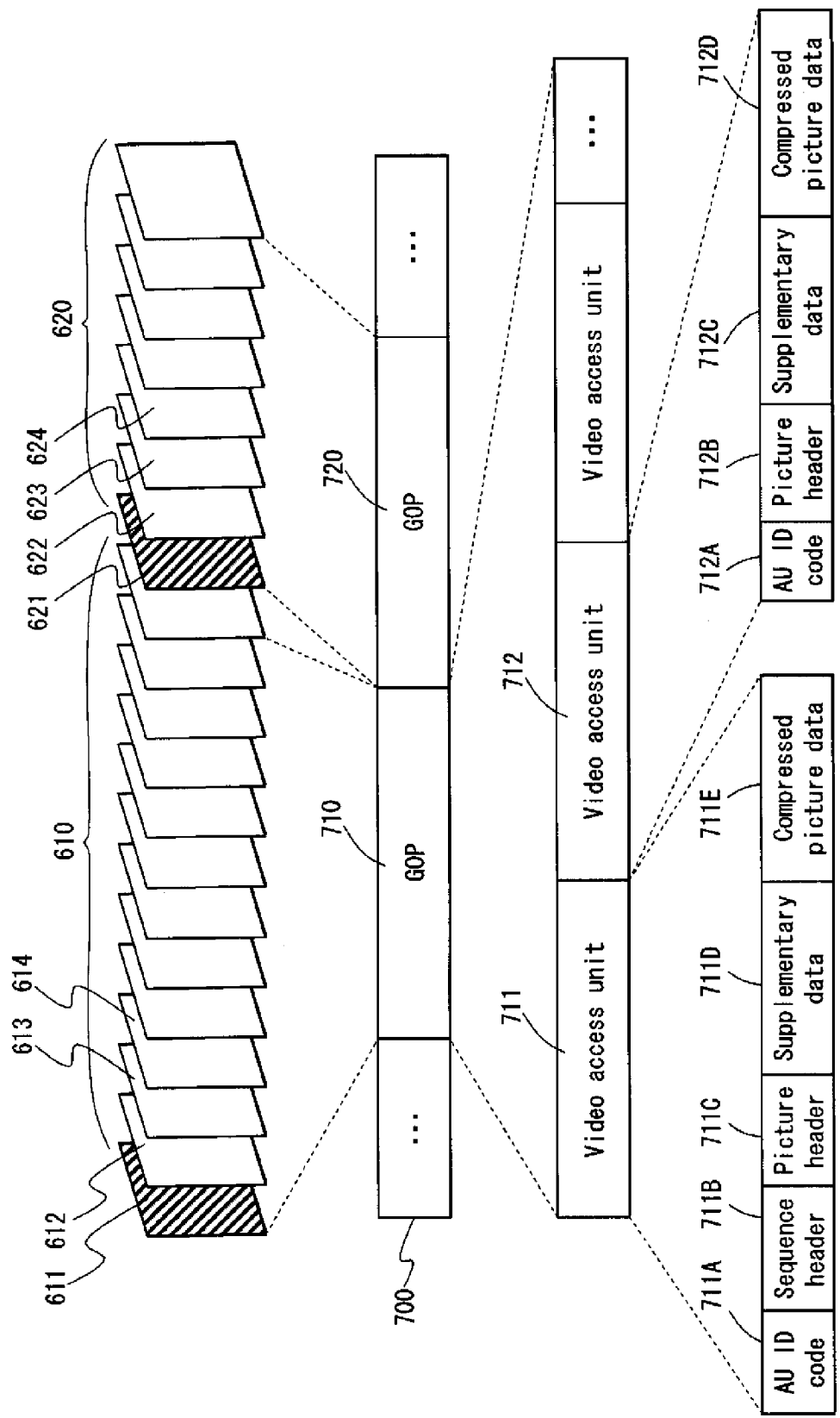
FIG. 7 is a schematic diagram showing details of the data structure of the video stream shown in FIG. 5.

FIG. 7 is a schematic diagram showing details of the data structure of the video stream 700. As shown in FIG. 7, in addition to the bodies of the GOPs 610 and 620 shown in FIG. 6, a header is assigned to each picture 611, 612, etc. in the GOPs 710 and 720, which constitute the actual video stream 700. This combination of a header and the body of each picture is called a "video access unit." In other words, in the GOPs 710 and 720, each picture is organized as a video access unit 711, 712, etc. Each picture can be read from the video stream 700 in video access units.

As shown in FIG. 7, the top video access unit 711 in the GOPs 710 and 720 includes the body of the I picture 611 and a header. The body of the I picture 611 is stored as compressed picture data 711E. The header includes an access unit (AU) identification code 711A, a sequence header 711B, a picture header 711C, and supplementary data 711D. The AU identification code 711A is a predetermined code indicating the top of each picture access unit. The sequence header 711B, also called a GOP header, includes information shared by the whole GOP 710, e.g. the resolution, frame rate, aspect ratio, and bit rate. The picture header 711C includes information necessary for decoding of the I picture 611, such as the encoding method, etc. The supplementary data 711D includes additional information regarding questions other than the decoding of the I picture 611, for example closed caption text information, as well as time code information. The second or subsequent video access unit 712 in the GOPs 710 and 720 has the same structure as the first video access unit 711, with the exception that the header does not include a sequence header 711B. The actual content of each element in the video access units 711, 712 varies according to the encoding method for the video stream 700. For example, when the encoding method is MPEG-4 AVC, the video access unit 711 is comprised of a plurality of NAL units, and the AU identification code 711A, sequence header 711B, picture header 711C, and supplementary data 711D respectively correspond to an AU delimiter (Access Unit Delimiter), SPS (sequence parameter set), PPS (picture parameter set), and SEI (Supplemental Enhancement Information).

Figure 8:
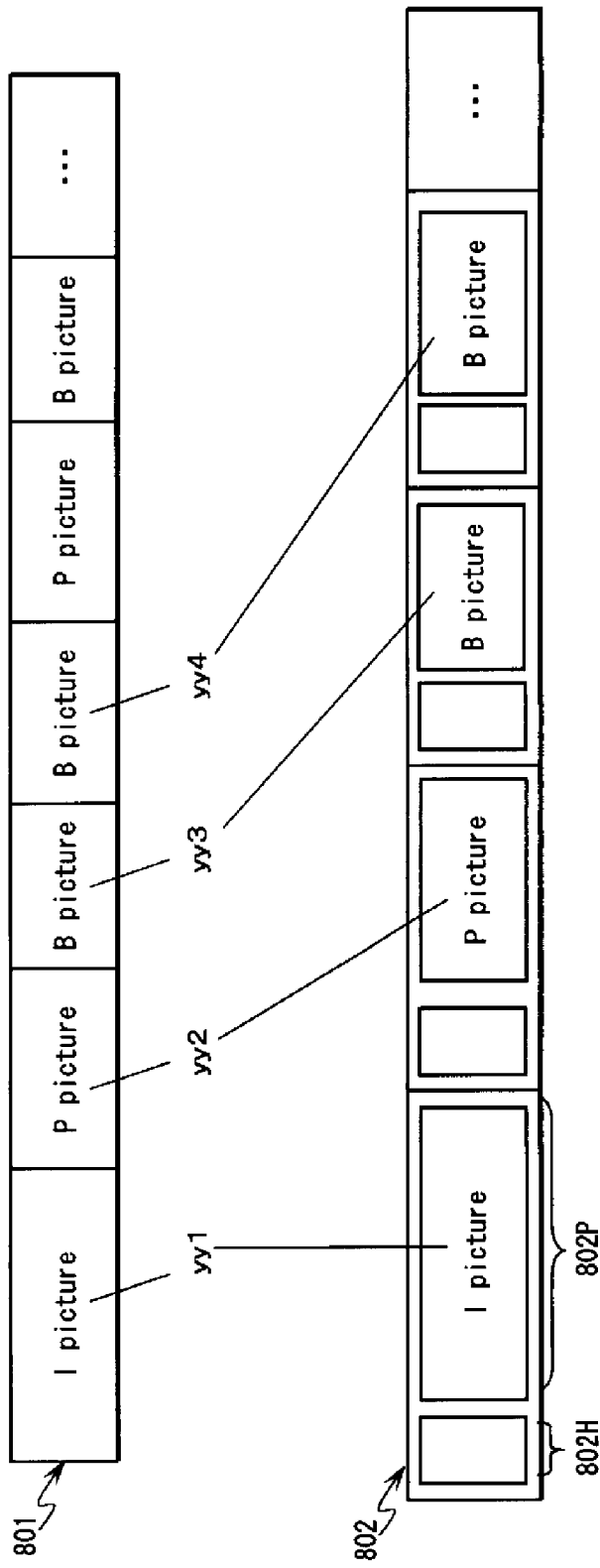
FIG. 8 is a schematic diagram showing details of a method for storing a video stream into PES packets shown in FIG. 5.

FIG. 8 is a schematic diagram showing details of a method for storing the video stream 801 into PES packets 802. Here, in the actual video stream, pictures are multiplexed in the order of encoding, not in the order of presentation time. In other words, as shown in FIG. 8, in each video access unit comprising the video stream 801, I picture yy1, P picture yy2, B pictures yy3, yy4, etc. are stored in order from the top. The I picture yy1 is used as a reference picture for encoding the P picture yy2, and the I picture yy1 and the P picture yy2 are used as reference pictures for encoding the B pictures yy3 and yy4. Each of these video access units is stored as a difference PES packet 802. As shown in FIG. 8, each PES packet 802 includes a PES payload 802P and a PES header 802H. Each video access unit is stored in a PES payload 802P, whereas each PES header 802H includes a presentation time for the picture stored in the PES payload 802P in the same PES packet 802, i.e., a PTS (presentation time-stamp), and a decoding time for the picture, i.e. a DTS (decoding time-stamp).

As with the video stream 801 shown in FIG. 8, the other elementary streams shown in FIG. 5 are stored in PES payloads in a sequence of PES packets. Furthermore, the PES header in each PES packet includes the PTS for the data stored in the PES payload for the PES packet.

Figure 9:
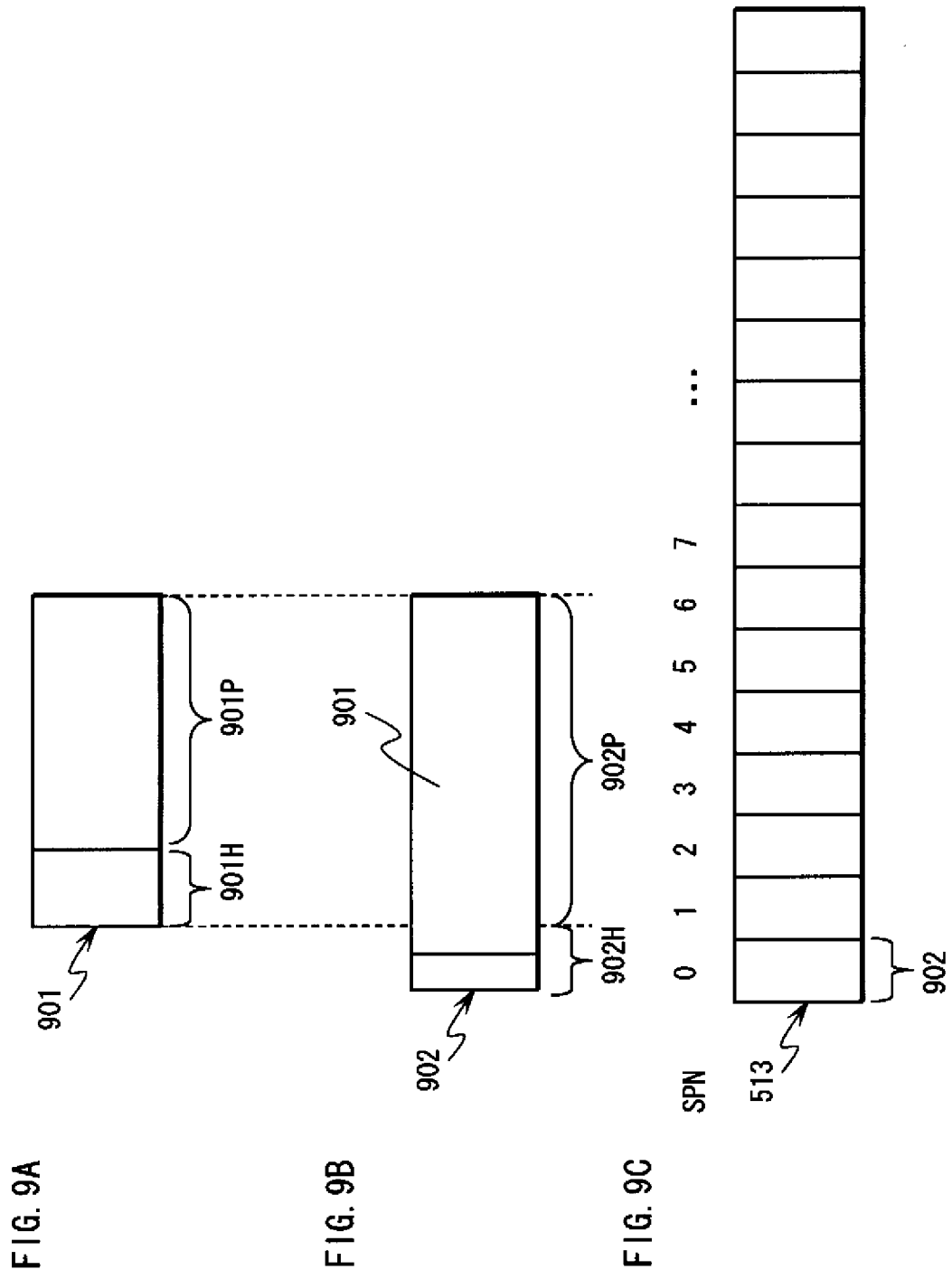
FIGS. 9A, 9B, and 9C are schematic views showing the format of a TS packet and a source packet which constitute the 2D/AV stream file shown in FIG. 5.

FIGS. 9A, 9B, and 9C schematically show the format of a TS packet 901 and a source packet 902 constituting the 2D/AV stream file 513. The TS packet 901 is 188 bytes long. As shown in FIG. 9A, the TS packet 901 is composed of a 4-byte long TS header 901H and a 184-byte long TS payload 901P. The PES packets in which each of the elementary streams shown in FIG. 5 are stored are typically divided into a plurality of sections, with each section being stored in the TS payload 901P of a different TS packet 901. Each TS header 901H includes a PID. The PID identifies an elementary stream having data stored in the PES payload 802P when the PES packet 802 is reconstructed from data stored in the TS payload 901P of the same TS packet 901. When the 2D/AV stream file 513 is written on the BD-ROM disc 101, as shown in FIG. 9B, a 4-byte long header (TP_Extra_Header) 902H is further added to each TS packet 901. The header 902H particularly includes an ATS (Arrival_Time_Stamp). The ATS shows the transfer start time at which the TS packet 901 is to be transferred to a PID filter inside a system target decoder, which is described later. The 192-byte long packet 902 formed by combining this header 902H with a TS packet 901 is called a "source packet." This source packet 902 is written in the 2D/AV stream file 513. Consequently, as shown in FIG. 9C, the plurality of source packets 902 is sequentially arranged in the 2D/AV stream file 513. The source packets 902 are assigned serial numbers from the top of the 2D/AV stream file 513 in the order 0, 1, 2, etc. The serial numbers are called SPNs (source packet numbers).

The types of the TS packets contained in the AV stream file include not only those that are converted from the elementary streams shown in FIGS. 4 and 5, but also a PAT (Program Association Table), a PMT (Program Map Table), and a PCR (Program Clock Reference). The PCR, PMT, and PAT are specified by European Digital Broadcasting Standard and are intended to regulate the partial transport stream constituting a single program. By using PCR, PMT, and PAT, the AV stream file can be regulated in the same way as the partial transport stream. Concretely, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information of the elementary streams. The PMT also includes various descriptors relating to the AV stream file. The descriptors particularly include copy control information showing whether copying of the AV stream file is permitted or not. The PCR stores information indicating the value of an STC (System Time Clock) to be associated with an ATS of the packet. Here, the STC is a clock used as a reference for the PTS and the DTS in a decoder. With the use of PCR, the decoder synchronizes the STC with the ATC that is the reference for the ATS.

Figure 10:
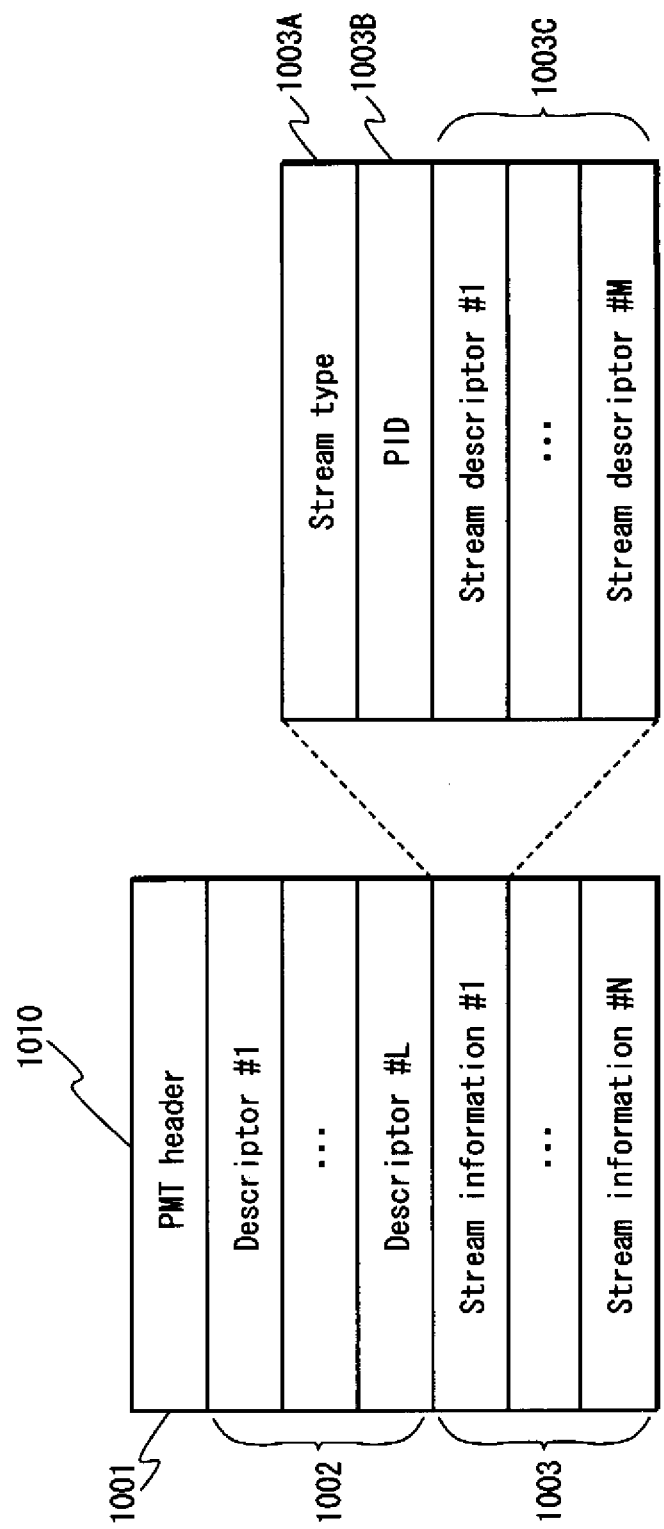
FIG. 10 is a schematic diagram showing the data structure of a PMT.

FIG. 10 is a schematic diagram showing the data structure of the PMT 1010. The PMT 1010 includes, from the top thereof, a PMT header 1001, a plurality of descriptors 1002, and a plurality of pieces of stream information 1003. The PMT header 1001 indicates the length of data, etc. stored in the PMT 1010. Each descriptor 1002 relates to the entire AV stream file that includes the PMT 1010. The aforementioned copy control information is described in one of the descriptors 1002. Each piece of stream information 1003 relates to a different one of the elementary streams included in the AV stream file, and each piece of stream information 1003 is assigned to a different elementary stream. Each piece of stream information 1003 includes a stream type 1003A, a PID 1003B, and a stream descriptor 1003C. The stream type 1003A includes identification information of the codec used for compressing the elementary stream. The PID 1003B indicates the PID of the elementary stream. The stream descriptor 1003C includes attribute information of the elementary stream, such as a frame rate and an aspect ratio.

By using PCR, PMT, and PAT, the decoder in the playback device can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<2D Clip Information File>>

FIG. 11 is a schematic diagram showing the data structure of the section of the first clip information file (00001.clip) 244A that is used as a 2D clip information file. A 2D clip information file generally has this data structure. As shown in FIG. 11, the first clip information file 244A includes clip information 1101, stream attribute information 1102, and an entry map 1103.

As shown in FIG. 11, the clip information 1101 includes a system rate 1101A, a playback start time 1101B, and a playback end time 1101C. The system rate 1101A indicates the maximum value of the transfer speed at which "TS packets" in the first AV stream file 245A are transferred from the read buffer in the playback device 102 to the system target decoder. Note that the read buffer and the system target decoder are described later. The interval between the ATSs of the source packets in the first AV stream file 245A is set so that the transfer speed of the TS packet is limited to the system rate or lower. The playback start time 1101B indicates the PTS of the video access unit located at the top of the first AV stream file 245A. For instance, the playback start time 1101B shows the PTS of the top video frame. The playback end time 1101C shows the value of the STC delayed a predetermined time from the PTS of the video access unit located at the end of the first AV stream file 245A. For instance, the playback end time 1101C shows the sum of the PTS of the last video frame and the playback time of one frame.

FIG. 12 is a schematic diagram showing the data structure of the stream attribute information 1102. As shown in FIG. 12, the stream attribute information 1102 is a table associating the PIDs 1201 for each elementary stream included in the first AV stream file 245A with pieces of attribute information 1202. Here, each piece of attribute information 1202 is different depending on whether it corresponds to a video stream, an audio stream, a PG stream, or an IG stream. For example, the piece of attribute information 1210 corresponding to the PID 0x1011 for the primary video stream includes a codec type 1211 used for the compression of the video stream, as well as a resolution 1212, an aspect ratio 1213, and a frame rate 1224 for the pictures constituting the video stream. On the other hand, the piece of attribute information 1220 corresponding to the PID 0x1101 for the primary audio stream includes a codec type 1221 used for compressing the audio stream, a number of channels 1222 included in the audio stream, a language 1223, and a sampling frequency 1224. The playback device 102 uses these pieces of attribute information 1202 to initialize the decoder.

FIG. 13A is a schematic diagram showing the data structure of the entry map 1103. As shown in FIG. 13A, the entry map 1103 includes tables 1300 which are assigned to video streams in the first AV stream file 245A. Each table 1300 corresponds to the PID for the assigned video stream. Each table 1300 includes an entry map header 1301 and a plurality of entry points 1302. The entry map header 1301 includes the PID corresponding to the table 1300 and the total number of entry points 1302 included in the table 1300. The entry point 1302 shows a pair of PTS 1303 and SPN 1304 in correspondence with a different entry map ID (EP_ID) 1305. The PTS 1303 is equivalent to the PTS for one of the I pictures included in the video stream associated with each section 1300. The SPN 1304 is equivalent to the SPN for the top of the source packet group stored in the corresponding I picture.

FIG. 13B schematically shows, out of the source packets included in the first AV stream file 245A, source packets whose correspondence with the EP_IDs 1305 are shown by the entry map 1103. With reference to the entry map 1103, the playback device 102 can specify the SPN within the first AV stream file 245A corresponding to a scene at an arbitrary point during the playback of the video from the video stream. For example, to execute trickplay such as fast-forward or rewind, the playback device 102 specifies source packets of the SPNs 1304 corresponding to the EP_IDs 1305 by using the entry map 1103 and selectively extracts and decodes the source packets. As a result, the I picture can be selectively played back. Thus, the playback device 102 can efficiently perform trickplay without analyzing the first AV stream file 245A.

<<2D Playlist File>>

FIG. 14 is a schematic diagram showing the data structure of a 2D playlist file 1400. The first playlist file 243A indicated in FIG. 2 has this data structure. The 2D play list file 1400 specifies the playback path of the 2D/AV stream file 1404, i.e. the sections P1, P2, and P3 of the 2D/AV stream file 1404 which are to be decoded, as well as the order of decoding thereof. The 2D playlist file 1400 particularly specifies with PTSs a range for each section P1, P2, and P3. The specified PTS are converted to SPNs of the AV stream file 1404 using the clip information file 1403 corresponding to the 2D/AV stream file 1404. As a result, the range of each section P1, P2, and P3 is specified with SPNs. Note that, unlike FIG. 14, any of the sections P1, P2, and P3 can be a section of a different AV stream file than the 2D/AV stream file 1404.

As shown in FIG. 14, the 2D playlist file 1400 includes at least one piece of playitem (PI) information 1401. Each piece of playitem information 1401 is identified by a unique playitem ID. Each piece of playitem information 1401 specifies a different playback section in the playback path via a pair of PTSs. For example, the first piece of playback item information PI#1 specifies the first playback section via a pair of PTSs T1, representing the start time, and T2, representing the end time. The start time T1 and the end time T2 are converted into SPNs A1 and A2 in the 2D/AV stream file 1404 by using the 2D clip information file 1403. As a result, the range of the section P1 that is to be decoded in the playback section is specified by the SPNs A1 and A2 at either end. Similar to the PI#1-3 shown in FIG. 14, when a plurality of pieces of playitem information 1401 are recorded in the 2D playlist file 1400, the order of the recording is indicated by the order of the corresponding playback sections in the playback path. Here, the playback path of a series that links the playback sections specified by the pieces of playitem information 1401 is referred to as a "main path." Furthermore, a series of pieces of playitem information PI#1-3 that specify a main path are also referred to as the "main path" 1405.

The 2D playlist file 1400 further includes an entry mark 1402. The entry mark 1402 indicates a time point in the main path 1405 to be actually played back. The entry mark 1402 can be assigned to a playback section defined by the playitem information 1401. For example, as shown in FIG. 14, a plurality of entry marks 1402 can be assigned to one piece of playitem information PI #1. The entry mark 1402 is particularly used for searching for a start position of playback when random access is made. When the 2D playlist file 1400 defines a playback path for a movie title, for instance, the entry marks 1402 may be assigned to the top of each chapter. Consequently, the playback device 102 can play back a movie title starting from any of the chapters.

FIG. 15 is a schematic diagram showing the data structure of playitem information 1500. As shown in FIG. 15, the playitem information 1500 includes reference clip information 1501, a playback start time 1502, a playback end time 1503, a connection condition 1504, and a stream selection table 1505. The reference clip information 1501 identifies a clip information file that is necessary for converting PTSs to SPNs. The playback start time 1502 and the playback end time 1503 respectively indicate the PTSs of the top and the end of the section of the AV stream file to be decoded. The playback device 102 refers to the entry map from the clip information file indicated by the reference clip information 1501, and obtains SPNs respectively corresponding to the playback start time 1502 and the playback end time 1503. Thus, the playback device 102 identifies the section that is to be read from the AV stream file and starts to play back the section.

The connection condition 1504 specifies a condition for connecting video in the playback section specified by a playback start time 1502 and a playback end time 1503 to video in the playback section specified by the previous piece of playitem information in the main path. The connection condition 1504 has three types, for example "1," "5," and "6." When the connection condition 1504 indicates "1," the video to be played back from the section of the AV stream file specified by the piece of playitem information does not need to be seamlessly connected to the video played back from the section of the AV stream file specified by the previous piece of playitem information. On the other hand, when the connection condition 1504 indicates "5" or "6," both videos need to be seamlessly connected.

FIGS. 16A and 16B each schematically show the relationships between playback sections specified by each piece of playitem information to be connected when the connection condition 1504 indicates "5" or "6." When the connection condition 1504 indicates "5," as shown in FIG. 16A, the STCs of two pieces of playitem information PI#1 and PI#2 may be nonconsecutive. That is, the PTS TE at the end of the first AV stream file section 1601 defined by the first piece of playitem information PI#1, in a previous position in the main path, and the PTS TS at the top of the second AV stream file section 1601 defined by the second piece of playitem information PI#2, in a later position, may be nonconsecutive. Note that, in this case, several constraint conditions need to be satisfied. For example, when the second section 1602 is supplied to a decoder subsequently after the first section 1601, the sections 1601 and 1602 need to be created so that the decoder can smoothly decode the file. Furthermore, the last frame of the audio stream contained in the first section 1601 needs to overlap the top frame of the audio stream contained in the second section 1602. On the other hand, when the connection condition 1504 indicates "6," as shown in FIG. 16B, the first section 1601 and the second section 1602 need to be able to be handled as a series of sections, in order to allow the decoder to duly perform the decode processing. That is, STCs and ATCs need to be consecutive between the first section 1601 and the second section 1602.

Referring to FIG. 15 again, the stream selection table 1505 shows a list of elementary streams that the decoder in the playback device 102 can select from the AV stream file during the time between the playback start time 1502 and the playback end time 1503. The stream selection table 1505 particularly includes a plurality of stream entries 1509. Each of the stream entries 1509 includes a stream selection number 1506, stream path information 1507, and stream identification information 1508 of a corresponding elementary stream. The stream selection numbers 1506 are serial numbers assigned to the stream entries 1509, and used by the playback device 102 to identify the elementary streams. Each piece of stream path information 1507 shows an AV stream file to which an elementary stream to be selected belongs. For example, if the stream path information 1507 shows "main path," the AV stream file corresponds to the clip information file indicated by the reference clip information 1501. If the stream path information 1507 shows "sub-path ID=1," the AV stream file to which the elementary stream to be selected belongs is an AV stream specified by a piece of sub-playitem information included in the sub-path whose sub-path ID=1. Here, the sub-playitem information piece defines a playback section that falls between the playback start time 1502 and the playback end time 1503. Note that the sub-path and the sub-playitem information are described in the next section of this specification. Each piece of stream identification information 1508 indicates the PID of a corresponding one of the elementary streams multiplexed in an AV stream file specified by the stream path information 1507. The elementary streams indicated by the PIDs are selectable during the time between the playback start time 1502 and the playback end time 1503. Although not shown in FIG. 15, each stream entry 1509 also contains attribute information of a corresponding elementary stream. For example, the attribute information of an audio stream, a PG stream, and an IG stream indicates a language type of the stream.

FIG. 17 is a schematic diagram showing the data structure of a 2D playlist file 1700 when the playback path to be defined includes sub-paths. As shown in FIG. 17, the 2D playlist file 1700 may include one or more sub-paths in addition to the main path 1701. Sub-paths 1702 and 1703 are each a playback path parallel to the main path 1701. The serial numbers are assigned to the sub-paths 1702 and 1703 in the order they are registered in the 2D playlist file 1700. The serial numbers are each used as a sub-path ID for identifying the sub-path. Similarly to the main path 1701 that is a playback path of a series of playback sections specified by the pieces of playitem information #1-3, each of the sub-paths 1702 and 1703 is a playback path of a series of playback sections specified by sub-playitem information #1-3. The data structure of the sub-playitem information 1702A is identical with the data structure of the playitem information 1500 shown in FIG. 15. That is, each piece of sub-playitem information 1702A includes reference clip information, a playback start time, and a playback end time. The playback start time and the playback end time of the sub-playitem information are expressed on the same time axis as the playback time of the main path 1701. For example, in the stream entry 1509 included in the stream selection table 1505 of the playitem information #2, assume that the stream path information 1507 indicates "sub-path ID=0," and the stream identification information 1508 indicates the PG stream. #1. Then, in the sub-path 1702 with sub-path ID=0, for the playback section of the playitem information #2, the PG stream #1 is selected as the decode target from an AV stream file corresponding to the clip information file shown by the reference clip information of the sub-playitem information #2.

Furthermore, the sub-playitem information includes a field called an SP connection condition. The SP connection condition carries the same meaning as a connection condition of the playitem information. That is, when the SP connection condition indicates "5" or "6," each AV stream file section specified by two adjacent pieces of sub-playitem information also needs to satisfy the above-described conditions.

<Configuration of 2D Playback Device>

Next, the configuration for the playback device 102 to play back the above-described 2D video content from the BD-ROM disc 101, i.e., the configuration of a 2D playback device, is described below.

Figure 18:
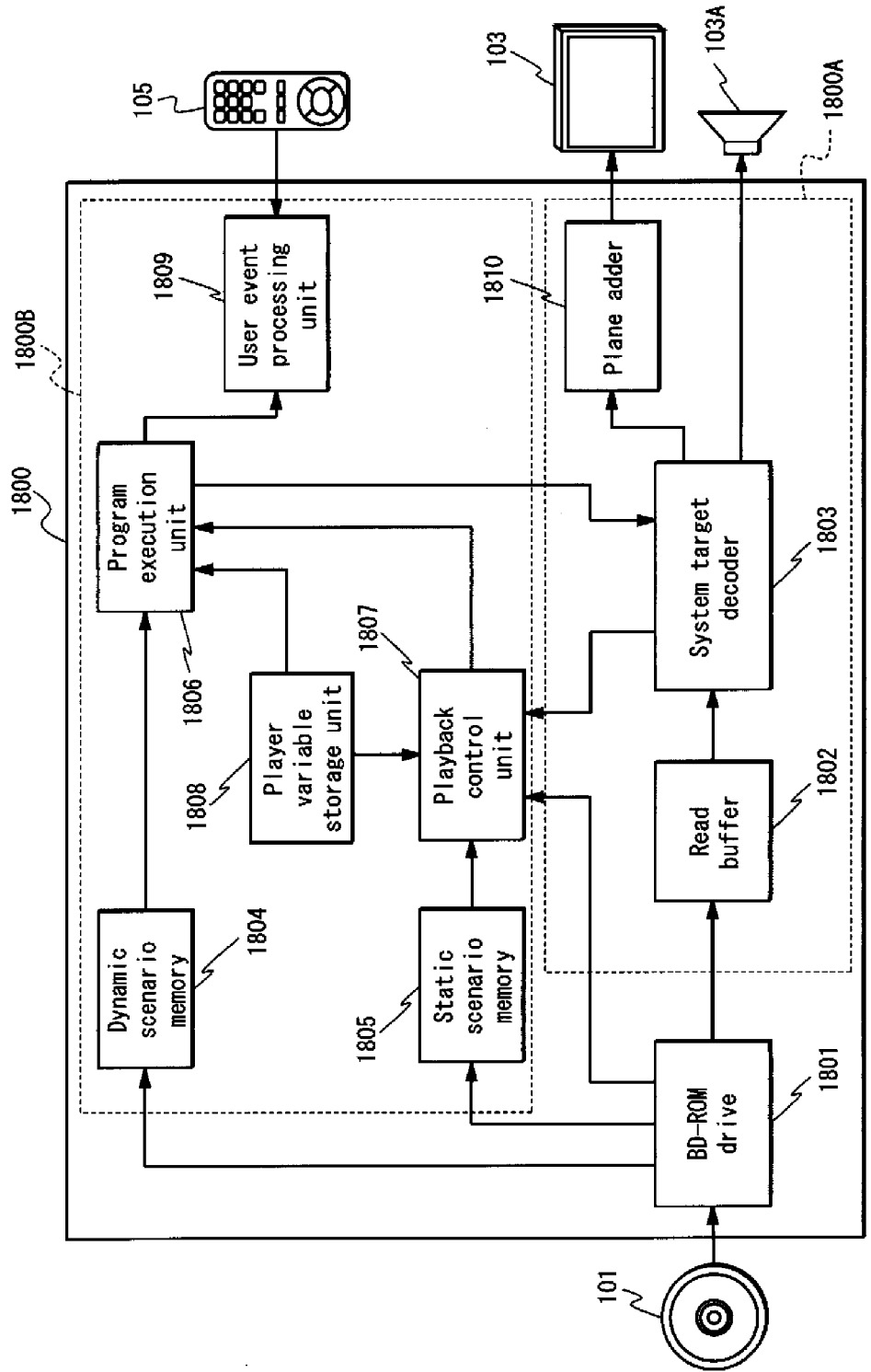
FIG. 18 is a functional block diagram of a 2D playback device.

FIG. 18 is a functional block diagram showing a 2D playback device 1800. As shown in FIG. 18, the 2D playback device 1800 has a BD-ROM drive 1801, a playback unit 1800A, and a control unit 1800B. The playback unit 1800A has a read buffer 1802, a system target decoder 1803, and a plane adder 1810. The control unit 1800B has a dynamic scenario memory 1804, a static scenario memory 1805, a program execution unit 1806, a playback control unit 1807, a player variable storage unit 1808, and a user event processing unit 1809. The playback unit 1800A and the control unit 1800B are each implemented on a different integrated circuit. Alternatively, the playback unit 1800A and the control unit 1800B may also be implemented on a single integrated circuit.

When the BD-ROM disc 101 is loaded into the BD-ROM drive 1801, the BD-ROM drive 1801 radiates laser light to the disc 101, and detects change in the light reflected from the disc 101. Furthermore, using the change in the amount of reflected light, the BD-ROM drive 1801 reads data recorded on the disc 101. Concretely, the BD-ROM drive 1801 has an optical pickup, i.e. an optical head. The optical head has a semiconductor laser, a collimate lens, a beam splitter, an objective lens, a collecting lens, and an optical detector. A beam of light radiated from the semiconductor laser sequentially passes through the collimate lens, the beam splitter, and the objective lens to be collected on a recording layer of the BD-ROM disc 101. The collected beam is reflected and diffracted by the recording layer. The reflected and diffracted light passes the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 1801 reads data from the BD-ROM disc 101 based on a request from the playback control unit 1807. Out of the read data, an AV stream file is transferred to the read buffer 1802; dynamic scenario information such as an index file, movie object file, and BD-J object file is transferred to the dynamic scenario memory 1804; and a playlist file and a clip information file, i.e. static scenario information, are transferred to the static scenario memory 1805.

The read buffer 1802, the dynamic scenario memory 1804, and the static scenario memory 1805 are each a buffer memory. A memory device in the playback unit 1800A is used as the read buffer 1802. Memory devices in the control unit 1800B are used as the dynamic scenario memory 1804 and the static scenario memory 1805. In addition, different areas in a single memory device may be used as these buffer memories 1802, 1804 and 1805. The read buffer 1802 stores an AV stream file, the dynamic scenario memory 1804 stores dynamic scenario information, and the static scenario memory 1805 stores static scenario information.

The system target decoder 1803 reads an AV stream file from the read buffer 1802 in units of source packets and demultiplexes the AV stream file. The system target decoder 1803 then decodes each of elementary streams obtained by the demultiplexing. Here, information necessary for decoding each elementary stream, such as the type of codec and attribute of the stream, is transferred from the playback control unit 1807 to the system target decoder 1803. The system target decoder 1803 outputs a primary video stream, a secondary video stream, an IG stream, and a PG stream that have been decoded in video access units. The output data are used as primary video plane data, secondary video plane data, IG plane data, and PG plane data, respectively. On the other hand, the system target decoder 1803 mixes the decoded primary audio stream and secondary audio stream and sends the resultant data to an audio output device, such as an internal speaker 103A of a display device. In addition, the system target decoder 1803 receives graphics data from the program execution unit 1806. The graphics data is used for rendering graphics such as a GUI menu on a screen, and is in a raster data format such as JPEG and PNG. The system target decoder 1803 processes the graphics data and outputs the data as image plane data. Details of the system target decoder 1803 will be described below.

The user event processing unit 1809 detects a user operation via the remote control 105 or the front panel of the playback device 102. Based on the user operation, the user event processing unit 1809 requests the program execution unit 1806 or the playback control unit 1807 to perform a relevant process. For example, when a user instructs to display a pop-up menu by pushing a button on the remote control 105, the user event processing unit 1809 detects the push and identifies the button. The user event processing unit 1809 further requests the program execution unit 1806 to execute a command corresponding to the button, which is a command to display the pop-up menu. When a user pushes a fast-forward or a rewind button on the remote control 105, for example, the user event processing unit 1809 detects the push and identifies the button. In addition, the user event processing unit 1809 requests the playback control unit 1807 to fast-forward or rewind the playlist currently being played back.

The playback control unit 1807 controls transfer of files, such as an AV stream file and an index file, from the BD-ROM disc 101 to the read buffer 1802, the dynamic scenario memory 1804, and the static scenario memory 1805. A file system managing the directory file structure 204 shown in FIG. 2 is used for this control. That is, the playback control unit 1807 causes the BD-ROM drive 1801 to transfer the files to each of the buffer memories 1802, 1804 and 1805 using a system call for opening files. The file opening is composed of a series of the following processes. First, a file name to be detected is provided to the file system by a system call, and an attempt is made to detect the file name from the directory/file structure 204. When the detection is successful, the file entry for the target file is first transferred to memory in the playback control unit 1807, and an FCB (File Control Block) is generated in the memory. Subsequently, a file handle for the target file is returned from the file system to the playback control unit 1807. After this, the playback control unit 1807 can transfer the target file from the BD-ROM disc 101 to each of the buffer memories 1802, 1804 and 1805 by showing the file handle to the BD-ROM drive 1801.

The playback control unit 1807 decodes the AV stream file to output video data and audio data by controlling the BD-ROM drive 1801 and the system target decoder 1803. More specifically, the playback control unit 1807 first reads a playlist file from the static scenario memory 1805, in response to an instruction from the program execution unit 1806 or a request from the user event processing unit 1809, and interprets the content of the file. In accordance with the interpreted content, particularly with the playback path, the playback control unit 1807 then specifies an AV stream file to be played back and instructs the BD-ROM drive 1801 and the system target decoder 1803 to read and decode this file. Such playback processing based on a playlist file is called "playlist playback." In addition, the playback control unit 1807 sets various types of player variables in the player variable storage unit 1808 using the static scenario information. With reference to the player variables, the playback control unit 1807 further specifies to the system target decoder 1803 elementary streams to be decoded and provides the information necessary for decoding the elementary streams.

The player variable storage unit 1808 is composed of a group of registers for storing player variables. Types of player variables include system parameters (SPRM) and general parameters (GPRM). FIG. 19 is a list of SPRMs. Each SPRM is assigned a serial number 1901, and each serial number 1901 is associated with a unique variable value 1802. The contents of major SPRM are shown below. Here, the numbers in parentheses indicate the serial numbers 1901.

| | |
|---|---|
| SPRM(0) | :Language code |
| SPRM(1) | :Primary audio stream number |
| SPRM(2) | :Subtitle stream number |
| SPRM(3) | :Angle number |
| SPRM(4) | :Title number |
| SPRM(5) | :Chapter number |
| SPRM(6) | :Program number |
| SPRM(7) | :Cell number |
| SPRM(8) | :Selected key name |
| SPRM(9) | :Navigation timer |
| SPRM(10) | :Current playback time |
| SPRM(11) | :Player audio mixing mode for Karaoke |
| SPRM(12) | :Country code for parental management |
| SPRM(13) | :Parental level |
| SPRM(14) | :Player configuration for video |
| SPRM(15) | :Player configuration for audio |
| SPRM(16) | :Language code for audio stream |
| SPRM(17) | :Language code extension for audio stream |
| SPRM(18) | :Language code for subtitle stream |
| SPRM(19) | :Language code extension for subtitle stream |
| SPRM(20) | :Player region code |
| SPRM(21) | :Secondary video stream number |
| SPRM(22) | :Secondary audio stream number |
| SPRM(23) | :Player status |
| SPRM(24) | :Reserved |
| SPRM(25) | :Reserved |
| SPRM(26) | :Reserved |
| SPRM(27) | :Reserved |
| SPRM(28) | :Reserved |
| SPRM(29) | :Reserved |
| SPRM(30) | :Reserved |
| SPRM(31) | :Reserved |

The SPRM(10) indicates the PTS of the picture currently being decoded and is updated every time a picture is decoded and written into the primary video plane memory. Accordingly, the current playback point can be known by referring to the SPRM(10).

The language code for the audio stream of the SPRM(16) and the language code for the subtitle stream of the SPRM (18) show default language codes of the playback device 102. These codes may be changed by a user with use of the OSD (On Screen Display) or the like of the playback device 102, or may be changed by an application program via the program execution unit 1806. For example, if the SPRM(16) shows "English," in playback processing of a playlist, the playback control unit 1807 first searches the stream selection table in the playitem information for a stream entry having the language code for "English." The playback control unit 1807 then extracts the PID from the stream identification information of the stream entry and transmits the extracted PID to the system target decoder 1803. As a result, an audio stream having the same PID is selected and decoded by the system target decoder 1803. These processes can be executed by the playback control unit 1807 with use of the movie object file or the BD-J object file.

During playback processing, the playback control unit 1807 updates the player variables in accordance with the status of the playback. The playback control unit 1807 updates the SPRM(1), the SPRM(2), the SPRM(21) and the SPRM(22) in particular. These SPRM respectively show, in the stated order, the stream selection numbers of the audio stream, the subtitle stream, the secondary video stream, and the secondary audio stream that are currently being processed. As an example, assume that the audio stream number SPRM(1) has been changed by the program execution unit 1806. In this case, the playback control unit 1807 first searches the stream selection table in the playitem information currently being played back for a stream entry including a stream selection number that matches the stream selection number shown by the changed SPRM(1). The playback control unit 1807 then extracts the PID from the stream identification information in the stream entry and transmits the extracted PID to the system target decoder 1803. As a result, the audio stream having the same PID is selected and decoded by the system target decoder 1803. This is how the audio stream targeted for playback is switched. The subtitle stream and the secondary video stream to be played back can be switched in a similar manner.

The playback execution unit 1806 is a processor and executes programs stored in the movie object file or the BD-J object file. The playback execution unit 1806 executes the following controls in particular in accordance with the programs. (1) The playback execution unit 1806 instructs the playback control unit 1807 to perform playlist playback processing. (2) The playback execution unit 1806 generates graphics data for a menu or a game as PNG or JPEG raster data, and transfers the generated data to the system target decoder 1803 to be composited with other video data. Specific contents of these controls can be designed relatively flexibly through program designing. That is, the contents of the controls are determined by the programming procedure of the movie object file and the BD-J object file in the authoring procedure of the BD-ROM disc 101.

The plane adder 1810 receives primary video plane data, secondary video plane data, IG plane data, PG plane data, and image plane data from the system target decoder 1803, and composites these data into a video frame or a field by superimposition. The resultant composited video data is outputted to the display device 103 and displayed on a screen thereof.

<<Structure of System Target Decoder>>

Figure 20:
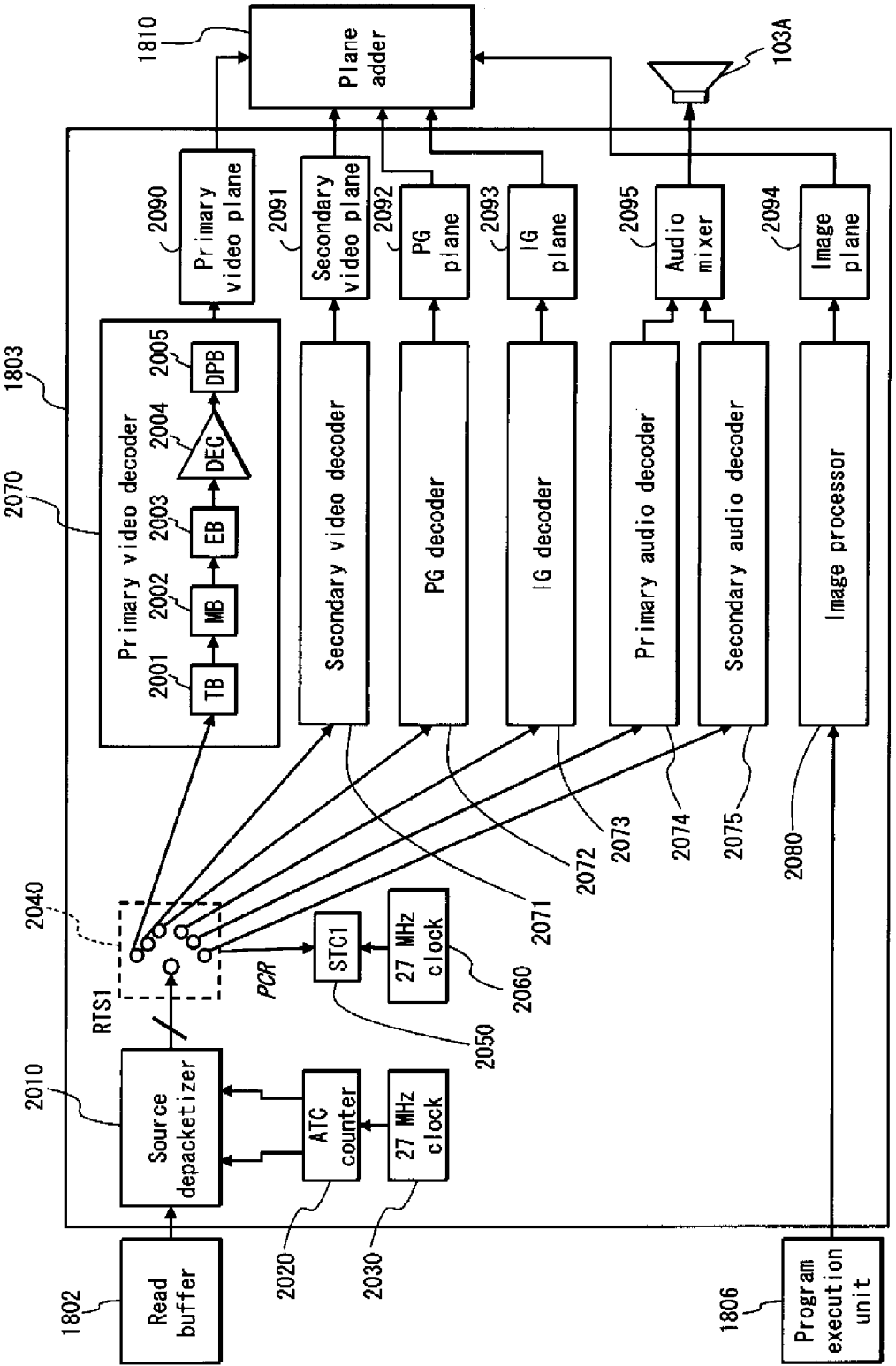
FIG. 20 is a functional block diagram of a system target decoder shown in FIG. 18.

FIG. 20 is a functional block diagram of the system target decoder 1803. As shown in FIG. 20, the system target decoder 1803 includes a source depacketizer 2010, an ATC counter 2020, a first 27 MHz clock 2030, a PID filter 2040, an STC counter (STC1) 2050, a second 27 MHz clock 2060, a primary video decoder 2070, a secondary video decoder 2071, a PG decoder 2072, an IG decoder 2073, a primary audio decoder 2074, a secondary audio decoder 2075, an image processor 2080, a primary video plane memory 2090, a secondary video plane memory 2091, a PG plane memory 2092, an IG plane memory 2093, an image plane memory 2094, and an audio mixer 2095.

The source depacketizer 2010 reads source packets from the read buffer 1802, extracts the TS packets from the read source packets, and transfers the TS packets to the PID filter 2040. The source depacketizer 2010 further adjusts the time of the transfer in accordance with the ATS of each source packet. Specifically, the source depacketizer 2010 first monitors the value of the ATC generated by the ATC counter 2020. Here, the value of the ATC depends on the ATC counter 2020, and is incremented in accordance with a pulse of the clock signal of the first 27 MHz clock 2030. Subsequently, at the instant the value of the ATC and the ATS of a source packet are identical, the source depacketizer 2010 transfers the TS packet extracted from the source packet to the PID filter 2040 at the recording speed $R_{TS1}$.

The PID filter 2040 first selects, from among the TS packets outputted from the source depacketizer 2010, TS packets which have a PID that matches a PID pre-specified by the playback control unit 1807. The PID filter 2040 then transfers the selected TS packets to the decoders 2070-2075 depending on the PID of the TS packets. For example, a TS packet with PID 0x1011 is transferred to the primary video decoder 2070, TS packets with PIDs ranging from 0x1B00 to 0x1B1F, 0x1100 to 0x111F, 0x1A00 to 0x1A1F, 0x1200 to 0x121F, and 0x1400 to 0x141F are transferred to the secondary video decoder 2071, the primary audio decoder 2074, the secondary audio decoder 2075, the PG decoder 2072, and the IG decoder 2073, respectively.

The PID filter 2040 further detects PCRs from each TS packet using the PID of the TS packet. In this case, the PID filter 2040 sets the value of the STC counter 2050 to a predetermined value. Herein, the value of the STC counter 2050 is incremented in accordance with a pulse of the clock signal of the second 27 MHz clock 2060. In addition, the value to which the STC counter 2050 is set to is instructed to the PID filter 2040 from the playback control unit 1807 in advance. The decoders 2070-2075 each use the value of the STC counter 2050 as the STC. That is, the decoders 2070-2075 perform decoding processing on the TS packets outputted from the PID filter 2040 at the time indicated by the PTS or the DTS shown by the TS packets.

The primary video decoder 2070, as shown in FIG. 20, includes a TB (Transport Stream Buffer) 2001, an MB (Multiplexing Buffer) 2002, an EB (Elementary Stream Buffer) 2003, a compressed video decoder (Dec) 2004, and a DPB (Decoded Picture Buffer) 2005. The TB 2001, the MB 2002, the EB 2003, and the DPB 2005 each are a buffer memory and use an area of a memory device internally provided in the primary video decoder 2070. Some or all of the TB 2001, the MB 2002, the EB 2003, and the DPB 2005 may be separated in different memory devices. The TB 2001 stores the TS packets received from the PID filter 2040 as they are. The MB 2002 stores PES packets reconstructed from the TS packets stored in the TB 2001. Note that when the TS packets are transferred from the TB 2001 to the MB 2002, the TS header is removed from each TS packet. The EB 2003 extracts an encoded video access unit from the PES packets and stores the extracted encoded video access unit therein. The video access unit includes compressed pictures, i.e., an I picture, B picture, and P picture. Note that when data is transferred from the MB 2002 to the EB 2003, the PES header is removed from each PES packet. The compressed video decoder 2004 decodes each video access unit in the MB 2002 at the time of the DTS shown by the original TS packet. Herein, the compressed video decoder 2004 changes a decoding scheme in accordance with the compression encoding formats, e.g., MPEG-2, MPEG-4 AVC, and VC1, and the stream attribute of the compressed pictures stored in the video access unit. The compressed video decoder 2004 further transfers the decoded pictures, i.e., a video frame or field, to the DPB 2005. The DPB 2005 temporarily stores the decoded pictures. When decoding a P picture or a B picture, the compressed video decoder 2004 refers to the decoded pictures stored in the DPB 2005. The DPB 2005 further writes each of the stored pictures into the primary video plane memory 2090 at the time of the PTS shown by the original TS packet.

The secondary video decoder 2071 includes the same structure as the primary video decoder 2070. The secondary video decoder 2071 first decodes the TS packets of the secondary video stream received from the PID filter 2040 into uncompressed pictures. Subsequently, the secondary video decoder 2071 writes the resultant uncompressed pictures into the secondary video plane memory 2091 at the time of the PTS shown by the TS packet.

The PG decoder 2072 decodes the TS packets received from the PID filter 2040 into uncompressed graphics data and writes the resultant uncompressed graphics data to the PG plane memory 2092 at the time of the PTS shown by the TS packet.

The IG decoder 2073 decodes the TS packets received from the PID filter 2040 into uncompressed graphics data and writes the resultant uncompressed graphics data to the IG plane memory 2093 at the time of the PTS shown by the TS packet.

The primary audio decoder 2074 first stores the TS packets received from the PID filter 2040 in a buffer provided therein. Subsequently, the primary audio decoder 2074 removes the TS header and the PES header from each TS packet in the buffer, and decodes the remaining data into uncompressed LPCM audio data. The primary audio decoder 2074 further sends the resultant audio data to the audio mixer 2095 at the time of the PTS shown by the original TS packet. The primary audio decoder 2074 changes a decoding scheme of the uncompressed audio data in accordance with the compression encoding format, e.g. AC-3 or DTS, and the stream attribute of the primary audio stream, included in the TS packets.

The secondary audio decoder 2075 has the same structure as the primary audio decoder 2074. The secondary audio decoder 2075 first decodes the TS packets of the secondary audio stream received from the PID filter 2040 into uncompressed LPCM audio data. Subsequently, the secondary audio decoder 2075 sends the uncompressed LPCM audio data to the audio mixer 2095 at the time of the PTS shown by the original TS packet. The secondary audio decoder 2075 changes a decoding scheme of the uncompressed audio data in accordance with the compression encoding format, e.g. Dolby Digital Plus or DTS-HD LBR, and the stream attribute of the primary audio stream, included in the TS packets.

The audio mixer 2095 mixes (superimposes) the uncompressed audio data received from the primary audio decoder 2074 and from the secondary audio decoder 2075. The audio mixer 2095 further sends the resultant composited audio to an internal speaker 103A of the display device 103 or the like.

The image processor 2080 receives graphics data, i.e., PNG or JPEG raster data, along with the PTS thereof from the program execution unit 1806. Upon the reception of the graphics data, the image processor 2080 appropriately processes the graphics data and writes the graphics data to the image plane memory 2094 at the time of the PTS thereof.

<Physical Arrangement on Disc of AV Stream Files Representing 2D Video Images>

When AV stream files representing 2D video images are stored on the BD-ROM disc 101, their physical arrangement needs to be designed so that the 2D video images can be played back seamlessly. Such a physical arrangement is described below. Here, seamless playback means that video images and sounds are played back smoothly and continuously from AV stream files.

AV stream files are recorded on the BD-ROM disc 101 as groups of extents. Here, logical addresses are consecutive within a single extent. As described previously, logical addresses in the BD-ROM disc 101 are substantially equivalent to physical addresses. Accordingly, the physical addresses in an extent are also substantially consecutive. Therefore, the BD-ROM drive 1801 can continuously read one extent without making the optical pickup perform a seek.

In the volume area 202B shown in FIG. 2, each extent is generally recorded in a plurality of physically consecutive sectors. These sectors belong to the recording area for an AV stream file in the STREAM directory area. Therefore, the logical address of each extent can be known from each allocation descriptor recorded in the file entry of the same recording area.

Figure 21:
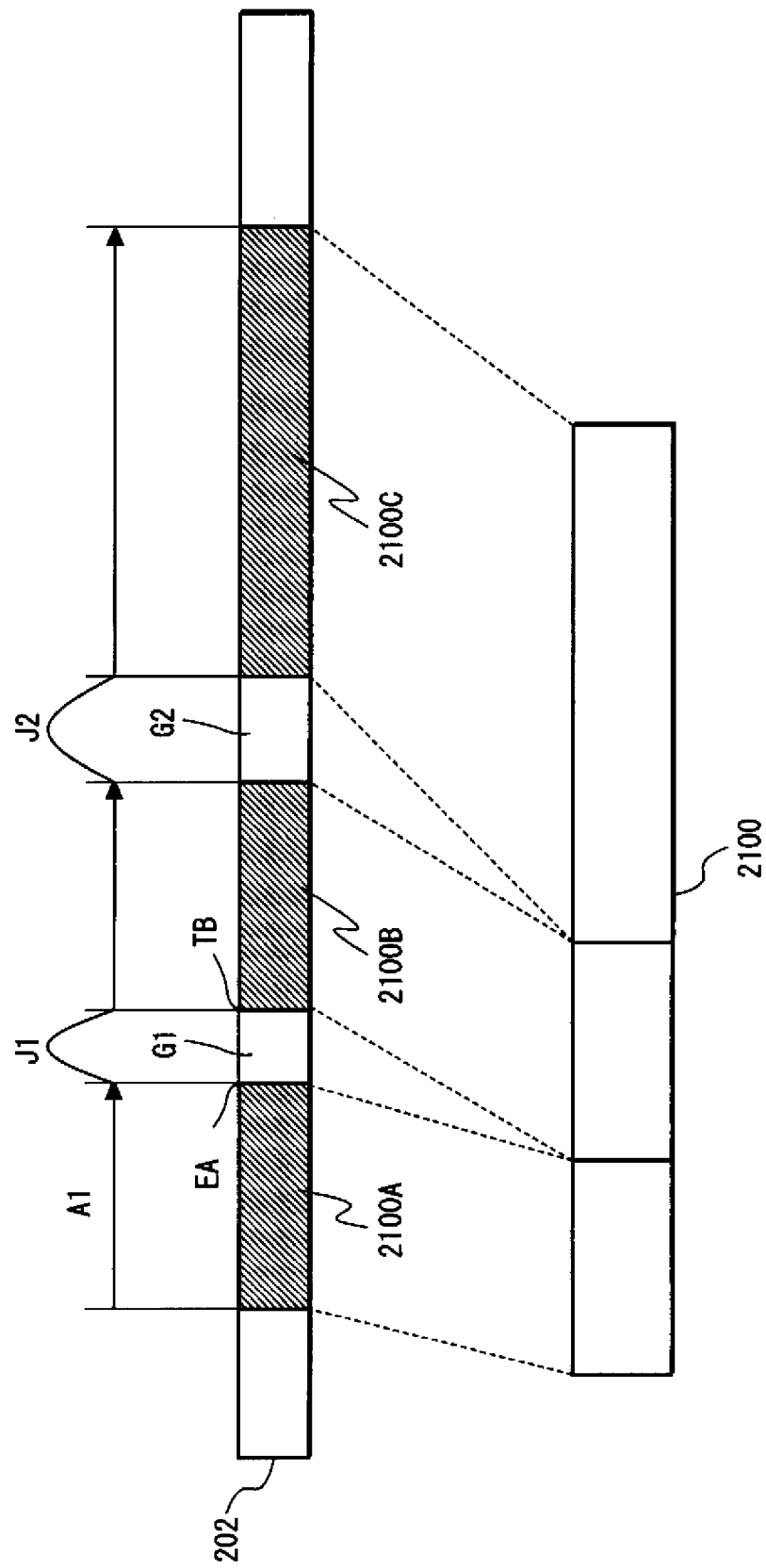
FIG. 21 is a schematic diagram showing a physical arrangement of extents on the BD-ROM disc shown in FIG. 2.

FIG. 21 is a schematic diagram showing a physical arrangement of extents on the BD-ROM disc 101. As shown in FIG. 21, an AV stream file 2100 is divided into three extents 2101A, 2101B, and 2101C recorded on the track 202 on the disc 101. As shown in FIG. 21, each of the extents 2101A-C is continuously arranged, but different extents are not consecutive with each other. To seamlessly play back video from the extents 2101A-C, the physical arrangement of the extents 2101A-C needs to satisfy the conditions described below.

A group of arrows A1 shown in FIG. 21 indicates a playback path. As the arrows A1 show, when video images are played back from the AV stream file 2100, the extents 2101A, 2101B, and 2101C are sequentially read by the playback device 102. When the first extent 2101A has been read to its end EA, the BD-ROM drive temporarily stops the reading operation by the optical pickup, increases the revolving speed of the BD-ROM disc 101, and quickly moves the top TB of the next extent 2101B to the location of the optical pickup. These operations of causing the optical pickup to suspend the reading operation and then, while suspended, position the optical pickup over the next area to be read is referred to as a "jump." In FIG. 21, convex portions J1 and J2 in the playback path A1 indicate the period in which a jump is performed on the playback path A1, i.e. the "jump period."

Types of jumps include a track jump and a focus jump, in addition to the operation of increasing or decreasing the revolving speed of the BD-ROM disc 101. Track jumps are operations of moving the optical pickup in a radial direction of the disc. Focus jumps are operations of moving the focus position of the optical pickup from one recording layer to another when the BD-ROM disc 101 is a multi-layer disc. These types of jumps generally cause a longer seek time and a larger number of sectors skipped in the reading processes, and thus are referred to as "long jumps." During a jump period, the optical pickup stops the reading operation. Accordingly, during the jump periods J1 and J2 shown in FIG. 21, data is not read from the corresponding portions G1 and G2 on the track 202, respectively. The length of a portion skipped in a reading process during a jump period, i.e. the length of the portions G1 and G2, is called a "jump distance." Jump distances are normally expressed by the number of sectors included in skipped portions. A long jump is specifically defined as a jump whose jump distance exceeds a predetermined threshold value. For example, the BD-ROM standards specify that the threshold value is to be 40,000 sectors based on the type of the BD-ROM disc and the reading capability of the BD-ROM drive.

During a jump period, the BD-ROM drive 1801 cannot read data from the BD-ROM disc 101. For the playback device 102 to seamlessly play back video from the AV stream file 2100, the system target decoder 1803 should be able to continue decoding processing even during a jump period and should be able to maintain continual output of decoded video data. The physical arrangement of the extents on the disc 101 thus needs to be designed accordingly.

Figure 22:
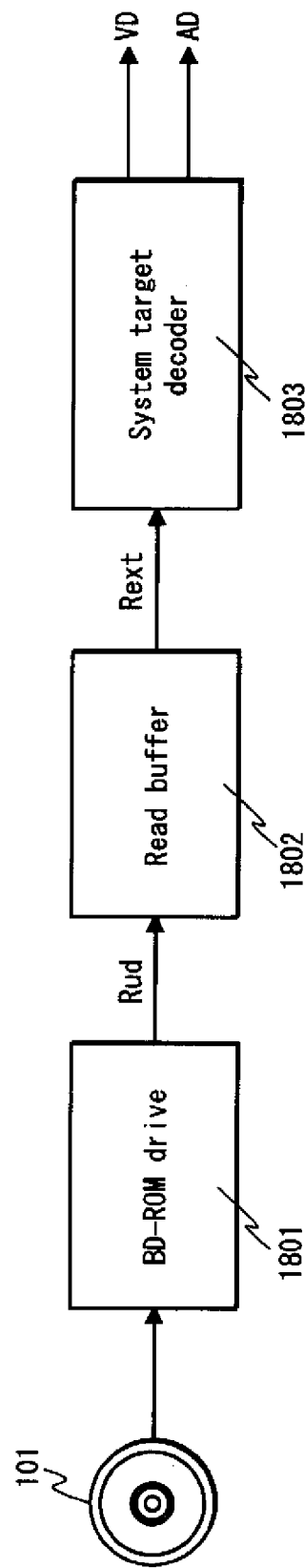
FIG. 22 is a schematic diagram showing the playback process system inside the 2D playback device shown in FIG. 18.

FIG. 22 is a schematic diagram showing the playback process system inside the 2D playback device shown in FIG. 18. This playback process system converts an AV stream file read from the BD-ROM disc 101 into video data VD and audio data AD. As shown in FIG. 22, the BD-ROM drive 1801 reads an AV clip from the BD-ROM disc 101 in units of extents and then stores the AV stream file in the read buffer 1802 at a read rate of $R_{ud}$. The system target decoder 1803 reads source packets from each extent in the read buffer 1802 at a mean transfer rate of $R_{ext}$ and then decodes the source packets into video data VD and audio data AD. Note that the mean transfer rate of $R_{ext}$ does not exceed 192/188 times the system rate 1101A shown in FIG. 11.

Figure 23:
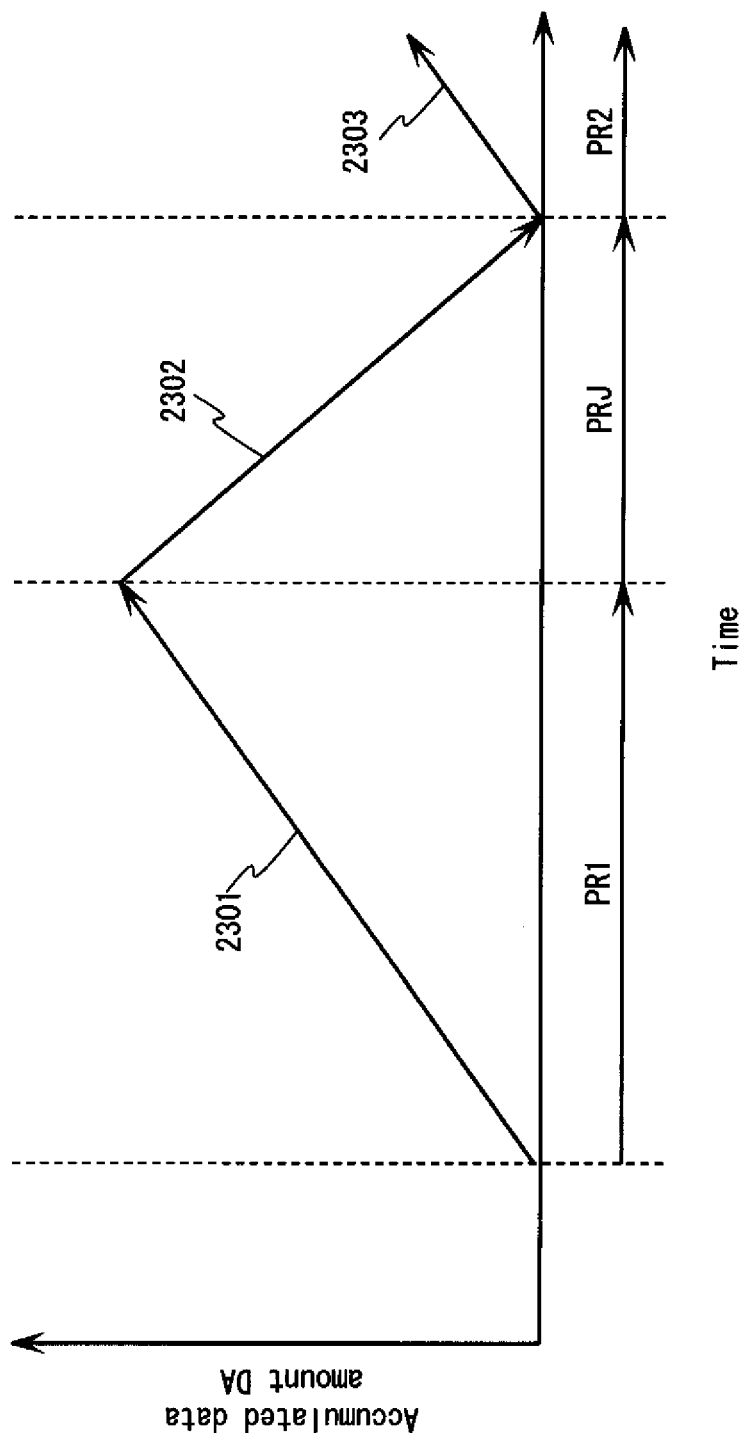
FIG. 23 is a graph showing the change of the accumulated data amount in the read buffer shown in FIG. 22 during a playback process period of an AV stream file.

FIG. 23 is a graph showing the change of the accumulated data amount DA in the read buffer 1802 during a playback process period of an AV stream file. This is a graph of when video is played back sequentially from the three extents 2101A-C shown in FIG. 21.

First, the top extent 2101A is read from the BD-ROM disc 101 into the read buffer 1802. During the read period PR1, the accumulated data amount DA, as shown by the arrow 2301 in FIG. 23, increases at a rate equivalent to the difference between the read rate $R_{ud}$ and the mean transfer rate $R_{ext}$, i.e. $R_{ud}$-$R_{ext}$. As shown in FIG. 21, when the last EA in the top extent 2101A is read, a jump J1 is performed to the top TB in the next extent 2101B. During the corresponding jump period PRJ, reading of data from the BD-ROM disc 101 is suspended. Therefore, as shown by the arrow 2303 in FIG. 23, the accumulated data amount DA decreases at the mean transfer rate $R_{ext}$. Here, the accumulated data amount in the read buffer 1802 during the read period PR1, i.e. the size of the top extent 2101A, is assumed to be equivalent to the data amount transferred from the read buffer 1802 to the system target decoder 1803 from the read period PR1 through the jump period PRJ. In this case, as shown in FIG. 23, the accumulated data amount DA returns to the value at the start of the read period PR1 by the end of the jump period PRJ. As shown in FIG. 21, after the jump J1, reading of the next extent 2101B begins. During the corresponding read period PR2, as shown by arrow 2303 in FIG. 23, the accumulated data amount DA once again increases at a rate equivalent to the difference between data transfer rates, or $R_{ud}$-$R_{ext}$.

The BD-ROM drive 1801 does not actually perform read/transfer operations continuously, as shown by the arrows 2301 and 2303 in FIG. 23, but rather intermittently. This ensures that the accumulated data amount DA during the read periods PR1 and PR2 for the extents does not exceed the amount of the read buffer 1802, or in other words, that overflow does not occur in the read buffer 1802. Accordingly, the arrows 2301 and 2303 in FIG. 23 represent what is actually a step-wise increase as an approximated straight increase.

To seamlessly play back video from the top extent 2101A and the next extent 2101B regardless of the jump J1, during the entire jump period PRJ, it is necessary to maintain provision of data from the read buffer 1802 to the system target decoder 1803 and ensure continual output from the decoder 1803. Here, as made clear by FIG. 23, even if the top extent 2101A is small, if it is equivalent to the data amount transferred from the read buffer 1802 to the system target decoder 1803 from the read period PR1 through the jump period PRJ, then the accumulated data amount DA will not reach zero during the jump period PRJ. That is, underfloor will not occur in the read buffer 1802. If this is the case, then the system target decoder 1803 can maintain continual output of video data, and seamless playback of video from this video data is possible. Accordingly, for seamless playback of video, the size $S_{ext}$ of the top extent 2101A should fulfill Equation 1.

$$S_{ext} \geq \left(\frac{S_{ext}}{R_{ud}} + T_{jump}\right) \times R_{ext}$$

$$\therefore S_{ext} \geq CEIL\left(\frac{R_{ext}}{8} \times \frac{R_{ud}}{R_{ud} - R_{ext}} \times T_{jump}\right)$$

Equation 1

In Equation 1, the jump period $T_{jump}$ represents the length of the jump period PRJ in units of seconds. The read rate $R_{ud}$ represents the rate of reading data from the BD-ROM disc 101 to the read buffer 1802 in bits per second. The mean transfer rate $R_{ext}$ represents, in bits per second, the mean transfer rate at which the source packets contained in each extent are transferred from the read buffer 1802 to the system target decoder 1803. Note that dividing the mean transfer rate $R_{ext}$ in the second line of Equation 1 by the number "8" is for converting the unit of the extent size $S_{ext}$ from bits to bytes. That is, the extent size $S_{ext}$ is represented in bytes. The function CEIL( ) represents an operation to round up fractional numbers after the decimal point of the value in parentheses. Hereinafter, the minimum value of the extent size $S_{ext}$ expressed by the right-hand side of Equation 1 is referred to as "minimum extent size."

More specifically, the mean transfer rate $R_{ext}$ is evaluated using the value obtained by dividing the size of an extent expressed in bits by the extent ATC time. Here, the "size of an extent expressed in bits" is equivalent to eight times the product of the number of source packets in the extent and the number of bytes per source packet (192 bytes). The "extent ATC time" is defined as the range of the ATS assigned to each source packet in the extent, i.e. the value of the ATC representing the time interval from the ATS for the top source packet in the extent to the ATS for the top source packet in the next extent. Accordingly, the extent ATC time is equal to the time required to transfer all the data included in the extent from the read buffer 1802 to the system target decoder 1803.

On the other hand, the finite size of the read buffer 1802 restricts the maximum value of the jump time $T_{jump}$ in which seamless playback is possible. That is, even if the accumulated data amount DA reaches the full capacity of the read buffer 1802, an excessively long jump time $T_{jump}$ due to an excessively long jump distance to the next extent would cause the accumulated data amount DA to reach zero during the jump period PRJ, and accordingly, would cause depletion of the data accumulated in the read buffer 1802. In this case, the system target decoder 1803 would stop providing video data, and therefore seamless playback could not be achieved. Hereinafter, the length of time required for the accumulated data amount DA to decrease from the full capacity of the read buffer 1802 to zero while data supply from the BD-ROM disc 101 to the read buffer 1802 is suspended, that is, the maximum value of the jump time $T_{jump}$ allowable for seamless playback, is referred to as "maximum jump time."

Standards of optical discs normally predetermine the relationship between jump distances and jump times by using the access speed of an optical disc drive and the like. FIG. 24 is a table showing an example of the relationship between jump distances $S_{jump}$ and jump times $T_{jump}$ specified for BD-ROM discs. In FIG. 24, jump distances $S_{jump}$ are represented in units of sectors. Here, 1 sector=2048 bytes. As shown in FIG. 24, when jump distances fall within the range of 0-10000, 10001-20000, 20001-40000 sectors, 40001 sectors-1/10 stroke, and 1/10 stroke or greater, the corresponding jump times are 250 ms, 300 ms, 350 ms, 700 ms, and 1400 ms, respectively. The minimum extent sizes are calculated according to the regulation shown in FIG. 24. Furthermore, the AV stream file is divided into a plurality of extents and arranged on the BD-ROM disc 101 in accordance with the minimum extent sizes. When the BD-ROM disc 101 is such a disc, the BD-ROM drive 1801 of the playback device 102 complies with the regulation shown in FIG. 24, thereby being able to seamlessly play back video images from the BD-ROM disc 101.

When the BD-ROM disc 101 is a multi-layer disc and a recording layer to be read is switched to another layer, 350 ms are needed for operations such as a focus jump to switch layers in addition to the jump time $T_{jump}$ specified in FIG. 24. This length of time is hereinafter referred to as "layer switching time." When there is a layer boundary between two extents to be consecutively read, the minimum extent size is accordingly determined based on the sum of the jump time $T_{jump}$ corresponding to the jump distance $S_{jump}$ between the two extents and the layer switching time.

The maximum jump distance corresponding to the maximum jump time is determined from the regulation in FIG. 24 and the layer switching time. For example, assuming that the maximum jump time is 700 ms, then the maximum jump distance is 1/10 stroke (approximately 1.2 GB) and 40000 sectors (approximately 78.1 MB) without and with a layer boundary between two consecutive extents, respectively.

When video that extends from one section of an AV stream file through a second, different section is played back, to seamlessly connect the video played back from these sections, the arrangement of the last extent of the previous section in the playback path and the top extent of the next section should satisfy the following conditions. First, the size of the last extent should at least be equivalent to the minimum extent size calculated based on the jump distance to the top extent. Next, the jump distance should not exceed the maximum jump distance.

Figure 25:
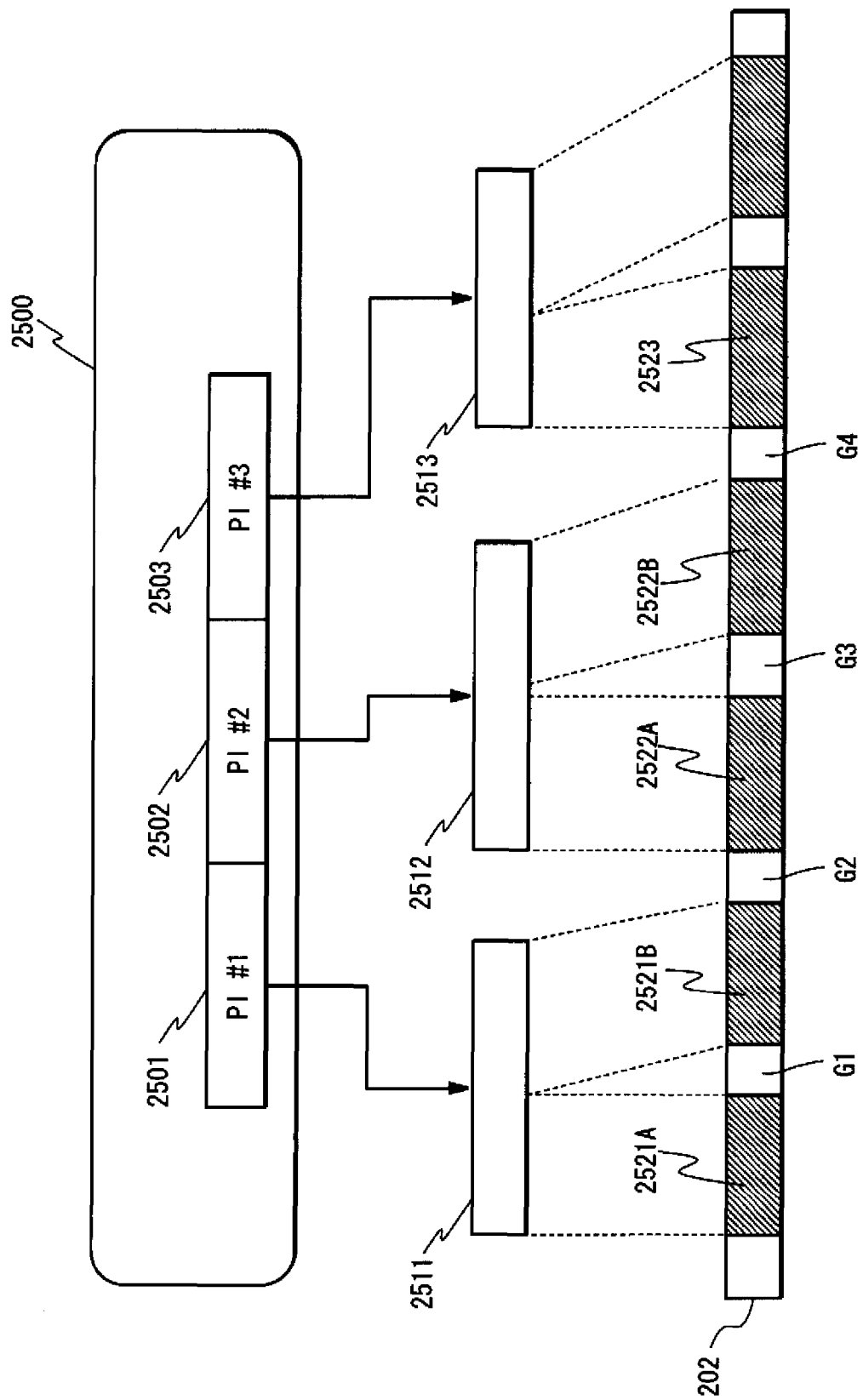
FIG. 25 is a schematic diagram showing an example of a physical arrangement of extents when 2D video images are continuously played back from three different sections of an AV stream file in turn.

FIG. 25 is a schematic diagram showing an example of a physical arrangement of extents when 2D video images are continuously played back from three different sections 2511-2513 of an AV stream file in turn. As shown in FIG. 25, a playlist file 2500 includes three pieces of playitem information (PI#1-3) 2501-2503. These pieces of playitem information 2501-2503 specify the entireties of the three different sections 2511-2513, respectively, as a playback section. The sections 2511-2513 are divided into a plurality of extents 2521A, 2521B, 2522A, 2522B, and 2523 and recorded on the track 202 of the BD-ROM disc 101.

The sizes of the extents 2521A and 2521B in the recording area of the top section 2511 are at least equivalent to the corresponding minimum extent size. Here, the minimum extent size for the top extent 2521A is calculated from the jump distance G1 from this extent 2521A to the next extent 2521B. The minimum extent size for the last extent 2521B is calculated from the jump distance G2 from this extent 2521B to the top extent 2522A in the second AV clip 2512. Furthermore, both jump distances G1 and G2 do not exceed the maximum jump distance. Similarly, in the recording area for the second section 2512, the sizes of the extents 2521A and 2521B are at least equivalent to the corresponding minimum extent size, and the minimum extent sizes are calculated from the jump distances G3 and G4 between extents. Furthermore, both jump distances G1 and G2 do not exceed the maximum jump distance.

By designing the arrangement of each extent in this way, data can be provided to the system target decoder 1803 without underflow occurring in the read buffer 1802 during any of the jump periods. Therefore, during all of the jump periods, the system target decoder 1803 can continue decoding processing and maintain continual output of video data after decoding. In this way, 2D video images can be played back seamlessly from the sections 2511-2513.

<Principle of 3D Video Image Playback>

Playback methods of 3D video images are roughly classified into two categories: methods using a holographic technique, and methods using parallax video.

A method using a holographic technique is characterized by allowing a viewer to perceive objects in video as stereoscopic by giving the viewer's visual perception substantially the same information as optical information provided to visual perception by human beings of actual objects. However, although a technical theory for utilizing these methods for moving video display has been established, it is extremely difficult to construct, according to the present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of a viewer's eyes for the same scene, i.e. the pair of a left-view and a right-view. A method using a parallax video is characterized by playing back the left-view and right-view of a single scene so that the viewer sees each view in only one eye, thereby allowing the user to perceive the scene as stereoscopic.

Figure 26B:
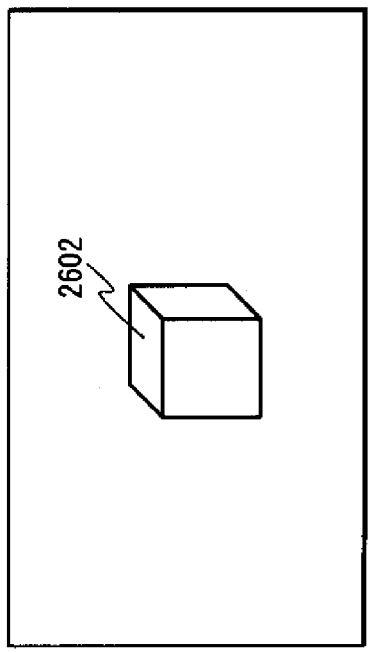
FIGS. 26A, 26B, 26C are schematic diagrams illustrating the principle of stereoscopic video playback according to a method using parallax video.
Figure 26C:
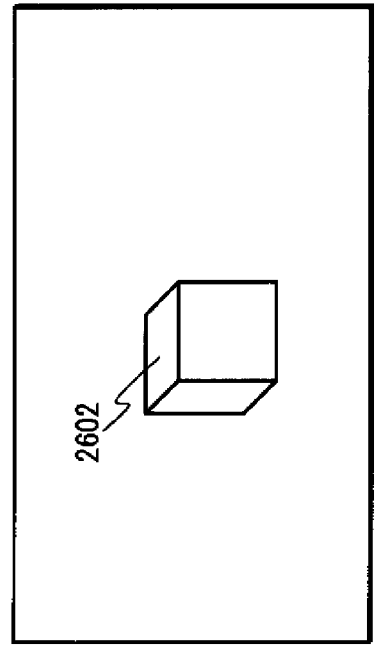
Figure 26A:
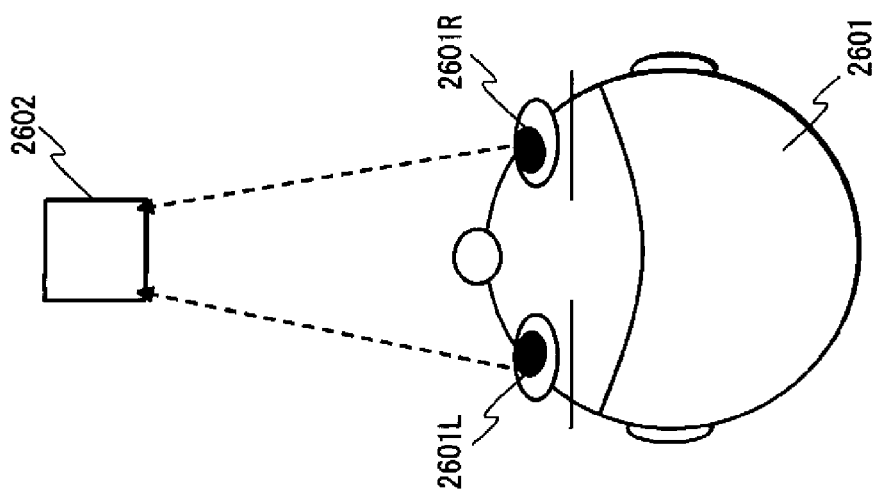

FIGS. 26A, 26B, 26C are schematic diagrams illustrating the principle of playing back 3D video images (stereoscopic video) according to a method using parallax video. FIG. 26A shows from above when a viewer 2601 is looking at a cube 2602 placed in front of the viewer's face. FIGS. 26B and 26C respectively show the outer appearance of the cube 2602 as a 2D video image as perceived by the left eye 2601L and the right eye 2601R of the viewer 2601. As is clear from comparing FIG. 26B and FIG. 26C, the outer appearances of the cube 2602 as perceived by the eyes are slightly different. The difference of the outer appearances, i.e., the binocular parallax allows the viewer 2601 to recognize the cube 2602 as three-dimensional. Thus, according to a method using parallax video, first, left and right 2D video images with different viewpoints are prepared for a single scene. For example, for the cube 2602 shown in FIG. 26A, the left view of the cube 2602 shown in FIG. 26B and the right view shown in FIG. 26C are prepared. Here, the position of each viewpoint is determined by the binocular parallax of the viewer 2601. Next, each video image is played back so as to allow the corresponding eye of the viewer 2601 to perceive it. Consequently, the viewer 2601 recognizes the scene played back on the screen, i.e., the video of the cube 2602 as stereoscopic. In this way, unlike methods using the holography technique, methods using parallax video have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, and two-color separation methods.

In alternate frame sequencing, left and right 2D video images are alternately displayed on a screen for a predetermined time, while the viewer observes the screen using shutter glasses. Here, each lens in the shutter glasses is, for example, formed by a liquid crystal panel. The lenses pass or block light in a uniform and alternate manner in synchronization with switching of the 2D video images on the screen. That is, each lens functions as a shutter that periodically blocks an eye of the viewer. More specifically, while a left video image is displayed on the screen, the shutter glasses make the left-side lens transmit light and the right-hand side lens block light. Conversely, while a right video image is displayed on the screen, the shutter glasses make the right-side glass transmit light and the left-side lens block light. As a result, the eyes of the viewer see afterimages of the right and left video images, which are overlaid with each other, and perceive a 3D video image.

According to the alternate-frame sequencing, as described previously, right and left video images are alternately displayed in a predetermined cycle. For example, when 24 video frames are displayed per second for playing back a normal 2D movie, 48 video frames in total for both right and left eyes need to be displayed for a 3D movie. Accordingly, a display device able to quickly execute rewriting of the screen is preferred for this method.

In a method using a lenticular lens, a right video frame and a left video frame are respectively divided into reed-shaped small and narrow areas whose longitudinal sides lie in the vertical direction of the screen. In the screen, the small areas of the right video frame and the small areas of the left video frame are alternately arranged in the landscape direction of the screen and displayed at the same time. Here, the surface of the screen is covered by a lenticular lens. The lenticular lens is a sheet-shaped lens constituted from parallel-arranged multiple long and thin hog-backed lenses. Each hog-backed lens lies in the longitudinal direction on the surface of the screen. When a viewer sees the left and right video frames through the lenticular lens, only the viewer's left eye perceives light from the display areas of the left video frame, and only the viewer's right eye perceives light from the display areas of the right video frame. This is how the viewer sees a 3D video image from the parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the display through polarization glasses. Here, for the polarization glasses, a longitudinal polarization filter is provided for the left lens, and a lateral polarization filter is provided for the right lens. Consequently, the right and left video images are respectively perceived only by the corresponding eyes, thereby allowing the viewer to recognize a stereoscopic video image.

In a method using parallax video, in addition to being constructed from the start by a combination of left and right video images, the 3D video content can also be constructed from a combination of 2D video images with a depth map. The 2D video images represent 3D video images projected on a hypothetical 2D picture plane, and the depth map represents the depth of each portion of the 3D video image as compared to the 2D picture plane in units of pixels. When the 3D content is constructed from a combination of 2D video images with a depth map, the 3D playback device or the display device first constructs left and right videos from the combination of 2D video images with a depth map and then creates 3D video images from these left and right videos using one of the above-described methods.

Figure 27:
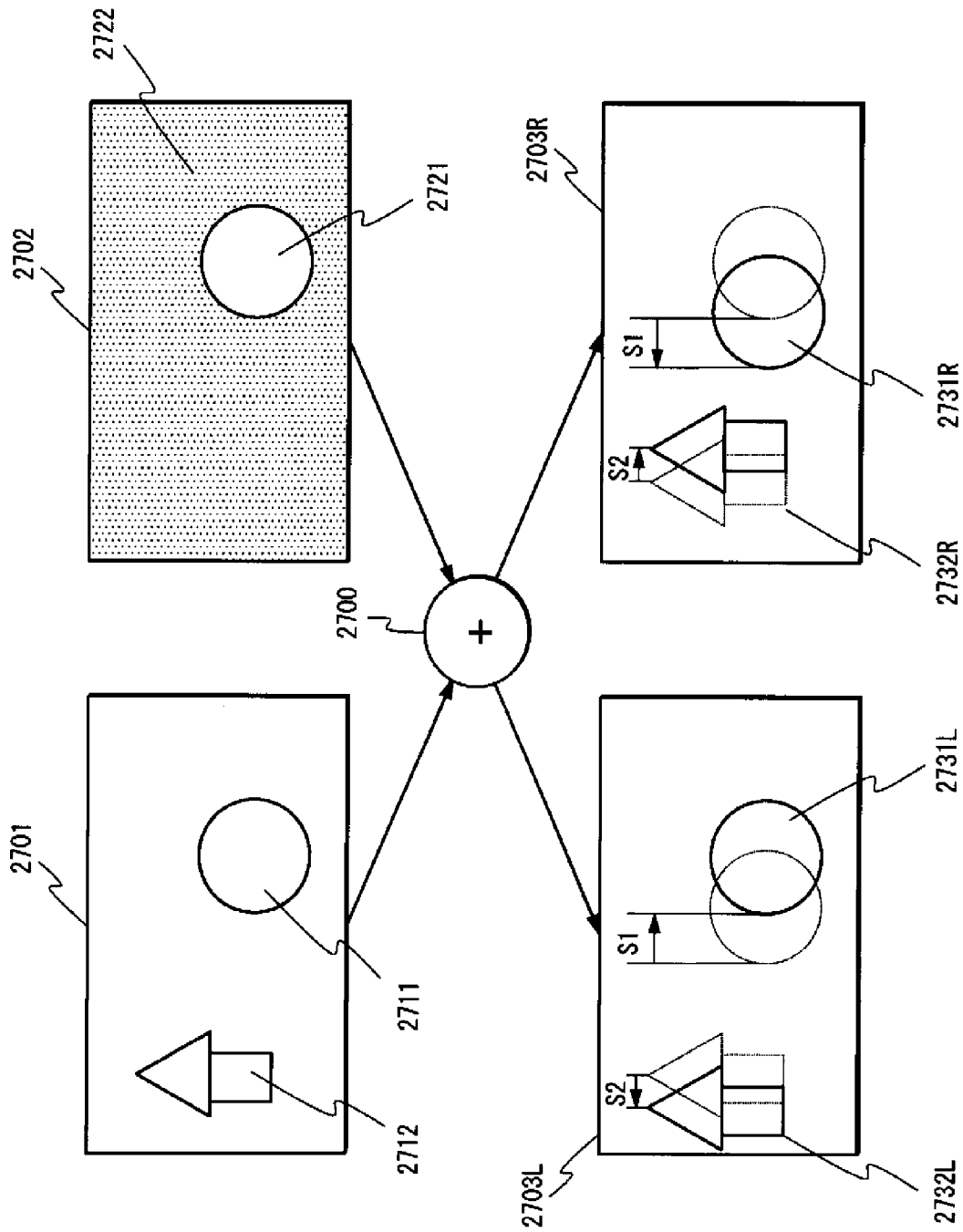
FIG. 27 is a schematic diagram showing an example of constructing a left-view and a right-view from a combination of 2D video images and a depth map.

FIG. 27 is a schematic diagram showing an example of constructing a left-view 2703-L and a right-view 2703-R from a combination of a 2D video image 2701 and a depth map 2702. As shown in FIG. 27, a circular plate 2711 is shown in the background 2712 of the 2D video image 2701. The depth map 2702 indicates the depth for each pixel in each portion of the 2D video image 2701. According to the depth map 2702, in the 2D video image 2701, the display area 2721 of the circular plate 2711 is closer to the viewer than the screen, and the display area 2722 of the background 2712 is deeper than the screen. The parallax video generation unit 2700 in the playback device 102 first calculates the binocular parallax for each portion of the 2D video image 2701 using the depth of each portion indicated by the depth map 2702. Next, the parallax video generation unit 2700 shifts the display position of each portion in the 2D video image 2701 in accordance with the calculated binocular parallax to construct the left-view 2703L and the right-view 2703R. In the example shown in FIG. 27, the parallax video generation unit 2700 shifts the display position of the circular plate 2711 in the 2D video image 2701 as follows: the display position of the circular plate 2731L in the left-view 2703L is shifted to the right by half of its binocular parallax, S1, and the display position of the circular plate 2731R in the right-view 2703R is shifted to the left by half of its binocular parallax, S1. In this way, the viewer perceives the circular plate 2711 as being closer than the screen. Conversely, the parallax video generation unit 2700 shifts the display position of the background 2712 in the 2D video image 2701 as follows: the display position of the background 2732L in the left-view 2703L is shifted to the left by half of its binocular parallax, S2, and the display position of the background 2732R in the right-view 2703R is shifted to the right by half of its binocular parallax, S2. In this way, the viewer perceives the background 2712 as being deeper than the screen.

A playback system for 3D video images with use of parallax video has already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other methods, as long as they use parallax video. This will be obvious to those skilled in the art from the following explanation of the embodiments.

<Data Structure of 3D Video Content>

Next, among the file group in the BDMV directory 242 shown in FIG. 2, an explanation is provided for the data structure of the files related to playback of 3D video content. Here, fundamental parts of the data structure are identical with those of the data structure for 2D content, which is shown in FIGS. 2-17. Accordingly, the following will mainly describe expanded or changed portions with respect to the data structure for the 2D video content, incorporating by reference the aforementioned explanation for the fundamental parts.

<<Objects Described in the Index Table>>

Figure 28:
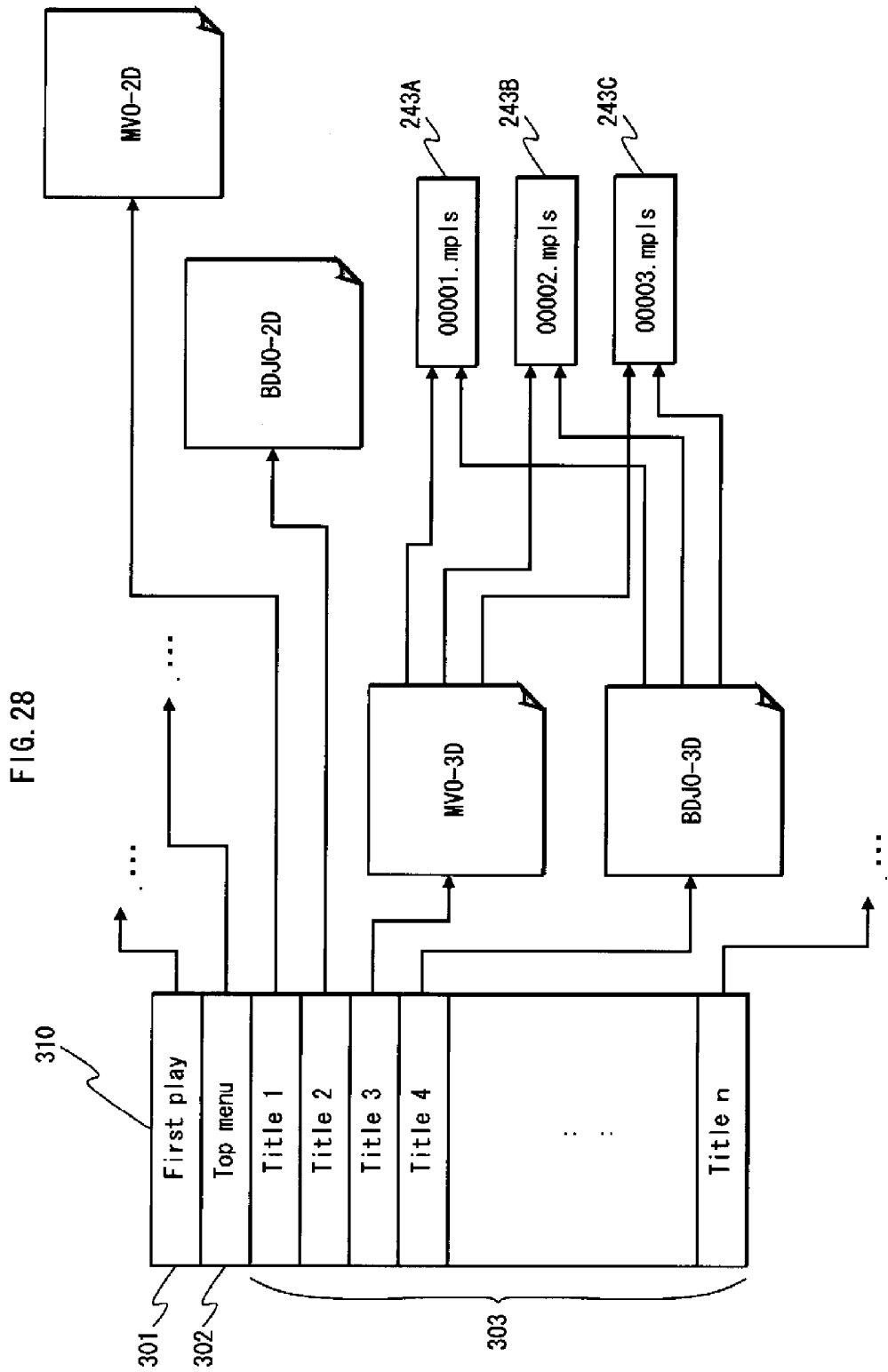
FIG. 28 is a schematic diagram showing the relationship between a movie object and a BD-J object, as related to the playback of 3D video images described in an index table, and three types of playlist files.

FIG. 28 is a schematic diagram showing the relationship between a movie object MVO-3D and a BD-J object BDJO-3D, as related to the playback of 3D video images described in the index table 310, and three types of playlist files 243A-C. The first playlist file (00001.mpls) 243A is a 2D playlist file. The second playlist file (00002.mpls) 243B and the third playlist file (00003.mpls) 243C are 3D playlist files. In the index table 310, the items "title 3" and "title 4" are allocated to 3D video titles. The movie object MVO-3D associated with the item "title 3" contains, in addition to a group of commands related to 2D video image playback processing using the first playlist file 243A, a group of commands related to 3D video image playback processing using either of the other playlist files 243B and 243C. In the BD-J object BDJO-3D associated with the item "title 4," the application management table specifies, in addition to a Java application program related to 2D video image playback processing using the first playlist file 243A, a Java application program related to 3D video image playback processing using either of the other playlist files 243B and 243C.

For example, when title 3 is selected by user operation, the playback device 102 refers to the item "title 3" in the index table 310, and calls and executes the movie object MVO-3D. In this way, the playback device 102 first performs the following four types of distinguishing processes: 1) Does the playback device 102 itself support playback of 3D video images? 2) Has the user selected 3D video image playback?

3) Does the display device 103 support playback of 3D video images? and 4) Is the 3D video image playback mode of the playback device 102 set to L/R mode or depth mode? Here, "L/R (left/right) mode" refers to a mode in which 3D video images are played back from a combination of a left-view stream file and a right-view stream file, whereas "depth mode" refers to a mode in which 3D video images are played back from a combination of a 2D/AV stream file and a depth map AV stream file. Next, the playback device 102 selects one of the playlist files 243A-C to be played back in accordance with the results of the above-described distinguishing processes. When, on the other hand, the playback device 102 refers to the item "title 4" in the index table 310 and calls the BD-J object BDJO-3D, the playback device 102 executes each Java application program in accordance with the application management table. In this way, the playback device 102 performs the above-described distinguishing processes and selects a playlist file in accordance with the results thereof.

Figure 29:
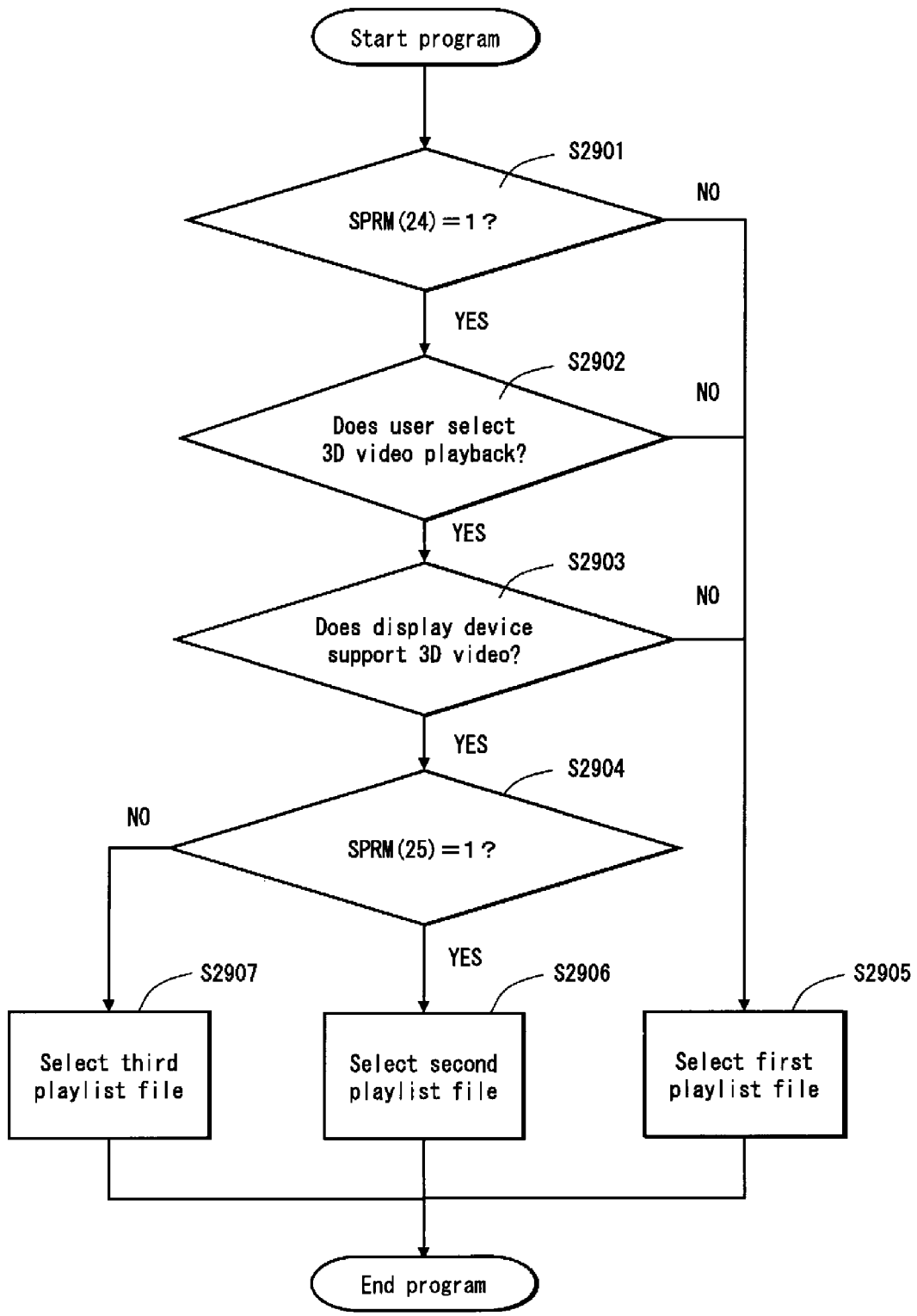
FIG. 29 is a flowchart showing processes, performed when a title of 3D video images is selected, to select a playlist file to be played back.

FIG. 29 is a flowchart showing processes, performed when a title of 3D video images is selected, to select a playlist file to be played back. In the example shown in FIG. 28, when the item "title 3" in the index table 310 is referred to, selection processes are executed in accordance with the movie object MVO-3D. When the item "title 4" is referred to, selection processes are executed in accordance with the Java application programs specified by the BD-J object BDJO-3D.

Here, the selection processes are assumed to be performed when the SPRM shown in FIG. 19 further include the following two types of flags: (A) a flag for identifying "whether the playback device 102 only supports playback of 2D video images or also supports 3D video images," and (B) a flag for identifying "whether the 3D video image playback mode of the playback device 102 is set to L/R mode or depth mode." Specifically, this assumes that the SPRM(24) includes flag (A), and the SPRM(25) includes flag (B). Furthermore, the value of each flag is assumed to indicate the following: when the SPRM(24) is "0," the playback device 102 only supports playback of 2D video images, and when it is "1," the playback device 102 also supports 3D video image playback. When the SPRM(25) is "0," the 3D video image playback mode of the playback device 102 is L/R mode, and when it is "1," the 3D video image playback mode is depth mode.

In step S2901, the playback device 102 checks the value of the SPRM(24). If the value is 0, the process advances to S2905. If the value is 1, the process advances to S52902.

In step S2902, the playback device 102 causes the display device 103 to display a menu and allows the user to select 2D video image playback or 3D video image playback. If the user selects 2D video image playback with an operation of a remote control or the like, the process advances to step S2905. On the other hand, if the user selects 3D video image playback, the process advances to step S2903.

In S2903, the playback device 102 checks whether the display device 103 supports 3D video image playback. Specifically, the playback device 102 exchanges CEC messages with the display device 103 via an HDMI cable 122, and the playback device 102 and asks the display device 103 whether it supports 3D video image playback. If the display device 103 does not support 3D video image playback, the process advances to step S2905, and when it does support 3D video image playback, the process advances to step S2904.

In step S2904, the playback device 102 checks the value of the SPRM(25). When the value is 1, the process advances to step S2907.

In step S2905, the playback device 102 selects the first playlist file 243A as the playback target. Note that in this case, the playback device 102 may cause the display device 103 to display the reason the 3D video image playback was not selected.

In step S2906, the playback device 102 selects the second playlist file 243B as the playback target.

In step S2907, the playback device 102 selects the third playlist file 243C as the playback target.

<<3D Playlist File>>

Figure 30:
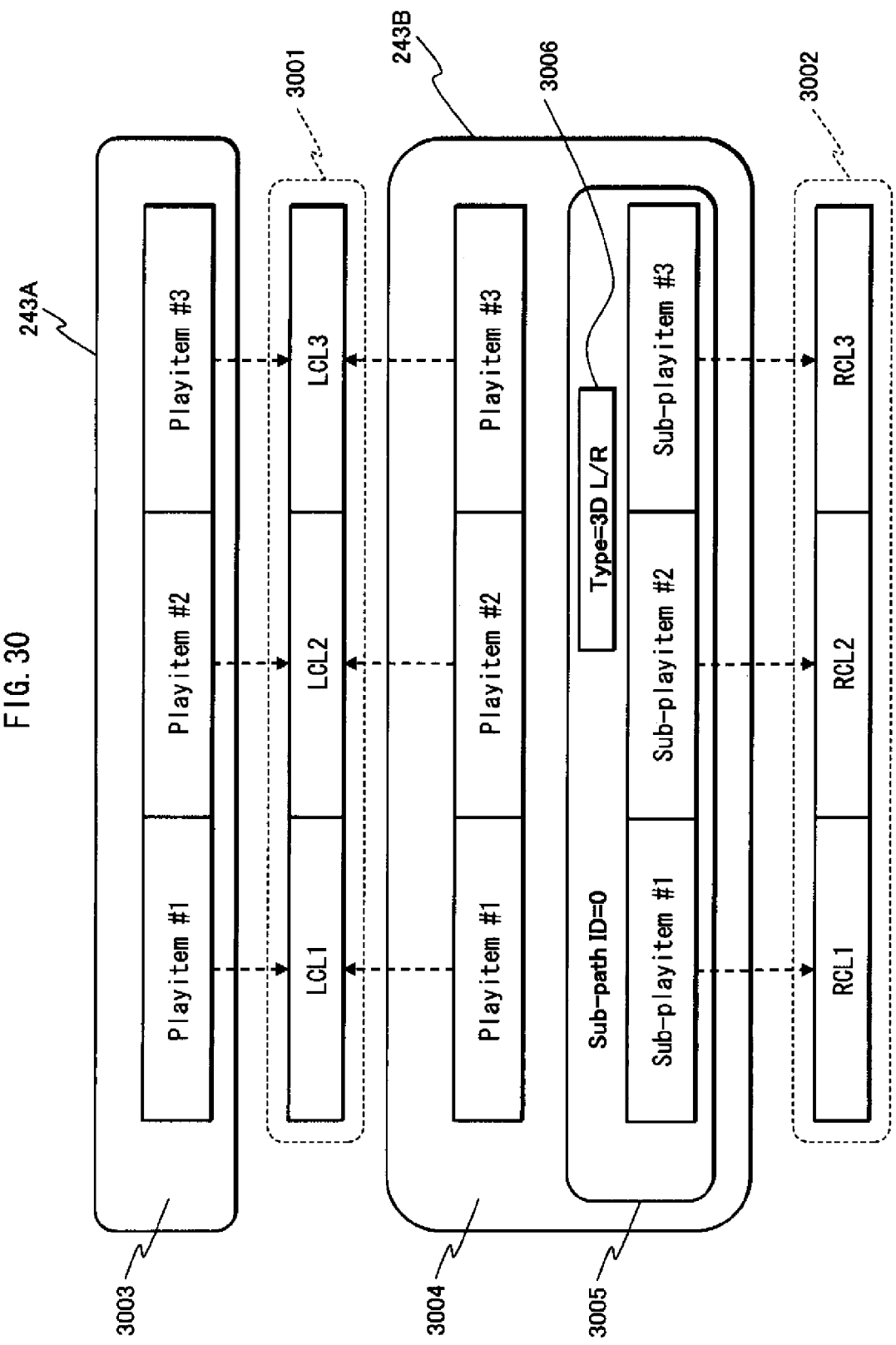
FIG. 30 is a schematic diagram showing an example of the structures of the first playlist file and the second playlist file shown in FIG. 2.

FIG. 30 is a schematic diagram showing an example of the structures of the first playlist file 243A and the second playlist file 243B. The first AV clip group 3001 is formed by sections LCL1-3 in the first AV stream file 245A. The second AV clip group 3002 is formed by sections RCL1-3 in the second AV stream file 245B. Both the main path 3003 in the first playlist file 243A and the main path 3004 in the second playlist file 243B include three pieces of playitem information #1-3. The three pieces of playitem information #1-3 all specify playback areas in the first AV clip group 3001. Unlike the first playlist file 243A, the second playlist file 243B further includes a sub-path 3005. The sub-path 3005 includes three pieces of sub-playitem information #1-3, and each piece of sub-playitem information #1-3 specifies a playback area in the second AV clip group 3002. The pieces of sub-playitem information #1-3 are in one-to-one correspondence with the pieces of playitem information #1-3. The length of the playback area of each piece of sub-playitem information is equivalent to the length of the playback area of the corresponding piece of playitem information. The sub-path 3005 further includes a sub-path type 3006. The "sub-path type" indicates whether the playback process should by synchronous between the main path and the sub-path. In FIG. 30, the value of the sub-path type 3006 is "3D L/R." This value indicates that the sub-path 3005 is to be used for playback of 3D video images in L/R mode, and in particular that the sub-path 3005 specifies the playback path for the right-view stream file.

When the first playlist file 243A is selected as the playback target by the selection process shown in FIG. 29, the playback device 102 plays back 2D video images from the first AV clip group 3001 in accordance with the corresponding main path 3003. On the other hand, when the second playlist file 243B is selected as the playback target, the playback device 102 executes 3D video image playback in L/R mode. In particular, the playback device 102 generates a left-view from the first AV clip group 3001 in accordance with the main path 3004 of the second playlist file 243B and generates a right-view from the second AV clip group 3002 in accordance with the sub-path 3005. At that time, the playback device 102 detects that the value of the sub-path type 3006 is "3D L/R" and synchronizes playback processing between the main path 3004 and the sub-path 3005. In this way, playback of 3D video images in L/R mode is performed. Here, the first AV clip group 3001 is used in common in 2D video image playback and in 3D video image playback in L/R mode.

In each piece of playitem information in the second playlist file 243B, a stream entry for the 2D/left-view stream and a stream entry for the right-view stream have been added to the stream selection table 1505 shown in FIG. 15. The stream entries 1509 for the 2D/left-view stream and the right-view stream have the same contents such as the frame rate, resolution, and video format. Note that each stream entry 1509 may further have a flag for identifying the 2D/left-view stream and the right-view stream added therein.

Figure 31:
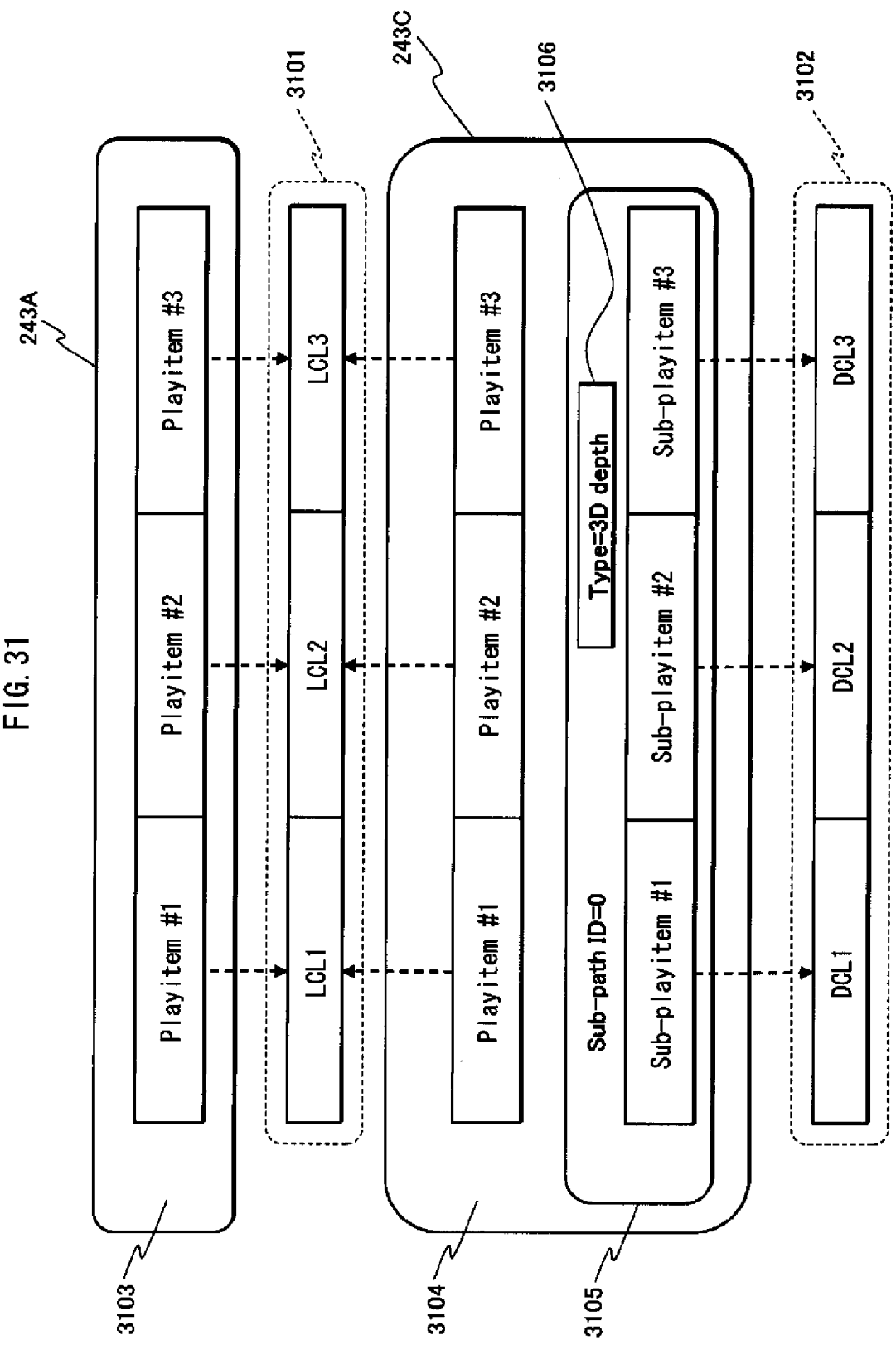
FIG. 31 is a schematic diagram showing an example of the structures of the first playlist file and the third playlist file shown in FIG. 2.

FIG. 31 is a schematic diagram showing an example of the structures of the first playlist file 243A and the third playlist file 243C. The first AV clip group 3101 is formed by the sections LCL1-3 in the first AV stream file 245A. The third AV clip group 3102 is formed by the sections DCL1-3 in the third AV stream file 245C. Both the main path 3103 in the first playlist file 243A and the main path 3104 in the third playlist file 243C include three pieces of playitem information #1-3. The three pieces of playitem information #1-3 all specify playback areas in the first AV clip group 3101. Unlike the first playlist file 243A, the third playlist file 243C further includes a sub-path 3105. The sub-path 3105 includes three pieces of sub-playitem information #1-3, and each piece of sub-playitem information #1-3 specifies a playback area in the third AV clip group 3102. The pieces of sub-playitem information #1-3 are in one-to-one correspondence with the pieces of playitem information #1-3. The length of the playback area of each piece of sub-playitem information is equivalent to the length of the playback area of the corresponding piece of playitem information. Furthermore, the value of the sub-path type 3106 in the sub-path 3105 is "3D depth." This value indicates that the sub-path 3105 is to be used for playback of 3D video images in depth mode, and in particular that the sub-path 3105 specifies the playback path for the depth map AV stream file.

When the first playlist file 243A is selected as the playback target by the selection process shown in FIG. 29, the playback device 102 plays back 2D video images from the first AV clip group 3101 in accordance with the corresponding main path 3103. On the other hand, when the third playlist file 243C is selected as the playback target, the playback device 102 executes 3D video image playback in depth mode. In particular, the playback device 102 generates 2D video images from the first AV clip group 3101 in accordance with the main path 3104 of the third playlist file 243C and generates a depth map from the third AV clip group 3102 in accordance with the sub-path 3105. At that time, the playback device 102 detects that the value of the sub-path type 3006 is "3D depth" and synchronizes playback processing between the main path 3104 and the sub-path 3105. Furthermore, the playback device 102 generates a pair of a left-view and a right-view from the generated 2D video images and depth map. In this way, playback of 3D video images in depth mode is performed. Here, the third AV clip group 3102 is used in combination with the first AV clip group 3101.

In each piece of playitem information in the third playlist file 243C, a stream entry for the depth map stream has been added to the stream selection table 1505 shown in FIG. 15. The primary video stream and the depth map stream share the contents of the stream entry 1509. A flag to distinguish between the primary video stream and the depth map stream may further be added to the stream entry 1509.

Figure 32:
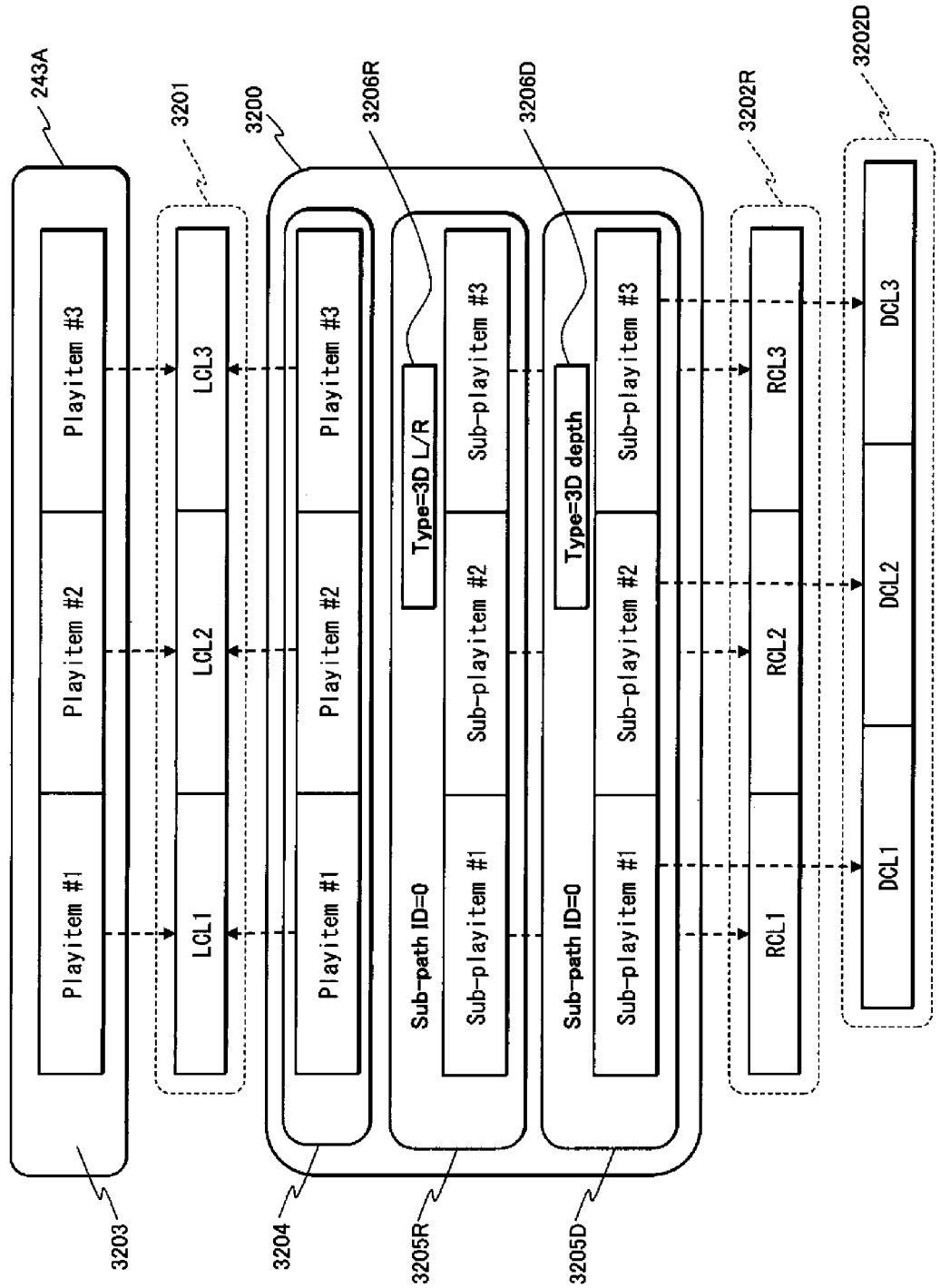
FIG. 32 is a schematic diagram showing another example of the structures of a first playlist file and a 3D playlist file.

FIG. 32 is a schematic diagram showing another example of the structures of a first playlist file 243A and a 3D playlist file 3200. The first AV clip group 3201 is formed by the sections LCL1-3 in the first AV stream file 245A. The second AV clip group 3202 is formed by the sections RCL1-3 in the second AV stream file 245B. The third AV clip group 3202D is formed by the sections DCL1-3 in the third AV stream file 245C. Both the main path 3103 in the first playlist file 243A and the main path 3204 in the 3D playlist file 3200 include three pieces of playitem information #1-3. The three pieces of playitem information #1-3 all specify playback areas in the first AV clip group 3201. Unlike the second playlist file 243B and the third playlist file 243C, the 3D playlist file 3200 includes two types of sub-paths. In the first sub-path 3205R, the sub-path type 3206R is "3D L/R," and each piece of sub-playitem information #1-3 specifies a playback area in the second AV clip group 3202R. On the other hand, in the second sub-path 3205D, the sub-path type 3206D is "3D depth," and each piece of sub-playitem information #1-3 specifies a playback area in the third AV clip group 3202D. The pieces of sub-playitem information #1-3 are in one-to-one correspondence with the pieces of playitem information #1-3. The length of the playback area of each piece of sub-playitem information is equivalent to the length of the playback area of the corresponding piece of playitem information.

When 3D video images are played back in accordance with the 3D playlist file 3200, the playback device 102 can switch the playback mode between L/R mode and depth mode as the sub-path targeted for playback is switched between two types of sub-paths, 3205R and 3205D. In particular, this switching process can be performed more rapidly than by a switching process between the second playlist file 243B and the third playlist file 243C.

Unlike FIG. 32, the 3D playlist file can include a plurality of sub-paths with equivalent sub-path types. For example, when 3D video images with differing binocular disparities for the same scene are represented by a common left-view and differing right-views, a different right-view stream file can be recorded on the BD-ROM disc 101 for each different right-view. In other words, the STREAM directory in the BD-ROM disc 101 may include two or more right-view stream files for the same left-view stream file. In this case, a plurality of sub-paths whose sub-path type is "3D L/R" is provided in the 3D playlist file. These sub-paths individually specify playback paths for each right-view stream file. In addition, two or more types of depth map AV stream files may be included for one 2D/AV stream file. In this case, a plurality of sub-paths whose sub-path type is "3D depth" is provided in the 3D playlist file. These sub-paths individually specify playback paths for each depth map AV stream file. When 3D video images are played back in accordance with this kind of 3D playlist file, since the sub-path targeted for playback can be switched rapidly, for example in accordance with user operation, the binocular parallax can be changed without substantially interrupting the 3D video images. In this way, the user can easily select the 3D video images for the desired binocular parallax.

<<AV Stream File Used for 3D Video Image Playback>>

Figures 33A, 33B:
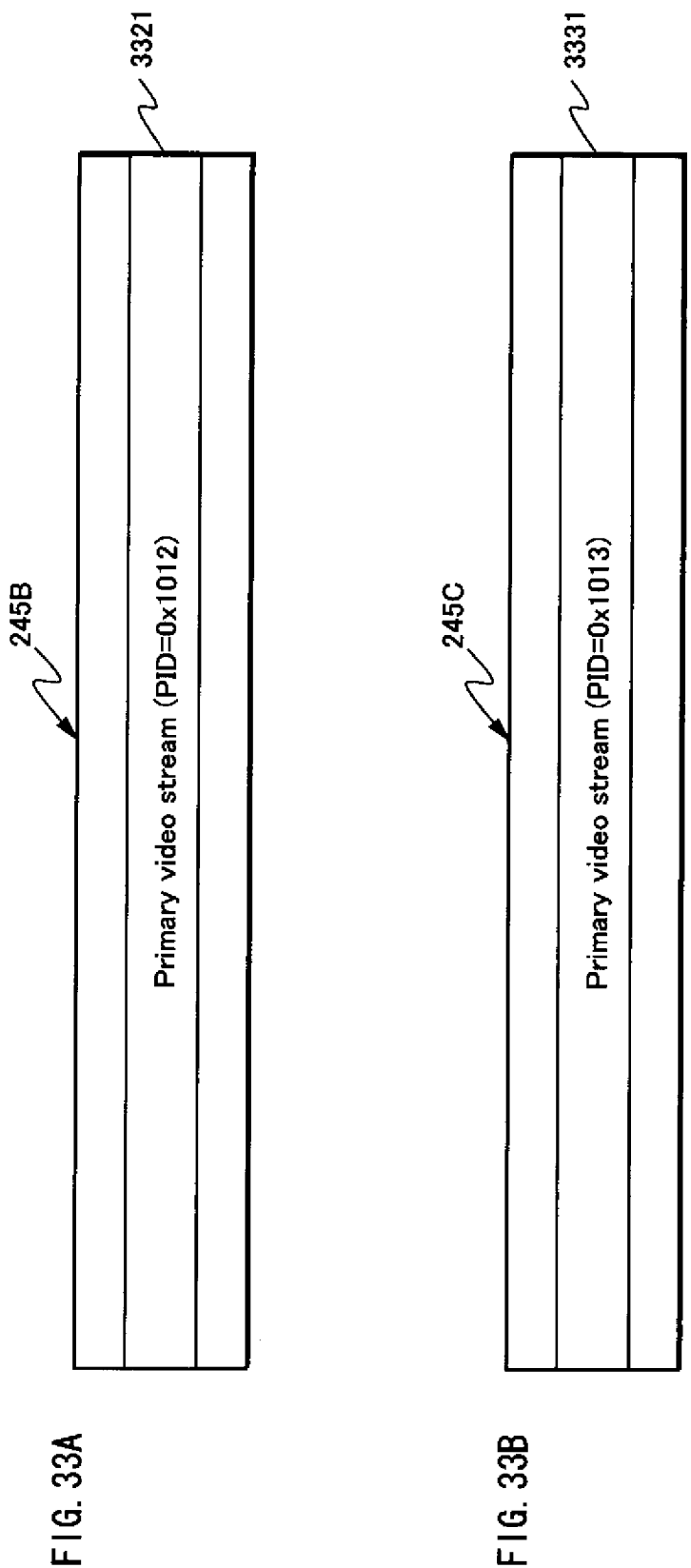
FIG. 33A is a schematic diagram showing the elementary stream multiplexed in the second AV stream file shown in FIG. 2.
FIG. 33B is a schematic diagram showing the elementary stream multiplexed in the third AV stream file shown in FIG. 2.

FIGS. 33A and 33B are schematic diagrams showing the elementary stream multiplexed in the second AV stream file 245B and the third AV stream file 245C. Unlike the first AV stream file 245A shown in FIG. 4, the second AV stream file 245B and the third AV stream file 245C include only the primary video streams 3321 and 3331, respectively. The primary video stream 3321 in the second AV stream file 245B represents the right-view stream, and the primary video stream 3331 in the third AV stream file 245C represents the depth map stream. Accordingly, PID=0x1012 and 0x1013 are allocated for the primary video streams 3321 and 3331; these differ from the PID=0x1011 for the primary video stream in the first AV stream file 245A, which represents the left-view stream.

Figure 34:
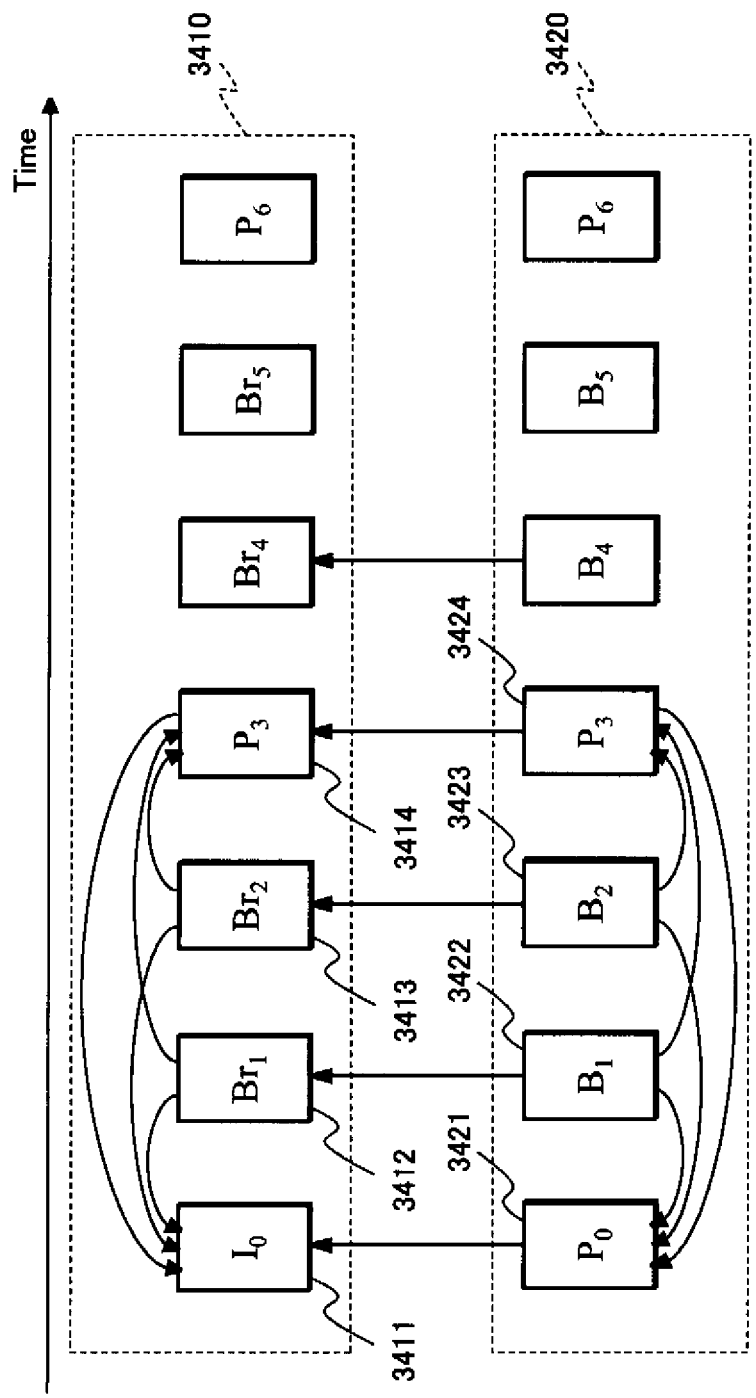
FIG. 34 is a schematic diagram showing the pictures included in the left-view stream and the pictures included in the right-view stream in the time order in which they are displayed.

FIG. 34 is a schematic diagram showing the pictures 3411-3414, etc. included in the left-view stream 3410 and the pictures 3421-3424, etc. included in the right-view stream 3420 in the time order in which they are displayed. Each picture 3411-3414 and 3421-3424 represents one frame or field of video data.

As shown in FIG. 34, each picture 3411-3414 in the left-view stream 3410 is compressed with inter-picture predictive encoding. This encoding method is exactly the same as the encoding method for each picture in the video stream 600 shown in FIG. 6. Specifically, the top picture in a GOP is first compressed into an $I_0$ picture 3411 by intra-picture encoding. Here, the subscripted number indicates the sequential number allotted to each picture in the order of presentation time. Next, the fourth picture is compressed as $P_3$ picture 3414 using $I_0$ picture 3411 as a reference picture, as indicated by the arrows in FIG. 34. Then the second and third pictures are compressed as $Br_1$ picture 3412 and $Br_2$ picture 3413 respectively, using the earlier $I_0$ picture 3411 and the later $P_3$ picture 3414 as reference pictures. Here, "Br pictures" are the pictures among the B pictures that are used as reference pictures in inter-picture predictive encoding of other pictures.

Each picture 3421-3424 in the right-view stream 3420 is compressed with inter-picture predictive encoding. However, this encoding method differs from the encoding method for each picture 3411-3414 in the left-view stream 3410, as in addition to the video's temporal redundancy, it uses the redundancy between the left and right videos. That is, the reference pictures for each picture 3421-3424, as shown by the arrows in FIG. 34, are selected not only from the same right-view stream 3420 but also from the left-view stream 3410. The presentation times for each picture 3421-3424 in the right-view stream 3420 and for each reference picture selected from the left-view stream 3410 are substantially equivalent. In other words, the pictures represent the right-view and the left-view of the same scene in the 3D video images. Specifically, the top picture in the right-view stream 3420 is first compressed as $P_0$ picture 3421 using $I_0$ picture 3411 in the left-view stream 3410 as a reference picture. Next, the fourth picture is compressed as $P_3$ picture 3424 using $P_0$ picture 3421 and $P_3$ picture 3414 in the left-view stream 3410 as reference pictures. Then the second picture is compressed as $B_1$ picture using $Br_1$ picture 3412 in the left-view stream 3410 along with $P_0$ picture 3421 and $P_3$ picture 3424 as reference pictures. Similarly, the third picture is compressed as $B_2$ picture using $Br_2$ picture 3413 in the left-view stream 3410 along with $P_0$ picture 3421 and $P_3$ picture 3424 as reference pictures.

The revised standards for MPEG-4 AVC/H.264, called MVC (Multiview Video Coding), are known as a video compression encoding method that makes use of this sort of correlation between left and right videos. MVC was created in July of 2008 by the JVT (Joint Video Team), a joint project between ISO/IEC MPEG and ITU-T VCEG, and is a standard for collectively encoding video that can be seen from a plurality of perspectives. With MVC, not only temporal similarity in video is used for inter-video predictive encoding, but also similarity between videos from differing perspectives. This type of predictive encoding has a higher video compression ratio than predictive encoding that individually compresses video seen from each perspective.

As described previously, pictures in the left-view stream 3410 are used as reference pictures for compression of pictures in the right-view stream 3420. Therefore, unlike the left-view stream 3410, the right-view stream 3420 cannot be decoded independently. On the other hand, however, since the correlation between the left-view and the right-view is high, the pictures in the right-view stream 3420 generally have a significantly higher compression rate than the pictures in the left-view stream 3410, and thus the amount of data is significantly smaller.

Each picture in the depth map stream is compressed with exactly the same inter-picture predictive encoding as the encoding method for the pictures in the video stream 600 shown in FIG. 6. Here, this encoding method is equivalent to the encoding method for the right-view stream. For example, when the right-view stream is encoded with the MVC format, the depth map stream is also encoded with the MVC format. In this case, as with the right-view stream, the depth map stream cannot be decoded independently. On the other hand, however, when the playback device 102 switches the 3D video image playback mode from L/R mode to depth mode, the playback device 102 can smoothly switch from the right-view stream to the depth map stream.

Hereinafter, a video stream that can be decoded independently, like the left-view stream 3410, and that can be used for playback of monoscopic video images is referred to as a "base-view stream." Furthermore, an AV stream file that includes a base-view stream is referred to as a "base-view stream file." On the other hand, a video stream that requires a base-view stream for decoding, like the right-view stream 3420 and the depth map stream, and that is used in combination with that base-view stream for playback of stereoscopic video images is referred to as a "dependent-view stream." Furthermore, an AV stream file that includes a dependent-view stream is referred to as a "dependent-view stream file."

Figures 35A, 35B:
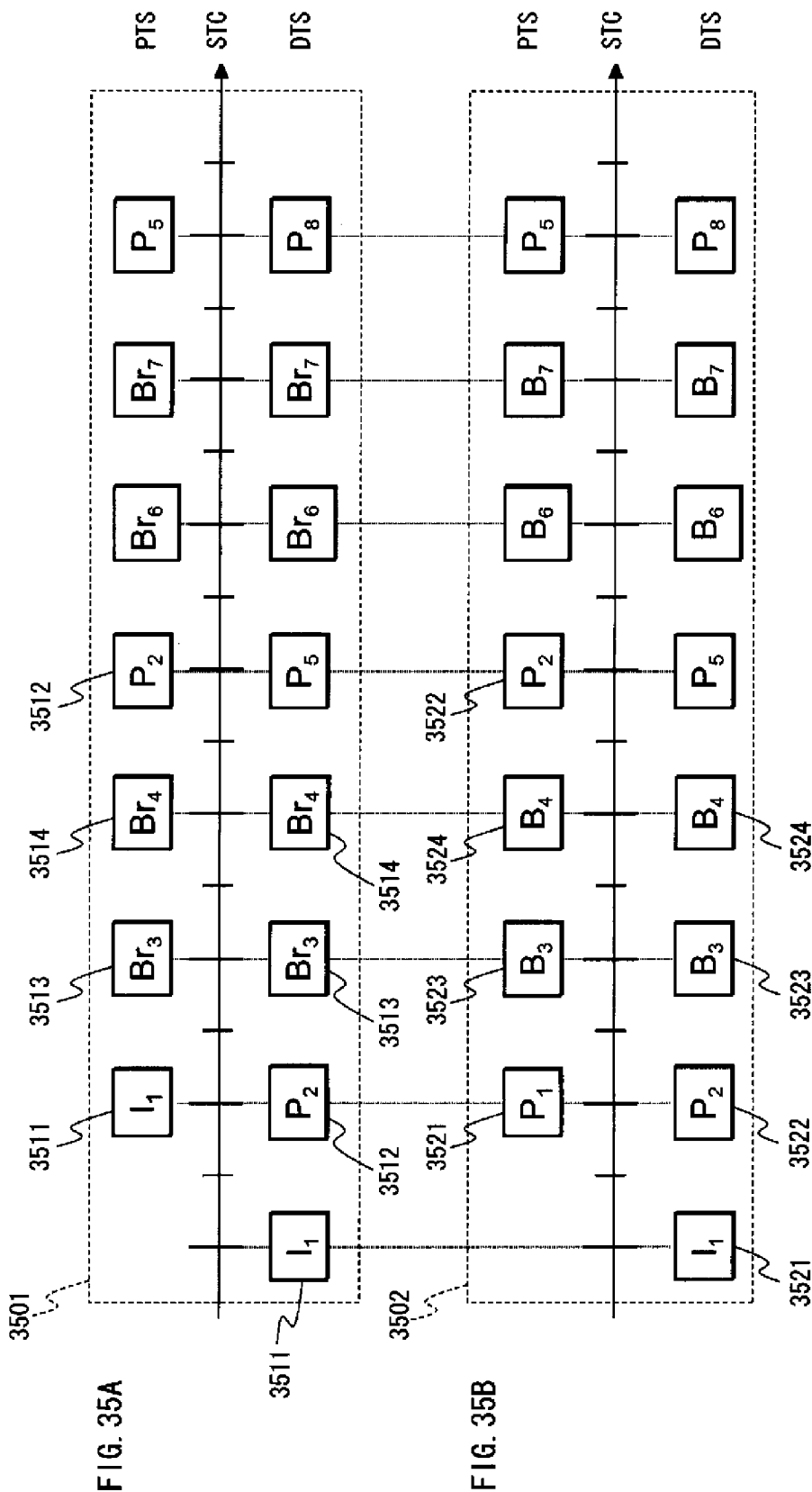
FIGS. 35A and 35B are schematic diagrams showing the relationship between PTSs and DTSs allocated to each picture in the base-view stream and the dependent-view stream.

FIGS. 35A and 35B are schematic diagrams showing the relationship between PTSs and DTSs allocated to each picture in the base-view stream 3501 and the dependent-view stream 3502. As shown in FIGS. 35A and 35B, the same PTS and DTS are allocated to a set of pictures used for displaying the same frame or field in the 3D video images in the video streams 3501 and 3502. For example, the top frame or field in the 3D video images is represented with a combination of $I_1$ picture 3511 in the base-view stream 3501 and $P_1$ picture 3521 in the dependent-view stream 3502. Therefore, the PTS and DTS are equivalent between the pair of pictures 3511 and 3521. Here, the subscripted number indicates the serial number allocated to each picture in order of the DTS. Similarly, the PTS and DTS are equivalent between the second pictures in the video streams 3501 and 3502, i.e. $P_2$ picture 3512 and $P_2$ picture 3522. The PTS and DTS are equivalent between the third pictures in the video streams 3501 and 3502, i.e. $Br_3$ picture 3513 and $B_3$ picture 3523. They are also equivalent between $Br_4$ picture 3514 and $B_4$ picture 3524.

As in the data structure of the video stream 700 shown in FIG. 7, one video access unit is formed for each picture in the GOPs constituting the actual base-view stream and the dependent-view stream. Furthermore, the sequence header in the top video access unit in each pair of GOPs in the base-view stream and the dependent-view stream includes the same resolution, frame rate, and aspect ratio. In particular, the frame rate is equivalent to the value for when the base-view stream is decoded independently by a 2D playback device.

A pair of video access units between the base-view stream 3501 and the dependent-view stream 3502 that contains pictures with equivalent PTSs and DTSs is referred to as a "3D video image access unit." By allocating PTSs and DTSs as shown in FIGS. 35A and 35B, the decoder of a 3D playback device can easily process the base-view stream 3501 and the dependent-view stream 3502 in parallel in units of 3D video image access units. In this way, the pair of pictures that is to be used for display of the same frame or field in a 3D video image is assured of being processed in parallel by the decoder.

Figure 36:
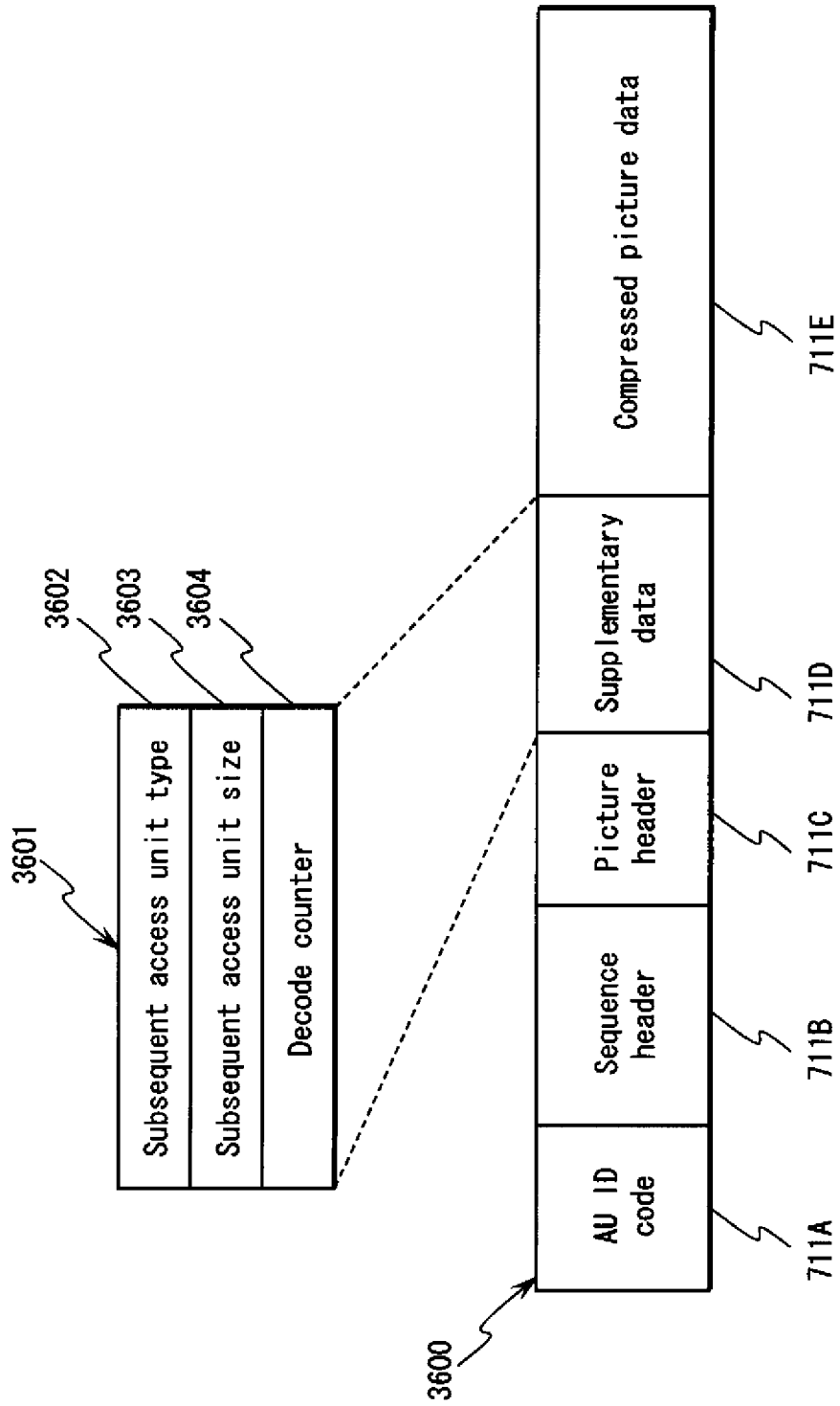
FIG. 36 is a schematic diagram showing the data configuration of a video access unit in the left-view stream, the right-view stream, and the depth map stream.

FIG. 36 is a schematic diagram showing the data configuration of a video access unit 3600 in the left-view stream, the right-view stream, and the depth map stream. As shown in FIG. 36, in addition to the data structure in FIG. 7, the video access unit 3600 further includes decoding switch information 3601. In particular, the decoding switch information 3601 is stored in the supplementary data 711D, i.e. in the SEI message as per MPEG-4 AVC. The decoding switch information 3601 is information to allow the 3D playback device to easily specify the video access unit that is the target of decoding. Here, as described below, the decoder in the 3D playback device alternately decodes the base-view stream and the dependent-view stream by video access units. At that time, in accordance with the time of the DTS assigned to each video access unit, the decoder specifies the next video access unit to be decoded. However, many types of decoders ignore the DTS, decoding video access units sequentially. With this sort of decoder, it is preferable for each video access unit to include decoding switch information 3601 in addition to the DTS.

As shown in FIG. 36, the decoding switch information 3601 includes a subsequent access unit type 3602, a subsequent access unit size 3603 and a decode counter 3604.

The subsequent access unit type 3602 indicates to which of the base-view stream and the dependent-view stream the subsequent video access unit to be decoded belongs. For example, when the value shown by the subsequent access unit type 3602 is "1," the subsequent video access unit belongs to the base-view stream, and when the value shown by the subsequent access unit type 3602 is "2," the subsequent video access unit belongs to the dependent-view stream. When the value shown by the subsequent access unit type 3602 is "0," the subsequent video access unit is at the end of the stream targeted for decoding, and no subsequent video access unit for decoding exists.

A subsequent access unit size 3603 indicates the size of each subsequent video access unit that is to be decoded. By referring to each subsequent access unit size 3603, the decoder in the 3D playback device can specify the size of a video access unit without analyzing its structure. Accordingly, the decoder can easily extract video access units from the buffer.

The decode counter 3204 shows a decoding order of the video access unit to which it belongs. The order is counted from video access unit that includes an I picture in the base-view stream. FIGS. 37A and 37B are schematic diagrams showing the values 3604A and 3604B of the decode counters allocated to each picture in the base-view stream 3701 and the dependent-view stream 3702. As shown in FIGS. 37A and 37B, there are two ways of allocating values.

In FIG. 37A, the decode counter values 3606A and 3604B are incremented alternately between the base-view stream 3701 and the dependent-view stream 3702. For example, for the I picture 3711 in the base-view stream 3701, a value of "1" is allocated to the decode counter value 3604A. Next, a value of "2" is allocated to the decode counter value 3604B for the next picture to be decoded, the P picture 3721 in the dependent-view stream 3702. Furthermore, a value of "3" is allocated to the decode counter value 3604A for the following picture to be decoded, the P picture 3712 in the base-view stream 3701. By allocating values in this way, even when the decoder in the 3D playback device fails to read one of the video access units due to some error, the decoder can immediately specify the missing picture using the decode counter values 3604A and 3604B. Therefore, the decoder can perform error processing appropriately and promptly.

In FIG. 37A, for example, an error occurs during the reading of the third video access unit in the base-view stream 3701, and the Br picture 3713 is missing. During decoding processing of the P picture 3722 contained in the second video access unit in the dependent-view stream 3702, however, the decoder has read the decode counter value 3604B for this video access unit and retained the value. Accordingly, the decoder can predict the decode counter value 3604A for the next video access unit to be processed. Specifically, the decode counter value 3604B in the video access unit that includes the P picture 3722 is "4." Therefore, the decode counter value 3604A for the next video access unit to be read can be predicted to be "5." The next video access unit that is actually read, however, is the fourth video access unit in the base-view stream 3701, whose decode counter value 3604A is "7." The decoder thus detects that it failed to read a video access unit. Accordingly the decoder can execute error processing to "skip decoding processing of the B picture 3723 extracted from the third video access unit in the dependent-view stream 3702, since the Br picture 3713 to be used as a reference is missing." In this way, the decoder checks the decode counter values 3604A and 3604B during each decoding process. Consequently, the decoder can promptly detect errors during reading of video access units and can promptly execute appropriate error processing. As a result, the decoder can prevent noise from contaminating the playback video.

In FIG. 37B, decode counter values 3604C and 3604D are incremented successively in the video streams 3701 and 3702. Therefore, the decode counter values 3604C and 3604D are equivalent for a pair of pictures in the same 3D video image access unit. In this case, when the decoder decodes a video access unit in the base-view stream 3701, it can predict that "the decode counter value 3604C is equivalent to the decode counter value 3604D for the next video access unit to be decoded in the dependent-view stream 3702." Conversely, when the decoder decodes a video access unit in the dependent-view stream 3702, it can predict that "the decode counter value 3604C for the next video access unit to be decoded in the base-view stream 3701 is equivalent to the decode counter value 3604D plus one." Accordingly, at any point in time, the decoder can promptly detect an error in reading a video access unit using the decode counter values 3604C and 3604D and can promptly execute appropriate error processing. As a result, the decoder can prevent noise from contaminating the playback video.

<<Clip Information Files Used in 3D Video Images>>

Figure 38A:
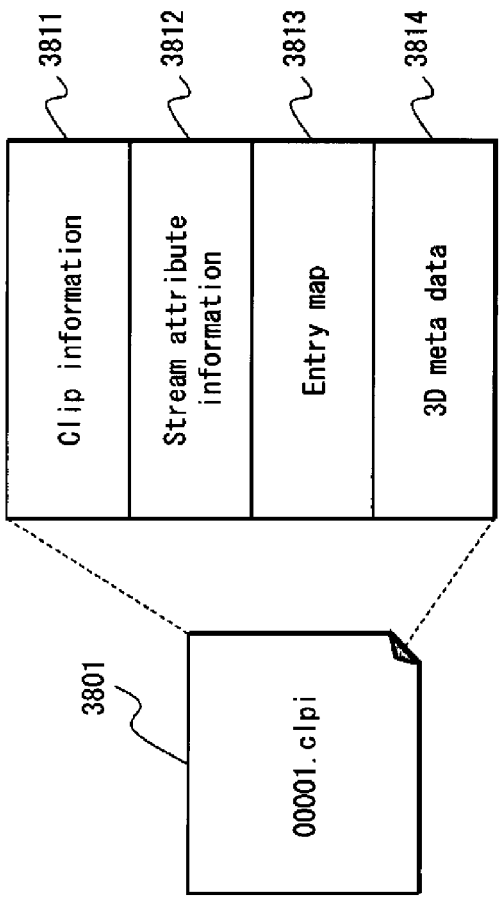
FIG. 38A is a schematic diagram showing the data structure of a base-view clip information file.
Figure 38B:
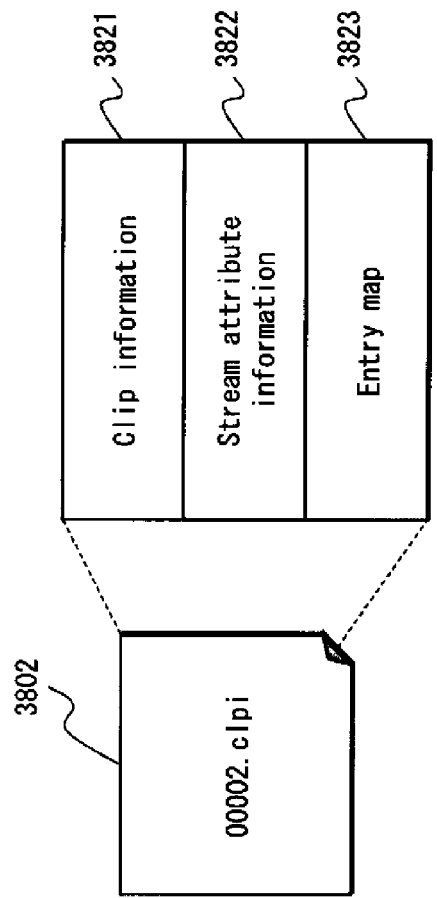
FIG. 38B is a schematic diagram showing the data structure of a dependent-view clip information file.

FIGS. 38A and 38B are schematic diagrams showing the data structure of a base-view clip information file 3801 and of a dependent-view clip information file 3802, respectively. Here, a "base-view clip information file" is a clip information file that should be associated with a base-view stream file, and in the present embodiment corresponds to a 2D/left-view clip information file. A "dependent-view clip information file" is a clip information file that should be associated with a dependent-view stream file, and in the present embodiment corresponds to a right-view clip information file and a depth map clip information file. Like the 2D clip information file shown in FIG. 11, the clip information files 3801 and 3802 include clip information 3811 and 3821, stream attribute information 3812 and 3822, and an entry map 3813 and 3823. These data structures are equivalent to the data structure in the 2D clip information file shown in FIGS. 11-13. The base-view clip information file 3801 further contains 3D meta data 3814. Additionally, conditions are placed on the stream attribute information 3822 in the dependent-view clip information file 3802, and information is added to the entry map 3823.

<<3D Meta Data>>

FIG. 39A and FIG. 39B are schematic diagrams showing the data structure of the 3D meta data 3814. The 3D meta data 3814 is information used for the cropping processes on the PG stream, IG stream and the secondary video stream that are multiplexed into the base-view stream file. "Cropping processes" refer to the processes that add depth to the 2D video images played back from each stream. During these processes, a left-view and right-view pair is generated by shifting each 2D video image in a horizontal direction. The amount of shifting corresponds to the binocular parallax that generates the depth that should be given to that 2D video image. In particular, the 3D meta data 3814 includes a value that represents the number of pixels of the amount of shifting, i.e. the "offset value."

As shown in FIG. 39A, the 3D meta data 3814 includes a table 3901 for each PID in the PG stream, the IG stream, and the secondary video stream. Each table 3901 generally includes a plurality of pairs of PTS 3902 and offset values 3903. Each PTS 3902 shows a display time of a frame or a field in the PG stream, the IG stream or the secondary video stream. The offset value 3903 represents the offset value for the frame or field to which the PTS 3902 is allocated. The offset values 3902 may be negative values. A pair 3904 of the PTS 3902 and the offset value 3903 is referred to as an "offset entry." The valid section of each offset entry ranges from the PTS of the offset entry to the PTS of the subsequent offset entry. In the example in FIG. 39A, the PTS of offset entry #1 is 180000, the PTS of offset entry #2 is 270000, and the PTS of offset entry #3 is 360000. In this case, as shown in FIG. 39B, an offset value of +5 in the offset entry #1 is valid in an STC range 3904A of 180000 to 270000, and an offset value of +3 in the offset entry #2 is valid in an STC range 3904B from 270000 to 360000.

<<Stream Attribute Information for the Dependent-View Stream>>

As was explained with regards to FIG. 34, the dependent-view stream is compressed using the base-view stream. Accordingly, the video stream attributes of the dependent-view stream become equivalent to the base-view stream. Here, the video stream attribute information for the base-view stream is associated with PID=0x1011 in the stream attribute information 3812 in the base-view clip information file 3801. The video stream attribute information for the dependent-view stream is associated with PID=0x1012 in the stream attribute information 3822 in the dependent-view clip information file 3802. Accordingly, the items shown in FIG. 12, i.e. the codec 1211, resolution 1212, aspect ratio 1213, and frame rate 1214, match between these two pieces of video stream attribute information. If the codec type matches, then a reference relationship between pictures in the base-view stream and the dependent-view stream is established during coding, and thus each picture can be decoded. If the resolution, aspect ratio, and frame rate all match, then on-screen presentation of the left and right videos can be synchronized. Therefore, these videos can be shown as 3D video images without making the viewer feel uncomfortable.

<<Entry Map for Dependent-view Stream>>

FIG. 40A is a schematic diagram showing the data structure of the entry map 3823 for the dependent-view clip information file 3802 shown in FIG. 38B. As shown in FIG. 40A, the entry map 3823 includes a table 4001 allocated to the dependent-view stream. The table 4001 includes an entry map header 4011 and a plurality of entry points 4012. The entry map header 4011 indicates the PID for the dependent-view stream allocated in the table 4001, i.e. either 0x1012 or 0x1013. In each entry point 4012, a pair of a PTS 4013 and an SPN 4014 is associated with an EP_ID 4016. The PTS 4013 is equivalent to the PTS for the top picture in one of the GOPs included in the dependent-view stream. The SPN 4014 is equivalent to the top SPN of the source packet group recorded by the top picture. In particular, among the PTSs in the entry map 3813 in the base-view clip information file 3801, the PTS 4013 for the entry point 4012 is equivalent to the PTS for the entry point in the table allocated to the base-view stream. In other words, whenever an entry point is set to the top of a source packet that includes one of a set of pictures included in the same 3D video image access unit, an entry point is also set to the top of the source packet group that includes the other picture.

Figure 41:
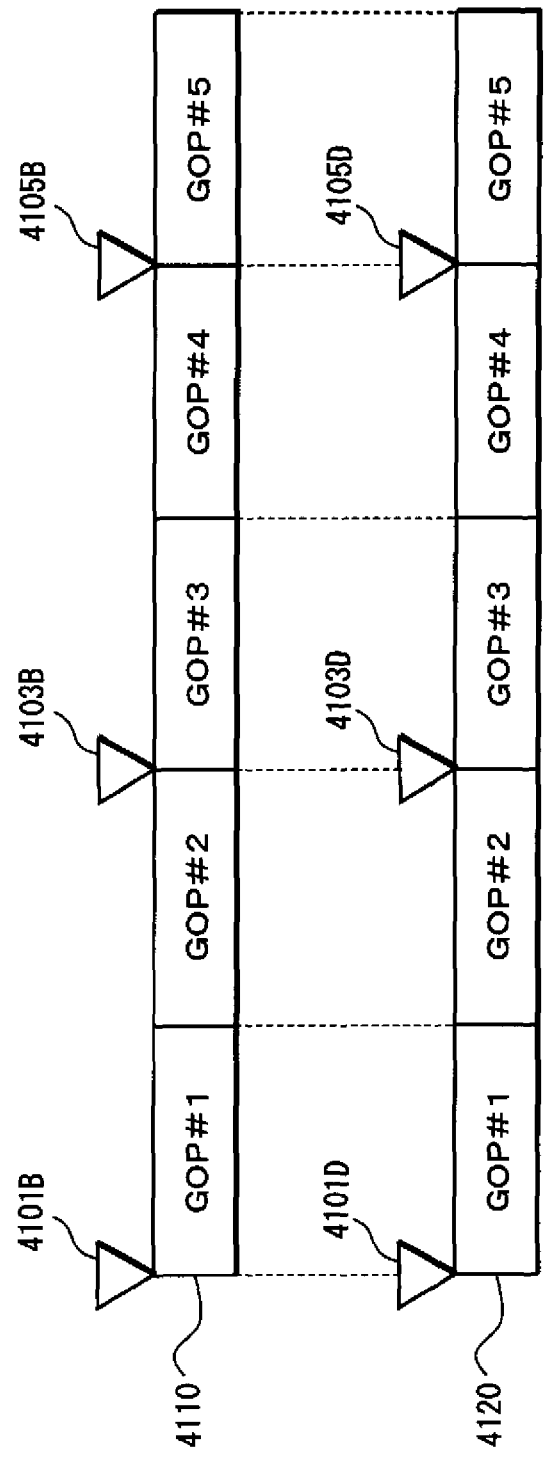
FIG. 41 is a schematic diagram showing an example of entry points set in the base-view stream and the dependent-view stream.

FIG. 41 is a schematic diagram showing an example of entry points set in the base-view stream 4110 and the dependent-view stream 4120. In the two video streams 4110 and 4120, GOPs that are the same number from the top represent video for the same playback period. As shown in FIG. 41, in the base-view stream 4110, entry points 4101B, 4103B, and 4105B are set to the top of the first GOP #1, the third GOP #3, and the fifth GOP #5, respectively. Accordingly, in the dependent-view stream 4120 as well, entry points 4101D, 4103D, and 4105D are set to the top of the first GOP #1, the third GOP #3, and the fifth GOP #5, respectively. In this case, when the 3D playback device begins interrupt playback of 3D video images from, for example, GOP #3, it can immediately acquire the top SPN of the source packet group to be played back from the corresponding entry points 4103B and 4103D. In this way, even during playback of 3D video images, it is possible to improve response speed for processing that requires random access to the video stream, such as interrupt playback or the like.

As further shown by FIG. 40A, each entry point 4012 further contains an extent start flag 4015. The extent start flag 4015 indicates whether, from among the source packet group stored by the dependent-view stream, the source packet specified by the SPN 4014 for the same entry point 4012 is at the top of any of the extents on the BD-ROM disc 101. FIG. 40B is a schematic diagram showing the relationship between the SPN shown by an entry point and an extent on the BD-ROM disc. For example, the value of the extent start flag 4015 in the entry point EP_ID=0 is "1." In this case, the value of the SPN 4014 in the same entry point, "3," indicates the SPN for the source packet at the top of the first extent 4022 in the track 202 on the disc 101. The value of the extent start flag 4015 in the entry point EP_ID=1 is "0." In this case, the value of the SPN 4014, "1500," indicates the SPN for a source packet recorded in a section other than the top of the first extent 4022. The value of the extent start flag 4015 in the entry point EP_ID=2 is "1." In this case, the value of the SPN 4014, "3200," indicates the SPN for a source packet at the top of the second extent 4023. Accordingly, the SPN 4014 for entry points where EP_ID=0 and EP_ID=2 indicates the range of the SPN for the source packet included in the first extent 4022. The 3D playback device is able to seek the size of the first extent 4022 and the extent ATC time from the size of this range. Furthermore, the 3D playback device can indicate to the BD-ROM drive the range to be read without seeking, from the file system, the range of the logical addresses of the first extent. Consequently, the 3D playback device can promptly execute the read process. Also, the entry point 4012 is always set, from among the source packet group stored by the dependent-view stream, to the top of each extent on the BD-ROM disc 101. Accordingly, the 3D playback device can promptly execute a read process for any of the extents.

A similar extent start flag is also included in the entry point of the entry map for the base-view clip information file 3801. Accordingly, the 3D playback device can acquire the size of each extent stored by the base-view stream from the extent start flag 4015. Therefore, the 3D playback device can promptly read these extents from the BD-ROM disc 101.

Additionally, each entry map header 4011 includes an extent start type. The extent start type indicates which is positioned first on the track 202 on the BD-ROM disc 101: an extent storing the base-view stream, or an extent storing the dependent-view stream. Accordingly, by referring to the extent start type, the 3D playback device can easily determine which of the extents storing one of the video streams it should first request that the BD-ROM read.

<Structure of 3D Playback Device>

The following describes the structure necessary for the playback device 102 to play back 3D video image content from the above-described BD-ROM disc 101, i.e. the structure necessary for a 3D playback device. The fundamental part of this structure is identical to the 2D playback device shown in FIGS. 18 to 20. Therefore, the following is a description of sections of the structure of the 2D playback device that are enlarged or modified, incorporating by reference the afore-mentioned description of the 2D playback device for the fundamental parts. Regarding the playback processing of 2D video images in accordance with the 2D playlist files that specify the playback path of the 2D video images, i.e. the playback processing of the 2D playlist, the 3D playback device has the same structure as the 2D playback device. The details thereof are incorporated in the following by reference. The following describes the playback processing of 3D video images in accordance with the 3D playlist files that define the playback path of the 3D video images, i.e. 3D playlist playback processing.

Figure 42:
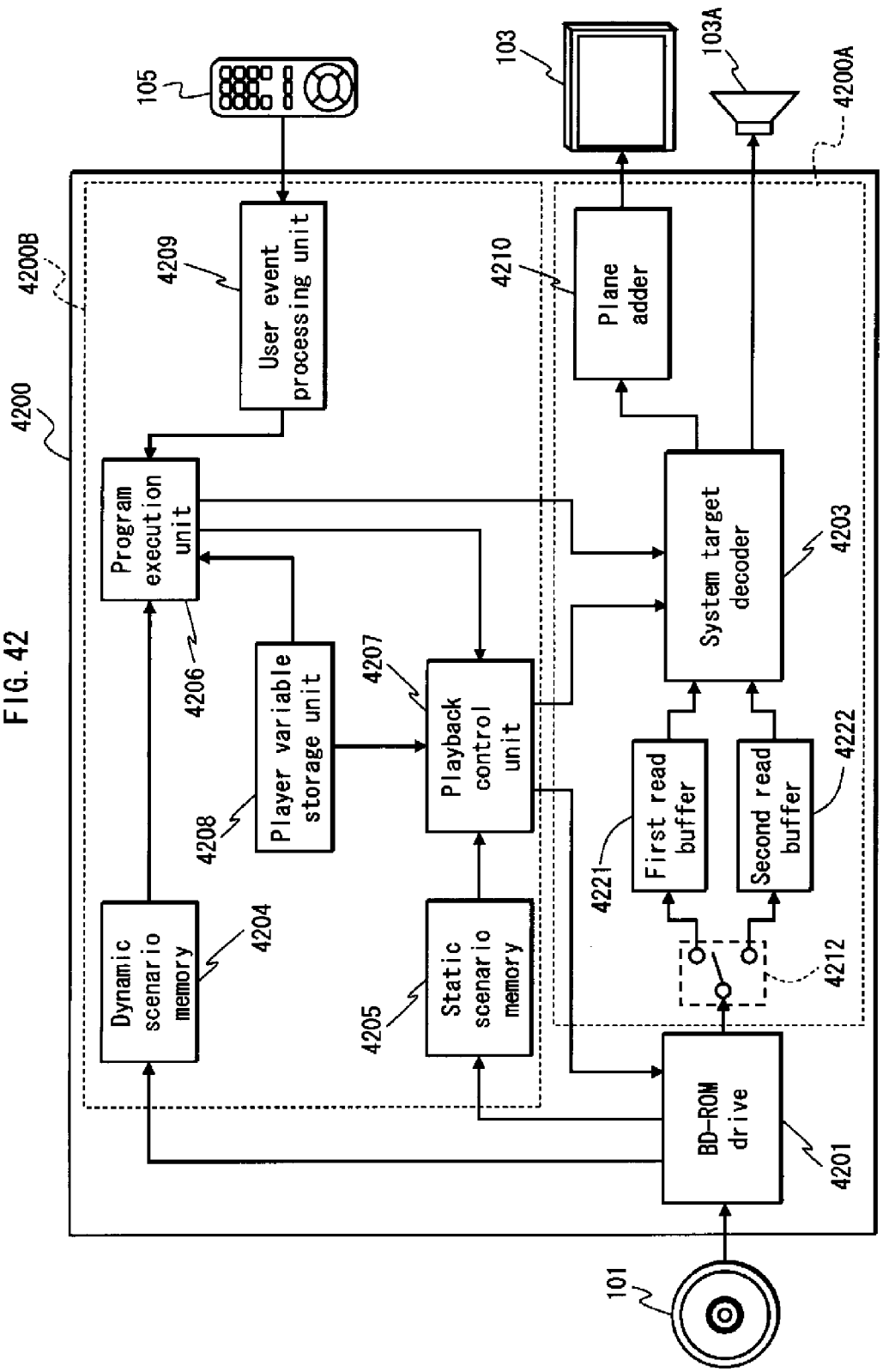
FIG. 42 is a functional block diagram of a 3D playback device.

FIG. 42 is a functional block diagram of the 3D playback device 4200. The 3D playback device 4200 includes a BD-ROM drive 4201, a playback unit 4200A, and a control unit 4200B. The playback unit 4200A includes a switch 4212, a first read buffer 4221, a second read buffer 4222, a system target decoder 4203, and a plane adder 4210. The control unit 4200B includes a dynamic scenario memory 4204, a static scenario memory 4205, a program execution unit 4206, a playback control unit 4207, a player variable storage unit 4208, and a user event processing unit 4209. The playback unit 4200A and the control unit 4200B are mounted on a different integrated circuit. Alternatively, these units may be mounted on a single integrated circuit. In particular, the dynamic scenario memory 4204, the static scenario memory 4205, the program execution unit 4206, and the user event processing unit 4209 have an identical structure with the 2D playback device shown in FIG. 18. Accordingly, details thereof are incorporated by reference to the above explanation of the 2D playback device.

The BD-ROM drive 4201 includes elements identical to the BD-ROM drive 1801 in the 2D playback device shown in FIG. 18. With use of these elements, the BD-ROM drive 4201 reads data from the BD-ROM disc 101 in accordance with a request from the playback control unit 4207. Among this data, the AV stream file is selectively sent from the BD-ROM drive 4201 to either the first read buffer 4221 or the second read buffer 4222. Specifically, the BD-ROM drive 4201 first alternately receives read requests for the base-view stream file and the dependent-view stream file from the playback control unit 4207 in units of extents. In accordance with each request, the BD-ROM drive 4201 alternately sends extents belonging to each AV stream file to the switch 4212. From among these extents, the switch 4212 sends those belonging to the base-view stream file to the first read buffer 4221 and those belonging to the dependent-view stream file to the second read buffer 4222. During playback of 3D video images, both the base-view stream file and the dependent-view stream file need to be sent in this way in parallel to the read buffers 4221 and 4222. Accordingly, the BD-ROM drive 4201 needs to have a faster access speed than the BD-ROM drive 1801 in the 2D playback device.

The first read buffer 4221 and the second read buffer 4222 are buffer memories that use a memory element in the playback unit 4200A. In particular, different areas in a single memory element are used as the read buffers 4221 and 4222. Alternatively, different memory elements may be used as the read buffers 4221 and 4222. The first read buffer 4221 stores the base-view stream file transferred from the BD-ROM drive 4201. The second read buffer 4222 stores the dependent-view stream file transferred from the BD-ROM drive 4201.

Receiving a request from, for example, the program execution unit 4206 for performing 3D playlist playback processing, the playback control unit 4207 first refers to the 3D playlist file stored in the static scenario memory 4205. For example, as shown in FIGS. 30 and 31, the 3D playlist files 243B and 243C specify main paths 3004 and 3014 and sub-paths 3005 and 3105. Subsequently, the playback control unit 4207 reads pieces of playitem information #1-3 in order from the main paths 3004 and 3005, and uses these pieces of information to specify base-view stream file sections LCL1-3 in order. In parallel, the playback control unit 4207 further reads pieces of sub-playitem information #1-3 in order from the sub-paths 3005 and 3105, and uses these pieces of information to specify dependent-view stream file sections RCL1-3 and DCL1-3 in order. Then, the playback control unit 4207 accesses the static scenario memory 4205 and, from among the clip information files associated with each section, refers to the entry maps 1103 and 3823 shown in FIGS. 13A and 40A. In this way, the playback control unit 4207 determines whether the extent at the playback start point belongs to the base-view stream file or the dependent-view stream file, based on the extent start type written in the entry map headers 1301 and 4011. From these results, the playback control unit 4207 determines an initial position of the switch 4212. Subsequently, the playback control unit 4207 makes a request to the BD-ROM drive 4201 to alternately read the extents of the base-view stream file and the dependent-view stream file from the playback start point. In particular, out of the two stream files, the request specifies to start reading the AV clip indicated by the above-mentioned determination results first. After the BD-ROM drive 4201 transfers the whole first extent from the BD-ROM drive 4201 to either of the read buffers 4221 or 4222, the extent is further transferred from the read buffer 4221 or 4222 to the system target decoder 4203. In addition to such processing, the playback control unit 4207 reads the 3D meta data 3814 shown in FIGS. 39A and 39B from the base-view clip information file stored in the static scenario memory 4205, and transfers the 3D meta data 3814 to the plane adder 4210.

First, the system target decoder 4203 reads source packets alternately from the base-view stream file stored in the first read buffer 4221 and the dependent-view stream file stored in the second read buffer 4222. Then, the system target decoder 4203 demultiplexes these read source packets to separate the elementary streams therein. Subsequently, the system target decoder 4203 decodes each of the elementary streams separately. Furthermore, the system target decoder 4203 writes a decoded base-view stream, dependent-view stream, secondary video stream, IG stream, and PG stream into built-in dedicated memories, namely a 2D/left video plane memory, a right video plane memory, a sub-video plane memory, an IG plane memory, and a PG plane memory, respectively. The details of the system target decoder 4203 are described below.

As in the 2D playback device, the player variable storage unit 4208 includes the SPRM shown in FIG. 19. However, any two of the SPRM(24)-(32) that were reserved in FIG. 19 include the above-described two types of flags (A) and (B). For example, the SPRM(24) includes flag (A), and the SPRM (25) includes flag (B). When the SPRM(24) is "0," the playback device 102 only supports playback of 2D video images, and when it is "1," the playback device 102 also supports 3D video image playback. When the SPRM(25) is "0," the 3D video image playback mode of the playback device 102 is L/R mode, and when it is "1," the 3D video image playback mode is depth mode.

The plane adder 4210 receives the 2D/left video plane data, right video plane data, sub-video plane data, IG plane data, PG plane data, and image plane data from the system target decoder 4203 and superimposes all of these data to compose one video frame or field. The composed video frame or field is sent to the display device 103 and displayed on the screen.

Figure 43:
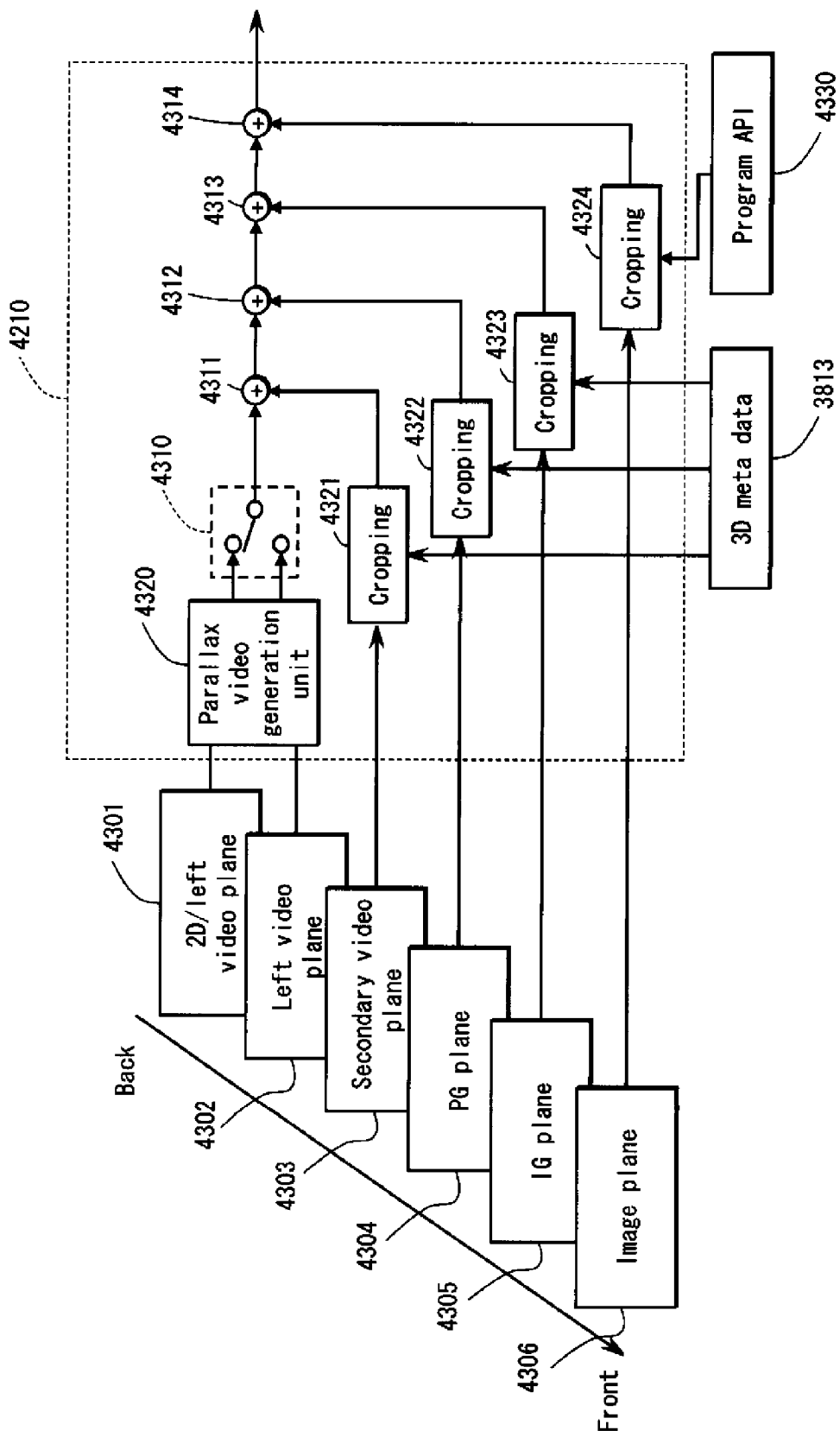
FIG. 43 is a functional block diagram of the plane adder unit shown in FIG. 42.

FIG. 43 is a functional block diagram of the plane adder 4210. The plane adder 4210 includes a parallax video generation unit 4320, a switch 4310, four adders 4311-4314, and four cropping processing units 4321-4324.

The parallax video generation unit 4320 receives 2D/left video plane data 4301 and right video plane data 4302 from the system target decoder 4203. When the 3D video image playback mode of the playback device 102 is set to L/R mode, the 2D/left video plane data 4301 represents a video frame or field in the left-view stream, and the right video plane data 4302 represents a video frame or field in the right-view stream. In this case, the parallax video generation unit 4320 sends the 2D/left video plane data 4301 and the right video plane data 4302 as they are to the switch 4310. On the other hand, when the 3D video image playback mode is set to depth mode, the 2D/left video plane data 4301 represents a video frame or field in the 2D video stream, and the right video plane data 4302 represents a depth map for that video frame or field. In this case, the parallax video generation unit 4320 first calculates the binocular parallax for each element in the video frame or field using the depth map. Next, the parallax video generation unit 4320 shifts the display position of each element in the video frame or field to the left or right according to the calculated binocular parallax to construct the video frames or fields representing the left-view and the right-view. The parallax video generation unit 4320 further sends left and right video frames or fields to the switch 4310 as the 2D/left video plane data 4301 and the right video plane data 4302.

The switch 4310 sends 2D/left video plane data 4301 and right video plane data 4302 with equivalent PTSs to the first adder 4311 in that order.

The first adder 4311 alternately receives the 2D/left video plane data 4301 and the right video plane data 4302 from the switch 4310. It also alternately receives a pair of sub-video plane data pieces representing the left-view and the right-view from the first cropping processing unit 4321. Next, the first adder 4311 superimposes the sub-video plane data representing the left-view on the 2D/left video plane data 4301 and superimposes the sub-video plane data representing the right-view on the right video plane data 4302. After superimposing is complete, the left and right video plane data are alternately sent to the second adder 4312.

The second adder 4312 alternately receives left and right video plane data from the first adder 4311. It also alternately receives a pair of PG plane data pieces representing the left-view and the right-view from the second cropping processing unit 4322. Next, the second adder 4312 superimposes the PG plane data representing the left-view on the plane data representing the left-view and superimposes the PG plane data representing the right-view on the plane data representing the right-view. After superimposing is complete, the left and right video plane data are alternately sent to the third adder 4313.

The third adder 4313 alternately receives left and right video plane data from the second adder 4312. It also alternately receives a pair of IG plane data pieces representing the left-view and the right-view from the third cropping processing unit 4323. Next, the third adder 4313 superimposes the IG plane data representing the left-view on the plane data representing the left-view and superimposes the IG plane data representing the right-view on the plane data representing the right-view. After superimposing is complete, the left and right video plane data are alternately sent to the fourth adder 4314.

The fourth adder 4314 alternately receives left and right video plane data from the third adder 4313. It also alternately receives a pair of image plane data pieces representing the left-view and the right-view from the fourth cropping processing unit 4324. Next, the fourth adder 4314 superimposes the image plane data representing the left-view on the plane data representing the left-view and superimposes the image plane data representing the right-view on the plane data representing the right-view. After superimposing is complete, the left and right video plane data are alternately sent to the display device 103.

In this way, as shown by the arrows 4300 in FIG. 43, the 2D/left video plane data 4301, right video plane data 4302, sub-video plane data 4303, IG plane data 4304, PG plane data 4305 and image plane data 4306 are superimposed in this order. By such combination processes, video images indicated by the sets of plane data are displayed on the screen of the display device 103 such that the 2D/left video plane or the right video plane, the sub-video plane, the IG plane, the PG plane, and the image plane are overlaid in this order.

The first cropping processing unit 4321 uses 3D meta data 3814 to perform cropping processing on the sub-video plane data 4303. In this way, the sub-video plane data 4303 is transformed into a pair of sub-video plane data pieces that represent a left-view and a right view and are alternately transmitted.

The second cropping processing unit 4322 uses 3D meta data 3814 to perform cropping processing on the PG plane data 4304. In this way, the PG plane data 4304 is transformed into a pair of PG plane data pieces that represent a left-view and a right view and are alternately transmitted.

The third cropping processing unit 4323 uses 3D meta data 3814 to perform cropping processing on the IG plane data 4305. In this way, the IG plane data 4305 is transformed into a pair of IG plane data pieces that represent a left-view and a right view and are alternately transmitted.

FIGS. 44A and 44B are schematic diagrams showing the cropping processing by each of the first through third cropping processing units 4321-4323. FIGS. 44A and 44B show an example of cropping processing performed on the PG plane data 4304 by the second cropping processing unit 4322. First, the second cropping processing unit 4322 searches among the 3D meta data 3814 shown in FIGS. 39A and 39B for the table 3901 that is associated with the PID=0x1200 of the PG stream. Then, the second cropping processing unit 4322 searches within the table 3901 for an offset entry 3904 that is currently valid, and acquires the offset value 3903. If video plane data to be superimposed on the PG plane data 4304 is 2D/left video plane data 4301, the second cropping processing unit 4322 shifts the PG plane data 4304 in a horizontal direction with respect to the 2D/left video plane data 4301 by a number of pixels 4401L equivalent to the acquired offset value, as shown in FIG. 44A. At that time, if the offset value is positive, the second cropping processing unit 4322 shifts the PG plane data 4304 to the right, and if the offset value is negative, it shifts the data to the left. Subsequently, the second cropping processing unit 4322 removes (crops) an area 4402L of the PG plane data 4304 that extends out of the range of the 2D/left video plane data 4301 and superimposes the remaining area 4403L on the 2D/left video plane data 4301. On the other hand, if the video plane data on which data is superimposed is the right video plane data 4302, the second cropping processing unit 4322 shifts the PG plane data 4304 in a horizontal direction with respect to the right video plane data 4302 by the number of pixels 4401R equivalent to the acquired offset value, as shown in FIG. 44B. At that time, if the offset value is positive, the second cropping processing unit 4322 shifts the PG plane data 4304 to the left, and if the offset value is negative, it shifts the data to the right, opposite from the case shown in FIG. 44A. Subsequently, the second cropping processing unit 4322 removes (crops) an area 4402R of the PG plane data 4304 that extends out of the range of the right video plane data 4302 and superimposes the remaining area 4403R on the right video plane data 4302, as in the case shown in FIG. 44A. The first cropping processing unit 4321 similarly performs cropping processing on the sub-video plane data 4303, and the third cropping processing unit 4323 similarly performs cropping processing on the IG plane data 4305.

FIGS. 45A and 45B are schematic diagrams respectively showing a left-view and a right-view superimposed by cropping processes shown in FIGS. 44A and 44C, and FIG. 45C is a schematic diagram showing the resulting 3D video image that the viewer is made to perceive. In the left-view, as shown in FIG. 45A, the PG plane 4502 is shifted to the right with respect to the left video plane 4501L by an offset value 4401L, and thus the area 4503L on the left side of the PG plane 4502 appears superimposed on the left video plane 4501L. As a result, the 2D video image 4504, i.e. subtitles for the PG plane 4502, appears shifted to the right from its original position by the offset value 4401L. Conversely, in the right view, as shown in FIG. 45B, the PG plane 4502 is shifted to the left with respect to the right video plane 4501R by an offset value 4401R, and thus the area 4503R on the right side of the PG plane 4502 appears superimposed on the right video plane 4501R. As a result, the 2D video image 4504, i.e. subtitles for the PG plane 4502, appears shifted to the left from its original position by the offset value 4401R. Consequently, as shown in FIG. 45C, the 3D video image 4504 of the subtitles appears to be closer to a viewer 4505 than the video plane 4506. Clipping processing is thus used to create a pair of left-view and right-view plane data pieces from a single plane data piece. In this way, it is possible to play back a parallax video. That is, depth can be added to a monoscopic image. In particular, it is possible to allow the viewer to see the monoscopic image as popping out from the screen.

Once again referring to FIG. 43, the image plane data 4306 is graphics data sent from the program execution unit 4206 to the system target decoder 4203 and decoded by the system target decoder 4203. The graphics data is raster data such as JPEG data or PNG data, and shows a GUI graphics part such as a menu. The fourth cropping processing unit 4324 performs the cropping processing on the image plane data 4306 as do the other cropping processing units 4321-4323. However, unlike the other cropping processing units 4321-4323, the fourth cropping processing unit 4324 reads the offset value from offset information specified by a program API 4330 instead of from the 3D meta data 3814. Here, the program API 4330 is executed by the program execution unit 4206. In this way, the offset information corresponding to the depth of the image representing the graphics data is calculated and output to the fourth cropping processing unit 4324.

In addition to the above-stated processing, the plane adder 4210 performs processing to convert an output format of the plane data combined by the four plane adders 4311-4314 into a format that complies with the 3D display method adopted in a device such as the display device 103 to which the data is outputted. If an alternate-frame sequencing method is adopted in the device, for example, the plane adder 4210 outputs the superimposed plane data pieces as one frame or one field. On the other hand, if a method that uses a lenticular lens is adopted in the device, the plane adder 4210 superimposes the left and right plane data pieces as one frame or one field of video data with use of the built-in buffer memory. More specifically, the plane adder 4210 temporarily stores and holds in the buffer memory the left video plane data that has been superimposed first. Subsequently, the plane adder 4210 superimposes the right video plane data, and further superimposes the resultant data with the left video plane data held in the buffer memory. In the superimposing, the left and right plane data pieces are each divided, in a vertical direction, into small rectangular areas that are long and thin, and the small rectangular areas are arranged alternately in the horizontal direction in one frame or one field so as to re-constitute the frame or the field. In this way, the left and right plane data pieces are combined into one video frame or field, which the plane adder 4210 then outputs to the appropriate device.

<<Configuration of System Target Decoder>>

Figure 46:
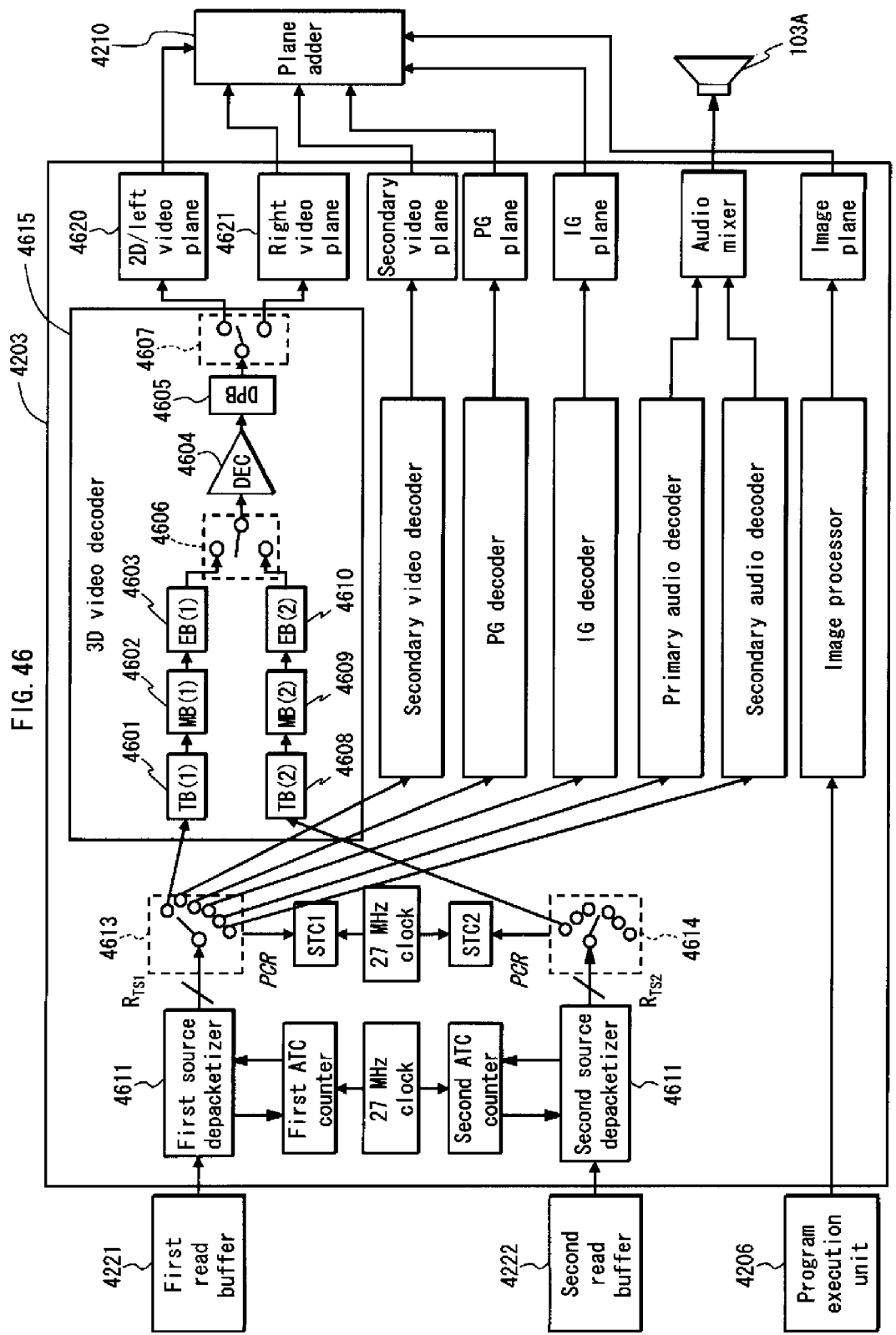
FIG. 46 is a functional block diagram of the system target decoder shown in FIG. 42.

FIG. 46 is a functional block diagram of the system target decoder 4203. The structural elements shown in FIG. 46 differ from the 2D playback device shown in FIG. 20 in the following two points: 1) the input channel from the read buffer to the main video decoder is doubled, and 2) the main video decoder is a 3D video image decoder that can alternately decode a base-view stream and a dependent-view stream. On the other hand, the secondary video decoder, IG decoder, PG decoder, primary audio decoder, secondary audio decoder, audio mixer, image processor, and plane memories are similar to those included in the 2D playback device shown in FIG. 20. Accordingly, among the structural elements shown in FIG. 46, those differing from the structural elements shown in FIG. 20 are described below, and details about similar structural elements are incorporated by reference to the explanation for FIG. 20.

The first source depacketizer 4611 reads source packets from the first read buffer 4221, fetches TS packets included in the source packets, and transmits the TS packets to the first PID filter 4613. The second source depacketizer 4612 reads source packets from the second read buffer 4222, fetches TS packets included in the source packets, and transmits the TS packets to the second PID filter 4614. Each of the source depacketizers 4611 and 4612 further adjusts the time of transferring the TS packets, in accordance with the ATS of the source packets. This adjustment is made in the same manner as made by the source depacketizer 2010 shown in FIG. 20. Thus, the detailed explanation of the adjustment provided for FIG. 20 is incorporated in the following by reference.

The first PID filter 4613 compares the PIDs of the TS packets received from the first source depacketizer 4611 with the PIDs previously designated by the playback control unit 4207. When two PIDs match, the first PID filter 4613 transfers the corresponding TS packet to the TB(1) 4601, the secondary video decoder, the IG decoder, the PG decoder, the audio decoder or the secondary audio decoder of the 3D video image decoder 4315, depending on the PID. Similarly, the second PID filter 4614 transfers the TS packets, received from the second source depacketizer 4612, to the decoders, according to the PID of each TPS packet. Here, as shown in FIGS. 33A and 33B, the dependent-view stream file generally includes only the dependent-view stream. Thus, for the 3D playlist playback, the second PID filter 4614 transfers the TS packets mainly to the TB(2) 4608 of the 3D video decoder 4615.

As shown in FIG. 46, the 3D video decoder 4615 includes a TB(1) 4601, an MB(1) 4602, an EB(1) 4603, a TB(2) 4608, an MB(2) 4609, an EB(2) 4610, a buffer switch 4606, a compressed video decoder 4604, a DPB 4605, and a picture switch 4607. The TB(1) 4601, the MB(1) 4602, the EB(1) 4603, the TB(2) 4608, the MB(2) 4609, the EB(2) 4610 and the DPB 4605 are all buffer memories, each of which uses an area of the memory elements included in the 3D video decoder 4615. Note that some or all of these buffer memories may be separated on different memory elements.

The TB(1) 4601 receives TS packets that include a base-view stream from the first PID filter 4613, and stores the TS packets as they are. The MB(1) 4602 stores PES packets reconstructed from the TS packets stored in the TB(1) 4601. The TS headers of the TS packets are removed at this point. The EB(1) 4603 extracts and stores encoded video access units from the PES packets stored in the MB(1) 4602. The PES headers of the PES packets are removed at this point.

The TB(2) 4608 receives TS packets that include a dependent-view stream from the second PID filter 4614, and stores the TS packets as they are. The MB(2) 4609 stores PES packets reconstructed from the TS packets stored in the TB(2) 4608. The TS headers of the TS packets are removed at this point. The EB(2) 4610 extracts and stores encoded video access units from the PES packets stored in the MB(2) 4609. The PES headers of the PES packets are removed at this point.

The buffer switch 4606 transfers the video access units stored in the EB(1) 4603 and the EB(2) 4610 to the compressed video decoder 4604 at the times of the DTSs indicated by the original TS packets. Here, as shown in FIGS. 35A and 35B, the DTSs for a pair of pictures belonging to the same 3D video image access unit in the base-view stream 3501 and the dependent-view stream 3502 are equivalent. Accordingly, from among the pairs of video access units with equivalent DTSs stored by the EB(1) 4603 and the EB(2) 4610, the buffer switch 4606 first sends a pair stored in the EB(1) 4603 to the compressed video decoder 4604. Additionally, the buffer switch 4606 may receive the decode switch information 3601, included in the corresponding video access unit 3600 shown in FIG. 36, back from the compressed video decoder 4604. If this is the case, the buffer switch 4606 can determine if it should first transfer the next video access unit to the EB(1) 4603 or to the EB(2) 4610 by using the decode switch information 3601.

The compressed video decoder 4604 decodes each video access unit transferred from the buffer switch 4606, at the time of the DTS of the corresponding TS packet. Here, the compressed video decoder 4604 uses different decoding methods according to the encoding format (e.g. MPEG-2, MPEG-4 AVC and VC1) of the compressed pictures contained in the video access unit, and according to the stream attribute. The compressed video decoder 4604 further transfers the decoded pictures, namely the video frames or fields, to the DPB 4605.

The DPB 4605 temporarily holds the decoded pictures. The compressed video decoder 4604 refers to the decoded pictures held by the DPB 4605 to decode the P pictures and the B pictures. The DPB 4605 further transfers each of the pictures to the picture switch 4607 at the time of the PTS of the original TS packet.

The picture switch 4607 writes the picture transferred from the compressed video decoder 4604 to either the 2D/left video plane memory 4620 or the right video plane memory 4621. When the picture belongs to the 2D/left-view stream, the picture switch 4607 writes the picture to the 2D/left video plane memory 4620, and when it belongs to the right-view stream, the picture switch 4607 writes it to the right video plane memory 4621.

<Physical Arrangement on Disc of AV Stream Files Representing 3D Video Images>

Next, an explanation is provided for the physical arrangement of AV stream files when recording a pair of AV stream files representing 3D video images, i.e. a base-view stream file and a dependent-view stream file, on the BD-ROM disc 101, such that the arrangement is useful for seamless playback of 3D video images.

During 3D video image playback, the 3D playback device has to process in parallel a base-view stream file and a dependent-view stream file whose playback periods match. FIGS. 47A and 47B are schematic diagrams showing the arrangement on the disc 101 of the extents belonging to both AV stream files.

Assume that, as shown in FIG. 47A, the entirety of a base-view stream file is sequentially recorded on the disc 101 as a single extent 4701, after which the entirety of a dependent-view stream file is sequentially recorded as a single extent 4702. When the 3D playback device processes the AV stream files 4701 and 4702 in parallel, the capacity of the buffer useable for the processing is generally limited. Therefore, as shown by the arrows (1)-(4) in FIG. 47A, the playback path of the 3D video images proceeds alternately for portions of the extents 4701 and 4702. As a result, each time the extent to be read switches, a jump occurs, as shown by the dotted lines in FIG. 47A. In particular, the jump distance is approximately the same as the length of each entire AV stream file. This makes it difficult for the read process of each AV stream file by the BD-ROM drive to keep up with the decoding process by the 3D video image decoder, and thus it is difficult to ensure continual seamless playback.

In Embodiment 1, as shown in FIG. 47B, the extents for both AV stream files are recorded in an interleaved arrangement. Specifically, one base-view stream file is divided into a plurality of extents 4701A, 4701B, etc., and one dependent-view stream file is divided into a plurality of extents 4702A, 4702B, etc. Furthermore, the extents for both AV stream files are arranged alternately on the disc 101. In this case, as shown by the arrows (1)-(4) in FIG. 47B, the playback path for the 3D video images proceeds in order starting with extents 4701A, 4701B, 4702A, 4702B, etc. In this way, the 3D playback device does not have to jump the entirety of the AV stream file and can read both AV stream files alternately in units of extents. This is useful for seamless playback of 3D video images.

<<Playback Time for Each Extent>>

Figure 48A:
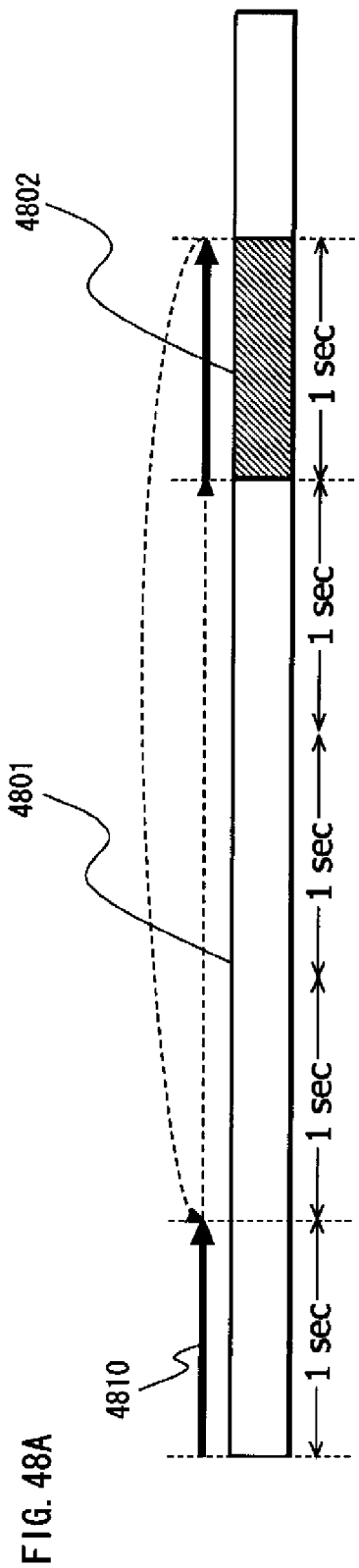
FIGS. 48A and 48B are schematic diagrams showing the relationship between the playback time of the video stream per extent and the playback path.
Figure 48B:
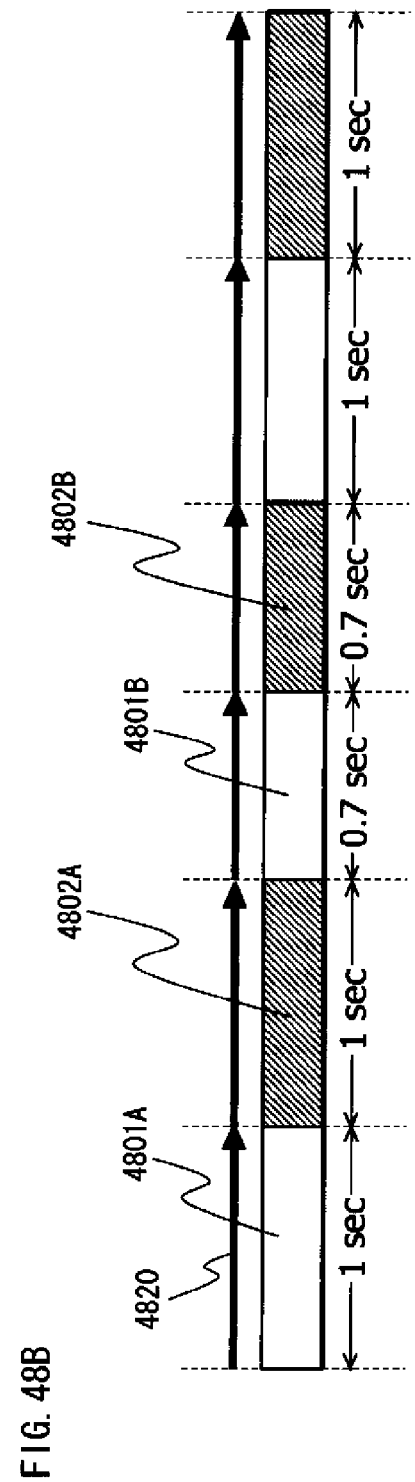

The playback time for the video stream for each extent fulfills the conditions described below. FIGS. 48A and 48B are schematic diagrams showing the relationship between this playback time and the playback path.

Assume that, as shown in FIG. 48A, an extent 4801 for the base-view stream file and an extent 4802 for the dependent-view stream file are consecutive. The playback time of the base-view stream included in the extent 4801 is four seconds, and the playback time of the dependent-view stream included in the extent 4802 is one second. Here, the playback time of the base-view stream required for decoding of the dependent-view stream is equivalent to the playback time of the dependent-view stream. Accordingly, to economize the buffer capacity within the 3D playback device, it is preferable that the 3D video image playback path proceed alternately between the extents 4801 and 4802 for each AV stream file for the same playback time, for example one second, as shown by the arrow 4810 in FIG. 48A. However, in that case, as shown by the dotted line in FIG. 48A, a jump occurs during the reading of the extent 4801, whose video stream has a long playback time.

In Embodiment 1, as shown in FIG. 48A, the sections of each AV stream file with matching playback periods are included in a pair of consecutive extents. In particular, the playback times of the video streams are equivalent between these extents. Specifically, the playback time of the video streams in the top extent 4801A in the base-view stream file and the top extent 4802A in the dependent-view stream file are both equivalent to one second, and the playback time of the video stream in the second extent in each AV stream file, 4801B and 4802B, are both equivalent to 0.7 seconds. The 3D video image playback path arranged in this way, as shown by the arrow 4820 in FIG. 48B, proceeds in order starting with the extents 4801A, 4802A, 4801B, 4802B, etc. Furthermore, no jump occurs during the reading of any of the extents. Accordingly, the 3D playback device can read extents continuously without causing any jumps. This is useful for seamless playback of 3D video images.

<<Pictures to be Included in the Top Extents>>

The top of each extent belonging to the base-view stream file includes an I picture for the base-view stream, and the top of each extent belonging to the dependent-view stream file includes a P picture for the dependent-view stream. This P picture, as shown in FIG. 34, is compressed using the I picture in the base-view stream as a reference picture. In this case, the 3D playback device can specify the size of each extent using the entry point in the clip information file. Therefore, the 3D playback device can simplify the processing to alternately read extents of both AV stream files from the BD-ROM disc 101.

<<Arrangement Order of Extents and Playback Path>>

Figure 49:
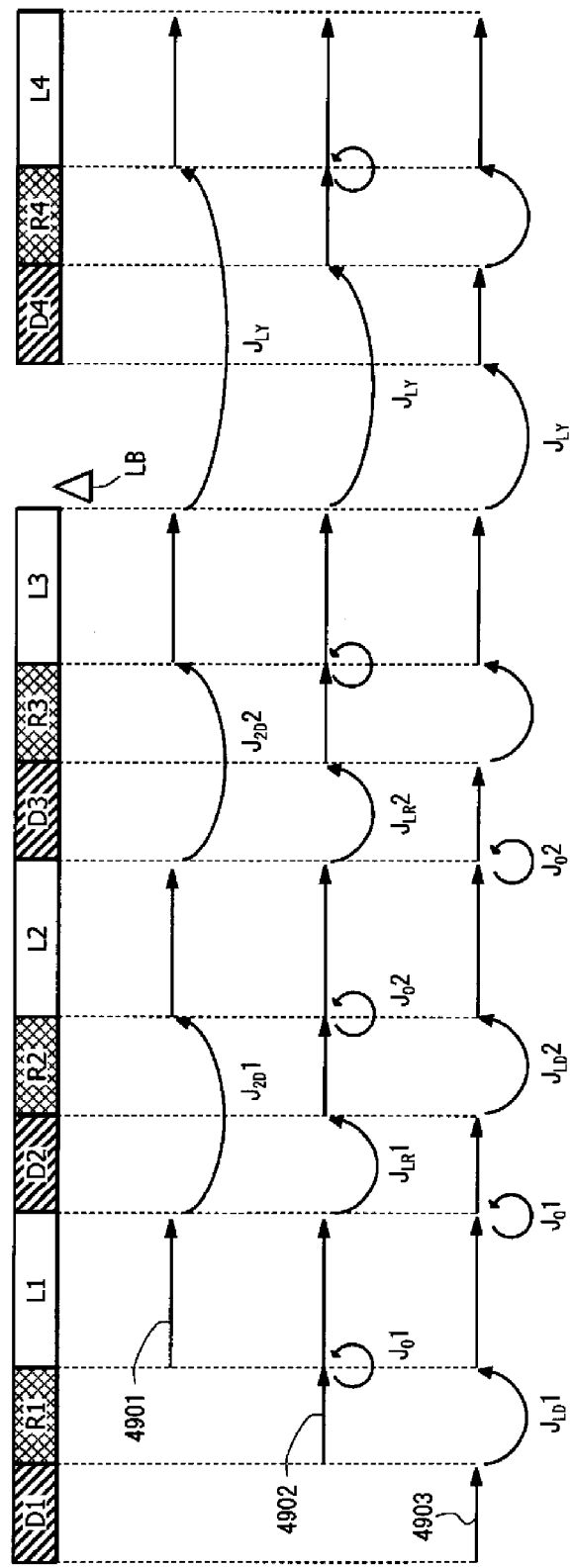
FIG. 49 is a schematic diagram showing the position on a BD-ROM disc of the extent groups belonging to a 2D/left-view stream file, a right-view stream file, and a depth map stream file.

FIG. 49 is a schematic diagram showing the position on a BD-ROM disc of the extent groups belonging to a 2D/left-view stream file, a right-view stream file, and a depth map stream file. The AV stream files correspond to the three types of AV stream files 245A-245C shown in FIG. 2. As shown in FIG. 49, these groups of extents are recorded in an interleaved arrangement similar to the arrangement shown in FIG. 47B. Specifically, the 2D/left-view stream file is first divided into a plurality of extents L1, L2, L3, etc., the right-view stream file is divided into a plurality of extents R1, R2, R3, etc., and the depth map stream file is divided into a plurality of extents D1, D2, D3, etc. Hereinafter, the plurality of extents L1, L2, L3, etc. belonging to the 2D/left-view stream file are referred to as "left-view extents," the plurality of extents R1, R2, R3, etc. belonging to the right-view stream file are referred to as "right-view extents," and the plurality of extents D1, D2, D3, etc. belonging to the depth map stream file are referred to as "depth map extents." The left-view extents L1-3, the right-view extents R1-3, and the depth map extents D1-3 are alternately arranged one at a time. In this interleaved arrangement, sections of each AV stream file with matching playback periods are further included individually in three consecutive extents, similar to the arrangement shown in FIG. 48B. In particular, between these extents, the playback times of the video streams are equivalent. For example, the top left-view extent L1, the top right-view extent R1, and the top depth map extent D1 are arranged consecutively. The sections of the AV stream files included in the extents L1, R1, and D1 have matching playback periods, and the playback time of the video streams is equivalent. The same is true for the next three consecutive extents, L2, R2, and D2.

As shown in FIG. 49, for each three consecutive extents, i.e. for a combination of a left-view extent, a right-view extent, and a depth map extent with matching playback periods, the arrangement order is fixed. In particular, extents are arranged starting with the smallest extent. For example, the picture R1 included in the top right-view extent is compressed using the picture included in the top left-view extent L1 as a reference picture, as shown in FIG. 34. On the other hand, the amount of data per pixel in the depth map, i.e. the number of bits of the depth value, is in general smaller than the amount of data per pixel of the picture included in the 2D/left-view stream, i.e. the number of bits of the chromatic coordinate value and the α value. Furthermore, as shown in FIGS. 4 and 33, unlike the dependent-view stream file, the base-view stream file includes elementary streams, such as a primary audio stream, in addition to the primary video stream. Therefore, the size of the top right-view extent R1, $S_{ext2}[1]$, and the size of the top depth map extent D1, $S_{ext3}[1]$, are both generally smaller than the size of the top left-view extent L1, $S_{ext1}[1]$: $S_{ext2}[1] \leq S_{ext1}[1]$, $S_{ext3}[1] \leq S_{ext1}[1]$. Therefore, in FIG. 49, the top depth map extent D1, the top right-view extent R1, and the top left-view extent L1 are recorded in that order. The same is true for the next three consecutive extents, D2, R2, and L2.

FIG. 49 shows the playback path 4901 when a 2D playback device plays back 2D video images, the playback path 4902 when a 3D playback device plays back 3D video images in L/R mode, and the playback path 4903 when a 3D playback device plays back 3D video images in depth mode.

The playback path 4901 for 2D video images traverses only the left-view extents in order. For example, the top left-view extent L1 is first read, and immediately thereafter reading of the depth map extent D2 and the right-view extent R2 is skipped by a first jump $J_{2D}1$. Next, the second left-view extent L2 is read, and immediately thereafter reading of the depth map extent D3 and the right-view extent R3 is skipped by a second jump $J_{2D}2$.

The playback path 4902 for 3D video images in L/R mode alternately traverses the left-view extents and the right-view extents. For example, the top right-view extent R1 and the top left-view extent L1 are first read successively. Between these extents R1 and L1, the first zero sector transition $J_01$ occurs.

A "zero sector transition" is a movement of the optical pickup between two extents whose logical addresses are consecutive. During a zero sector transition period, the BD-ROM disc 101 revolves so that the position of the optical pickup is moved from the end of the extent that was just read to the top of the next extent to be read. During movement, the optical pickup temporarily stops reading and is placed on standby. Note that the zero sector transition period may include the period in which the error correction code (ECC) that immediately follows each extent is read and used to perform error correction, i.e. the ECC correction time. The time of the zero sector transition $T_{jump\text{-}0}$ is evaluated as the sum of two parameters. One of the parameters expresses the time actually required for the zero sector transition, and is set as a value equal to or less than, for example, 20 ms, based on the time to move the optical pickup and the ECC correction time. However, during a period when extents are read continuously, the standby time of the optical pickup during a zero sector transition and the ECC correction time are generally both short enough to be negligible, and this parameter can be taken to be zero. The other parameter is referred to as "margin time." Margin time is set so that, each time a pair of a base-view extent and a dependent-view extent is decoded, the accumulated data amounts in the read buffers 4221 and 4222 increase gradually. Details regarding the margin time are provided later.

Once the end of the top left-view extent L1 is read, the first jump $J_{LR}1$ occurs, and reading of the immediately subsequent depth map extent D2 is skipped. Next, the second right-view extent R2 and the second left-view extent L2 are read with the second zero sector transition $J_02$ in between. Furthermore, reading of the second depth map extent D3 is skipped by the second jump $J_{LR}2$.

The playback path 4903 for 3D video images in depth mode alternately traverses the left-view extents and the depth map extents. For example, the top depth map extent D1 is first read, and reading of the immediately subsequent right-view extent R1 is skipped by the first jump $J_{LD}1$. Next, the top left-view extent L1 and the second depth map extent D2 are read with the first zero sector transition $J_0 1$ in between, and reading of the immediately subsequent right-view extent R2 is skipped by the second jump $J_{LD}2$.

In FIG. 49, as extent groups are constructed in an interleaved arrangement, the playback paths 4902 and 4903 for 3D video images can traverse extents in the order in which they are on the disc 101. Accordingly, similar to the case shown in FIG. 47B, the 3D playback device can reduce the jump distance sufficiently more than the entire length of an AV stream file in both L/R mode and depth mode. Furthermore, in FIG. 49 three types of extents whose playback periods match are arranged consecutively. Therefore, similar to the case shown in FIG. 48B, the 3D playback device can continuously read all of the extents without having to execute a jump during the reading. Additionally, as the arrangement order for the three consecutive extents is fixed, the playback paths 4902 and 4903 for 3D video images are both constructed via repetition of a fixed pattern. Therefore, in both L/R mode and depth mode, the 3D playback device can, in a fixed pattern, make repeated requests of the BD-ROM drive to read the base-view extents and dependent-view extents. Furthermore, in each combination of a base-view extent and a dependent-view extent whose playback periods match, the dependent-view extent is read first. The buffer capacity of the 3D playback device can therefore be reduced more than if the reverse were true.

When the BD-ROM disc 101 is a multi-layer disc, as shown in FIG. 49, extent groups belonging to a sequence of sections of AV stream files can be arranged on two recording layers. In this case, since the layer boundary is set immediately after a base-view extent, on the next recording layer, the subsequent extent group is arranged in order starting with the dependent-view extent that should be placed at the top of a combination of extents with matching playback periods. In the example shown in FIG. 49, a layer boundary LB is set immediately after the left-view extent L3, and in the next recording layer, the subsequent extent group is arranged in order starting with the fourth depth map extent D4. As a result, in the playback paths 4901, 4902, and 4903, the jump $J_{LY}$ to skip the layer boundary LB is not distinguished from the zero sector transitions $J_0 1$, $J_0 2$, etc., nor from the other jumps $J_{2D}1$, $J_{2D}2$, etc., $J_{LR}1$, $J_{LR}2$, etc., and $J_{LD}1$, $J_{LD}2$, etc. Unlike the other jumps, however, the jump time for the jump $J_{LY}$ is evaluated as being longer than the value associated with the jump distance as per the regulation shown in FIG. 24 by the time for switching layers, i.e. 350 ms.

<<Interrupt Playback>>

Figure 50:
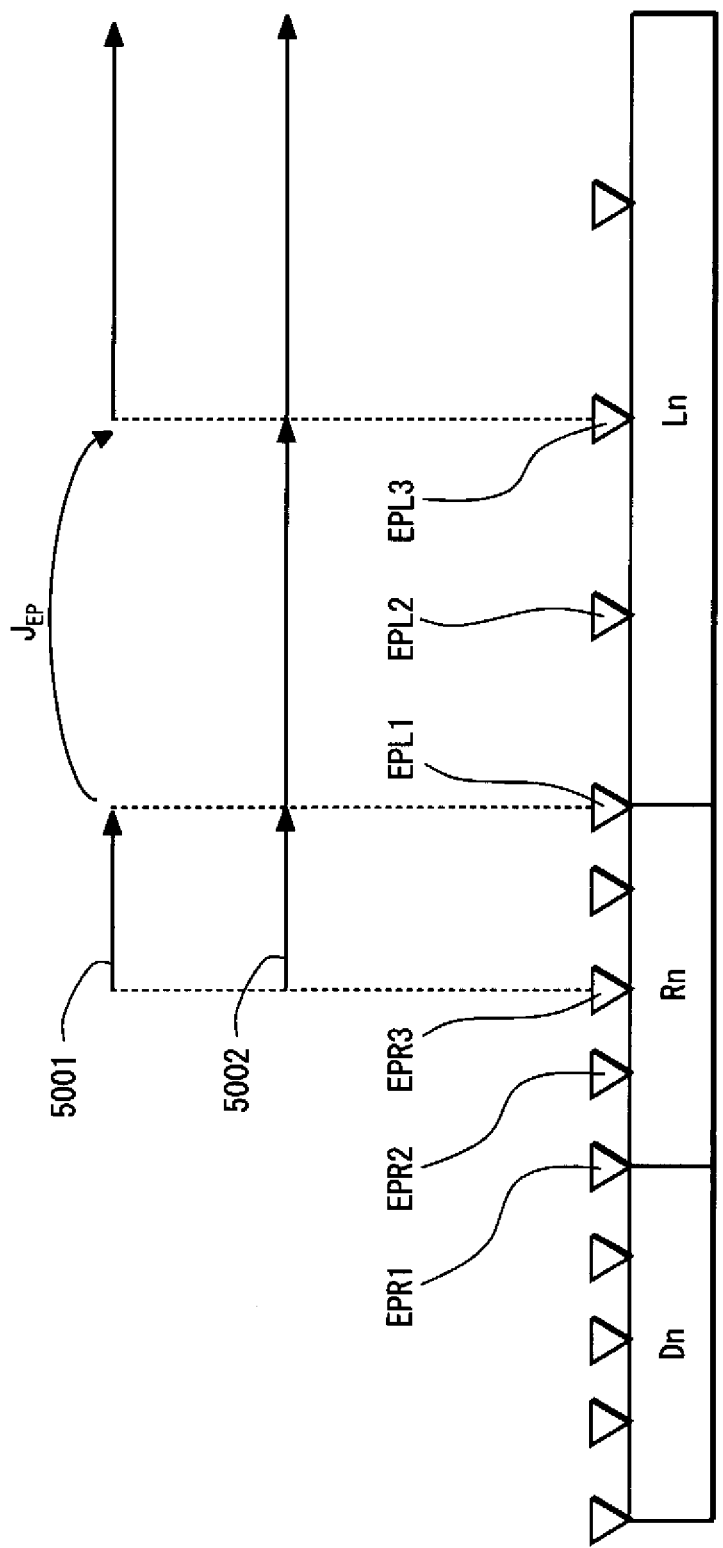
FIG. 50 is a schematic diagram showing (i) the entry points set for a combination Dn, Rn, and Ln of the $n^{th}$ extent among the interleaved arrangement shown in FIG. 49 and (ii) the playback path during interrupt playback.

FIG. 50 is a schematic diagram showing (i) the entry points set for a combination Dn, Rn, and Ln of the $n^{th}$ extent among the interleaved arrangement shown in FIG. 49 and (ii) the playback path during interrupt playback. As shown in FIG. 50, four entry points are set in each of the extents Dn, Rn, and Ln. Similar to the entry points shown in FIG. 41, the entry points in the extents Dn, Rn, and Ln located at the same position when counted from their respective tops have the same PTS. For example, the PTS for the top entry point EPR1 in the right-view extent Rn is equivalent to the PTS for the top entry point EPL1 in the left-view extent Ln, and the PTS for the second entry point EPR2 in the right-view extent Rn is equivalent to the PTS for the second entry point EPL2 in the left-view extent Ln.

FIG. 50 further shows the types of playback paths 5001 and 5002 that can be chosen when interrupt playback of 3D video images is performed from the third entry point EPR3 in the right-view extent Rn. Both playback paths 5001 and 5002 first traverse the right-view extent Rn from the third entry point EPR3 to the end. In the first playback path 5001, a jump JEP occurs from the end of the right-view extent Rn to the third entry point EPL3 of the left-view extent Ln. Subsequently, the first playback path 5001 traverses the left-view extent Ln starting from the third entry point EPL3. On the other hand, the second playback path 5002 proceeds continuously from the end of the right-view extent Rn to the top of the left-view extent Ln and further proceeds along the left-view extent Ln without a jump. However, the source packets included from the top entry point EPL1 through the third entry point EPL3 in the left-view extent Ln are discarded without being decoded.

One of the two playback paths 5001 and 5002 is chosen as follows. First, the jump distance of the jump JEP, i.e. the number of sectors from the top entry point EPL1 to the third entry point EPL3 in the left-view extent Ln, is calculated from the entry map 3823 in the base-view clip information file 3801 shown in FIG. 38A. Next, according to the regulation shown in FIG. 24, the jump time $T_{jump-EP}$ corresponding to the jump distance is determined to be the maximum jump time for the jump JEP. On the other hand, the time $T_{read-EP}$ required for the BD-ROM drive 4201 to read the left-view extent Ln from the top entry point EPL1 through the third entry point EPL3 and transfer data to the first read buffer 4221 is calculated by multiplying the data transfer rate from the BD-ROM drive 4201 to the first read buffer 4221 by the above-mentioned number of sectors. Next, this time $T_{read-EP}$ is compared with the jump time $T_{jump-EP}$. When $T_{read-EP}$ is shorter than $T_{jump-EP}$, i.e. $T_{read-EP} < T_{jump-EP}$, then the first playback path 5001 is selected. Conversely, when $T_{read-EP}$ is longer than $T_{jump-EP}$, i.e. $T_{read-EP} > T_{jump-EP}$, then the second playback path 5002 is selected. In this way, decoding of the range from the top entry point EPL1 through the third entry point EPL3 in the left-view extent Ln is skipped as quickly as possible. As a result, upon interrupt playback, the time until video images are actually played back can be reduced.

<<Data Transfer Rate of Playback Process System in 3D Playback Device>>

Figure 51:
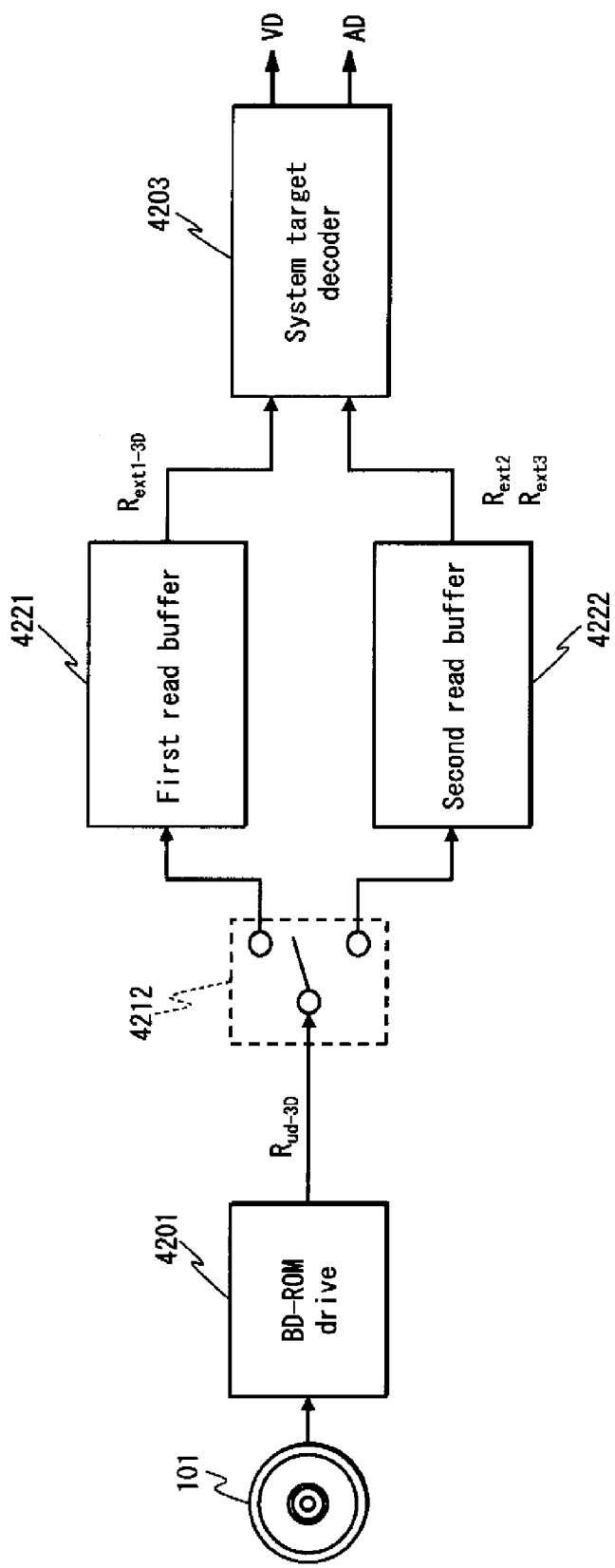
FIG. 51 is a schematic diagram showing the playback process system in the 3D playback device shown in FIG. 42.

Here, as an assumption for the following explanation, the data transfer rate of the playback process system in the 3D playback device is defined. FIG. 51 is a schematic diagram showing the playback process system in the 3D playback system shown in FIG. 42. This playback process system converts the base-view stream file and the dependent-view stream file read by the BD-ROM disc 101 into 3D video image data VD and audio data AD. As shown in FIG. 51, the BD-ROM drive 4201 alternately reads both AV stream files in units of extents and stores them alternately in the first read buffer 4221 and the second read buffer 4222 at a rate $R_{ud-3D}$ (bits/second). This rate $R_{ud-3D}$ is referred to as the "3D video image read rate." The 3D video image read rate $R_{ud-3D}$ is, for example, 72 Mbps. The system target decoder 4203 reads source packets from the first read buffer 4221 at a mean transfer rate of $R_{ext1-3D}$ (bits/second). This mean transfer rate of $R_{ext1-3D}$ is referred to as the "left-view transfer rate." The left-view transfer rate $R_{ext1-3D}$ is generally different for each extent. The maximum value $R_{max1-3D}$ of the left-view transfer rate $R_{ext1-3D}$ is equivalent to 192/188 times the system rate for the 2D/left-view stream file. On the other hand, the system target decoder 4203 reads source packets that include a section of a right-view stream file from the second read buffer 4222 at a first mean transfer rate $R_{ext2}$ (bits/second) and reads source packets that include a section of the depth map stream file at a second mean transfer rate $R_{ext3}$ (bits/second). The first mean transfer rate $R_{ext2}$ is referred to as the "right-view transfer rate," and the second mean transfer rate $R_{ext3}$ is referred to as the "depth map transfer rate." Both transfer rates $R_{ext2}$ and $R_{ext3}$ are generally different for each extent. The maximum value $R_{max2}$ of the right-view transfer rate $R_{ext2}$ is equivalent to 192/188 times the system rate for the right-view stream file, and the maximum value $R_{max3}$ of the depth map transfer rate $R_{ext3}$ is equivalent to 192/188 times the system rate for the depth map stream file. Note that the system rate, as shown in FIGS. 11 and 38, is recorded in the clip information in the clip information file. While the BD-ROM drive 4201 is reading an extent from the disc 101, in order to prevent underflow in the read buffers 4221 and 4222 caused by the decoding process in the system target decoder, the 3D video image read rate $R_{ud-3D}$ should be equal to or greater than each of the maximum values of the transfer rates, $R_{max1-3D}$, $R_{max2}$, and $R_{max3}$ as in Equation 2.

$$R_{ud-3D} \geq R_{max1-3D}, R_{ud-3D} \geq R_{max2}, R_{ud-3D} \geq R_{max3} \qquad \text{Equation 2}$$

The playback process system in the 3D playback device shown in FIG. 51 is further assumed to be useable as a playback process system to play back 2D video images from the BD-ROM disc 101. In playback of 2D video images, the BD-ROM drive 4201 only stores the left-view extents in the first read buffer 4221 at a rate $R_{ud-2D}$ (bits/second). This rate $R_{ud-2D}$ is referred to as the "2D video image read rate." The 2D video image read rate $R_{ud-2D}$ is, for example, 54 Mbps. The system target decoder 4203 reads source packets from the first read buffer 4221 at a mean transfer rate $R_{ext1-2D}$ (bits/second). This mean transfer rate $R_{ext1-2D}$ is referred to as the "2D video image transfer rate." The 2D video image transfer rate $R_{ext1-2D}$ is generally different for each extent. The maximum value $R_{max1-2D}$ of the 2D video image transfer rate $R_{ext1-2D}$ is equivalent to 192/188 times the system rate for the 2D/left-view stream file. While the BD-ROM drive 4201 is reading an extent from the disc 101, in order to prevent underflow in the first read buffer 4221 caused by the decoding process in the system target decoder, the 2D video image read rate $R_{ud-2D}$ should be higher than the maximum value of the transfer rate, $R_{max1-2D}$ as in Equation 3.

$$R_{ud-2D} > R_{max1-2D} \qquad \text{Equation 3}$$

<<Conditions on Arrangement of Left-view Extents Required for Seamless 2D Video Playback>>

As shown in FIG. 49, in the playback path 4901 for 2D video images, jumps $J_{2D}1$, $J_{2D}2$, etc., occur respectively in each recording area of the dependent view extents D2, R2, D3, R3, etc. On the other hand, data transfer from the first read buffer 4221 to the system target decoder 4203 is continuous. Accordingly, for the 2D playback device to seamlessly play back 2D video images, a sufficient amount of data should be accumulated in the first read buffer 4221 during reading of extents, so that underfloor will not occur in the first read buffer 4221 due to data transfer to the system target decoder 4203 while reading of extents is suspended. In other words, as explained with reference to FIGS. 22-24, the size of each base-view extent should be at least equivalent to the size of the smallest extent, and the gap between base-view extents should be smaller than the maximum jump distance.

Figure 52:
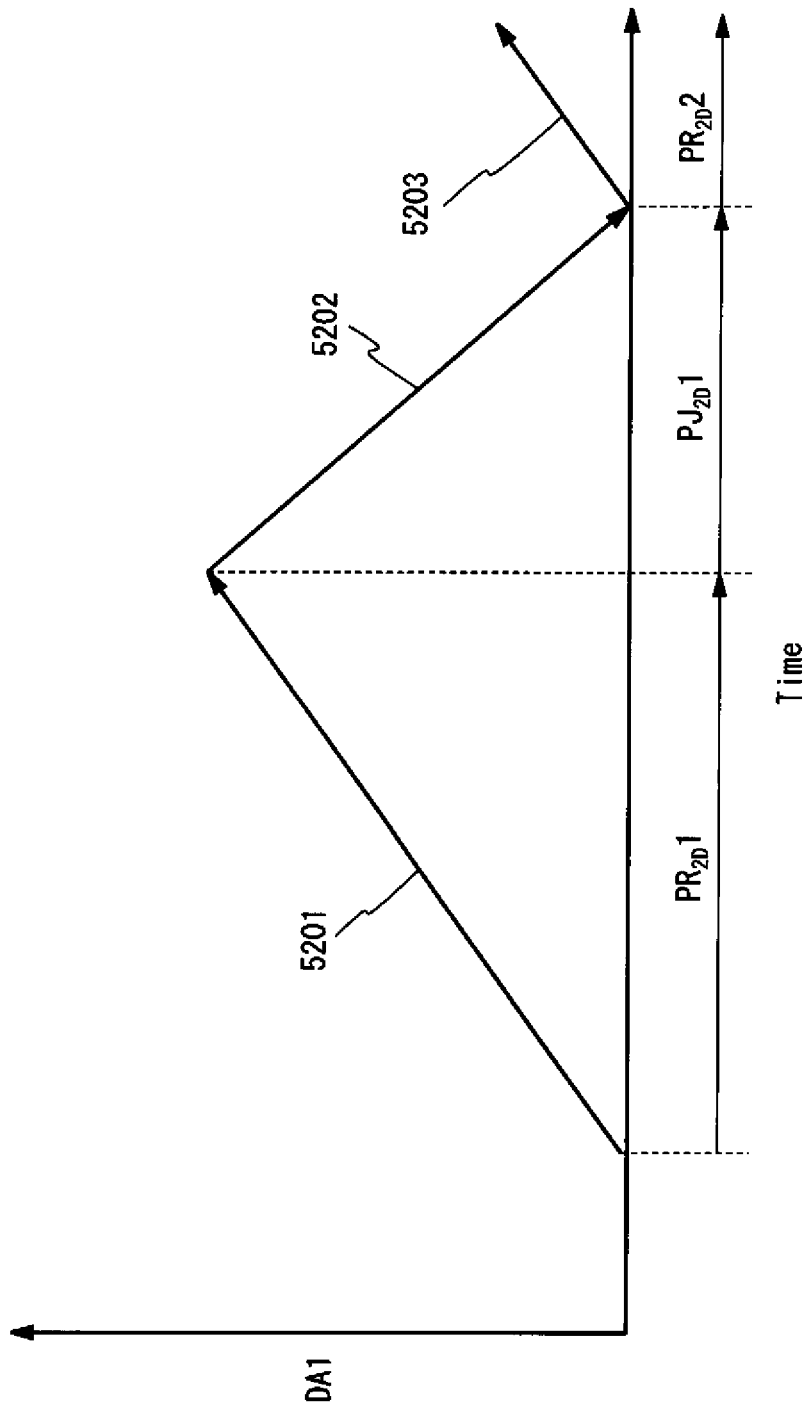
FIG. 52 is a graph showing the change of the accumulated data amount in the first read buffer when the 2D playback device plays back 2D video images from the extent groups shown in FIG. 49.

FIG. 52 is a graph showing the change of the accumulated data amount D1 in the first read buffer 4221 when the 2D playback device plays back 2D video images from the extent groups shown in FIG. 49. First, the top left-view extent L1 is read from the BD-ROM disc 101 and output to the first read buffer 4221. During the read period $PR_{2D}1$, as shown by the arrow 5201 in FIG. 52, the accumulated data DA1 increases at a rate equivalent to the difference between the 2D video image read rate $R_{ud-2D}$ and the 2D video image transfer rate $R_{ext1-2D}[1]$, or $R_{ua-2D}-R_{ext1-2D}[1]$. When the end of the top left-view extent L1 is read, a jump $J_{2D}1$ occurs. During the jump period $PJ_{2D}1$, reading of the two extents D2 and R2 positioned immediately after the top left-view extent L1 is skipped, and thus reading of data from the BD-ROM disc 101 stops. Accordingly, during the jump period $PJ_{2D}1$, as shown by the arrow 5202 in FIG. 52, the accumulated data amount DA1 decreases at the 2D video image transfer rate $R_{ext1-2D}[1]$ Here, during the read period $PR_{2D}1$, the accumulated data amount in the first read buffer 4221, i.e. the size $S_{ext1}[1]$ of the top left-view extent L1, is assumed to be equivalent to the data amount transferred from the first read buffer 4221 to the system target decoder 4203 between this read period $PR_{2D}1$ and the jump period $PJ_{2D}1$. In this case, as shown in FIG. 52, at the end of the jump period $PJ_{2D}1$, the accumulated data amount DA1 only falls to the value it was at the start of the read period $PR_{2D}1$. After the jump $J_{2D}1$, reading of the next left-view extent L2 begins. During the corresponding read period $PR_{2D}2$, as shown by the arrow 5203 in FIG. 52, the accumulated data amount DA1 once again rises at a rate equivalent to the difference in data transfer rates, $R_{ud-2D}-R_{ext1-2D}[2]$ The above-described change of the accumulated data amount DA1 is not limited to the top two left-view extents L1 and L2, but is also similar when playing back 2D video images from the $n^{th}$ and $(n+1)^{th}$ left-view extents Ln and L(n+1) (an integer n is equal to or greater than two). Accordingly, in order to play back 2D video images seamlessly from these two left-view extents Ln and L(n+1) regardless of the jump between them, the following two conditions should be fulfilled, as in the case shown in FIG. 23. First, the size $S_{ext1}[n]$ of the $n^{th}$ left-view extent Ln should be at least equivalent to the size of the smallest extent expressed by the right-hand side of Equation 4.

$$S_{ext1}[n] \geq CEIL\left(\frac{R_{ext1-2D}[n]}{8} \times \frac{R_{ud-2D}}{R_{ud-2D}-R_{ext1-2D}[n]} \times T_{jump-2D}[n]\right) \qquad \text{Equation 4}$$

In Equation 4, the jump time $T_{jump-2D}[n]$ expresses the length of the jump period from the end of the $n^{th}$ left-view extent Ln to the top of the $(n+1)^{th}$ left-view extent L(n+1) in seconds. The jump time $T_{jump-2D}[n]$ is determined by the sum of two parameters, TJ[n] and TL[n]: $T_{jump-2D}[n]=TJ[n]+TL[n]$. The first parameter TJ[n] represents the value assigned to the number of sectors, i.e. the jump distance, from the end of the $n^{th}$ left-view extent Ln to the top of the $(n+1)^{th}$ left-view extent L(n+1) as per the regulation shown in FIG. 24. The second parameter TL[n] represents either (i) the layer switching time, i.e. 350 ms, when there is a layer boundary LB between the $n^{th}$ left-view extent Ln and the $(n+1)^{th}$ left-view extent L n+1) or (ii) zero, when there is no layer boundary LB therebetween.

Next, the gap between the $n^{th}$ and the $(n+1)^{th}$ left-view extents Ln and L(n+1) should be smaller than the maximum jump distance. The maximum jump distance is equivalent to the value associated with the jump time $T_{jump-2D}[n]$ as per the regulation shown in FIG. 24.

<<Conditions on Arrangement of Extents Required for Seamless 3D Video Playback in L/R Mode>>

As shown in FIG. 49, the playback path 4902 for 3D video images in L/R mode alternately reads right-view extents R1, R2, etc. and left-view extents L1, L2, etc. Accordingly, while an extent is being read into one of the two read buffers 4221 and 4222, extents are not read into the other buffer. Furthermore, in the playback path 4902, jumps $J_{LR}1$, $J_{LR}2$, etc. occur in the recording areas for the depth map extents D2, D3, etc. On the other hand, data transfer from the read buffers 4221 and 4222 to the system target decoder 4203 is continuous. Accordingly, in order for the 3D playback device to play back 3D video images seamlessly, a sufficient amount of data should be accumulated in the read buffers 4221 and 4222 during reading of extents, so that underfloor will not occur in the read buffers 4221 and 4222 due to data transfer to the system target decoder 4203 while reading of extents is suspended.

FIGS. 53A, 53B, and 53C are graphs showing the change of the accumulated data amounts DA1 and DA2 in the read buffers 4221 and 4222 when the 3D playback device plays back 3D video images in L/R mode from the extent groups shown in FIG. 49. For convenience of explanation, it is assumed that the right-view extents and left-view extents have already been read into the read buffers 4221 and 4222 from the top pair of extents R1 and L1 in order through the $(n-1)^{th}$ pair of extents R (n−1) and L (n−1). It is also assumed that the integer n is sufficiently larger than one. In this case, the accumulated data amounts DA1 and DA2 in the read buffers 4221 and 4222 are already maintained above the lower limits UL1 and UL2 respectively. These lower limits UL1 and UL2 are referred to as the "buffer margin amount." Furthermore, the zero sector transition time $T_{jump-0}$ is assumed to be equivalent to a value that does not include a margin time, i.e. a defined value that is evaluated only on the time actually required for a zero sector transition. The method for guaranteeing the buffer margin amounts UL1 and UL2 is described later.

In accordance with the playback path 5301 shown in FIG. 53C, the $n^{th}$ right-view extent Rn is first read from the BD-ROM disc 101 during the $(2n-1)^{th}$ read period $PR_Rn$ and output to the second read buffer 4222. During the $(2n-1)^{th}$ read period $PR_Rn$, as shown in FIG. 53B, the accumulated data amount DA2 in the second read buffer 4222 increases at a rate equivalent to the difference between the 3D video image read rate $R_{ud-3D}$ and the right-view transfer rate $R_{ext2}[n]$, or $R_{ud-3D}-R_{ext2}[n]$. Conversely, as shown in FIG. 53A, the accumulated data amount DA1 in the first read buffer 4221 decreases at the left-view transfer rate $R_{ext1-3D}[n]$ When the end of the $n^{th}$ right-view extent Rn is read, the $n^{th}$ zero sector transition $J_0n$ occurs. During the $n^{th}$ zero sector transition period $PJ_0n$, reading of data from the BD-ROM disc 101 is suspended. Therefore, the accumulated data amount DA1 in the first read buffer 4221 decreases at the left-view transfer rate $R_{ext1-3D}[n-1]$, and the accumulated data amount DA2 in the second read buffer 4222 decreases at the right-view transfer rate $R_{ext2}[n]$ At the point the $n^{th}$ zero sector transition period $PJ_0n$ ends, the $2n^{th}$ read period $PR_Ln$ begins. During the $2n^{th}$ read period $PR_Ln$, the $n^{th}$ left-view extent Ln is read from the BD-ROM disc 101 and output to the first read buffer 4221. Accordingly, as shown in FIG. 53A, the accumulated data amount DA1 in the first read buffer 4221 increases at a rate equivalent to the difference between the 3D video image read rate $R_{ud-3D}$ and the left-view transfer rate $R_{ext1-3D}[n]$, or $R_{ud-3D}-R_{ext1-3D}[n]$ Conversely, as shown in FIG. 53B, the accumulated data amount DA2 in the second read buffer 4222 decreases at the right-view transfer rate $R_{ext2}[n]$ When the end of the $n^{th}$ left-view extent Ln is read, the jump $J_{LR}n$ occurs. During the jump period $PJ_{LR}n$, reading of the depth map extent D(n+1) located immediately after the $n^{th}$ left-view extent Ln is skipped, and thus reading of data from the BD-ROM disc 101 is suspended. Therefore, during the jump period $PJ_{LR}n$, as shown in FIG. 53A, the accumulated data amount DA1 in the first read buffer 4221 decreases at the left-view transfer rate $R_{ext1-3D}[n]$, whereas, as shown in FIG. 53B, the accumulated data amount DA2 in the second read buffer 4222 decreases at the right-view transfer rate $R_{ext2}[n]$.

The accumulated data amount in the second read buffer 4222 during the $(2n-1)^{th}$ read period $PR_Rn$, i.e. the size $S_{ext2}[n]$ of the $n^{th}$ right-view extent Rn, is at least equivalent to the data amount transferred from the second read buffer 4222 to the system target decoder 4203 from the $(2n-1)^{th}$ read period $PR_Rn$ through the jump period $PJ_{LR}n$. Accordingly, at the end of the jump period $PJ_{LR}n$, as shown in FIG. 53B, the accumulated data amount DA2 in the second read buffer 4222 does not fall below the second buffer margin amount UL2.

At the point the jump period $PJ_{LR}n$ ends, the $(2n+1)^{th}$ read period $PR_R$ (n+1) begins. During the $(2n+1)^{th}$ read period $PR_R(n+1)$, the $(n+1)^{th}$ right-view extent R(n+1) is read from the BD-ROM disc 101 and output to the second read buffer 4222. Accordingly, as shown in FIG. 53B, the accumulated data amount DA2 in the second read buffer 4222 increases at a rate equivalent to the difference between the 3D video image read rate $R_{ud-3D}$ and the right-view transfer rate $R_{ext2}[n+1]$, or $R_{ud-3D}-R_{ext2}[n+1]$. Conversely, as shown in FIG. 53A, the accumulated data amount DA1 in the first read buffer 4221 continues to decrease at the left-view transfer rate $R_{ext1-3D}[n]$.

When the end of the $(n+1)^{th}$ right-view extent R(n+1) is read, the $(n+1)^{th}$ zero sector transition $J_0(n+1)$ occurs. During the $(n+1)^{th}$ zero sector transition period $PJ_0(n+1)$, reading of data from the BD-ROM disc 101 is suspended. Therefore, the accumulated data amount DA1 in the first read buffer 4221 decreases at the left-view transfer rate $R_{ext1-3D}[n]$, and the accumulated data amount DA2 in the second read buffer 4222 decreases at the right-view transfer rate $R_{ext2}[n+1]$.

The accumulated data amount in the first read buffer 4221 during the $2n^{th}$ read period $PR_Ln$, i.e. the size $S_{ext1}[n]$ of the $n^{th}$ left-view extent Ln, is at least equivalent to the data amount transferred from the first read buffer 4221 to the system target decoder 4203 from the $2n^{th}$ read period $PR_Ln$ through the $(n+1)^{th}$ zero sector transition period $PJ_0$ (n+1). Accordingly, at the end of the $(n+1)^{th}$ zero sector transition period $PJ_0(n+1)$, as shown in FIG. 53A, the accumulated data amount DA1 in the first read buffer 4221 does not fall below the first buffer margin amount UL1.

At the point the $(n+1)^{th}$ zero sector transition period $PJ_0(n+1)$ ends, the $(2n+2)^{th}$ read period $PR_L(n+1)$ begins. During the $(2n+2)^{th}$ read period $PR_L(n+1)$, the $(n+1)^{th}$ left-view extent L(n+1) is read from the BD-ROM disc 101 and output to the first read buffer 4221. Accordingly, as shown in FIG. 53A, the accumulated data amount DA1 in the first read buffer 4221 increases at a rate equivalent to the difference between the 3D video image read rate $R_{ud-3D}$ and the left-view transfer rate $R_{ext1-3D}[n+1]$, or $R_{ud-3D}-R_{ext1-3D}[n+1]$. Conversely, as shown in FIG. 53B, the accumulated data amount DA2 in the second read buffer 4222 continues to decrease at the right-view transfer rate $R_{ext2}[n+1]$.

The above-described change of the accumulated data amounts DA1 and DA2 is similar for each extent after the $(n+2)^{th}$ extents. Accordingly, in order to play back 3D video images seamlessly from the right-view extents Rn, R(n+1), etc. and the left-view extents Ln, L(n+1), etc., regardless of jumps between them, the following two conditions need to be fulfilled.

The first condition is that the size $S_{ext1}[n]$ of the $n^{th}$ left-view extent Ln should be equivalent to the data amount transferred from the first read buffer 4221 to the system target decoder 4203 from the $2n^{th}$ read period $PR_Ln$ through the $(n+1)^{th}$ zero sector transition period $PJ_0(n+1)$. Here, the length of the $2n^{th}$ read period $PR_Ln$ is equivalent to the size $S_{ext1}[n]$ of the $n^{th}$ left-view extent Ln divided by the 3D video image read rate $R_{ud-3D}$, or $S_{ext1}[n]/R_{ud-3D}$. The length of the $(2n+1)^{th}$ read period $PR_R(n+1)$ is equivalent to the size $S_{ext2}$

[n+1] of the (n+1)$^{th}$ right-view extent R(n+1) divided by the 3D video image read rate $R_{ud-3D}$, or $S_{ext2}[n+1]/R_{ud-3D}$. Accordingly, the size $S_{ext1}[n]$ of the n$^{th}$ left-view extent Ln is at least equivalent to the smallest extent size represented by the right-hand side of Equation 5.

$$S_{ext1}[n] \geq \qquad \text{Equation 5}$$

$$\left( \frac{S_{ext1}[n]}{R_{ud-3D}} + T_{jump-3D}[n] + \frac{S_{ext2}[n+1]}{R_{ud-3D}} + T_{jump-0}[n+1] \right) \times$$

$$R_{ext1}[n]$$

$$\therefore S_{ext1}[n] \geq CEIL\left\{ \frac{R_{ext1}[n]}{8} \times \frac{R_{ud-3D}}{R_{ud-3D} - R_{ext1}[n]} \times \right.$$

$$\left. \left( T_{jump-3D}[n] + \frac{S_{ext2}[n+1]}{R_{ud-3D}} + T_{jump-0}[n+1] \right) \right\}$$

The second condition is that the size $S_{ext2}[n]$ of the n$^{th}$ right-view extent Rn should be at least equivalent to the data amount transferred from the second read buffer 4222 to the system target decoder 4203 from the (2n−1)$^{th}$ read period PR$_R$n through the n$^{th}$ jump period PJ$_{LR}$n. Here, the length of the (2n−1)$^{th}$ read period PR$_R$n is equivalent to the size $S_{ext2}[n]$ of the n$^{th}$ right-view extent Rn divided by the 3D video image read rate $R_{ud-3D}$, or $S_{ext2}[n]/R_{ud-3D}$. Accordingly, the size $S_{ext2}[n]$ of the n$^{th}$ right-view extent Rn is at least equivalent to the smallest extent size represented by the right-hand side of Equation 6.

$$S_{ext2}[n] \geq \qquad \text{Equation 6}$$

$$\left( \frac{S_{ext2}[n]}{R_{ud-3D}} + T_{jump-0}[n] + \frac{S_{ext1}[n]}{R_{ud-3D}} + T_{jump-3D}[n] \right) \times R_{ext2}[n]$$

$$\therefore S_{ext2}[n] \geq CEIL\left\{ \frac{R_{ext2}[n]}{8} \times \frac{R_{ud-3D}}{R_{ud-3D} - R_{ext2}[n]} \times \right.$$

$$\left. \left( T_{jump-0}[n] + \frac{S_{ext1}[n]}{R_{ud-3D}} + T_{jump-3D}[n] \right) \right\}$$

In Equations 5 and 6, the jump time $T_{jump-3D}[n]$ expresses the length of the jump period PJ$_{LR}$ from the end of the n$^{th}$ left-view extent Ln to the top of the (n+1)$^{th}$ right-view extent R(n+1) in seconds. More specifically, the jump time $T_{jump-3D}[n]$ is determined by the sum of two parameters, TJ[n] and TL[n]: $T_{jump-3D}[n]$=TJ[n]+TL[n]. The first parameter TJ[n] represents the value assigned to the number of sectors, i.e. the jump distance, from the end of the n$^{th}$ left-view extent Ln to the top of the (n+1)$^{th}$ right-view extent R(n+1) as per the regulation shown in FIG. 24. The second parameter TL[n] represents either (i) the layer switching time, i.e. 350 ms, when there is a layer boundary LB between the n$^{th}$ left-view extent Ln and the (n+1)$^{th}$ right-view extent R(n+1) or (ii) zero, when there is no layer boundary LB therebetween.

<<Conditions on Arrangement of Extents Required for Seamless 3D Video Playback in Depth Mode>>

As shown in FIG. 49, the playback path 4903 for 3D video images in depth mode alternately reads depth map extents D1, D2, etc. and left-view extents L1, L2, etc. Accordingly, while an extent is being read into one of the two read buffers 4221 and 4222, extents are not read into the other buffer. Furthermore, in the playback path 4903, jumps J$_{LR}$1, J$_{LR}$2, etc. occur in the recording areas for the depth map extents D2, D3, etc. On the other hand, data transfer from the read buffers 4221 and 4222 to the system target decoder 4203 is continuous. Accordingly, in order for the 3D playback device to play back 3D video images seamlessly, a sufficient amount of data should be accumulated in the read buffers 4221 and 4222 during reading of extents, so that underfloor will not occur in the read buffers 4221 and 4222 due to data transfer to the system target decoder 4203 while reading of extents is suspended.

FIGS. 54A, 54B, and 54C are graphs showing the change of the accumulated data amounts DA1 and DA2 in the read buffers 4221 and 4222 when the 3D playback device plays back 3D video images in depth mode from the extent groups shown in FIG. 49. For convenience of explanation, it is assumed that the depth map extents and left-view extents have already been read into the read buffers 4221 and 4222 from the top pair of extents D1 and L1 in order through the (n−1)$^{th}$ pair of extents D(n−1) and L(n−1). It is also assumed that the integer n is sufficiently larger than one. In this case, the accumulated data amounts DA1 and DA2 in the read buffers 4221 and 4222 are already maintained above the buffer margin amounts UL1 and UL2 respectively. Furthermore, the zero sector transition time $T_{jump-0}$ is assumed to be equivalent to a value that does not include a margin time, i.e. equivalent to a defined value that is evaluated only on the time required for an actual zero sector transition.

In accordance with the playback path 5401 shown in FIG. 54C, the n$^{th}$ depth map extent Dn is first read from the BD-ROM disc 101 during the (2n−1)$^{th}$ read period PR$_D$n and output to the second read buffer 4222. During the (2n−1)$^{th}$ read period PR$_D$n, as shown in FIG. 54B, the accumulated data amount DA2 in the second read buffer 4222 increases at a rate equivalent to the difference between the 3D video image read rate $R_{ud-3D}$ and the depth map transfer rate $R_{ext3}[n]$ or $R_{ud-3D}$−$R_{ext3}[n]$. Conversely, as shown in FIG. 54A, the accumulated data amount DA1 in the first read buffer 4221 decreases at the left-view transfer rate $R_{ext1-3D}[n-1]$.

When the end of the n$^{th}$ depth map extent Dn is read, the n$^{th}$ jump J$_{LD}$n occurs. During the n$^{th}$ jump period PJ$_{LD}$n, reading of the right-view extent Rn located immediately after the n$^{th}$ depth map extent Dn is skipped, and thus reading of data from the BD-ROM disc 101 is suspended. Therefore, during the n$^{th}$ jump period PJ$_{LD}$n, as shown in FIG. 54A, the accumulated data amount DA1 in the first read buffer 4221 decreases at the left-view transfer rate $R_{ext1-3D}[n-1]$, whereas, as shown in FIG. 54B, the accumulated data amount DA2 in the second read buffer 4222 decreases at the depth map transfer rate $R_{ext3}[n]$.

At the point the n$^{th}$ jump period PJ$_{LD}$n ends, the 2n$^{th}$ read period PR$_L$n begins. During the 2n$^{th}$ read period PR$_L$n, the n$^{th}$ left-view extent Ln is read from the BD-ROM disc 101 and output to the first read buffer 4221. Accordingly, as shown in FIG. 54A, the accumulated data amount DA1 in the first read buffer 4221 increases at a rate equivalent to the difference between the 3D video image read rate $R_{ud-3D}$ and the left-view transfer rate $R_{ext1-3D}[n]$ or $R_{ud-3D}$−$R_{ext1-3D}[n]$. Conversely, as shown in FIG. 54B, the accumulated data amount DA2 in the second read buffer 4222 continues to decrease at the depth map transfer rate $R_{ext3}[n]$.

When the end of the n$^{th}$ left-view extent Ln is read, the n$^{th}$ zero sector transition J$_0$n occurs. During the n$^{th}$ zero sector transition period PJ$_0$n, reading of data from the BD-ROM disc 101 is suspended. Therefore, the accumulated data amount DA1 in the first read buffer 4221 decreases at the left-view transfer rate $R_{ext1-3D}[n]$, and the accumulated data amount DA2 in the second read buffer 4222 decreases at the depth map transfer rate $R_{ext3}[n]$ The accumulated data amount in the second read buffer 4222 during the (2n−1)$^{th}$ read period PR$_D$n, i.e. the size $S_{ext3}[n]$ of the n$^{th}$ depth map extent Dn, is at least equivalent to the data amount transferred from the second read buffer 4222 to the system target decoder 4203 from the $(2n-1)^{th}$ read period $PR_D n$ through the $n^{th}$ zero sector transition period $PJ_0 n$. Accordingly, at the end of the $n^{th}$ zero sector transition period $PJ_0 n$, as shown in FIG. 54B, the accumulated data amount DA2 in the second read buffer 4222 does not fall below the second buffer margin amount UL2.

At the point the $n^{th}$ zero sector transition period $PJ_0 n$ ends, the $(2n+1)^{th}$ read period $PR_D(n+1)$ begins. During the $(2n+1)^{th}$ read period $PR_D(n+1)$, the $(n+1)^{th}$ depth map extent $D(n+1)$ is read from the BD-ROM disc 101 and output to the second read buffer 4222. Accordingly, as shown in FIG. 54A, the accumulated data amount DA1 in the first read buffer 4221 continues to decrease at the left-view transfer rate $R_{ext1-3D}[n]$ Conversely, as shown in FIG. 54B, the accumulated data amount DA2 in the second read buffer 4222 increases at a rate equivalent to the difference between the 3D video image read rate $R_{ud-3D}$ and the depth map transfer rate $R_{ext3}[n+1]$, or $R_{ud-3D} - R_{ext3}[n+1]$.

When the end of the $(n+1)^{th}$ depth map extent $D(n+1)$ is read, the $(n+1)^{th}$ jump $J_{LD}(n+1)$ occurs. During the $(n+1)^{th}$ jump period $PJ_{LD}(n+1)$, reading of the right-view extent $R(n+1)$ located immediately after the $(n+1)^{th}$ depth map extent $D(n+1)$ is skipped, and thus reading of data from the BD-ROM disc 101 is suspended. Therefore, during the $(n+1)^{th}$ jump period $PJ_{LD}(n+1)$, the accumulated data amount DA1 in the first read buffer 4221 decreases at the left-view transfer rate $R_{ext1-3D}[n]$, and the accumulated data amount DA2 in the second read buffer 4222 decreases at the depth map transfer rate $R_{ext3}[n+1]$.

At the point the $(n+1)^{th}$ jump period $PJ_{LD}(n+1)$ ends, the $(2n+2)^{th}$ read period $PR_L(n+1)$ begins. During the $(2n+2)^{th}$ read period $PR_L(n+1)$, the $(n+1)^{th}$ left-view extent $L(n+1)$ is read from the BD-ROM disc 101 and output to the first read buffer 4221. Accordingly, as shown in FIG. 54A, the accumulated data amount DA1 in the first read buffer 4221 increases at a rate equivalent to the difference between the 3D video image read rate $R_{ud-3D}$ and the left-view transfer rate $R_{ext1-3D}[n+1]$, or $R_{ud-3D} - R_{ext1-3D}[n+1]$. Conversely, as shown in FIG. 54B, the accumulated data amount DA2 in the second read buffer 4222 continues to decrease at the depth map transfer rate $R_{ext3}[n+1]$.

The accumulated data amount in the first read buffer 4221 during the $2n^{th}$ read period $PR_L n$, i.e. the size $S_{ext1}[n]$ of the $n^{th}$ left-view extent Ln, is at least equivalent to the data amount transferred from the first read buffer 4221 to the system target decoder 4203 from the $2n^{th}$ read period $PR_L n$ through the $(n+1)^{th}$ jump period $PJ_{LD}(n+1)$. Accordingly, at the end of the $(n+1)^{th}$ jump period $PJ_{LD}(n+1)$, as shown in FIG. 54A, the accumulated data amount DA1 in the first read buffer 4221 does not fall below the first buffer margin amount UL1.

The above-described change of the accumulated data amounts DA1 and DA2 is similar for each extent after the $(n+2)^{th}$ extents. Accordingly, in order to play back 3D video images seamlessly from the depth map extents Dn, $D(n+1)$, etc. and the left-view extents Ln, $L(n+1)$, etc., regardless of jumps between them, the following two conditions need to be fulfilled.

The first condition is that the size $S_{ext1}[n]$ of the $n^{th}$ left-view extent Ln should be equivalent to the data amount transferred from the first read buffer 4221 to the system target decoder 4203 from the $2n^{th}$ read period $PR_L n$ through the $(n+1)^{th}$ jump period $PJ_{LD}(n+1)$. Here, the length of the $2n^{th}$ read period $PR_L n$ is equivalent to the size $S_{ext1}[n]$ of the $n^{th}$ left-view extent Ln divided by the 3D video image read rate $R_{ud-3D}$, or $S_{ext1}[n]/R_{ud-3D}$. The length of the $(2n+1)^{th}$ read period $PR_D(n+1)$ is equivalent to the size $S_{ext3}[n+1]$ of the $(n+1)^{th}$ depth map extent $D(n+1)$ divided by the 3D video image read rate $R_{ud-3D}$, or $S_{ext3}[n+1]/R_{ud-3D}$. Accordingly, the size $S_{ext1}[n]$ of the $n^{th}$ left-view extent Ln is at least equivalent to the smallest extent size represented by the right-hand side of Equation 7.

$$S_{ext1}[n] \geq \qquad \text{Equation 7}$$

$$\left( \frac{S_{ext1}[n]}{R_{ud-3D}} + T_{jump-0}[n] + \frac{S_{ext3}[n+1]}{R_{ud-3D}} + T_{jump-3D}[n+1] \right) \times R_{ext1}[n]$$

$$\therefore S_{ext1}[n] \geq CEI \left\{ L \frac{R_{ext1}[n]}{8} \times \frac{R_{ud-3D}}{R_{ud-3D} - R_{ext1}[n]} \times \left( T_{jump-0}[n] + \frac{S_{ext3}[n+1]}{R_{ud-3D}} + T_{jump-3D}[n+1] \right) \right\}$$

The second condition is that the size $S_{ext3}[n]$ of the $n^{th}$ depth map extent Dn should be at least equivalent to the data amount transferred from the second read buffer 4222 to the system target decoder 4203 from the $(2n-1)^{th}$ read period $PR_D n$ through the $n^{th}$ zero sector transition period $PJ_0 n$. Here, the length of the $(2n-1)^{th}$ read period $PR_D n$ is equivalent to the size $S_{ext3}[n]$ of the $n^{th}$ depth map extent Dn divided by the 3D video image read rate $R_{ud-3D}$, or $S_{ext3}[n]/R_{ud-3D}$. Accordingly, the size $S_{ext3}[n]$ of the $n^{th}$ depth map extent Dn is at least equivalent to the smallest extent size represented by the right-hand side of Equation 8.

$$S_{ext3}[n] \geq \qquad \text{Equation 8}$$

$$\left( \frac{S_{ext3}[n]}{R_{ud-3D}} + T_{jump-3D}[n] + \frac{S_{ext1}[n]}{R_{ud-3D}} + T_{jump-0}[n] \right) \times R_{ext3}[n]$$

$$\therefore S_{ext3}[n] \geq CEI \left\{ L \frac{R_{ext3}[n]}{8} \times \frac{R_{ud-3D}}{R_{ud-3D} - R_{ext3}[n]} \times \left( T_{jump-3D}[n] + \frac{S_{ext1}[n]}{R_{ud-3D}} + T_{jump-0}[n] \right) \right\}$$

In Equations 7 and 8, the jump time $T_{jump-3D}[n]$ expresses the length of the jump period $PJ_{LD} n$ from the end of the $n^{th}$ depth map extent Dn to the top of the $n^{th}$ left-view extent Ln in seconds. More specifically, the jump time $T_{jump-3D}[n]$ is equivalent to the value assigned to the number of sectors, i.e. the jump distance, from the end of the $n^{th}$ depth map extent Dn to the top of the $n^{th}$ left-view extent Ln as per the regulation shown in FIG. 24.

When there is no layer boundary LB between the $n^{th}$ left-view extent Ln and the $(n+1)^{th}$ depth map extent $D(n+1)$, the zero sector transition time $T_{jump-0}[n]$ is equivalent to a defined value that is evaluated only on the time actually required for a zero sector transition. On the other hand, when there is a layer boundary LB between the $n^{th}$ left-view extent Ln and the $(n+1)^{th}$ depth map extent $D(n+1)$, then the zero sector transition time $T_{jump-0}[n]$ is replaced by the jump time necessary to skip the layer boundary LB. This jump time is longer than the value associated with the number of sectors between the $n^{th}$ left-view extent Ln and the $(n+1)^{th}$ depth map extent $D(n+1)$, as per the regulation shown in FIG. 24, by the time for switching layers, i.e. 350 ms.

To enable seamless playback of 2D video images, 3D video images in L/R mode, and 3D video images in depth mode from the extent groups shown in FIG. 49, the size of each extent needs to fulfill Equations 4-8 above. In particular, the size of the smallest extent in the 2D/left-view stream file needs to be equivalent to the largest value among the values corresponding to the right-hand side of Equations 4, 5, and 7.

<<Conditions on Arrangement of Extents when Only Using L/R Mode for 3D Video Image Playback>>

Figure 55:
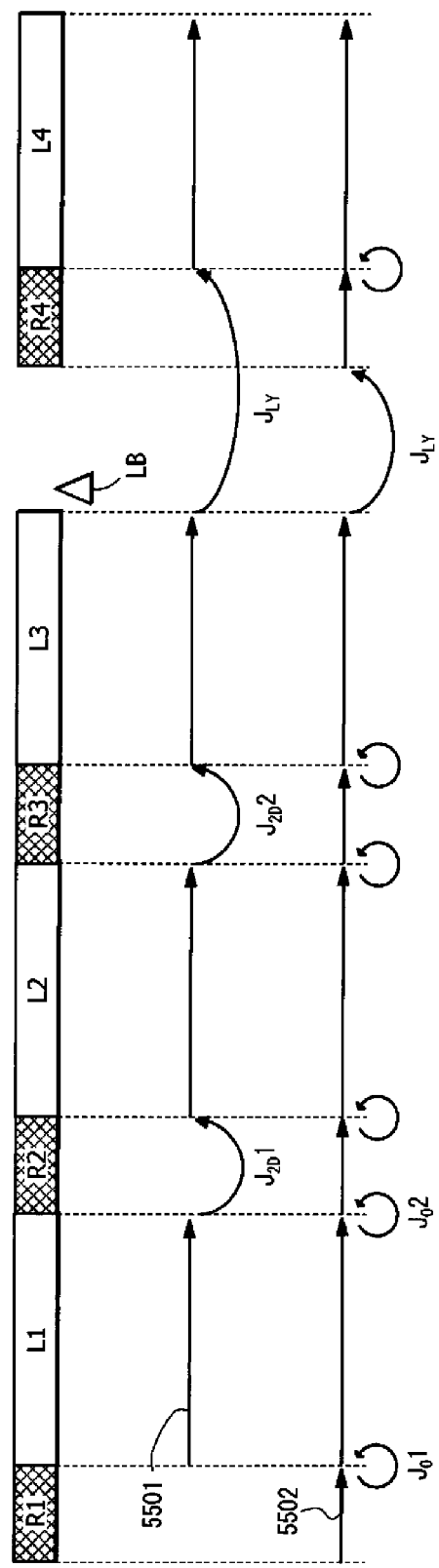
FIG. 55 is a schematic diagram showing the arrangement of extent groups belonging to each file when only two types of files, a 2D/left-view stream file and a right-view stream file, are recorded on a BD-ROM disc.

When only L/R mode is used for 3D video playback, the depth map extents may be removed from the arrangement in FIG. 49. FIG. 55 is a schematic diagram showing the arrangement of extent groups belonging to each file when only two types of files, a 2D/left-view stream file and a right-view stream file, are recorded on a BD-ROM disc. As shown in FIG. 55, these two types of extent groups are recorded in an interleaved arrangement. In this interleaved arrangement, sections of each AV stream file with matching playback periods are included individually in two consecutive extents. In particular, between these extents, the playback times of the video streams are equivalent. For example, the top right-view extent R1 and the top left-view extent L1 are consecutive, their playback periods match, and the playback time of the video streams is equivalent. The conditions for extent sizes required to make seamless 2D video playback and seamless 3D video playback compatible are determined for this arrangement in the same way as in the arrangement shown in FIG. 49.

First, in 2D video playback processing, only the left-view extents L1, L2, etc. are read in accordance with the playback path 5501 shown in FIG. 55, and reading of the right-view extents R1, R2, etc. is skipped by jumps $J_{2D}1$, $J_{2D}2$, etc. Here, the extent groups shown in FIG. 55 do not include depth map extents, unlike the extent groups shown in FIG. 49. Accordingly, the playback path 5501 for 2D video images differs from the playback path 4901 for 2D video images shown in FIG. 49 only in the jump distance between the $n^{th}$ and $(n+1)^{th}$ left-view extents Ln and L(n+1) (an integer n is equal to or greater than two). Accordingly, for seamless 2D video playback, the size $S_{ext1}[n]$ of the $n^{th}$ left-view extent Ln should fulfill Equation 4.

Next, in playback processing of 3D video images, the right-view extents R1, R2, etc. and the left-view extents L1, L2, etc. are read in order from the top in accordance with the playback path 5502 shown in FIG. 55. The extent groups shown in FIG. 55 do not include depth map extents, unlike the extent groups shown in FIG. 49. Accordingly, the playback path 5502 for 3D video images differs from the playback path 4902 for 3D video images in L/R mode shown in FIG. 49 in that a jump $J_{LR}n$ does not occur immediately after each left-view extent. Instead, only a zero sector transition $J_0n$ occurs (n=1, 2, etc.). Therefore, for 3D video images to be played back seamlessly, the size $S_{ext1}[n]$ of the $n^{th}$ left-view extent Ln should fulfill Equation 9 below instead of Equation 5, and the size $S_{ext2}[n]$ of the $n^{th}$ right-view extent Rn should fulfill Equation 10 below instead of Equation 6. Both Equations 9 and 10 are equivalent to Equations 5 and 6, replacing the jump time $T_{jump-3D}$ with the zero sector transition time $T_{jump-0}$.

$$S_{ext1}[n] \geq CEI\left\{L\frac{R_{ext1}[n]}{8} \times \frac{R_{ud-3D}}{R_{ud-3D} - R_{ext1}[n]} \times \left(T_{jump-0}[n] + \frac{S_{ext2}[n+1]}{R_{ud-3D}} + T_{jump-0}[n+1]\right)\right\}$$ Equation 9

$$S_{ext2}[n] \geq CEI\left\{L\frac{R_{ext2}[n]}{8} \times \frac{R_{ud-3D}}{R_{ud-3D} - R_{ext2}[n]} \times \left(T_{jump-0}[n] + \frac{S_{ext1}[n]}{R_{ud-3D}} + T_{jump-0}[n]\right)\right\}$$ Equation 10

Accordingly, the size of the smallest extent in the 2D/left-view stream file is equivalent to the larger of the values corresponding to the right-hand side of Equations 4 and 9.

Note that when the consecutive extents shown in FIG. 55 are read continuously by the BD-ROM drive 4201, the zero sector transition time $T_{jump-0}[n]$ in Equations 9 and 10 can be considered to be zero. In other words, the size $S_{ext1}[n]$ of the $n^{th}$ left-view extent Ln and the size $S_{ext2}[n]$ of the $n^{th}$ right-view extent Rn should fulfill the following equations.

$$S_{ext1}[n] \geq CEI\left\{L\frac{R_{ext1}[n]}{8} \times \frac{R_{ud-3D}}{R_{ud-3D} - R_{ext1}[n]} \times \frac{S_{ext2}[n+1]}{R_{ud-3D}}\right\},$$

$$S_{ext2}[n] \geq CEI\left\{L\frac{R_{ext2}[n]}{8} \times \frac{R_{ud-3D}}{R_{ud-3D} - R_{ext2}[n]} \times \frac{S_{ext1}[n]}{R_{ud-3D}}\right\}$$

<<Read Buffer Margin Amounts>>

The lower limits UL1 and UL2 for the accumulated data amounts DA1 and DA2 in the read buffers 4221 and 4222 shown in FIGS. 53A-C and 54A-C represent the buffer margin amount for each buffer. The "buffer margin amounts" refer to the lower limit of the accumulated data amount that should be maintained in each of the read buffers 4221 and 4222 in order to prevent underfloor, which is caused during the reading of an AV stream file mainly when the recording layer to be read is switched, or when reading is interrupted by the read process of another file. Here, the term "another file" means a file other than the AV stream file shown in FIG. 2, and for example includes the movie object file 242B, the BD-J object file 246A, and the JAR file 247A.

Figure 56:
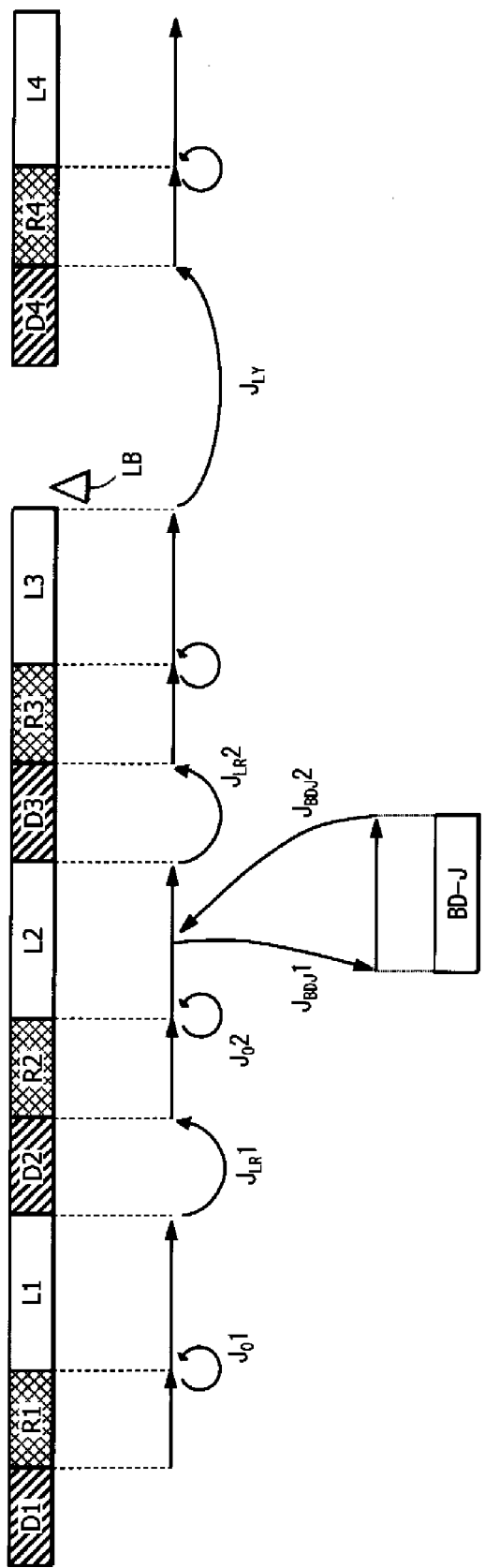
FIG. 56 is a schematic diagram showing (i) a jump $J_{LY}$ caused by layer switching occurring during the playback path of 3D video images in L/R mode and (ii) an object $J_{BDJ}$ caused by the read process of the BD-J object file.

FIG. 56 is a schematic diagram showing (i) a jump $J_{LY}$ caused by layer switching occurring during the playback path of 3D video images in L/R mode and (ii) an object $J_{BDJ}$ caused by the read process of the BD-J object file 246A. The buffer margin amounts UL1 and UL2 necessary for the jumps $J_{LY}$ and $J_{BDJ}$ are calculated as follows.

For the jump $J_{LY}$ caused by switching layers, the maximum jump time $T_{jump-LY}$ is equivalent to the sum of the jump distance as per the regulation shown in FIG. 24 and the layer switching time. The jump distance is the value associated with the number of sectors between the extents Ln and D(n+1) on either side of the layer boundary LB. As per Equation 2, the left-view transfer rate $R_{ext1-3D}$ does not exceed the maximum value $R_{max1-3D}$. Accordingly, the data amount that is consumed from the first read buffer 4221 during the jump period caused by layer switching does not exceed the product of the left-view transfer rate $R_{ext1-3D}$ and the maximum jump time $T_{jump-LY}$. The value of this product is determined to be the first buffer margin amount UL1. In other words, the first buffer margin amount UL1 is calculated by Equation 11.

$$UL1 = CEI\left(L\frac{R_{max1-3D}}{8} \times T_{jump-LY}\right)$$ Equation 11

For example, when the maximum jump distance is 40000 sectors, as per the regulation shown in FIG. 24, the maximum jump time $T_{jump-LY}$ is 700 ms, which includes the layer switching time of 350 ms. Accordingly, when the system rate corresponding to the 2D/left-view stream file is 48 Mbps, the first buffer margin amount UL1 is equivalent to (48 Mbps× 192/188)×0.7 seconds=approximately 4.09 MB.

Similarly, the maximum value of the data amount that is consumed from the second read buffer 4222 during the jump period caused by layer switching, i.e. the product of the maximum value $R_{max2}$ of the right-view transfer rate and the maximum jump time $T_{jump-LY}$, is determined to be the second buffer margin amount UL2. In other words, the second buffer margin amount UL2 is calculated in Equation 12.

$$UL2 = CEI\left(L\frac{R_{max2}}{8} \times T_{jump-LY}\right)$$  Equation 12

For example, when the maximum jump distance is 40000 sectors, meaning that the maximum jump time $T_{jump-LY}$ is 700 ms, and when the system rate corresponding to the right-view stream file is 16 Mbps, the second buffer margin amount UL2 is equivalent to (16 Mbps×192/188)×0.7 seconds= approximately 1.36 MB.

When a read process of the BD-J object file 246A interrupts the read period of the AV stream file, as shown in FIG. 56, a first jump $J_{BDJ}1$ occurs. In this way, the position of the read target shifts from the recording area of the $(n-1)^{th}$ left-view extent L (n-1) to the recording area of the BD-J object file 246A. The corresponding jump time $T_{BDJ}$ is set to a predetermined fixed value, e.g. 900 ms. Next, the BD-J object file 246A is read. The time required for reading is equivalent to eight times the size $S_{BDJ}$ of the extent belonging to the file 246A in bytes divided by the 3D video image read rate $R_{ud-3D}$, or $8 \times S_{BDJ}[n]/R_{ud-3D}$. Next, a second jump $J_{BDJ}2$ occurs. In this way, the position of the read target returns from the recording area of the BD-J object file 246A back to the recording area of the $(n-1)^{th}$ left-view extent L(n-1). The corresponding jump time $T_{BDJ}$ is equivalent to the first jump period, e.g. 900 ms. During the two jumps $J_{BDJ}1$ and $J_{BDJ}2$ and the reading of the BD-J object file 246A, data is not read into the first read buffer 4221. Accordingly, the maximum value of the amount of data that is consumed from the first read buffer 4221 during this time is determined to be the first read buffer margin amount UL1. In other words, the first read buffer margin amount UL1 is calculated in Equation 13.

$$UL1 = CEI\left(L\frac{R_{max1-3D}}{8} \times \left(2 \times T_{BDJ} + \frac{8 \times S_{BDJ}}{R_{ud-3D}}\right)\right)$$  Equation 13

Similarly, the maximum value of the amount of data that is consumed from the second read buffer 4222 during the two jumps $J_{BDJ}1$ and $J_{BDJ}2$ and the reading of the BD-J object file 246A is determined to be the second read buffer margin amount UL2. In other words, the second buffer margin amount UL2 is calculated in Equation 14.

$$UL2 = CEI\left(L\frac{R_{max2}}{8} \times \left(2 \times T_{BDJ} + \frac{8 \times S_{BDJ}}{R_{ud-3D}}\right)\right)$$  Equation 14

The first buffer margin amount UL1 is set to the larger of the values corresponding to the right-hand side of Equations 11 and 13. The second buffer margin amount UL2 is set to the larger of the values corresponding to the right-hand side of Equations 12 and 14.

<<Guaranteeing Buffer Margin Amounts by Using a Margin Time>>

The buffer margin amounts UL1 and UL2 are guaranteed in the following way. First, a margin time is added to the zero sector transition time $T_{jump-0}[n]$ substituted into Equations 5-8. The margin time is, for example, 100 ms. In this way, since the minimum extent size is enlarged, the accumulated data amounts DA1 and DA2 in the read buffers 4221 and 4222 increase by a predetermined amount each time a pair of a base-view extent and a dependent-view extent is decoded, unlike the change shown in FIGS. 53 and 54. Accordingly, by reading a certain number of extents into the read buffers 4221 and 4222, the buffer margin amounts UL1 and UL2 are guaranteed.

Figure 57:
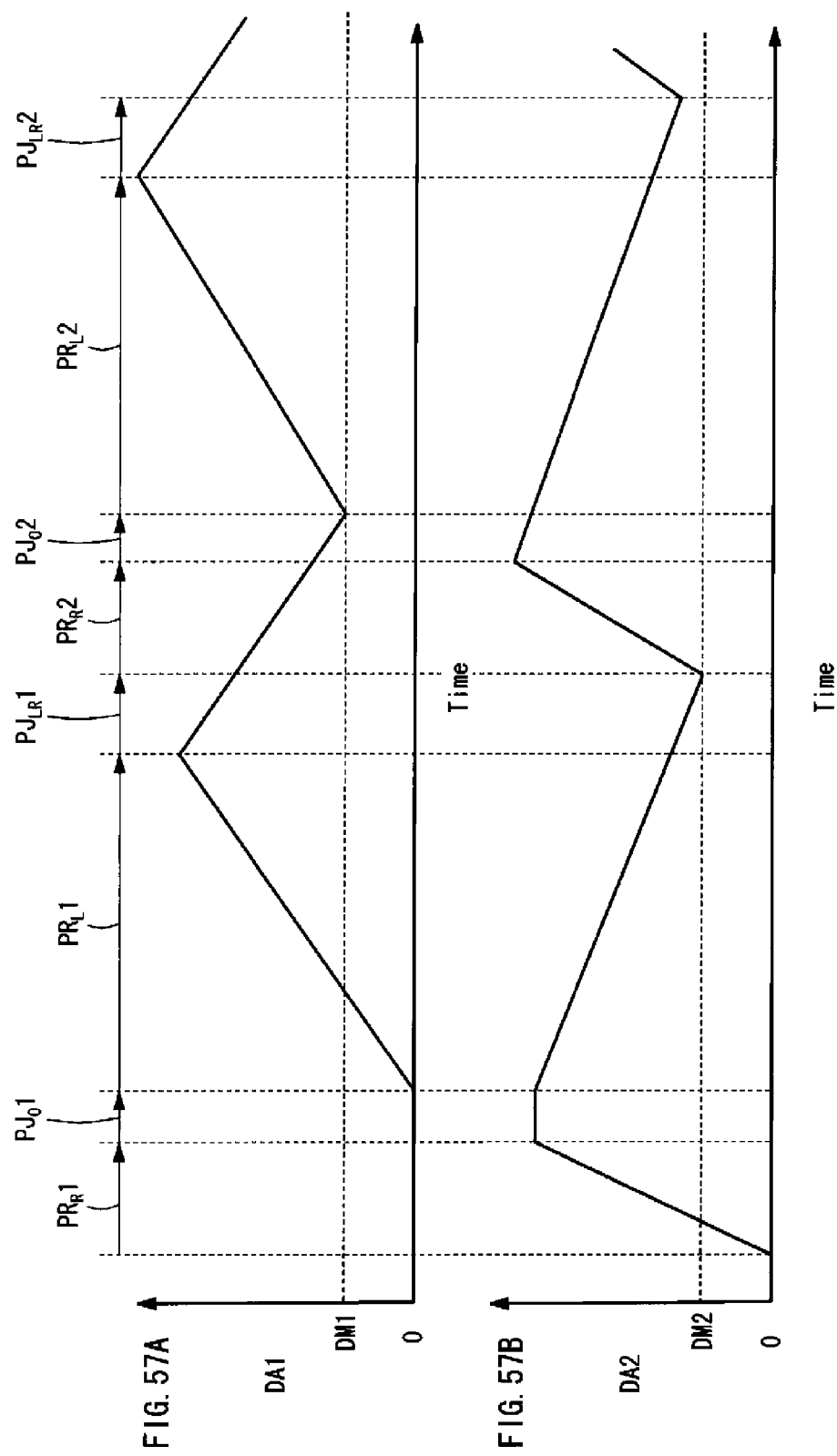
FIGS. 57A and 57B are graphs showing the change of the accumulated data amount in each read buffer when a margin time is added to the zero sector transition time.

FIGS. 57A and 57B are graphs showing the change of the accumulated data amounts DA1 and DA2 in the read buffers 4221 and 4222 when a margin time is added to the zero sector transition time. In the following explanation, 3D video images are assumed to be played back in L/R mode from the top of the extent groups shown in FIG. 49. This explanation is also applicable when 3D video images are played back in depth mode and when 3D video images are played back from an arbitrary extent via interrupt playback.

First, during the first read period $PR_R1$, the top right-view extent R1 is read from the BD-ROM disc 101 and output to the second read buffer 4222. Meanwhile, the system target decoder 4203 is placed on standby. Accordingly, in the first read period $PR_R1$, as shown in FIG. 57B, the accumulated data amount DA2 in the second read buffer 4222 increases from 0 at the 3D video image read rate $R_{ud-3D}$.

When the end of the top right-view extent R1 is read, the first zero sector transition $J_0 1$ occurs. During the first zero sector transition period $PJ_0 1$, reading of data from the BD-ROM disc 101 is suspended. Meanwhile, the system target decoder 4203 continues on stand-by. Therefore, during the first zero sector transition period $PJ_0 1$, the accumulated data amount DA1 in the first read buffer 4221 and the accumulated data amount DA2 in the second read buffer 4222 are both maintained constant.

At the point the first zero sector transition period $PJ_0 1$ ends, the second read period $PR_L 1$ begins. During the second read period $PR_L 1$, the top left-view extent L1 is read from the BD-ROM disc 101 and output to the first read buffer 4221. Meanwhile, the system target decoder 4203 beings the decoding process in the second read period $PR_L 1$. Accordingly, as shown in FIG. 57A, the accumulated data amount DA1 in the first read buffer 4221 increases from 0 at a rate equivalent to the difference between the 3D video image read rate $R_{ud-3D}$ and the left-view transfer rate $R_{ext1-3D}[1]$, or $R_{ud-3D}-R_{ext1-3D}[1]$. Conversely, as shown in FIG. 57B, the accumulated data amount DA2 in the second read buffer 4222 decreases at the right-view transfer rate $R_{ext2}[1]$.

When the end of the top left-view extent L1 is read, the first jump $J_{LR}1$ occurs. During the first jump period $PJ_{LR}1$, reading of the second depth map extent D2 located immediately after the top left-view extent L1 is skipped, and thus reading of data from the BD-ROM disc 101 is suspended. Therefore, during the first jump period $PJ_{LR}1$, as shown in FIG. 57A, the accumulated data amount DA1 in the first read buffer 4221 decreases at the left-view transfer rate $R_{ext1-3D}[1]$, whereas, as shown in FIG. 57B, the accumulated data amount DA2 in the second read buffer 4222 decreases at the right-view transfer rate $R_{ext2}[1]$.

The accumulated data amount in the second read buffer 4222 during the first read period $PR_R1$, i.e. the size $S_{ext2}[1]$ of the top right-view extent R1, is at least equivalent to the smallest extent size expressed by the right-hand side of Equation 6. Here, a margin time, e.g. 100 ms, is added to the zero sector transition time $T_{jump-0}[1]$. Furthermore, during the first read period $PR_R1$, data is not transferred from the second read buffer 4222 to the system target decoder 4203. Accordingly, the size $S_{ext2}[1]$ of the top right-view extent R1 is larger than the data amount transferred from the second read buffer 4222 to the system target decoder 4203 from the second read period $PR_L 1$ through the first jump period $PJ_{LR}1$. As a result, at the end of the first jump period $PJ_{LR}1$, as shown in FIG. 57B, the accumulated data amount DA2 in the second read buffer 4222 increases to a value DM2 larger than zero. This value DM2 is evaluated as the product of the maximum value $R_{max2}$ of the right-view transfer rate multiplied by a margin time, e.g. 100 ms: $DM2=R_{max2} \times T_{jump-0}[1]$ At the point the first jump period $PJ_{LR}1$ ends, the third read period $PR_R2$ begins. During the third read period $PR_R2$, the second right-view extent R2 is read from the BD-ROM disc 101 and output to the second read buffer 4222. Accordingly, as shown in FIG. 57B, the accumulated data amount DA2 in the second read buffer 4222 increases at a rate equivalent to the difference between the 3D video image read rate $R_{ud-3D}$ and the right-view transfer rate $R_{ext2}[2]$, or $R_{ud-3D}-R_{ext2}[2]$. Conversely, as shown in FIG. 57A, the accumulated data amount DA1 in the first read buffer 4221 continues to decrease at the left-view transfer rate $R_{ext1-3D}[1]$ When the end of the second right-view extent R2 is read, the second zero sector transition $J_O2$ occurs. During the second zero sector transition period $PJ_O2$, reading of data from the BD-ROM disc 101 is suspended. Therefore, the accumulated data amount DA1 in the first read buffer 4221 decreases at the left-view transfer rate $R_{ext1-3D}[2]$ and the accumulated data amount DA2 in the second read buffer 4222 decreases at the right-view transfer rate $R_{ext2}[2]$.

The accumulated data amount in the first read buffer 4221 during the second read period $PR_L1$, i.e. the size $S_{ext1}[1]$ of the top left-view extent L1, is at least equivalent to the smallest extent size expressed by the right-hand side of Equation 5. Here, a margin time, e.g. 100 ms, is added to the zero sector transition time $T_{jump-0}[2]$. Accordingly, the size $S_{ext1}[1]$ of the top left-view extent L1 is larger than the data amount transferred from the first read buffer 4221 to the system target decoder 4203 from the second read period $PR_L1$ through the second zero sector transition period $PJ_O2$. As a result, at the end of the second zero sector transition period $PJ_O2$, as shown in FIG. 57A, the accumulated data amount DA1 in the first read buffer 4221 increases to a value DM1 larger than zero. This value DM1 is evaluated as the product of the maximum value $R_{max1-3D}$ of the left-view transfer rate multiplied by a margin time, e.g. 100 ms: $DM1=R_{max1-3D} \times T_{jump-0}[2]$.

By repeating the above-described process, each time a pair of a left-view extent and a right-view extent are read into the read buffers 4221 and 4222, the accumulated data amounts DA1 and DA2 in the read buffers 4221 and 4222 increase by the values DM1 and DM2. Accordingly, once a certain number of extents have been read into the read buffers 4221 and 4222, the buffer margin amounts UL1 and UL2 are guaranteed. For example, when the margin time is 100 ms, in order to guarantee the buffer margin amounts UL1 and UL2 required to prevent underfloor caused by a 700 ms jump, the above-described process should be repeated 700 ms/100 ms=seven times.

Conversely, as long as no large jump occurs, the accumulated data amounts DA1 and DA2 in the read buffers 4221 and 4222 continue to increase by values DM1 and DM2. Therefore, when the accumulated data amounts DA1 and DA2 exceed a predetermined threshold, the 3D playback device interrupts the read/transfer operation of the BD-ROM drive 4201. In this way, the 3D video image read rate $R_{ud-3D}$ decreases, and thus the rate of increase of the accumulated data amounts DA1 and DA2 is held down. Overflow in the read buffers 4221 and 4222 can thus be avoided.

<<Minimum Capacity of Read Buffers>>

When the arrangement on the BD-ROM disc 101 of the extents belonging to the AV stream file is as described above, the minimum values of the capacities required for the read buffers 4221 and 4222 are calculated as follows.

When playing back 3D video images in either L/R mode or depth mode, in order to read the $n^{th}$ left-view extent Ln, the capacity RB1[$n$] of the first read buffer 4221 should fulfill Equation 15.

$$RB1[n] \geq CEI\left(LUL1 + \frac{R_{ud-3D} - R_{max1-3D}[n]}{8} \times \frac{S_{ext1}[n]}{R_{ud-3D}}\right) \quad \text{Equation 15}$$

On the other hand, when playing back 3D video images in L/R mode, in order to read the $n^{th}$ right-view extent Rn, the capacity $RB2_{LR}[n]$ of the second read buffer 4222 should fulfill Equation 16.

$$RB2_{LR}[n] \geq$$
$$\max\left\{CEI\left(LUL2 + \frac{R_{ud-3D} - R_{max2}}{8} \times \frac{S_{ext1}[n]}{R_{ud-3D}}\right), S_{ext2}[n]\right\} \quad \text{Equation 16}$$

Here, any of the right-view extents may be read first by interrupt playback. In that case, as shown in FIG. 57B, the system target decoder 4203 does not read data from the second read buffer 4222 until the entire right-view extent is stored in the second read buffer 4222. Accordingly, unlike the capacity RB1[$n$] of the first read buffer 4221, the capacity $RB2_{LR}[n]$ of the second read buffer 4222 needs to further fulfill the condition of being "at least larger than the size $S_{ext2}[n]$ of the $n^{th}$ right-view extent Rn."

When playing back 3D video images in depth mode, in order to read the $n^{th}$ depth map extent Dn, the capacity $RB2_{LD}[n]$ of the second read buffer 4222 should fulfill Equation 17.

$$RB2_{LD}[n] \geq$$
$$\max\left\{CEI\left(LUL2 + \frac{R_{ud-3D} - R_{max3}}{8} \times \frac{S_{ext3}[n]}{R_{ud-3D}}\right), S_{ext3}[n]\right\} \quad \text{Equation 17}$$

Similar to the right-view extents, any of the depth map extents may be read first by interrupt playback. Accordingly, the capacity $RB2_{LD}[n]$ of the second read buffer 4222 needs to further fulfill the condition of being "at least larger than the size $S_{ext3}[n]$ of the $n^{th}$ depth map extent Dn."

The minimum values of the sizes of the base-view extents and dependent-view extents on the BD-ROM disc 101 in Embodiment 1 of the present invention are clearly expressed by the right-hand side of Equations 4, 5, and 6. As a result, underfloor does not occur in either of the read buffers 4221 and 4222 during playback of either 2D video images or 3D video images from the BD-ROM disc, and it is easy to appropriately set the size of extents to further reduce the capacities of the buffers.

<Other Modifications>

(1) Embodiment 1 of the present invention pertains to the arrangement of extents when storing 3D video images on a recording medium. However, the present invention can also be used for storage of high frame rate video on a recording medium. Specifically, for example the high frame rate video can be divided into an odd-numbered frame group and an even-numbered frame group, which can be considered as a base-view stream and a dependent-view stream and recorded on a recording medium with the arrangement of extents as described in Embodiment 1. A playback device that only supports video playback at a normal frame rate can play back video for the odd-numbered frame group from the recording medium. Conversely, a playback device that supports video playback at a high frame rate can choose to play back video for only the odd-numbered frame group or video for both frame groups. In this way, compatibility with a playback device that only supports video playback at a normal frame rate can be ensured on a recording medium on which a high frame rate video is stored.

(2) Embodiment 1 of the present invention assumes that the left-view stream is the base-view stream. However, the right-view stream may also be the base-view stream. In this case, the left-view stream can be compressed as a dependent-view stream using the right-view stream.

(3) In order to accurately calculate the extent ATC time when the mean transfer rate $R_{ext}$ of data from the read buffer 1802 to the system target decoder 1803, as shown in FIG. 22, is evaluated, the size of each extent can be regulated as a fixed multiple of the source packet length. Furthermore, when a particular extent includes more source packets than this multiple, the sum of (i) the product of the number of source packets exceeding the multiple and the transfer time per source packet and (ii) the extent ATC time corresponding to the multiple can be considered to be the extent ATC time for the particular extent. Additionally, the extent ATC time can be defined as the sum of (iii) the value of the time interval from the ATS of the top source packet in an extent until the ATS of the last source packet in the same extent and (iv) the transfer time per source packet. In this case, reference to the next extent is unnecessary for calculation of the extent ATC time, and thus the calculation can be simplified. Note that in the above-described calculation of extent ATC time, the occurrence of wraparound in the ATS needs to be taken into consideration.

(4) As shown in FIGS. 35A and 35B, a pair of pictures belonging to the same 3D video image access unit have the same PTS and the same DTS. Additionally, the PTS and DTS allocated to one picture in one of the pairs of pictures may be later than the PTS and DTS allocated to the other picture by a predetermined amount, e.g. a half cycle. In this case, the switch 4310 shown in FIG. 43 would output the 2D/left video plane data 4301 and the right video plane data 4302 to the first adder 4311 in order of PTSs. Furthermore, the buffer switch 4606 shown in FIG. 46 would transfer video access units accumulated in the EB(1) 4603 and the EB(2) 4610 respectively to the compressed video decoder 4604 in accordance with the times of DTSs shown by original TS packets.

(5) Among the stream attribute information 3821 in the dependent-view clip information file 3802 shown in FIG. 38B, the video stream attribute information regarding the dependent-view stream may have an additional flag indicating that reference to the base-view stream is necessary for decoding of the dependent-view stream. Furthermore, the identification information for the AV stream file that includes the base-view stream may also be added to the video stream attribute information. In this case, when verifying whether or not the data that is to be recorded on the disc 101 has been created according to a specified format during the authoring process of the BD-ROM disc 101, the suitability of the correspondence between the base-view stream and the dependent-view stream can be assessed using the above-described additional information.

(6) The 3D meta data 3814 shown in FIG. 39A can be set, for example, for each plane, unlike the setting for each PID as shown in the figure. In this way, the 3D playback device can simplify analysis of the 3D meta data. Additionally, taking into consideration the performance of the 3D playback device with regards to the plane combining process, a condition of being, for example, one second or longer may be placed on the length of the valid section of the offset entry.

(7) In the example shown in FIG. 40A, an extent start flag 4015 is newly added to each entry point 4012. Additionally, the one bit area reserved in each entry point 4012 for an angle switching flag may be used as the area for the extent start flag 4015. Here, the "angle switching flag" is a flag indicating whether or not the entry point has been set at a position in which the angle can be changed when the AV stream file is expressed as multi-angle video images. By using this one bit area as both an "angle switching flag" and an "extent start flag," the total bit volume in the entry map 3823 can be reduced. In this case, another flag indicating whether the one bit area is being used as an area for either flag can be newly added to the entry map header 4011. By checking this flag, the 3D playback device can promptly interpret the above-described one bit area. Accordingly, the 3D playback device can promptly switch between playback processing of multi-angle video images and playback processing of 3D video images.

(8) Unlike the example shown in FIG. 40A, information other than the extent start flag 4015 can be used for determining the size of extents belonging to an AV stream file. For example, a list of the size of each extent can be stored in the clip information file as meta data. Additionally, a plurality of bits associated on a one-to-one basis with the entry points in the entry map may be stored apart from the entry map. Each bit is set to "1" only when the corresponding entry point is set to the top of an extent.

(9) In the interleaved arrangement shown in FIG. 49, the three types of extents Dn, Rn, and Ln, which have matching playback periods, preferably all have the same extent ATC time. In other words, each of the extents has the same difference in ATS from the top source packet in the extent to the top source packet in the next extent. In this case, in the same time measured by the ATC, the first source depacketizer 4611 fetches TS packets from all of the source packets in the base-view extent Ln and outputs them to the first PID filter 4613, and the second source depacketizer 4612 fetches TS packets from all of the source packets in the dependent-view extent Dn or Rn and outputs them to the second PID filter 4614. Accordingly, in particular during interrupt playback, the 3D video decoder 4615 can easily synchronize decoding processing of TS packets between the base-view stream and the dependent-view stream.

(10) The extent groups shown in FIG. 49 may include, instead of the depth map stream, two or more different right-view streams. In this case, the extents belonging to each stream would be arranged alternately on the track on the BD-ROM disc 101 similarly to the interleaved arrangement shown in FIG. 49. Furthermore, the size of each extent would fulfill conditions similar to Equations 4-8. Specific details are as follows.

First, for a shared base-view stream file, it is assumed that N types of dependent-view stream files 1-N are recorded. Here, an integer N is two or greater. In this case, a plurality of base-view extents and a plurality of dependent-view extents belonging to the $(k-1)^{th}$ dependent-view stream file (k=2, 3, 4 . . . N+1) are alternately arranged one by one on the BD-ROM disc 101. In particular, similar to the interleaved arrangement shown in FIG. 49, the $n^{th}$ extent in the $(k-1)^{th}$ dependent-view stream file is placed between the $n^{th}$ base-view extent and the $(n+1)^{th}$ base-view extent. To seamlessly play back video from these extent groups, the size $S_{ext1}[n]$ of the $n^{th}$ (n=2, 3, . . . ) base-view extent and the size $S_{extk}[n]$ of the $n^{th}$ extent in the $(k-1)^{th}$ dependent-view stream file should fulfill the following conditions.

During playback of 2D video images, when the jump from the $n^{th}$ (an integer n is sufficiently large) base-view extent to the $(n+1)^{th}$ base-view extent requires a time length $T_{jump-2D}[n]$ each base-view extent is read into the first read buffer 4221 at a rate $R_{ud-2D}$, and the base-view stream file is transferred from the first read buffer 4221 to the system target decoder 4203 at a mean rate of $R_{ext1-2D}[n]$, then the size $S_{ext1}[n]$ of the $n^{th}$ base-view extent should fulfill Equation 18.

$$S_{ext1}[n] \geq \frac{R_{ud-2D} \times R_{ext1-2D}[n]}{R_{ud-2D} - R_{ext1-2D}[n]} \times T_{jump-2D}[n] \qquad \text{Equation 18}$$

During playback of 3D video images, when the jump from the $n^{th}$ base-view extent to the $n^{th}$ extent in the $(k-1)^{th}$ dependent-view stream file requires a time length $TF_{jump-k-3D}[n]$ the jump from the $n^{th}$ extent in the $(k-1)^{th}$ dependent-view stream file to the $(n+1)^{th}$ base-view extent requires a time length $TB_{jump-k-3D}[n]$, each base-view extent is read into the first read buffer 4221 at a rate $R_{ud-3D}$, each extent in the $(k-1)^{th}$ dependent-view stream file is read into the second read buffer 4222 at the rate $R_{ud-3D}$, and the base-view stream file is transferred from the first read buffer 4221 to the system target decoder 4203 at a mean rate of $R_{ext1-3D}[n]$, the size $S_{ext1}[n]$ of the $n^{th}$ base-view extent should fulfill Equation 19.

$$S_{ext1}[n] \geq \frac{R_{ud-3D} \times R_{ext1-3D}[n]}{R_{ud-3D} - R_{ext1-3D}[n]} \times \left( TF_{jump-k-3D}[n] + \frac{S_{extk}[n]}{R_{ud-3D}} + TB_{jump-k-3D}[n] \right) \qquad \text{Equation 19}$$

Furthermore, in playback of 3D video images, when the jump from the $n^{th}$ base-view extent to the $(n+1)^{th}$ extent in the $(k-1)^{th}$ dependent-view stream file requires a time length $TF_{jump-k-3D}[n+1]$ and the $(k-1)^{th}$ dependent-view stream file is transferred from the second read buffer 4222 to the system target decoder 4203 at a mean rate of $R_{extk-3D}[n]$, the size $S_{extk}[n]$ of the $n^{th}$ extent in the $(k-1)^{th}$ dependent-view stream file should fulfill Equation 20.

$$S_{extk}[n] \geq \frac{R_{ud-3D} \times R_{extk-3D}[n]}{R_{ud-3D} - R_{extk-3D}[n]} \times \left( TB_{jump-k-3D}[n] + \frac{S_{ext1}[n+1]}{R_{ud-3D}} + TF_{jump-k-3D}[n+1] \right) \qquad \text{Equation 20}$$

(11) When playing back 3D video images from the extent groups shown in FIG. 49, the buffer margin times UL1 and UL2 are guaranteed by successively reading a certain number of extents into the read buffers 4221 and 4222, as can be easily understood from FIGS. 57A and 57B. Accordingly, if there were few extents placed between a starting position of interrupt playback and a layer boundary LB, there would be a risk that the accumulated data amounts DA1 and DA2 in the read buffers 4221 and 4222 might not reach the buffer margin amounts UL1 and UL2 before the jump produced by layer switching. In order to avoid that risk, interrupt playback should be prohibited in extent groups located a predetermined number of extents immediately before a layer boundary LB.

Figure 58:
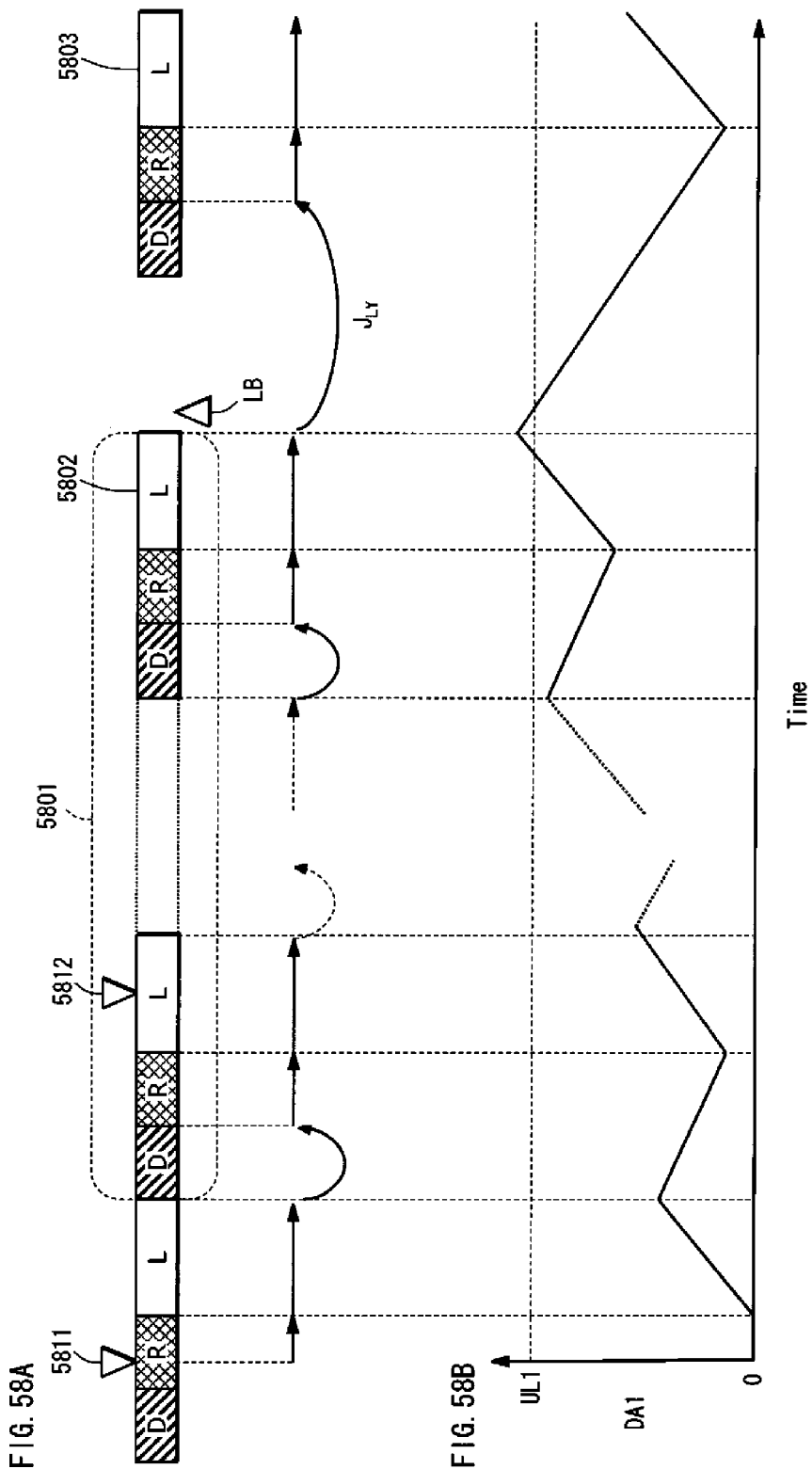
FIGS. 58A and 58B are schematic diagrams showing the relationship between a section in which interrupt playback is prohibited and the change of the accumulated data amount in the first read buffer.

FIGS. 58A and 58B are schematic diagrams showing the relationship between a section in which interrupt playback is prohibited and the change of the accumulated data amount DA1 in the first read buffer 4221. As shown in FIG. 58A, the depth map extent group D, right-view extent group R, and left-view extent group L are recorded in an interleaved arrangement on two recording layers separated by a layer boundary LB, similar to the arrangement shown in FIG. 49. The interrupt playback prohibited area 5801 is set for extent groups consecutively located a predetermined number of extents immediately before the layer boundary LB. Interrupt playback is prohibited in the interrupt playback prohibited area 5801. In the example shown in FIG. 58A, since the first entry point 5811 is located before the interrupt playback prohibited area 5801, interrupt playback at this point is allowed. On the other hand, since the second entry point 5812 is located in the interrupt playback prohibited area 5801, interrupt playback at this point is prohibited.

FIG. 58B is a graph showing the change of the accumulated data amount DA1 in the first read buffer 4221 during interrupt playback from the first entry point 5811. This interrupt playback is performed in L/R mode, and in accordance with the playback path 5810 shown in FIG. 58A, the left-view extents L included in the area from the first entry point 5811 to the layer boundary LB are read into the first read buffer 4221. At that time, as shown in FIG. 58B, each time a left-view extent L is processed, the accumulated data amount DA1 increases. In particular, when the left-view extent 5802 located immediately before the layer boundary LB is read into the first read buffer 4221, the accumulated data amount DA1 exceeds the first buffer margin amount UL1. Therefore, from the starting point of the jump $J_{LY}$ that occurs immediately afterwards to the point when the top of the next left-view extent 5803 is read, underfloor does not occur in the first read buffer 4221. The same is true for the second read buffer 4222.

Based on the above description, the length of the interrupt playback prohibited area 5801 should fulfill the following two conditions: (A) the number of left-view extents located from the top of the interrupt playback prohibited area 5801 to immediately before the layer boundary LB should exceed the value yielded by dividing the first buffer margin amount UL1 by the margin time, and (B) the number of right-view extents located from the top of this area to immediately before the layer boundary LB should exceed the value yielded by dividing the second buffer margin amount UL2 by the margin time.

The interrupt playback prohibited area 5801 is specified to the 3D playback device in the following way. First, in the clip information file corresponding to the AV stream file to which each extent belongs, an interrupt playback prohibited mark is added to each entry point 4012 in the entry map 3823 shown in FIG. 40A. The "interrupt playback prohibited mark" is a flag and indicates whether or not the position in the extent shown by the entry point is included in an interrupt playback prohibited area 5801. When the 3D playback device is instructed to perform interrupt playback of 3D video images by user instruction or the like, the playback control unit 4207 shown in FIG. 42 refers to the interrupt playback prohibited mark in the clip information file. In this way, the 3D playback device can determine whether or not the starting position of interrupt playback is included in an interrupt playback prohibited area 5801. Note that the "interrupt playback prohibited mark" may be included in the playitem information in the 3D playlist file 243B shown in FIG. 30. When instructed to perform interrupt playback of 3D video images, the 3D playback device can determine whether or not to permit interrupt playback by making the playback control unit 4207 refer to the interrupt playback prohibited mark in the 3D playlist file.

(12) Extents belonging to a different file than the AV stream files may be inserted in the extent groups in an interleaved arrangement shown in FIG. 49. Such a different file may, for example, be the movie object file 242B, the BD-J object file 246A, or the JAR file 247A, which are shown in FIG. 2. FIG.

Figure 59:
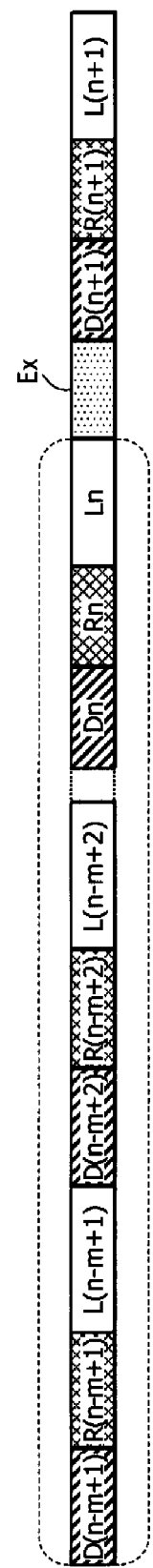
FIG. 59 is a schematic diagram showing the arrangement of the extent groups in an interleaved arrangement shown in FIG. 49 when an extent belonging to a file other than the AV stream file is inserted into the extent groups.

59 is a schematic diagram showing the arrangement of the extent groups in such a case. As shown in FIG. 59, an extent Ex is inserted between the $n^{th}$ left-view extent Ln and the $(n+1)^{th}$ depth map extent D(n+1). The file to which this extent Ex belongs is different from either AV stream file. In this case, the insertion of extents belonging to a file other than the AV stream files is prohibited in m sets of extents arranged consecutively immediately before the extent Ex, i.e. D(n−m+1), R(n−m+1), L(n−m+1), D(n−m+2), R(n−m+2), L(n−m+2), ..., Dn, Rn, Ln. Here, three types of consecutive extents Dk, Rk, Lk (k=1, 2, 3, etc.) are defined as a set. Furthermore, the number m is at least equivalent to the value yielded by dividing the buffer margin amounts UL1 and UL2 by the margin time. When these m sets of extents are read in order from the top into the read buffers 4221 and 4222, the accumulated data amounts DA1 and DA2 exceed the buffer margin amounts UL1 and UL2. Accordingly, underfloor does not occur in the read buffers 4221 and 4222 while reading of the extent Ex is being skipped by the immediately subsequent jump.

Here, in the regulation shown in FIG. 24, when the jump distance exceeds 40,000 sectors, the corresponding jump time becomes significantly longer. The buffer capacity necessary for such a long jump time can easily become excessively large. Accordingly, it is preferable that the size of the extent Ex be set so that the interval between the left-view extents Ln and L(n+1) placed immediately before and after the extent Ex not exceed 40,000 sectors.

(13) When playing back 3D video images from the extent groups shown in FIG. 49, the buffer margin amounts UL1 and UL2 are guaranteed by successively reading a certain number of extents into the read buffers 4221 and 4222, as can be easily understood from FIGS. 57A and 57B. Accordingly, interruption by read processes of files other than AV stream files, such as the BD-J object file 246A or the like, is prohibited from the point at which reading of the AV stream files from the BD-ROM disc 101 starts until a predetermined number of extents have been read into the read buffers 4221 and 4222. Additionally, the accumulated data amounts DA1 and DA2 in the read buffers 4221 and 4222 are monitored, and while either falls below the corresponding buffer margin amount UL1 or UL2, interruption by read processes of other files may be prohibited.

In the example shown in FIGS. 57A and 57B, when a certain number of extents have been successively read into the read buffers 4221 and 4222, the buffer margin amounts UL1 and UL2 are guaranteed. Additionally, the buffer margin amounts UL1 and UL2 may be guaranteed immediately after reading of the AV stream files into the read buffers 4221 and 4222 has begun using the method described below. Immediately after the BD-ROM drive 4201 starts to read the AV stream files, this method makes the system target decoder 4203 wait to perform decoding processing not only during reading of the first dependent-view extent, but also until a predetermined time has passed after reading of the first base-view extent begins. This predetermined time is set so that, during the standby period, a sufficient data amount will accumulate in the read buffers 4221 and 4222. In this way, when reading of the second base-view extent and dependent-view extent begins, the accumulated data amounts DA1 and DA2 are already maintained at the buffer margin amounts UL1 and UL2.

FIGS. 60A and 60B are graphs showing the change of the accumulated data amounts DA1 and DA2 in the read buffers 4221 and 4222 when this method is used on the extent groups shown in FIG. 49. In the following explanation, 3D video images are assumed to be played back in L/R mode from the top of the extent groups shown in FIG. 49. This explanation is also applicable when 3D video images are played back in depth mode and when 3D video images are played back from an arbitrary extent via interrupt playback. Note that the size of each extent has already been determined so as to fulfill Equations 5 and 6. Here, as described below, a margin time does not need to be included in the zero sector transition time $T_{jump\text{-}0}[\bullet]$ to be substituted into Equations 5 and 6.

First, during the first read period $PR_R1$, the top right-view extent R1 is read from the BD-ROM disc 101 and output to the second read buffer 4222. In the first read period $PR_R1$, as shown in FIG. 60B, the accumulated data amount DA2 in the second read buffer 4222 increases from 0 at the 3D video image read rate $R_{ud\text{-}3D}$.

At the end of the first read period $PR_R1$, the first zero sector transition period $PJ_01$ starts. During the first zero sector transition period $PJ_01$, reading of data from the BD-ROM disc 101 is suspended. Therefore, the accumulated data amounts DA1 and DA2 in the read buffers 4221 and 4222 are both maintained constant.

At the point the first zero sector transition period $PJ_01$ ends, the second read period $PR_L1$ begins. During the second read period $PR_L1$, the top left-view extent L1 is read from the BD-ROM disc 101 and output to the first read buffer 4221. However, the system target decoder 4203 continues on standby until a predetermined time dt has passed from the start of the second read period $PR_L1$. Accordingly, as shown in FIG. 60A, the accumulated data amount DA1 in the first read buffer 4221 increases from 0 at the 3D video image read rate $R_{ud\text{-}3D}$. Conversely, as shown in FIG. 60B, the accumulated data amount DA2 in the second read buffer 4222 is maintained constant.

When the predetermined time dt has passed from the start of the second read period $PR_L1$, the system target decoder 4203 is activated and starts to read and decode source packets from the read buffers 4221 and 4222. Accordingly, as shown in FIG. 60A, the rate of increase of the accumulated data DA1 in the first read buffer 4221 decreases from the 3D video image read rate $R_{ud\text{-}3D}$ by the left-view transfer rate $R_{ext1\text{-}3D}[1]$. Conversely, as shown in FIG. 60B, the accumulated data amount DA2 in the second read buffer 4222 decreases by the right-view transfer rate $R_{ext2}[1]$.

When the end of the top left-view extent L1 is read, the first jump $J_{LR}1$ is performed to skip over the immediately subsequent depth map extent D2 to the next right-view extent R2. During the first jump period $PJ_{LR}1$, reading of data from the BD-ROM disc 101 is suspended. Therefore, as shown in FIG. 60A, the accumulated data amount DA1 in the first read buffer 4221 decreases at the left-view transfer rate $R_{ext1\text{-}3D}[1]$, whereas, as shown in FIG. 60B, the accumulated data amount DA2 in the second read buffer 4222 continues to decrease at the right-view transfer rate $R_{ext2}[1]$.

Unlike FIG. 57B, in FIG. 60B, data is not transferred from the second read buffer 4222 to the system target decoder 4203 until the predetermined time dt has passed from the start of the second read period $PR_L1$. In other words, the amount of time that the accumulated data amount DA2 in the second read buffer 4222 decreases is shortened by the predetermined time dt. As a result, the data amount transferred from the second read buffer 4222 to the system target decoder 4203 from the second read period $PR_L1$ through the first jump period $PJ_{LR}1$ is smaller than the size $S_{ext2}[1]$ of the top right-view extent R1 by the second buffer margin amount UL2. Accordingly, at the end of the first jump period $PJ_{LR}1$, as shown in FIG. 60B, the accumulated data amount DA2 in the second read buffer 4222 does not fall below the second buffer margin amount UL2.

At the point the first jump period $PJ_{LR}1$ ends, the third read period $PR_R2$ begins. During the third read period $PR_R2$, the second right-view extent R2 is read from the BD-ROM disc 101 and output to the second read buffer 4222. Accordingly, as shown in FIG. 60B, the accumulated data amount DA2 in the second read buffer 4222 increases at a rate equivalent to the difference between the 3D video image read rate $R_{ud-3D}$ and the right-view transfer rate $R_{ext2}[2]$, or $R_{ud-3D}-R_{ext2}[2]$. Conversely, as shown in FIG. 60A, the accumulated data amount DA1 in the first read buffer 4221 continues to decrease at the left-view transfer rate $R_{ext1-3D}[1]$.

When the end of the second right-view extent R2 is read, the second zero sector transition period $PJ_02$ starts. During the second zero sector transition period $PJ_02$, reading of data from the BD-ROM disc 101 is suspended. Therefore, the accumulated data amount DA1 in the first read buffer 4221 decreases at the left-view transfer rate $R_{ext1-3D}[2]$, and the accumulated data amount DA2 in the second read buffer 4222 decreases at the right-view transfer rate $R_{ext2}[2]$.

Unlike FIG. 57B, in FIG. 60B, data is not transferred from the first read buffer 4221 to the system target decoder 4203 until the predetermined time dt has passed from the start of the second read period $PR_L1$. In other words, the transfer time is shortened by the predetermined time dt. As a result, the data amount transferred from the first read buffer 4221 to the system target decoder 4203 from the second read period $PR_L1$ through the second zero sector transition period $PJ_02$ is smaller than the size $S_{ext1}[1]$ of the top left-view extent L1 by the first buffer margin amount UL1. Accordingly, at the end of the first jump period $PJ_02$, as shown in FIG. 60A, the accumulated data amount DA1 in the first read buffer 4221 does not fall below the first buffer margin amount UL1.

After the second zero sector transition period $PJ_02$, the size of each extent should be set so that the accumulated data amounts DA1 and DA2 in the read buffers 4221 and 4222 exhibit the change shown in FIGS. 53A-B. In other words, each time an extent is processed, the accumulated data amounts DA1 and DA2 in the read buffers 4221 and 4222 should return to the respective buffer margin amounts UL1 and UL2. Accordingly, a margin time does not need to be included in the zero sector transition time $T_{jump-0}[\cdot]$ substituted into Equations 5 and 6.

During interrupt playback, the first extents to be read are not limited to the top extents R1 and L1, but may be any arbitrary extents Rn, Ln (excluding, however, extents in interrupt playback prohibited areas). Therefore, based on the above-mentioned considerations, the predetermined time dt should fulfill Equations 21 and 22 for an arbitrary integer n.

$$S_{ext1}[n] - UL1 \geq \left(\frac{S_{ext1}[n]}{R_{ud-3D}} - dt + T_{jump-3D}[n] + \frac{S_{ext2}[n+1]}{R_{ud-3D}} + T_{jump-0}[n+1]\right) \times R_{ext1}[n] \quad \text{Equation 21}$$

$$\therefore dt \geq \frac{S_{ext1}[n]}{R_{ud-3D}} + T_{jump-3D}[n] + \frac{S_{ext2}[n+1]}{R_{ud-3D}} + T_{jump-0}[n+1] - \frac{S_{ext1}[n] - UL1}{R_{ext1}[n]}$$

$$S_{ext2}[n] - UL2 \geq \left(\frac{S_{ext1}[n]}{R_{ud-3D}} - dt + T_{jump-3D}[n]\right) \times R_{ext2}[n] \quad \text{Equation 22}$$

$$\therefore dt \geq \frac{S_{ext1}[n]}{R_{ud-3D}} + T_{jump-3D}[n] - \frac{S_{ext2}[n] - UL2}{R_{ext2}[n]}$$

As shown by FIG. 60A, during the read process of the top left-view extent L1, the accumulated data amount DA1 in the first read buffer 4221 reaches its maximum value at the end of the second read period $PR_L1$. Accordingly, to read the $n^{th}$ left-view extent Ln, the capacity RB1[n] of the first read buffer 4221 should fulfill Equation 23 instead of Equation 15.

$$RB1[n] \geq CEI\left(L\frac{R_{ud-3D}}{8} \times dt + \frac{R_{ud-3D} - R_{max1-3D}[n]}{8} \times \left(\frac{S_{ext1}[n]}{R_{ud-3D}} - dt\right)\right) = \quad \text{Equation 23}$$

$$CEI\left(L\frac{R_{max1-3D}[n]}{8} \times dt + \frac{R_{ud-3D} - R_{max1-3D}[n]}{8} \times \frac{S_{ext1}[n]}{R_{ud-3D}}\right)$$

On the other hand, as shown by FIG. 60B, during the read process of the top right-view extent R1, the accumulated data amount DA2 in the second read buffer 4222 should at least be equivalent to the size of the top right-view extent R1. Accordingly, to read the $n^{th}$ right-view extent Rn, the capacity RB2[n] of the second read buffer 4222 should fulfill the above-mentioned Equation 16.

Embodiment 2

The following describes, as the second embodiment of the present invention, a recording device and a recording method for recording the recording medium of Embodiment 1 of the present invention.

The recording device described here is called an authoring device. The authoring device, generally located at a creation studio that creates movie contents to be distributed, is used by authoring staff. First, in accordance with an operation by the authoring staff, the recording apparatus converts movie content into a digital stream compression encoded in accordance with an MPEG specification, i.e. into an AV stream file. Next, the recording device generates a scenario, which is information defining how each title included in the movie content is to be played back. Specifically, the scenario includes the above-described dynamic scenario information and static scenario information. Then, the recording device generates a volume image or an update kit for a BD-ROM disc from the aforementioned digital stream and scenario. Lastly, the recording device records the volume image on the recording medium in accordance with the arrangements of extents explained in the afore-described Embodiment 1.

FIG. 61 is a block diagram of an internal structure of the above-described recording device. As shown in FIG. 61, the recording device includes a video encoder 6101, a material creation unit 6102, a scenario generation unit 6103, a BD program creation unit 6104, a multiplex processing unit 6105, a format processing unit 6106, and a database unit 6107.

The database unit 6107 is a nonvolatile storage device embedded in the recording device. Specifically, the database unit 6107 is a hard disk drive (HDD). Alternatively, the database unit 6107 may be an external HDD connected to the recording device, a nonvolatile semiconductor memory device embedded in the recording device, or an external nonvolatile semiconductor memory device connected to the recording device.

The video encoder 6101 receives video data, such as uncompressed bitmap data, from the authoring staff, and compresses the received video data in accordance with a compression/encoding scheme such as MPEG-4 AVC or MPEG-2. This process converts primary video data into a primary video stream, and secondary video data into a secondary video stream. In particular, 3D video image data is converted into a 2D/left-view stream or a right-view stream. As shown in FIGS. 34A and 34B, the video encoder 6101 forms the 2D/left-view stream as a base-view stream by performing inter-picture predictive encoding on the pictures included in the 2D/left-view stream. On the other hand, the video encoder 6101 forms the right-view stream as a dependent-view stream by performing inter-picture predictive encoding on both the pictures included in the 2D/left-view stream and the pictures included in the right-view stream. Alternatively, the right-view stream and the 2D/left-view stream may be formed as the base-view stream and the dependent-view stream, respectively. The converted video streams 6111 are stored into the database unit 6107.

During the above-described process of inter-picture predictive encoding, the video encoder 6101 further detects motion vectors between left video images and right video images and calculates depth information of each 3D video image based on the detected motion vectors. The calculated depth information of each 3D video image is organized into the frame depth information 6110 that is stored in the database unit 6107.

FIGS. 62A, 62B, and 62C are schematic diagrams showing processes to calculate depth information from a pair of left and right pictures by the video encoder 6101.

The video encoder 6101 first compresses each picture using the redundancy between the left and right pictures. At that time, the video encoder 6101 compares an uncompressed left picture and an uncompressed right picture on a per-macroblock basis (each macroblock containing 8×8 or 16×16 pixels, with all the macroblocks representing a matrix) so as to detect a motion vector for each image in the two pictures. Specifically, as shown in FIGS. 62A and 62B, a left video picture 6201 and a right video picture 6202 are each divided into macroblocks 6203, the entirety of which represents a matrix. Next, the areas occupied by the image data in picture 6201 and picture 6202 are compared for each macroblock 6203, and a motion vector between these pieces of image data is detected based on the result of the comparison. For example, the area occupied by image 6204 showing a "house" in picture 6201 is substantially the same as that in picture 6202. Accordingly, a motion vector is not detected from such areas. On the other hand, the area occupied by image 6205 showing a "circle" in picture 6201 is substantially different from the area in picture 6202. Accordingly, a motion vector indicating the displacement between the images 6205 showing the "circles" in the pictures 6201 and 6202 is detected from these areas.

The video encoder 6101 next makes use of the detected motion vector not only when compressing the pictures 6201 and 6202, but also when calculating the binocular parallax pertaining to a 3D video image constituted from the pieces of image data 6204 and 6205. Furthermore, in accordance with the binocular parallax thus obtained, the video encoder 6101 calculates the "depths" of each image, such as the images 6204 and 6205 of the "house" and "circle." The information indicating the depth of each image may be organized, for example, into a matrix 6206 the same size as the matrix of the macroblocks in pictures 6201 and 6202 as shown in FIG. 62C. The frame depth information 6110 shown in FIG. 61 includes this matrix 6206. In this matrix 6206, blocks 6207 are in one-to-one correspondence with the macroblocks 6203 in pictures 6201 and 6202. Each block 6207 indicates the depth of the image shown by the corresponding macroblocks 6203 by using, for example, eight bits. In the example shown in FIGS. 62A-C, the depth of the image 6205 of the "circle" is stored in each of the blocks in an area 6208 in the matrix 6206. This area 6208 corresponds to the entire areas in the pictures 6201 and 6202 that show the image 6205.

Returning to FIG. 61, the material creation unit 6102 creates elementary streams other than video streams, such as an audio stream 6112, a PG stream 6113, and an IG stream 6114, and stores the created streams into the database unit 6107. For example, the material creation unit 6102 receives uncompressed LPCM audio data from the authoring staff, encodes the uncompressed LPCM audio data in accordance with a compression/encoding scheme such as AC-3, and converts the encoded LPCM audio data into the audio stream 6112. The material creation unit 6102 also receives a subtitle information file from the authoring staff and creates the PG stream 6113 in accordance with the subtitle information file. The subtitle information file defines image data for showing subtitles, display timings of the subtitles, and visual effects to be added to the subtitles (e.g., fade-in and fade-out). Furthermore, the material creation unit 6102 receives bitmap data and a menu file from the authoring staff and creates the IG stream 6114 in accordance with the bitmap data and the menu file. The bitmap data shows images that are to be presented on a menu. The menu file defines how each button on the menu is to be transitioned from one status to another, and visual effects to be added to each button.

The scenario generation unit 6103 creates BD-ROM scenario data 6115 in accordance with an instruction that has been issued by the authoring staff and received via GUI and then stores the created BD-ROM scenario data 6115 in the database unit 6107. The BD-ROM scenario data 6115 described here is a file group that defines methods of playing back the elementary streams 6111 to 6114 stored in the database unit 6107. Of the file group shown in FIG. 2, the BD-ROM scenario data 6115 includes the index file 242A, the movie object file 242B, and the playlist files 243A-C. The scenario generation unit 6103 further creates a parameter file 6116 and transfers the created parameter file 6116 to the multiplex processing unit 6105. The parameter file 6116 defines, from among the elementary streams 6111 to 6114 stored in the database unit 6107, one or more streams to be multiplexed to form each AV stream file.

The BD program creation unit 6104 provides the authoring staff with a programming environment for programming a BD-J object and Java application programs. The BD program creation unit 6104 receives a request from a user via GUI and creates each program's source code according to the request. The BD program creation unit 6104 further creates the BD-J object file 246A from the BD-J object and compresses the Java application programs in the JAR file 247A. The files 246A and 247A are transferred to the format processing unit 6106.

Here, it is assumed that the BD-J object is programmed in the following way: the BD-J object causes the program execution unit 4206 shown in FIG. 42 to transfer graphics data for GUI to the system target decoder 4203. Furthermore, the BD-J object causes the system target decoder 4203 to process the graphics data as the image plane data 4306 shown in FIG. 43. In this case, the BD program creation unit 6104 may set offset information corresponding to the image plane data 4306 in the BD-J object by using the frame depth information 6110 stored in the database unit 6107.

In accordance with the parameter file 6116, the multiplex processing unit 6105 multiplexes each of the elementary streams 6111-6114 stored in the database unit 6107 to form a stream file in an MPEG-2 TS format. More specifically, as shown in FIG. 5, each of the elementary streams 6111 to 6114 is converted into a source packet series, and the source packets included in each series are assembled to construct a single stream file. In this manner, the AV stream files 245A-C shown in FIG. 2 are created.

In parallel with the aforementioned processing, the multiplex processing unit 6105 creates the clip information files which respectively correspond to the AV stream files 245A-C by the following procedure. First, the entry maps 1103 and 3823 shown in FIGS. 13A and 40A are generated. Next, for each AV stream file, the stream attribute information 1102 shown in FIG. 12 is extracted from each elementary stream to be multiplexed. Furthermore, as shown in FIGS. 11, 38A, and 38B, a pair of an entry map and a piece of stream attribute information is associated with the clip information that indicates each AV stream file.

The format processing unit 6106 creates a BD-ROM disc image 6120 of the directory structure 204 shown in FIG. 2 from (i) the BD-ROM scenario data 6115 stored in the database unit 6107, (ii) a group of program files including, among others, a BD-J object file created by the BD program creation unit 6104, and (iii) AV stream files and clip information files generated by the multiplex processing unit 6105. In this directory structure 204, UDF is used as a file system.

When creating a file entry of an AV stream file, the format processing unit 6106 refers to the entry map of a corresponding clip information file. In this manner, the SPN of each entry point is used for creation of allocation descriptors. In particular, allocation descriptors in a file entry of an AV stream file of 3D video images are created such that, with a depth map extent at the start of the file, three types of extents are arranged alternately, as shown in FIG. 49. Furthermore, the size of each extent is set so as to fulfill Equations 4-8, and the value of the logical address shown by each allocation descriptor is determined accordingly.

In addition, by using the frame depth information 6110 stored in the database unit 6107, the format processing unit 6106 creates the 3D meta data 3814 shown in FIGS. 39A and 39B for each of the secondary video stream 6111, the PG stream 6113, and the IG stream 6114. Here, the positions of image data pieces within left and right video frames are automatically adjusted so that 3D video images represented by one stream avoid overlap with 3D video images represented by other streams in the same visual direction. Furthermore, an offset value for each video frame is also automatically adjusted so that depths of 3D video images represented by one stream avoid agreement with depths of 3D video images represented by other streams.

Thereafter, the BD-ROM disc image 6120 generated by the format processing unit 6106 is converted into data suited for pressing of a BD-ROM disc, then recorded on the master to be utilized for creation of the BD-ROM disc. Mass production of the BD-ROM disc 101 pertaining to Embodiment 1 of the present invention is made possible by using the master in the press process.

<Supplementary Explanation>

<<Data Distribution via Broadcasting or Communication Circuit>>

The recording medium according to Embodiment 1 of the present invention may be, in addition to an optical disc, a general removable medium available as a package medium, such as a portable semiconductor memory device including an SD memory card. Also, Embodiment 1 describes an example of an optical disc in which data has been recorded beforehand, namely, a conventionally available read-only optical disc such as a BD-ROM or a DVD-ROM. However, the embodiment of the present invention is not limited to these. For example, when a terminal device writes a 3D video content that has been distributed via broadcasting or a network into a conventionally available writable optical disc such as a BD-RE or a DVD-RAM, arrangement of the extents according to the above-described embodiment may be used.

Here, the terminal device may be incorporated in a playback device, or may be a device different from the playback device.

<<Playback of Semiconductor Memory Card>>

The following describes a data read unit of a playback device in the case where a semiconductor memory card is used as the recording medium according to Embodiment 1 of the present invention instead of an optical disc.

A part of the playback device that reads data from an optical disc is composed of an optical disc drive, for example. Compared with this, a part of the playback device that reads data from a semiconductor memory card is composed of an exclusive interface (I/F). In more detail, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<<Copyright Protection Technique for Data Stored in BD-ROM Disc>>

Here, the mechanism for protecting copyright of data recorded on a BD-ROM disc is described, as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key," namely, an MKB (Media Key Block), and encrypted data of the "key," namely, an encrypted title key. The device key, the MKB, and the encrypted title key are associated with one another, and each are further associated with a particular identifier written into a BCA 201 recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above-mentioned "key," namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key."

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<<Recording Data on Recording Medium through Electronic Distribution>>

The following describes processing of transmitting data such as an AV stream file for 3D video images (hereinafter, "distribution data") to the playback device according to Embodiment 1 of the present invention via electronic distribution, and causing the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. Here, the playback device reads identification information of the SD memory card from the SD memory card, and transmits the read identification information to the distribution server together with the transmission request. The identification information of the SD memory card is for example an identification number specific to the SD memory card, more specifically, a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. Here, the encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information, and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information, and records the received distribution data and public key information in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) A check is performed on whether the identification information of the SD memory card included in the public key information matches the identification number stored in the SD memory card inserted into the card slot.

(2) A check is performed on whether a hash value calculated based on the public key information matches the hash value included in the signature information.

(3) A check is performed on whether the playback device is excluded from the device list indicated by the public key information, and specifically, whether the device key of the playback device is excluded from the device list.

If at least any one of the results of the checks (1) to (3) is negative, the playback device stops decryption processing of the encrypted data. Conversely, if all of the results of the checks (1) to (3) are affirmative, the playback device authorizes the public key information, and decrypts the encrypted title key included in the public key information using the device key, the MKB, and the identification information of the SD memory card, thereby to obtain a title key. The playback device further decrypts the encrypted data using the title key, thereby to obtain a video stream and/or an audio stream for example.

The afore-mentioned mechanism has the following advantage. If a playback device, compositional elements, and a function (program) that have risk of being in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to easily realize an illegal copy of the SD memory card. In other words, if the tampering allows generation of a plurality of semiconductor memory cards having the same identification information, it is impossible to identify between authorized products and unauthorized copy products by performing the above-described check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that the above-described application program desirably checks whether the application program itself has been tampered with, before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<<Application to Real-Time Recording>>

Embodiment 2 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file in a writable recording medium such as a BD-RE disc, a BD-R disc, a hard disk, or a semiconductor memory card (hereinafter, "BD-RE disc or the like"), and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. Here, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<<Managed Copy>>

The playback device according to Embodiment 1 of the present invention may write a digital stream recorded on the BD-ROM disc 101 on another recording medium via a managed copy. Here, managed copy refers to a technique for permitting copy of a digital stream, a playlist file, a clip information file, and an application program from a read-only recording medium such as a BD-ROM disc to a writable recording medium only in the case where authentication with the server via communication succeeds. Here, the writable recording medium may be a writable optical disc such as a BD-R, a BD-RE, a DVD-R, a DVD-RW, and a DVD-RAM, and a portable semiconductor memory device such as a hard disk, an SD memory card, a Memory Stick™, a Compact Flash™, a Smart Media™, and a Multimedia Card™. A managed copy allows for limitation of the number of backups of data recorded on a read-only recording medium and for charging for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. Here, a "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<<Method for Describing Data Structure>>

Among the data structures in Embodiment 1 of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in Embodiment 1 is described using a high level programming language. Accordingly, the data structure is converted by a computer into a computer readable code via the translation process performed by a compiler, which includes "syntax analysis," "optimization," "resource allocation," and "code generation," and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<<Management of Playlist File and Clip Information File by Playback Program>>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory device of a computer and is then executed by the computer. The loading process includes compile processing or link processing. By these processes, the playback program is divided into a plurality of sections in the memory device. The sections include a text section, a data section, a bss section, and a stack section. The text section includes a code array of the playback program, an initial value, and non-rewritable data. The data section includes variables with initial values and rewritable data. In particular, the data section includes a file, recorded on the recording device, that can be accessed at any time. The bss section includes variables having no initial value. The data included in the bss section is referenced in accordance with commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording device into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

<<System LSI>>

A playback device according to Embodiment 1 of the present invention includes middleware, a system LSI, and hardware other than the system LSI. The playback device further includes an interface for the middleware, an interface between the middleware and the system LSI, an interface between the middleware and other hardware, and a user interface. When these elements are incorporated in a playback device, they operate in cooperation with one another. As a result, each element provides the playback device with a particular function. By appropriately defining the interface for the middleware and the interface between the middleware and the system LSI, it is possible to develop the user interface, middleware, and system LSI in the playback device independently, in parallel, and efficiently. Note that in each interface, there is generally a variety of such appropriate definitions.

INDUSTRIAL APPLICABILITY

The present invention relates to a technique for playing back stereoscopic video images. As described above, the present invention provides clear lower limits for the base-view extents and the dependent-view extents recorded on a recording medium. It is thus clear that the present invention is industrially applicable.

REFERENCE SIGNS LIST

DA1 Accumulated data amount in first read buffer
DA2 Accumulated data amount in second read buffer
UL1 Buffer margin amount for first read buffer
UL2 Buffer margin amount for second read buffer
Dn $n^{th}$ depth map extent
Rn $n^{th}$ right-view extent
Ln $n^{th}$ left-view extent
$PR_R$n Read period for $n^{th}$ right-view extent
$PJ_0$n Zero sector transition period immediately after $n^{th}$ right-view extent
$PR_L$n Read period for $n^{th}$ left-view extent
$PJ_{LR}$n Jump period immediately after $n^{th}$ left-view extent
$J_0$n Zero sector transition immediately after $n^{th}$ right-view extent
$J_{LR}$n Jump immediately after $n^{th}$ left-view extent

The invention claimed is:

1. A non-transitory computer-readable recording medium storing a base-view stream file and a dependent-view stream file recorded thereon, the base-view stream file to be used for monoscopic video playback, the dependent-view stream file to be used for stereoscopic video playback in combination with the base-view stream file, the recording medium comprising a contiguous area in which a plurality of base-view extents belonging to the base-view stream file and a plurality of dependent-view extents belonging to the dependent-view stream file are arranged in an interleaved manner, wherein:

a lower limit of a size of each base-view extent is set at a larger one of a first lower limit value and a second lower limit value so that buffer underflow does not occur in a playback device during both monoscopic video playback and stereoscopic video playback;

the first lower limit value is determined by a value proportional to a jump time from each base-view extent to a next base-view extent during monoscopic video playback;

the second lower limit value is determined by a value proportional to a read time of a next dependent-view extent after each base-view extent during stereoscopic video playback;

a lower limit of a size of each dependent-view extent is set at a third lower limit value so that buffer underflow does not occur in a playback device during stereoscopic video playback;

the third lower limit value is determined by a value proportional to a read time of a next base-view extent after each dependent-view extent during stereoscopic video playback;

a dependent-view extent is arranged at the head of the contiguous area;

an $n^{th}$ base-view extent has a size $S_{ext1}[n]$, where an integer n is larger than one;

during monoscopic video playback by a first playback device that includes a first read buffer and a first decoder, when (i) a jump time $T_{jump-2D}(n)$ from the $n^{th}$ base-view extent to an $(n+1)^{th}$ base-view extent is required, (ii) each base-view extent is read into the first read buffer at a rate $R_{ud-2D}$, and (iii) the base-view stream file is transferred from the first read buffer to the first decoder at a mean rate $R_{ext1-2D}$, then the first lower limit value is expressed by the right-hand side of the following equation, $$S_{ext1}[n] \geq \frac{R_{ud-2D} \times R_{ext1-2D}}{R_{ud-2D} - R_{ext1-2D}} \times T_{jump-2D}[n];$$

an $(n+1)^{th}$ dependent-view extent located next after the $n^{th}$ base-view extent has a size $S_{ext2}[n+1]$;

during stereoscopic video playback by a second playback device that includes a second read buffer, a third read buffer, and a second decoder, when (i) each base-view extent is read into the second read buffer at a rate $R_{ud-3D}$, (ii) each dependent-view extent is read into the third read buffer at a rate $R_{ud-3D}$, and (iii) the base-view stream file is transferred from the second read buffer to the second decoder at a mean rate $R_{ext1-3D}$, then the second lower limit value is expressed by the right-hand side of the following equation, $$S_{ext1}[n] \geq \frac{R_{ud-3D} \times R_{ext1-3D}}{R_{ud-3D} - R_{ext1-3D}} \times \frac{S_{ext2}[n+1]}{R_{ud-3D}}; \text{ and}$$

during the stereoscopic video playback, when the dependent-view stream file is transferred from the third read buffer to the second decoder at a mean rate $R_{ext2-3D}$, then the third lower limit value is expressed by the right-hand side of the following equation, $$S_{ext2}[n] \geq \frac{R_{ud-3D} \times R_{ext2-3D}}{R_{ud-3D} - R_{ext2-3D}} \times \frac{S_{ext1}[n]}{R_{ud-3D}}.$$

2. A playback device for playing back video images from a recording medium, comprising:

a reading unit operable to read a base-view stream file and a dependent-view stream from the recording medium, the base-view stream file to be used for monoscopic video playback, the dependent-view stream file to be used for stereoscopic video playback in combination with the base-view stream file;

a separation unit operable to separate extents from the base-view and dependent-view stream files read by the reading unit;

a first read buffer storing base-view extents belonging to the base-view stream file from among the extents separated by the separation unit;

a second read buffer storing dependent-view extents belonging to the dependent-view stream file from among the extents separated by the separation unit; and a decoder operable to receive and decode from the first and second read buffers compressed pictures included in the extents, wherein:

the recording medium comprises a contiguous area in which a plurality of base-view extents and a plurality of dependent-view extents are arranged in an interleaved manner;

a lower limit of a size of each base-view extent is set at a larger one of a first lower limit value and a second lower limit value so that underflow does not occur in the first read buffer during both monoscopic video playback and stereoscopic video playback;

the first lower limit value is determined by a value proportional to a jump time from each base-view extent to a next base-view extent during monoscopic video playback;

the second lower limit value is determined by a value proportional to a read time of a next dependent-view extent after each base-view extent during stereoscopic video playback;

a lower limit of a size of each dependent-view extent is set at a third lower limit value so that underflow does not occur in the second read buffer during stereoscopic video playback;

the third lower limit value is determined by a value proportional to a read time of a next base-view extent after each dependent-view extent during stereoscopic video playback;

a dependent-view extent is arranged at the head of the contiguous area an $n^{th}$ base-view extent has a size $S_{ext1}[n]$, where an integer n is larger than one;

when, during monoscopic video playback, (i) the reading unit requires a jump time $T_{jump-2D}(n)$ from the $n^{th}$ base-view extent to an $(n+1)^{th}$ base-view extent, (ii) the reading unit reads each base-view extent into the first read buffer at a rate $R_{ud-2D}$, and (iii) the decoder transfers the base-view stream file from the first read buffer at a mean rate $R_{ext1-2D}$, then the first lower limit value is expressed by the right-hand side of the following equation, $$S_{ext1}[n] \geq \frac{R_{ud-2D} \times R_{ext1-2D}}{R_{ud-2D} - R_{ext1-2D}} \times T_{jump-2D}[n];$$

an $(n+1)^{th}$ dependent-view extent located next after the $n^{th}$ base-view extent has a size $S_{ext2}[n+1]$;

when, during stereoscopic video playback, (i) the reading unit reads each base-view extent into the first read buffer at a rate $R_{ud-3D}$, (ii) the reading unit reads each dependent-view extent into the second read buffer at a rate $R_{ud-3D}$, and (iii) the decoder transfers the base-view stream file from the first read buffer at a mean rate $R_{ext1-3D}$, then the second lower limit value is expressed by the right-hand side of the following equation, $$S_{ext1}[n] \geq \frac{R_{ud-3D} \times R_{ext1-3D}}{R_{ud-3D} - R_{ext1-3D}} \times \frac{S_{ext2}[n+1]}{R_{ud-3D}}; \text{ and}$$

when, during the stereoscopic video playback, the decoder transfers the dependent-view stream file from the second read buffer at a mean rate $R_{ext2-3D}$, then the third lower limit value is expressed by the right-hand side of the following equation, $$S_{ext2}[n] \geq \frac{R_{ud-3D} \times R_{ext2-3D}}{R_{ud-3D} - R_{ext2-3D}} \times \frac{S_{ext1}[n]}{R_{ud-3D}}.$$

3. An integrated circuit loaded on a playback device for playing back video images from a recording medium, the playback device comprising:
a reading unit operable to read a base-view stream file and a dependent-view stream file from the recording medium, the base-view stream file to be used for monoscopic video playback, the dependent-view stream file to be used for stereoscopic video playback in combination with the base-view stream file;
a separation unit operable to separate extents from the base-view and dependent-view stream files read by the reading unit;
a first read buffer storing base-view extents belonging to the base-view stream file from among the extents separated by the separation unit; and
a second read buffer storing dependent-view extents belonging to the dependent-view stream file from among the extents separated by the separation unit,
the integrated circuit comprising:
a decoder operable to receive and decode from the first and second read buffers compressed pictures included in the extents; and
a control unit operable to control provision of the compressed pictures from the first and second read buffers to the decoder, wherein:
the recording medium comprises a contiguous area in which a plurality of base-view extents and a plurality of dependent-view extents are arranged in an interleaved manner;
a lower limit of a size of each base-view extent is set at a larger one of a first lower limit value and a second lower limit value so that underflow does not occur in the first read buffer during both monoscopic video playback and stereoscopic video playback;
the first lower limit value is determined by a value proportional to a jump time from each base-view extent to a next base-view extent during monoscopic video playback;
the second lower limit value is determined by a value proportional to a read time of a next dependent-view extent after each base-view extent during stereoscopic video playback;
a lower limit of a size of each dependent-view extent is set at a third lower limit value so that underflow does not occur in the second read buffer during stereoscopic video playback;
the third lower limit value is determined by a value proportional to a read time of a next base-view extent after each dependent-view extent during stereoscopic video playback;
a dependent-view extent is arranged at the head of the contiguous area
an $n^{th}$ base-view extent has a size $S_{ext1}[n]$, where an integer n is larger than one
when, during monoscopic video playback, (i) the reading unit requires a jump time $T_{jump-2D}(n)$ from the $n^{th}$ base-view extent to an $(n+1)^{th}$ base-view extent, (ii) the reading unit reads each base-view extent into the first read buffer at a rate $R_{ud-2D}$, and (iii) the control unit transfers the base-view stream file from the first read buffer to the decoder at a mean rate $R_{ext1-2D}$, then the first lower limit value is expressed by the right-hand side of the following equation, $$S_{ext1}[n] \geq \frac{R_{ud-2D} \times R_{ext1-2D}}{R_{ud-2D} - R_{ext1-2D}} \times T_{jump-2D}[n];$$

an $(n+1)^{th}$ dependent-view extent located next after the $n^{th}$ base-view extent has a size $S_{ext2}[n+1]$;
when, during stereoscopic video playback, (i) the reading unit reads each base-view extent into the first read buffer at a rate $R_{ud-3D}$, (ii) the reading unit reads each dependent-view extent into the second read buffer at a rate $R_{ud-3D}$, and (iii) the control unit transfers the base-view stream file from the first read buffer to the decoder at a mean rate $R_{ext1-3D}$, then the second lower limit value is expressed by the right-hand side of the following equation, $$S_{ext1}[n] \geq \frac{R_{ud-3D} \times R_{ext1-3D}}{R_{ud-3D} - R_{ext1-3D}} \times \frac{S_{ext2}[n+1]}{R_{ud-3D}}; \text{ and}$$

when, during the stereoscopic video playback, the control unit transfers the dependent-view stream file from the second read buffer to the decoder at a mean rate $R_{ext2-3D}$, then the third lower limit value is expressed by the right-hand side of the following equation, $$S_{ext2}[n] \geq \frac{R_{ud-3D} \times R_{ext2-3D}}{R_{ud-3D} - R_{ext2-3D}} \times \frac{S_{ext1}[n]}{R_{ud-3D}}.$$

* * * * *